United States Patent [19]
Kobayashi

[11] Patent Number: 6,019,695
[45] Date of Patent: Feb. 1, 2000

[54] AUTOMOBILE DRIVING SYSTEM

[75] Inventor: Toshio Kobayashi, Tokyo-To, Japan

[73] Assignee: Fuji Jukogyo Kabushiki Kaisha, Tokyo, Japan

[21] Appl. No.: 08/952,700

[22] PCT Filed: Apr. 2, 1997

[86] PCT No.: PCT/JP97/01144

§ 371 Date: Mar. 25, 1998

§ 102(e) Date: Mar. 25, 1998

[87] PCT Pub. No.: WO97/37153

PCT Pub. Date: Oct. 9, 1997

[30] Foreign Application Priority Data

| Apr. 2, 1996 | [JP] | Japan | 8-080348 |
| Apr. 15, 1996 | [JP] | Japan | 8-092271 |
| May 21, 1996 | [JP] | Japan | 8-125951 |
| May 13, 1996 | [JP] | Japan | 8-117865 |
| May 23, 1996 | [JP] | Japan | 8-128223 |
| May 15, 1996 | [JP] | Japan | 8-120633 |
| May 17, 1996 | [JP] | Japan | 8-123656 |
| May 27, 1996 | [JP] | Japan | 8-132207 |

[51] Int. Cl.[7] .................................................. F16H 3/52
[52] U.S. Cl. .......................... 475/204; 475/200; 475/192; 475/210; 475/319; 475/248; 475/252; 180/248; 180/249
[58] Field of Search ................................ 475/198, 317, 475/319, 210, 200, 202, 206, 204, 221, 222, 211, 252; 180/248, 249

[56] References Cited

U.S. PATENT DOCUMENTS

| 4,718,303 | 1/1988 | Fogelburg | 475/150 |
| 4,726,254 | 2/1988 | Kubo et al. | 475/200 X |
| 4,763,749 | 8/1988 | Miura et al. | 475/205 X |
| 4,779,699 | 10/1988 | Hatano | 475/221 X |
| 4,950,213 | 8/1990 | Morisawa | 475/210 X |
| 5,129,285 | 7/1992 | Sugano et al. | 475/200 X |
| 5,176,590 | 1/1993 | Haydock | 475/249 |
| 5,188,574 | 2/1993 | Echigo et al. | 475/200 X |

FOREIGN PATENT DOCUMENTS

| 121251 | 7/1984 | Japan | 475/210 |
| 164444 | 9/1984 | Japan | 475/210 |
| 2-168061 | 6/1990 | Japan | 475/210 |

Primary Examiner—Charles A Marmor
Assistant Examiner—Ankur Parekh
Attorney, Agent, or Firm—Smith, Gambrell & Russell, LLP Beveridge, DeGrandi, Weilacher & Young

[57] ABSTRACT

Principal components of an automobile driving system for a two-wheel drive vehicle including a torque converter, a belt-type variable-speed transmission, a front differential gear, a transmission case containing these components, a front drive shaft included in a transfer unit, a double-pinion planetary gear, a fixed shaft, a first friction coupling element and a second friction coupling element can be used as the principal components of an automobile driving system for a four-wheel drive vehicle. The automobile driving system for a four-wheel drive vehicle can be constructed by additionally incorporating third, fourth and fifth friction coupling elements, a rear differential gear and a power transmitting mechanism for transmitting power to the rear differential gear into the automobile driving system for a two-wheel drive vehicle.

21 Claims, 72 Drawing Sheets

|  | DRIVE RANGE(D) | REVERSE RANGE(R) | NEUTRAL POSITION(N) PARKING POSITION(P) |
|---|---|---|---|
| FIRST MULTIPLE-DISK CLUTCH 155 | ○ | | |
| SECOND MULTIPLE-DISK CLUTCH 165 | | ○ | |

FIG.13

|  | DRIVE RANGE(D) | REVERSE RANGE(R) | NEUTRAL POSITION(N) PARKING POSITION(P) |
| --- | --- | --- | --- |
| FIRST MULTIPLE-DISK CLUTCH 270 | ○ | | |
| SECOND MULTIPLE-DISK CLUTCH 280 | | ○ | |

FIG.21

|  | DRIVE RANGE(D) | REVERSE RANGE(R) | NEUTRAL POSITION(N) PARKING POSITION(P) |
|---|---|---|---|
| FIRST MULTIPLE-DISK CLUTCH 365 | ○ |  |  |
| SECOND MULTIPLE-DISK CLUTCH 375 |  | ○ |  |

FIG.30

|  | DRIVE RANGE(D) | REVERSE RANGE(R) | NEUTRAL POSITION(N) PARKING POSITION(P) |
| --- | --- | --- | --- |
| FIRST MULTIPLE-DISK CLUTCH 465 | ○ |  |  |
| SECOND MULTIPLE-DISK CLUTCH 475 |  | ○ |  |

FIG.38

|  | DRIVE RANGE(D) | REVERSE RANGE(R) | NEUTRAL POSITION(N) PARKING POSITION(P) |
|---|---|---|---|
| FIRST MULTIPLE-DISK CLUTCH 568 | ○ | | |
| SECOND MULTIPLE-DISK CLUTCH 578 | | ○ | |
| THIRD MULTIPLE-DISK CLUTCH 584 | ○ | | |
| FOURTH MULTIPLE-DISK CLUTCH 593 | (○) | ○ | |
| FIFTH MULTIPLE-DISK CLUTCH 5102 | | ○ | |

| | DRIVE RANGE(D) | REVERSE RANGE(R) | NEUTRAL POSITION(N) PARKING POSITION(P) |
|---|---|---|---|
| FIRST MULTIPLE-DISK CLUTCH 668 | ○ | | |
| SECOND MULTIPLE-DISK CLUTCH 678 | | ○ | |
| THIRD MULTIPLE-DISK CLUTCH 684 | (○) | ○ | |
| FOURTH MULTIPLE-DISK CLUTCH 693 | ○ | | |
| FIFTH MULTIPLE-DISK CLUTCH 6102 | | ○ | |

FIG.56

| | DRIVE RANGE(D) | REVERSE RANGE(R) | NEUTRAL POSITION(N) PARKING POSITION(P) |
|---|---|---|---|
| FIRST MULTIPLE-DISK CLUTCH 768 | ○ | | |
| SECOND MULTIPLE-DISK CLUTCH 778 | | ○ | |
| THIRD MULTIPLE-DISK CLUTCH 784 | ○ | | |
| FOURTH MULTIPLE-DISK CLUTCH 793 | (○) | ○ | |
| FIFTH MULTIPLE-DISK CLUTCH 7102 | | ○ | |

FIG.65

|  | DRIVE RANGE(D) | REVERSE RANGE(R) | NEUTRAL POSITION(N) PARKING POSITION(P) |
|---|---|---|---|
| FIRST MULTIPLE-DISK CLUTCH 868 | ○ | | |
| SECOND MULTIPLE-DISK CLUTCH 878 | | ○ | |
| THIRD MULTIPLE-DISK CLUTCH 884 | (○) | ○ | |
| FOURTH MULTIPLE-DISK CLUTCH 893 | ○ | | |
| FIFTH MULTIPLE-DISK CLUTCH 8102 | | ○ | |

FIG.73

AUTOMOBILE DRIVING SYSTEM

TECHNICAL FIELD

The present invention relates to an automobile driving system and, more specifically, to an automobile driving system capable of transmitting the driving force of an engine by a transmission capable of changing the output speed, and of driving two wheels selectively in a forward drive mode or a reverse drive mode by a double-pinion planetary gear, or distributing the driving force to the front and the rear axles of the vehicle and driving four wheels selectively in a forward drive mode or a reverse drive mode by a double-pinion planetary gear.

BACKGROUND ART

A prior art automobile driving system including a longitudinal arrangement of an engine and a transmission is disclosed in JP-A No. 51-89066. As shown in FIG. 1, this prior art automobile driving system is of a substantially U-shaped drive line in which an engine 1001, a torque converter 1002 and a belt-drive variable-speed transmission 1003 are disposed coaxially in a longitudinal arrangement, a reverse gear 1004 including a planetary gear is interposed between the torque converter 1002 and the belt-drive variable-speed transmission 1003, and power is transmitted from the belt-drive variable-speed transmission 1003 through a drive shaft 1006 to a differential gear 1005 disposed under the engine 1001.

This automobile driving system, however, has a relatively great length along the longitudinal axis of the vehicle body because the engine 1001, the torque converter 1002, the reverse gear 1004 and the transmission 1003 are arranged coaxially in a longitudinal arrangement. Therefore, a rear portion of the automobile driving system interferes with the wall of a tunnel formed under a passenger chamber in the vehicle body when the automobile driving system is installed in an engine room and hence the wall of the tunnel must be unavoidably protruded into the passenger chamber. Furthermore, a toe board separating the engine room and the passenger room from each other unavoidably needs to be shifted toward the passenger room, which reduces the space of the passenger room, adversely affecting the comfortability of the passenger room. Since the automobile driving system is disposed close to the toe board, the passenger room needs to be further reduced to secure a sufficient crush stroke for safety in case of head-on collision, which further spoils the comfortability of the passenger room. Moreover, it is difficult to secure a sufficient working space in the engine room which makes work for installing the automobile driving system in the engine room and maintenance work difficult.

In an automobile driving system shown in FIG. 2 proposed to solve the foregoing problems, a torque converter 1002 and a belt-drive variable-speed transmission 1003 are disposed coaxially behind an engine 1001 in a longitudinal arrangement. A reverse gear 1004 and a differential gear 1005 are disposed under the engine 1001, and the output driving force of the transmission 1003 is transmitted through the reverse gear 1004 and a drive shaft 1006 to the differential gear 1005. Thus, the length a of the automobile driving system along the axis of the vehicle is relatively small.

Although the disposition of the reverse gear interposed between the torque converter and the belt-drive variable-speed transmission under the engine is effective in reducing the length a along the longitudinal axis of the vehicle, the overall height h of the automobile driving system increases as shown in FIG. 2. The automobile driving system having such a relatively great overall height h imposes restrictions on the design of a slant nose body and limits the freedom of vehicle body design.

The foregoing prior art automobile driving systems are intended for use on a two-wheel drive vehicle. A center differential gear must be interposed between the reverse gear and the differential gear when constructing a automobile driving system for a four-wheel drive vehicle on the basis of those prior art automobile driving systems to distribute the output driving force of the reverse gear to the front and the rear axles. Consequently, a portion of the gear train lying under the engine protrudes greatly downward and the automobile driving system has a complicated construction.

Accordingly, it is an object of the present invention to solve the foregoing problems in the foregoing prior art automobile driving systems and to provide a compact automobile driving system having relatively small longitudinal and transverse dimensions, increasing the degree of freedom of vehicle body design, and securing a space for crush stroke and driving system mounting and dismounting work.

Another object of the present invention is to provide an automobile driving system having a simple construction, comprising component parts common to various types, and, when designed for use on a two-wheel drive vehicle, capable of being readily modified for use on a four-wheel drive vehicle.

DISCLOSURE OF THE INVENTION

According to a first aspect of the present invention, an automobile driving system for a two-wheel drive vehicle comprises an engine, a transmission which receives the output of the engine, a drive shaft extended in parallel to the crankshaft of the engine to transmit power to a differential gear, a double-pinion planetary gear having a sun gear operatively connected to the drive shaft, an input member for transmitting the output power of the transmission to a carrier included in the planetary gear, a first friction coupling element for selectively transmitting power from the carrier of the planetary gear to the drive shaft, and a second friction coupling element for selectively allowing a ring gear included in the planetary gear to rotate or restraining the same from rotation. The first and the second friction coupling element are operated selectively to set the automobile driving system selectively in a forward drive mode or a reverse drive mode.

More concretely, this automobile driving system comprises an engine, a transmission which receives the output of the engine, a front drive shaft extended in parallel to the crankshaft of the engine to transmit power to a front differential gear, a double-pinion planetary gear having a sun gear operatively connected to the front drive shaft, an input member for transmitting the output power of the transmission to a carrier included in the planetary gear, a first friction coupling element for selectively transmitting power from the carrier of the planetary gear to the front drive shaft, and a second friction coupling element for selectively allowing a ring gear included in the planetary gear to rotate or restraining the same from rotation. When the automobile driving system is set in the forward drive mode, the first friction coupling element is set in a state for power transmission and the second friction coupling element is set in a state for allowing the rotation of the ring gear. When the automobile driving system is set in the reverse drive mode, the first friction coupling element is disengaged and the second friction coupling element restrains the ring gear from rotation.

The component parts of the automobile driving system are common to a type for two-wheel drive vehicle and a type for a four-wheel vehicle and hence an automobile driving system for a four-wheel drive vehicle can be readily assembled by using parts for an automobile driving system for a two-wheel vehicle.

According to a second aspect of the present invention, an automobile driving system for a four-wheel drive vehicle comprises, in addition to the component of the automobile driving system for a two-wheel drive vehicle, a rear drive shaft extended in parallel to the crankshaft of the engine to transmit power to a rear differential gear, and a fifth friction coupling element for selectively interlocking the front drive shaft and the rear drive shaft. The input member serves as an input selecting means for selectively transmitting the output power of the transmission to the ring gear or the carrier of the planetary gear, the first friction coupling element is able to transmit the output power of the planetary gear to the rear drive shaft, the input selecting means and the friction coupling elements are engaged and disengaged selectively to distribute the output power of the transmission by the planetary gear to the front and the rear drive shaft and to set the automobile driving system in the forward drive mode or the reverse drive mode.

According to a third aspect of the present invention, an automobile driving system for a four-wheel drive vehicle comprises an engine, a transmission which receives the output power of the engine, a first drive shaft extended in parallel to the crankshaft of the engine to transmit power to one of two differential gears, a second drive shaft extended in parallel to the crankshaft of the engine to transmit power to the other differential gear, and a double-pinion planetary gear to distribute input power received from the transmission to the first and the second drive shaft and to set the automobile driving system selectively in a forward drive mode or a reverse drive mode.

The engine is mounted longitudinally or transversely on a vehicle body.

The output of the engine is transmitted to the ring gear or the carrier of the planetary gear or to the ring gear or the sun gear of the planetary gear.

The planetary gear may be disposed coaxially with the first drive shaft.

The double planetary gear is disposed apart from the transmission to enable the interposition of the input selecting means between the double planetary gear and the transmission.

The transmission comprises a primary shaft, a secondary shaft parallel to the primary shaft, a primary pulley mounted on the primary shaft, a secondary pulley mounted on the secondary shaft, and a drive belt extended between the primary and the secondary pulley. The ratio between the respective pitch diameters of the primary and the secondary pulley is varied to make the transmission function as a belt-drive variable-speed transmission.

The above and other features of the present invention will become more apparent from the following description taken in connection with the accompanying drawings.

BRIEF DESCRIPTION OF THE DRAWINGS

FIG. 13 is a table of assistance in explaining the operation of a friction coupling element;

FIG. 21 is a table of assistance in explaining the operation of a friction coupling element;

FIG. 30 is a table of assistance in explaining the operation of a friction coupling element;

FIG. 38 is a table of assistance in explaining the operation of a friction coupling element;

FIG. 48 is a table of assistance in explaining the operation of a friction coupling element;

Figure 51:
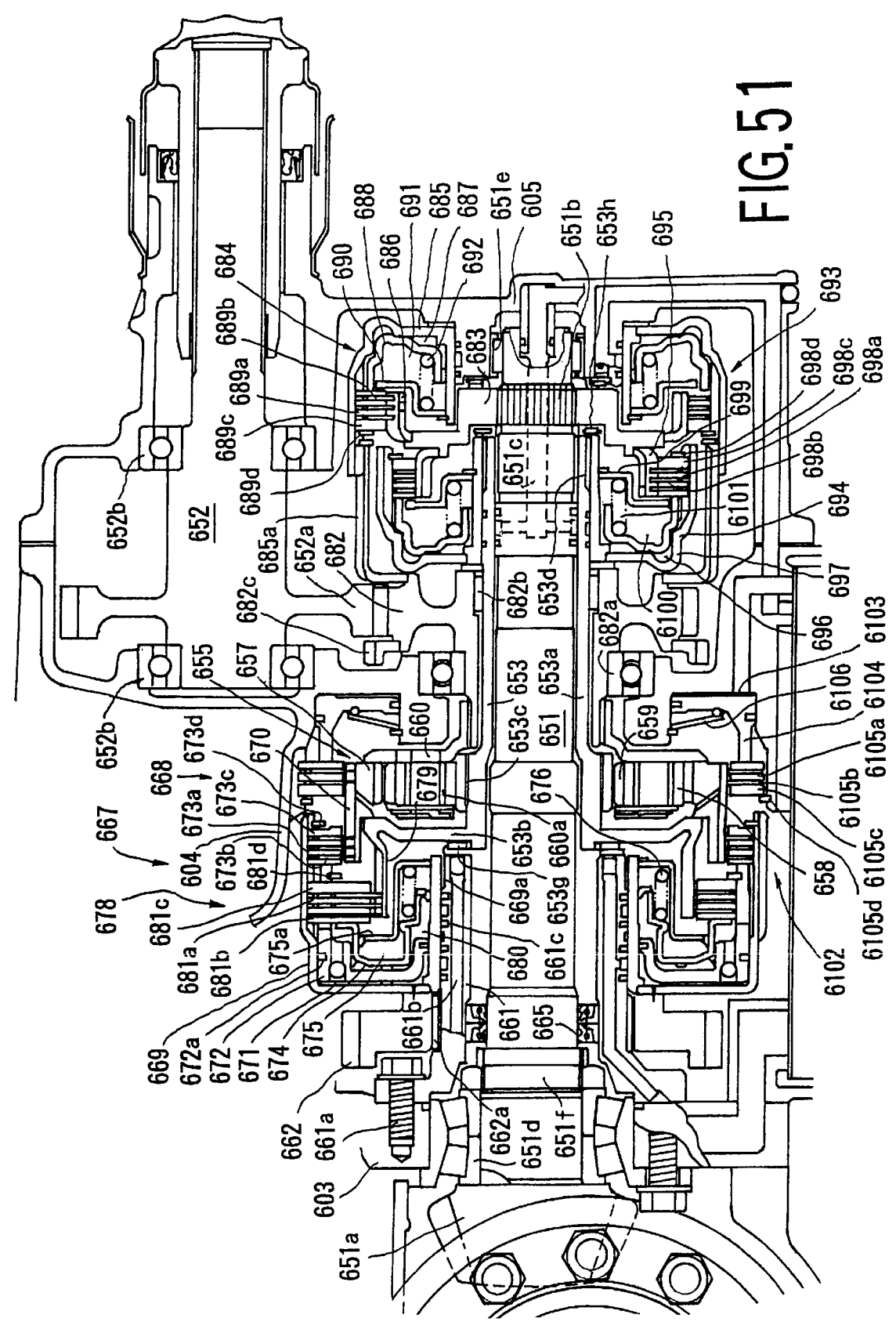

FIG. 51 is an enlarged view of a portion of the automobile driving system of FIG. 50;

FIG. 56 is a table of assistance in explaining the operation of a friction coupling element;

FIG. 65 is a table of assistance in explaining the operation of a friction coupling element;

FIG. 73 is a table of assistance in explaining the operation of a friction coupling element;

BEST MODE FOR CARRYING OUT THE INVENTION

Automobile driving systems embodying the present invention will be described with reference to the accompanying drawings.

Automobile driving systems in first to fourth embodiments are intended for use on two-wheel drive vehicles, and those in fifth to eighth embodiments are intended for use on four-wheel drive vehicles.

An engine is disposed longitudinally in the first, the second, the fifth and the sixth embodiment, and an engine is disposed transversely in the third, the fourth, the seventh and the eighth embodiment.

The automobile driving systems in the fifth and the sixth embodiment for four-wheel drive vehicles are manufactured on the bases of the automobile driving systems in the first and the second embodiment for two-wheel drive vehicles, and the automobile driving systems in the seventh and the eighth embodiment for four-wheel drive vehicles are manufactured on the bases of the automobile driving systems in the third and the fourth embodiment for two-wheel drive vehicles.

Each of the automobile driving system embodying the present invention employ a transmission constructed by combining a torque converter and a belt-drive variable-speed transmission.

First Embodiment

An automobile driving system 100 in a first embodiment according to the present invention for a two-wheel drive vehicle will be described with reference to FIGS. 3 to 13.

Figure 1:
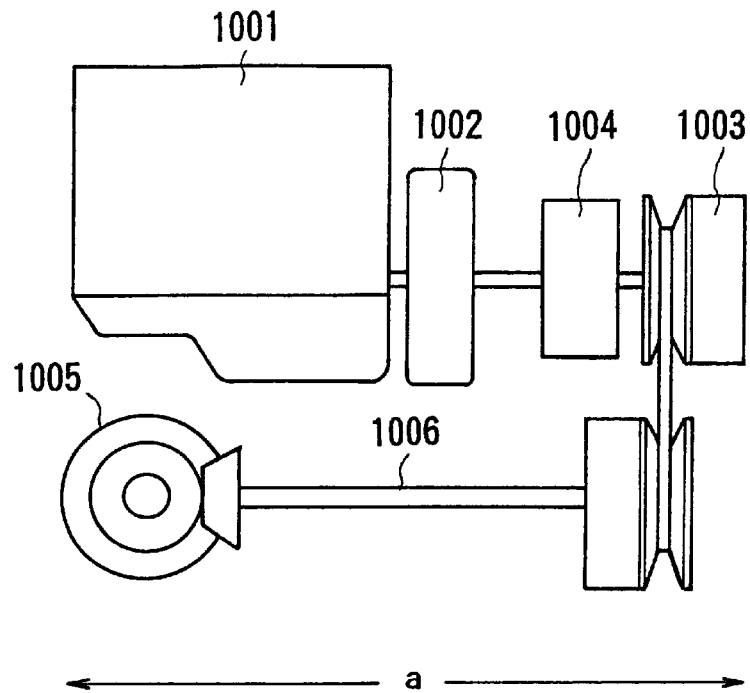
FIG. 1 is a typical view of a prior art automobile driving system.
Figure 2:
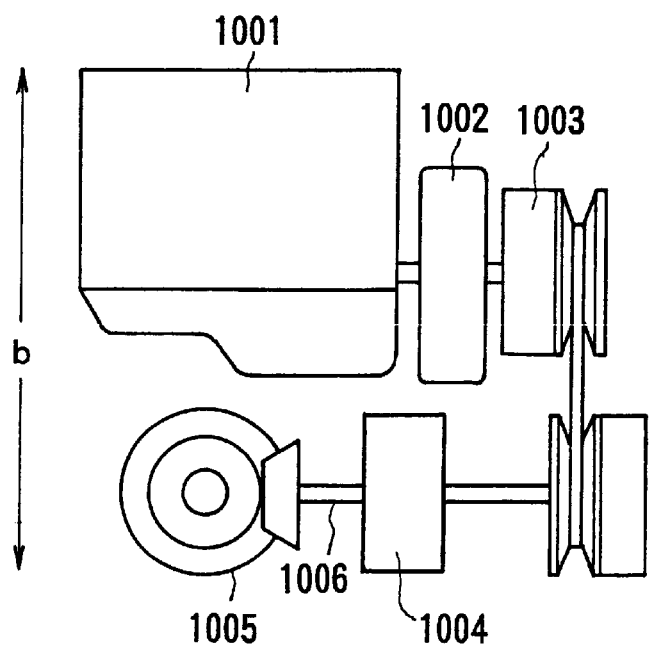
FIG. 2 is a schematic sectional view of another prior art automobile driving system.
Figure 3:
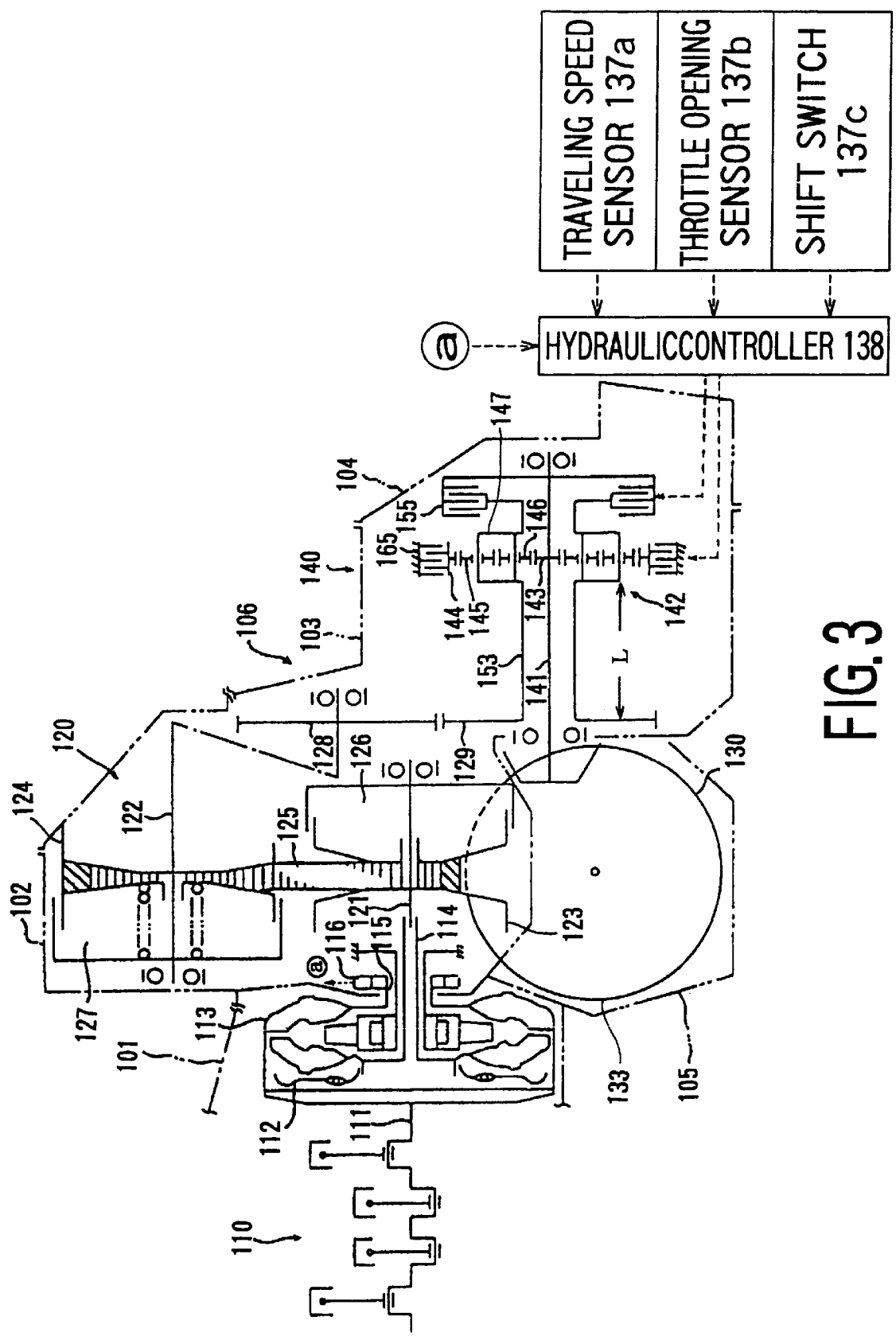
FIG. 3 is a typical view of an automobile driving system in a first embodiment according to the present invention.

Referring to FIG. 3, in the automobile driving system 100 in the first embodiment, a first case 101 joined to a longitudinal engine, a second case 102 disposed behind the first case 101 and containing a belt-drive variable-speed transmission 120, a third case 103 disposed behind the second case 102 and containing a transfer unit 140, and a fourth case 104 disposed behind the third case 103 so as to cover the open rear end of the third case 103 are arranged and joined successively in that order. A fifth case 105 containing a front differential gear 130 is joined to a lower portion of the second case 102 to construct a transmission case 106. An oil pan is attached to a lower portion of the transmission case 106.

The longitudinal engine 110 has a crankshaft 111 connected to a torque converter 113 provided with a lockup clutch 112 and contained in the first case 101. An output shaft 114 associated with the torque converter 113 is coupled with a primary shaft 121 included in the belt-drive variable-speed transmission 120 contained in the second case 102. The output shaft 114 included in the torque converter 113 and the primary shaft 121 are coaxial with the crankshaft 111 of the engine 110, and are supported for rotation in bearings on the transmission case 106.

The variable-speed transmission 120 has a secondary shaft 122 disposed beside and in parallel to the primary shaft 121. A primary pulley 123 and a secondary pulley 124 are mounted on the primary shaft 121 and the secondary shaft 122, respectively. The width of the groove of the primary pulley 123 is varied by a primary cylinder actuator 126, and the width of the groove of the secondary pulley 124 is varied by a secondary cylinder actuator 127. A drive belt 125 is extended between the primary pulley 123 and the secondary pulley 124.

A hydraulic control system varies the width of the groove between the movable and fixed cones of the primary pulley 123 and the secondary pulley 124 to vary the ratio between the pitch diameters of the primary pulley 123 and the secondary pulley 124, whereby the rotating speed of the secondary shaft 122 is varied continuously.

A primary reduction gear 128 is mounted on the secondary shaft 124, and power is transmitted through a primary driven gear 129 engaged with the primary reduction gear 128 to the transfer unit 140 contained in the third case 103 and the fourth case 104. An output driving force of the transfer unit 140 is transmitted, for example, through the front differential gear 130 to front wheels.

Figure 4:
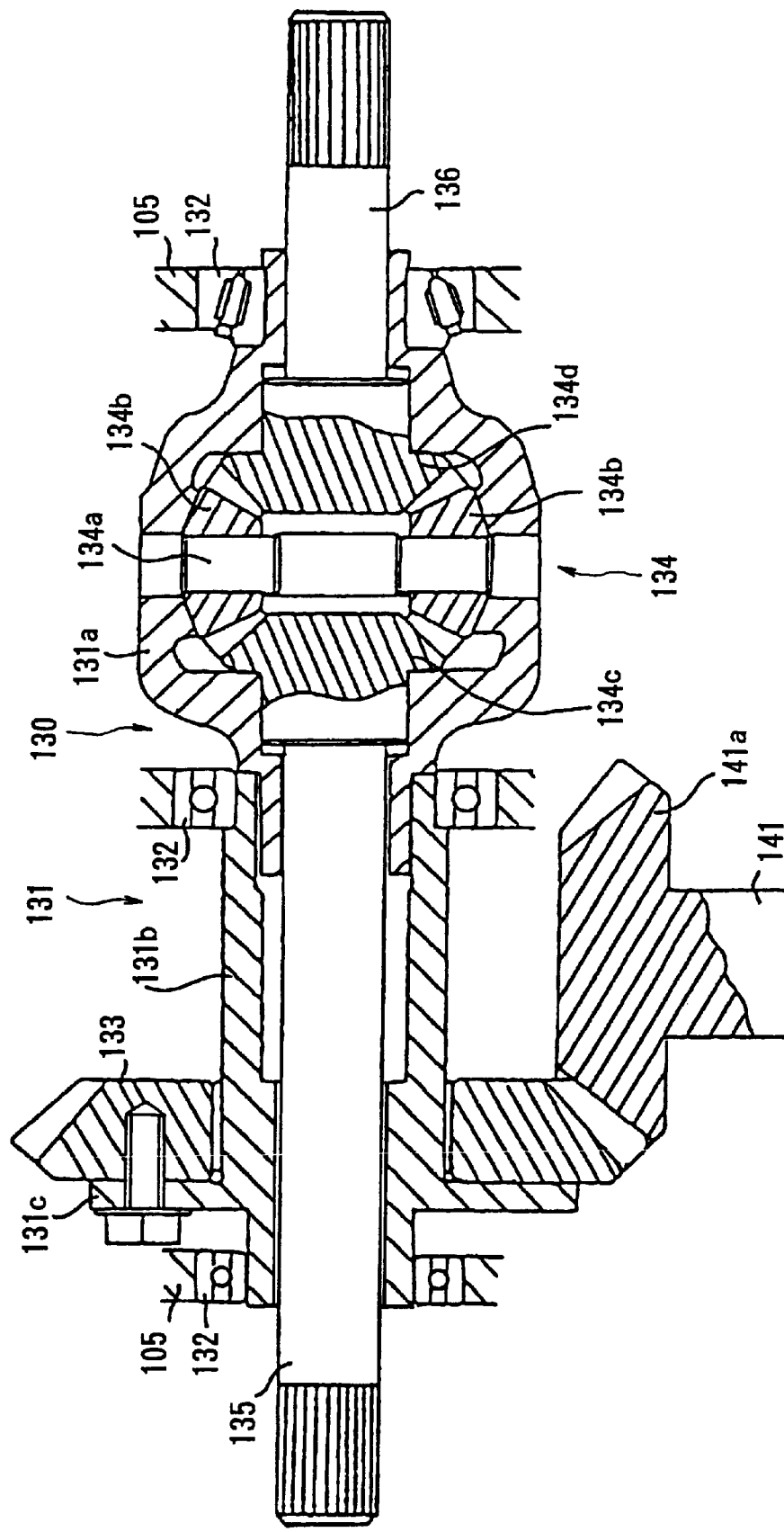
FIG. 4 is a schematic sectional view of a front differential gear unit included in the automobile driving system of FIG. 3.
Figure 5:
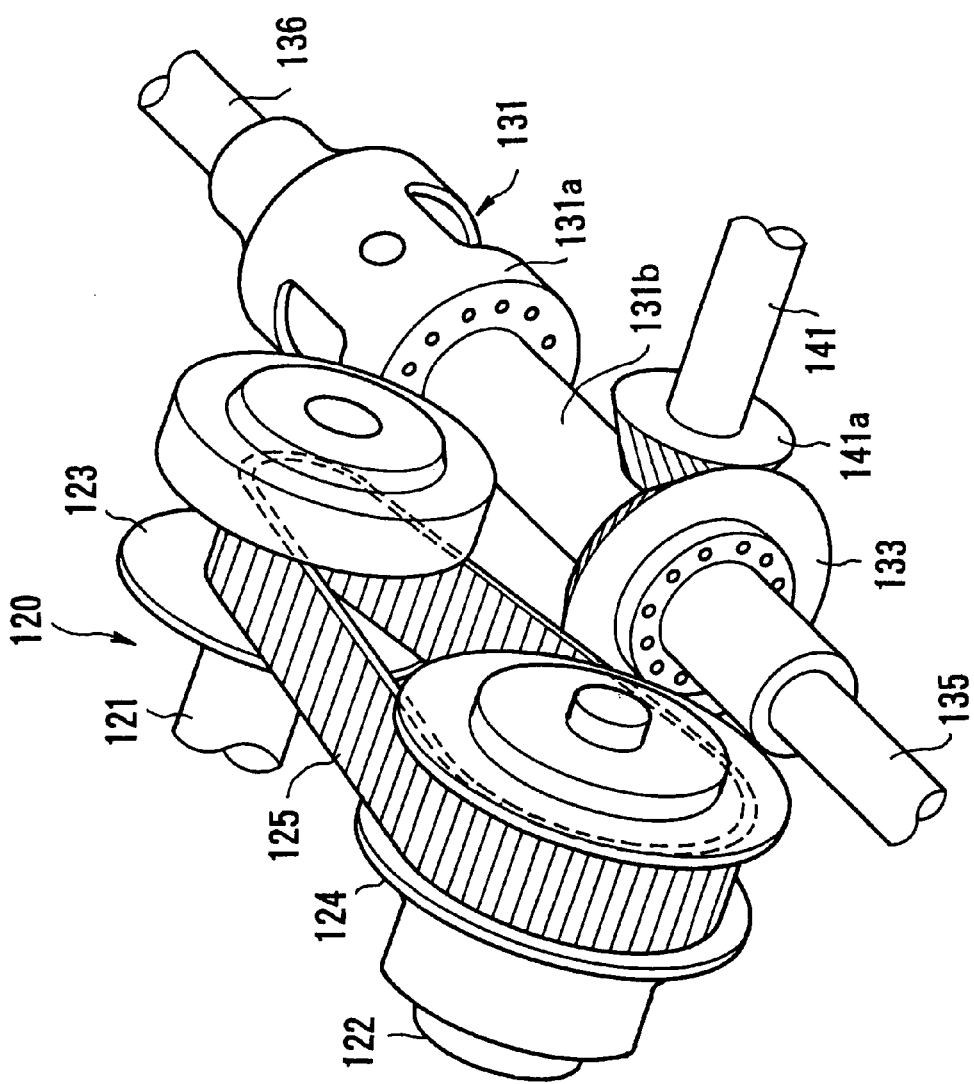
FIG. 5 is a perspective view of a front differential gear unit and a belt-drive variable-speed transmission.

FIG. 4 is a sectional view of an essential portion of the front differential gear 130 and FIG. 5 is a perspective view of an essential portion of the front differential gear 130, in which the transmission case 106 is omitted. Referring to FIGS. 4 and 5, a differential gear case 131 having a gear case 131a and a substantially cylindrical crown gear support member 131b formed integrally with the gear case 131a is disposed transversely in and supported for rotation in a plurality of bearings 132 on the fifth case 105. The crown gear support member 131b has a flange 131c, and a crown gear 133 is attached to the flange 131c. A front drive shaft 141 is operatively connected to the crown gear 133.

A differential gear 134 is constructed by supporting a pair of pinions 134b in the gear case 131a by pinion shafts 134a, and engaging right and left side gears 134c and 134d with the pinions 134b. A drive shaft 135 connected to the side gears 134c is extended from the gear case 131a through the crown gear support member 131b, and transmits driving force to one of the front wheels through a constant-velocity joint and an axle. A drive shaft 136 connected to the other side gear 134d projects from the gear case 131a and transmits driving force through a constant-speed joint and an axle to the other front wheel.

As viewed from above, the crown gear 133 is located at a position between the primary shaft 121 and the secondary shaft 122 below the variable-speed transmission 120. The crown gear 133 and the gear case 131a are disposed on the opposite sides, respectively, of the primary shaft 121 within the fifth case 105. Therefore, the crown gear 133 can be formed in a diameter smaller than that of a conventional crown gear which is mounted on the outer circumference of a differential gear case containing the differential gear 134. Thus, the front differential gear 130 has a relatively small overall size. The variable-speed transmission 120 and the front differential gear 130 can be disposed close to each other by disposing the front differential gear 130 with a middle portion of a relatively small diameter thereof between the crown gear 133 and the gear case 131a positioned opposite to the primary shaft 121.

As shown in FIG. 3, an oil pump 116 which is driven continuously by a stator shaft 115 included in the torque converter 113 is contained in the second case 102. The oil pump 116 discharges oil at a line pressure continuously to supply the oil to the torque converter 113 and associated parts, enables the hydraulic control of the variable-speed transmission 120, and enables the hydraulic control of the transfer unit 140 by a hydraulic controller 138 on the basis of signals provided by a traveling speed sensor 137a, a throttle opening sensor 137b and a shift switch 137c.

The construction of the transfer unit 140 will be described with reference to FIGS. 3 and 4.

As shown in FIG. 3, the transfer unit 140 has a front drive shaft 141, i.e., a first drive shaft, extended in parallel to the crankshaft 111 of the engine 110, the output shaft 114, the primary shaft 121 and the secondary shaft 122.

Figure 6:
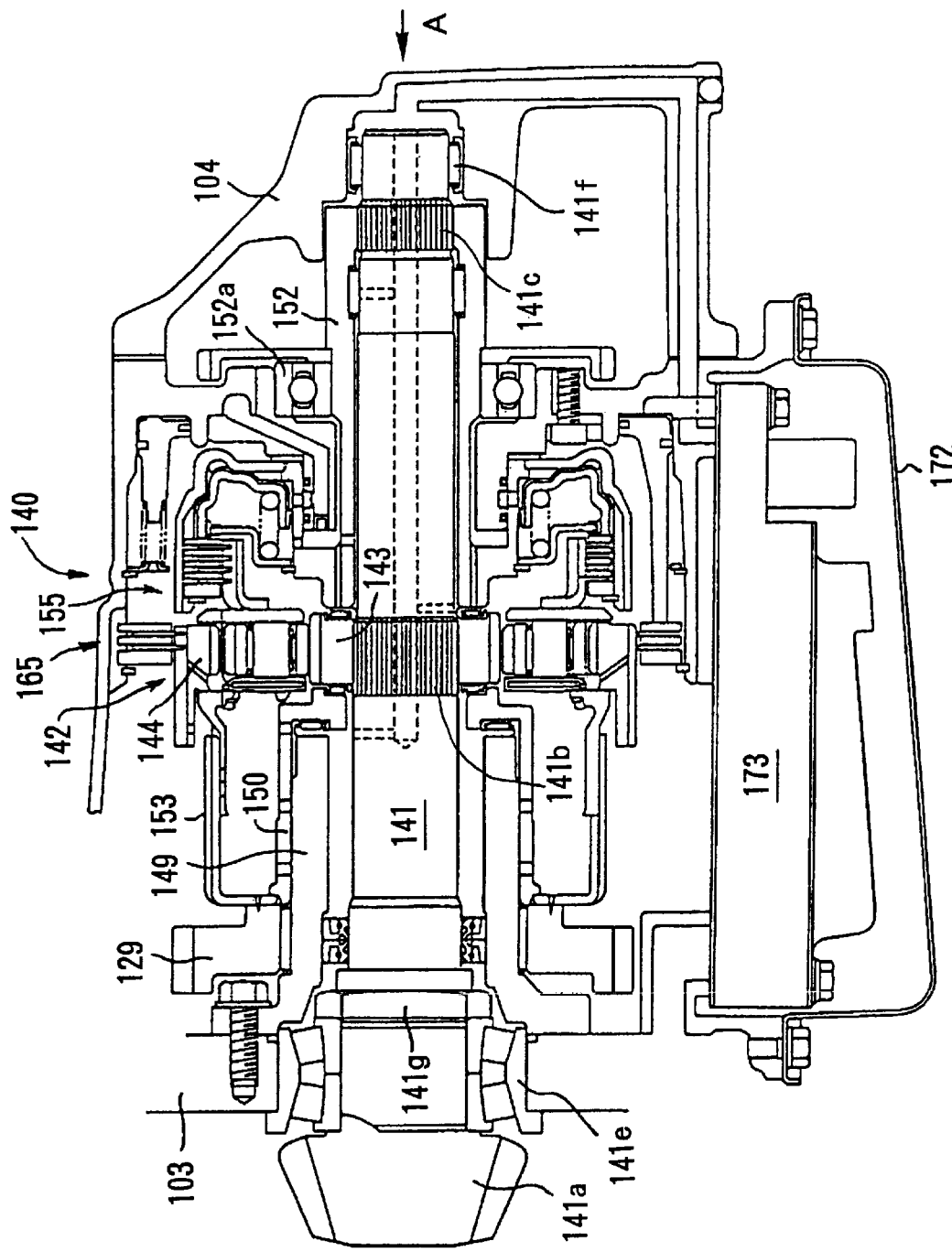
FIG. 6 is a sectional view of a transfer unit shown in FIG. 3.
Figure 7:
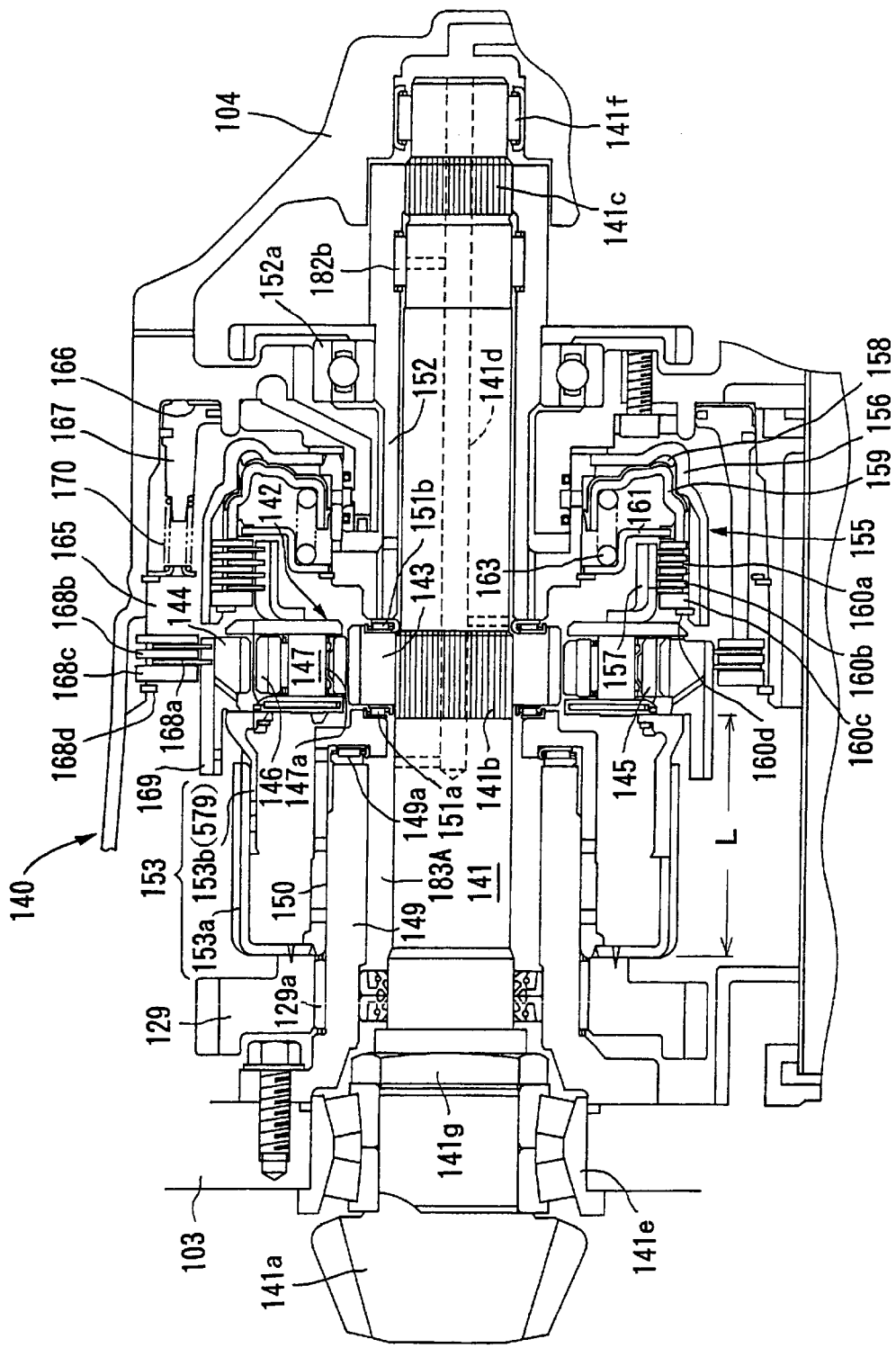
FIG. 7 is an enlarged sectional view of an essential portion of the transfer unit of FIG. 6.
Figure 8:
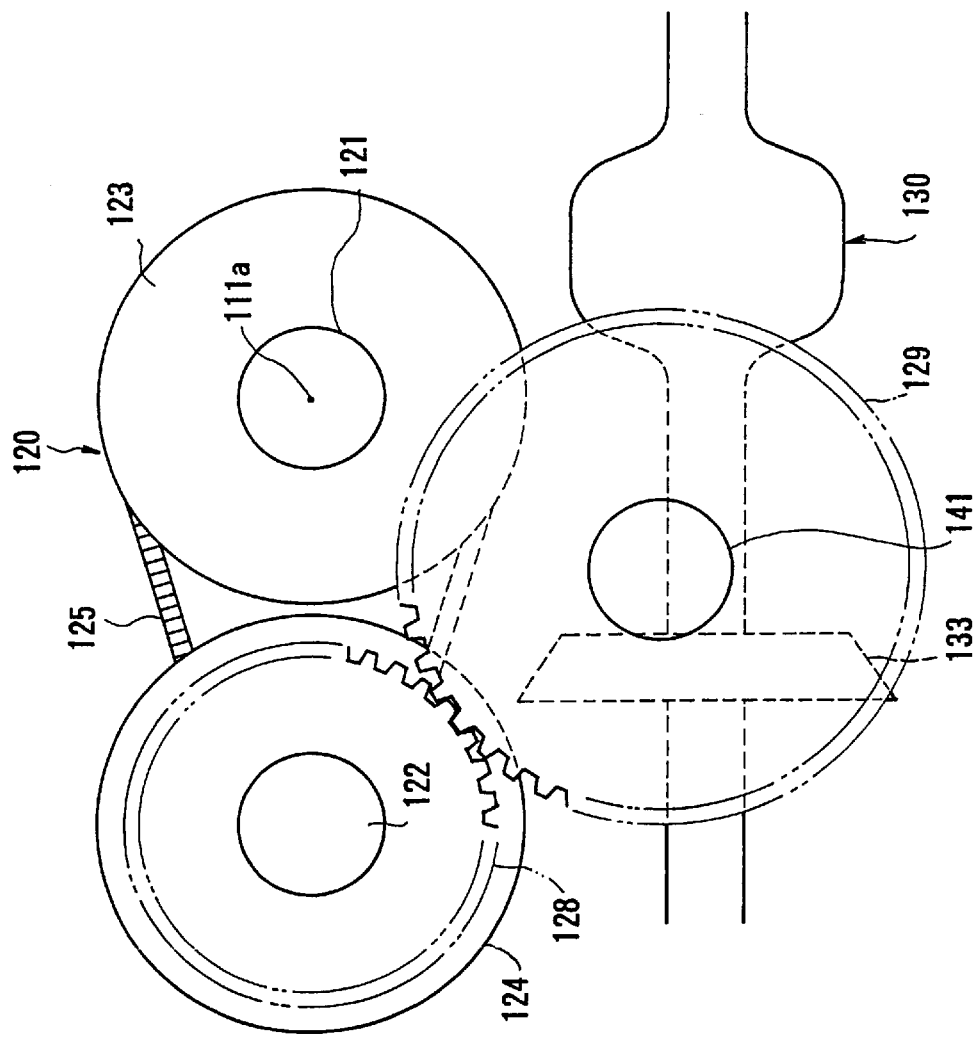
FIG. 8 is a front view taken in the direction of the arrow A in FIG. 6.

As is obvious from FIG. 8, i.e., a view taken in the direction of the arrow A in FIG. 6, the crankshaft 111, the primary shaft 121, the secondary shaft 122 and the front drive shaft 141 are extended in parallel to each other, the axis 111a of rotation of the crankshaft 111 and the axis of the primary shaft 121 are extended longitudinally coaxially with the longitudinal center axis of the vehicle body, and the secondary shaft 122 is disposed beside and in parallel to the primary shaft 121 on substantially the same level as the primary shaft 121, so that the primary pulley 123 and the secondary pulley 124 are on substantially the same level. As mentioned above, the front drive shaft 141 is operatively connected to the crown gear 133 at a position between the primary shaft 121 and the secondary shaft 122 below the variable-speed transmission 120 to interlock the transfer unit 140 and the variable-speed transmission 120 properly, and to form the automobile driving system in a compact construction and in a relatively small height.

A pinion 141a formed in an end portion of the front drive shaft 141 is in engagement with the crown gear 133 of the front differential gear 130. A front end portion and a rear end portion of the front drive shaft 141 are supported for rotation in a taper roller bearing 141e and a needle bearing 141f on the third case 103 and the fourth case 104 of the transmission case 106, respectively.

The front drive shaft 141 is provided with splines 141b to be engaged with a sun gear 143 included in a double-pinion planetary gear 142 in the circumference of a middle portion thereof, splines 141c to be engaged with a rear end portion of a hollow shaft 152 in the circumference of a rear end portion thereof, and an oil passage 141d opening at the rear end thereof and at positions on the circumference thereof respectively corresponding to an oil chamber 183A, a thrust bearing 151b and a needle bearing 182b, which will be described later.

The inner ring of the taper roller bearing 141e is held between the pinion 141a and a lock nut 141g screwed on the front drive shaft 141 to restrain the front drive shaft 141 from axial movement.

The double-pinion planetary gear 142 in engagement with the splines 141b formed in the circumference of the middle portion of the front drive shaft 141 comprises the sun gear 143 in engagement with the splines 141b, a ring gear 144, a first pinion 145 engaged with the ring gear 144, a second pinion 146 engaged with the sun gear 143 and the first pinion 145, and a carrier 147 supporting the first pinion 145 and the second pinion 146 for rotation in needle bearings 147a thereon. When the ring gear 144 is fastened to the transmission case 106, the sun gear 143 is rotated in the reverse direction relative to the carrier 147 by power transmitted to the carrier 147.

The sun gear 143 is held between a thrust bearing 151a supported on the third case 103 of the transmission case 106 by a fixed shaft 149 fixed to the transmission case 106, a thrust bearing 149a and a hollow member 150, and a thrust bearing 151b supported on a hollow shaft 152 supported for rotation coaxially with the front drive shaft 141 in a bearing 152a on the third case 103 of the transmission case 106 to restrain the double-pinion planetary gear 142 from axial movement.

The fixed shaft 149 has a substantially cylindrical shape, surrounds the front drive shaft 141, and provided at its base end with a flange, which is fastened to the case 103 of the transmission case 106 with bolts.

The primary driven gear 129 engaged with the primary reduction gear 128 is supported for rotation by a needle bearing 129a on the fixed shaft 149. The primary driven gear 129 is separated by a distance L from the double-pinion planetary gear 142 to enable a third friction coupling element 568 and a fourth friction coupling element 578, which are included in an automobile driving system in a fifth embodiment according to the present invention, to be disposed between the primary driven gear 129 and the double-pinion planetary gear 142.

The primary driven gear 129 and the double-pinion planetary gear 142 are interconnected by an input member consisting of a first connecting member 153a, and a second connecting member 153b, which serves also as a hub 579 included in the fourth friction coupling element 578, connected to the first connecting member 153a.

A first multiple-disk clutch 155 is disposed on one side of the double-pinion planetary gear 142 opposite the other side of the same on which the input member 153 is disposed for the selective power transmission from the carrier 147 of the double-pinion planetary gear 142 to the hollow shaft 152.

The first multiple-disk clutch 155 has a drum 156 engaged with the hollow shaft 152 by splines, and a hub 157 connected to the carrier 147 of the double-pinion planetary gear 142. Thus, power can be transmitted from the carrier 147 through the first multiple-disk clutch 155 to the hollow shaft 152. A retaining plate 160c contiguous with a snap ring 160d fixed to the inner circumference of the drum 156, driven plates 160b, and drive plates 160a interlocked with the hub 157 are compressed by driving a piston 159 fitted in a pressure chamber 158 by hydraulic pressure applied to the pressure chamber 158 to transmit power. A retainer 161 is disposed on one side of the piston 159 opposite the other side of the same on which the pressure chamber 158 is formed, and a return spring 163 exerts a pressure to the piston 159 to bias the piston 159.

A rear end portion of the front drive shaft 141 and a rear end portion of the hollow shaft 152 are interlocked by splines 141c.

A second multiple-disk clutch 165, i.e., a second friction coupling element for selectively fixing the ring gear 144 to the transmission case 106, is disposed between the third case 103 of the transmission case 106 and the double-pinion planetary gear 142.

In the second multiple-disk clutch 165, a retaining plate 168c contiguous with a snap ring 168d fixed to the inner circumference of the transmission case 106, driven plates 168b, and drive plates 168a interlocked with a hub 169 mounted on the ring gear 144 are compressed by a piston 167 by applying hydraulic pressure to a pressure chamber 166 to fasten the ring gear 144 to the transmission case 106. The piston 167 is biased by return springs 170.

A control valve 173 is disposed in an oil pan 172 joined to a lower portion of the transmission case 106. The control valve 173 is controlled by the hydraulic controller 138 on the basis of signals provided by the traveling speed sensor 137a, the throttle opening sensor 137b and the shift switch 137c to supply the oil discharged from the oil pump 116 selectively to the respective pressure chambers 158 and 166 of the first multiple-disk clutch 155 and the second multiple-disk clutch 165, and the variable-speed transmission 120.

The operation of the automobile driving system thus constructed will be described hereinafter with reference to FIGS. 9 to 12 showing schematic views, and FIG. 13 tabulating the operating conditions of the first multiple-disk clutch 155 and the second multiple-disk clutch 165. In the table shown in FIG. 13, blank circles indicate that the corresponding multiple-disk clutches are engaged.

Figure 9:
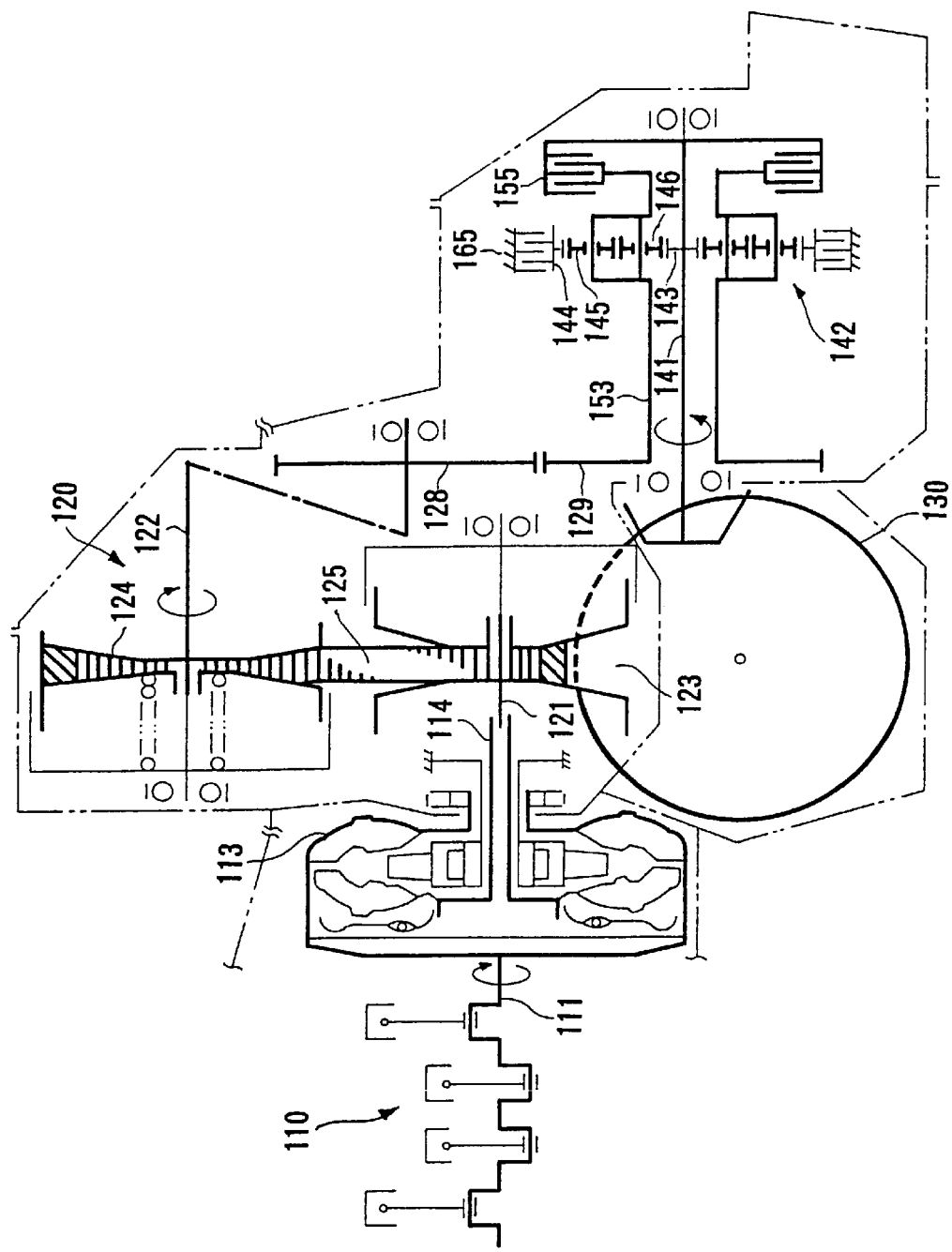
FIG. 9 is a schematic side view of assistance in explaining the operation of the automobile driving system of FIG. 3.

Referring to FIG. 9, the power of the engine 110 is transmitted from the crankshaft 111 through the torque converter 113 to the primary shaft 121 of the variable-speed transmission 121. An input speed of the primary shaft 121 is converted continuously into an output speed of the secondary shaft 122 by the action of the primary pulley 123 and the secondary pulley 124 operatively connected by the drive belt 125. The output speed of the secondary shaft 122 is reduced by the action of the primary reduction gear 128 and the primary driven gear 129 and a reduced speed is transmitted through the input member 153 to the carrier 147 of the double-pinion planetary gear 142. Although both the first multiple-disk clutch 155 and the second multiple-disk clutch 165 are disengaged, the carrier 147 is driven for rotation so that the pinions 145 and 146 revolve round the sun gear when a neutral position N or a parking position P is selected, and power is not transmitted to the front drive shaft 141.

When a forward range D is selected, the first multiple-disk clutch 155 is engaged to transmit driving power through a drive line indicated by thick lines in FIG. 9. A pressure is applied through the control valve 173 to the pressure chamber 158 to compress the retaining plate 160c contiguous with the snap ring 160d fixed to the inner circumference of the drum 156, the driven plates 160b and the drive plates 160a by the piston 159 so that the first multiple-disk clutch 155 is engaged. Then, the rotation of the primary driven gear 129 is transmitted through the carrier 147 of the double-pinion planetary gear 142 and the first multiple-disk clutch 155 to the hollow shaft 152, whereby the front drive shaft 141 coupled with the hollow shaft 152 by the splines is driven for rotation in the same direction as the direction in which the primary driven gear 129 is rotated to transmit power to the front differential gear 130.

Figure 10:
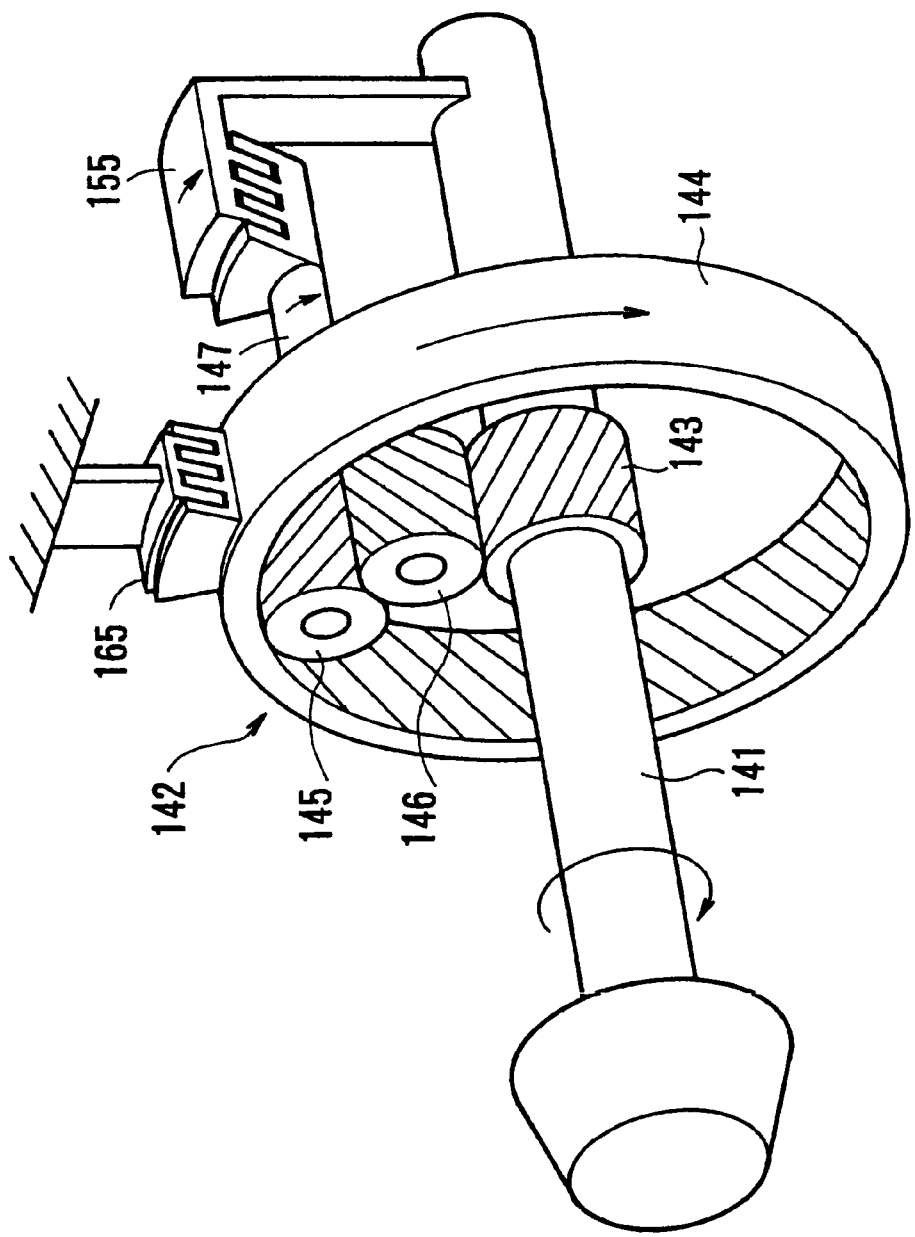
FIG. 10 is a schematic perspective view of assistance in explaining the operation of a double-pinion planetary gear.

Since the second multiple-disk clutch 165 is disengaged to release the ring gear 144, and the carrier 147 and the front drive shaft 141 are interlocked by the first multiple-disk clutch 155 and the hollow shaft 152 as shown in FIG. 10, the double-pinion planetary gear 142 rotates together with the front drive shaft 141.

Figure 11:
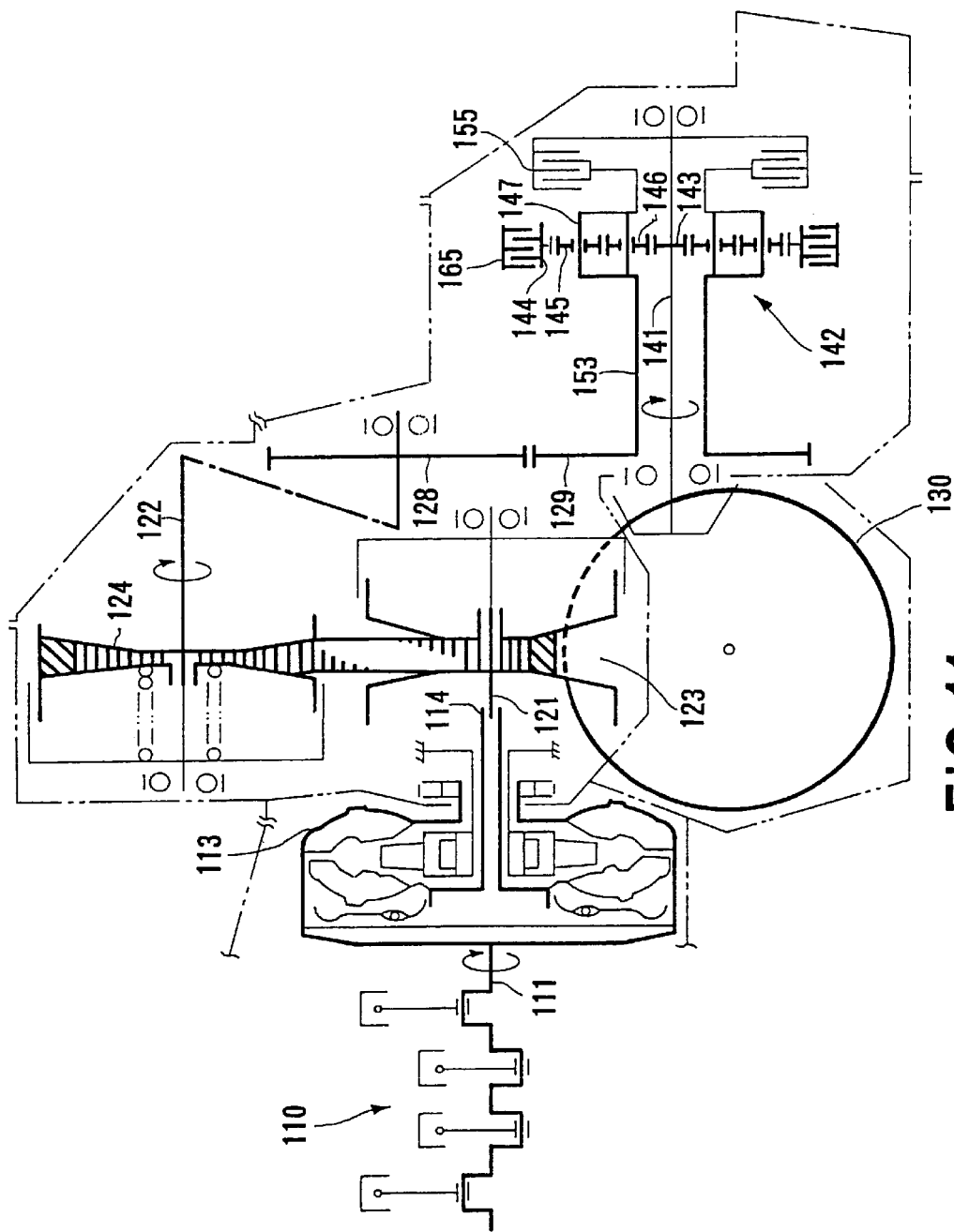
FIG. 11 is a schematic side view of assistance in explaining the operation of the automobile driving system of FIG. 3.
Figure 12:
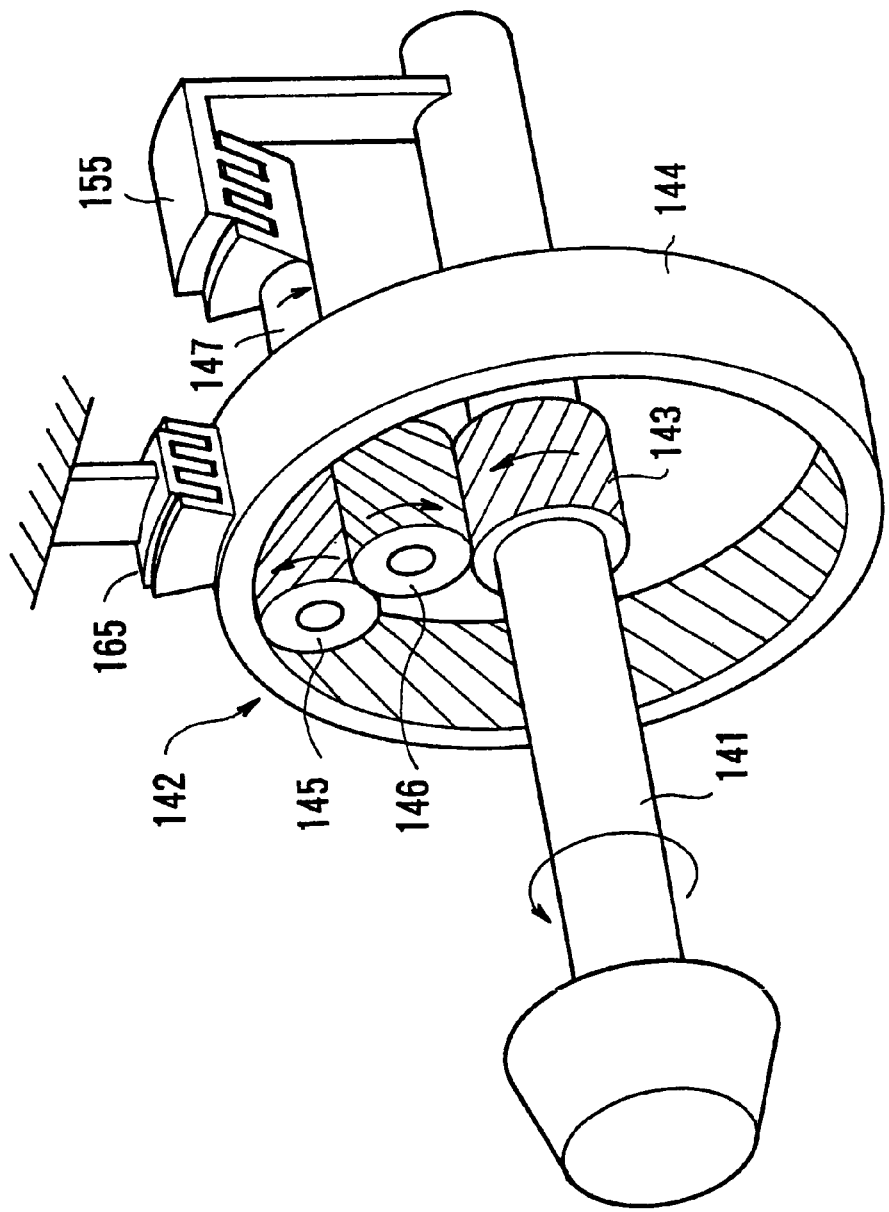
FIG. 12 is a schematic perspective view of assistance in explaining the operation of a double-pinion planetary gear.

When a reverse range R is selected, the first multiple-disk clutch 155 is disengaged and the second multiple-disk clutch 165 is engaged to transmit power through a drive line indicated by thick lines in FIG. 11. A pressure is applied through the control valve 173 to the pressure chamber 166 to compress the retaining plate 168c contiguous with the snap ring 168d, the driven plates 168b and the drive plates 168a by the piston 167 so that the second multiple-disk clutch 165 is engaged, whereby the ring gear 144 is restrained from rotation relative to the transmission case 106.

Consequently, the first pinion 145 and the second pinion 146 rotate in the opposite directions, respectively, and revolve along the ring gear 144 as the carrier 147 of the double-pinion planetary gear 142 rotates, and thereby the sun gear 143 is rotated in a direction opposite the rotating direction of the carrier 147. Consequently, the front drive shaft 141 is driven for rotation in the reverse direction to transmit power to the front differential gear 130.

The gear ratio of the double-pinion planetary gear 142 will be explained hereinafter.

The gear ratio of the double-pinion planetary gear 142, i.e., the ratio of the rotating speed of the front drive shaft 141 to that of the carrier 147, is expressed by:

Gear ratio=[ZS+(−ZR)]/ZS where ZS is the number of teeth of the sun gear 143, and ZR is the number of teeth of the ring gear 144.

Accordingly, an optional gear ratio can be provided by properly determining ZS of the sun gear 143 and ZR of the ring gear 144.

If ZS=37 and ZR=82,

Gear ratio=[37+(−82)]/37=−1.216 which is an appropriate gear ratio for the reverse range R.

Thus, a forward/reverse selecting mechanism comprising, as principal components, the double-pinion planetary gear 142, the first multiple-disk clutch 155 and the second multiple-disk clutch 165 is constructed.

The engine 110, the torque converter 113 and the belt-drive variable-speed transmission 120 are arranged coaxially and longitudinally, and the double-pinion planetary gear 142, the first multiple-disk clutch 155 and the second multiple-disk clutch 165 constituting the forward/reverse selecting mechanism are disposed on the axis of the front drive shaft 141 disposed on a level below that of the crankshaft 111 of the engine 110 on one side of the variable-speed transmission 120 opposite the other side of the same on which the torque converter 113 is disposed. Accordingly, the upper portion of the driving system is reduced, the height of the driving system is not increased and the driving system can be made compact.

An automobile driving system for a four-wheel drive vehicle, such as an automobile driving system in a fifth embodiment, comprising the same principal components as those of the automobile driving system in the first embodiment for a two-wheel drive vehicle can be constructed by additionally interposing an input selecting means between the primary driven gear 129 and the double-pinion planetary gear 142, and employing a power transfer mechanism for transferring driving force to a rear differential gear instead of the hollow shaft 152, which will be described in connection with the fifth embodiment.

Second Embodiment

An automobile driving system 200 in a second embodiment according to the present invention for a two-wheel drive vehicle will be described with reference to FIGS. 14 to 21.

Figure 14:
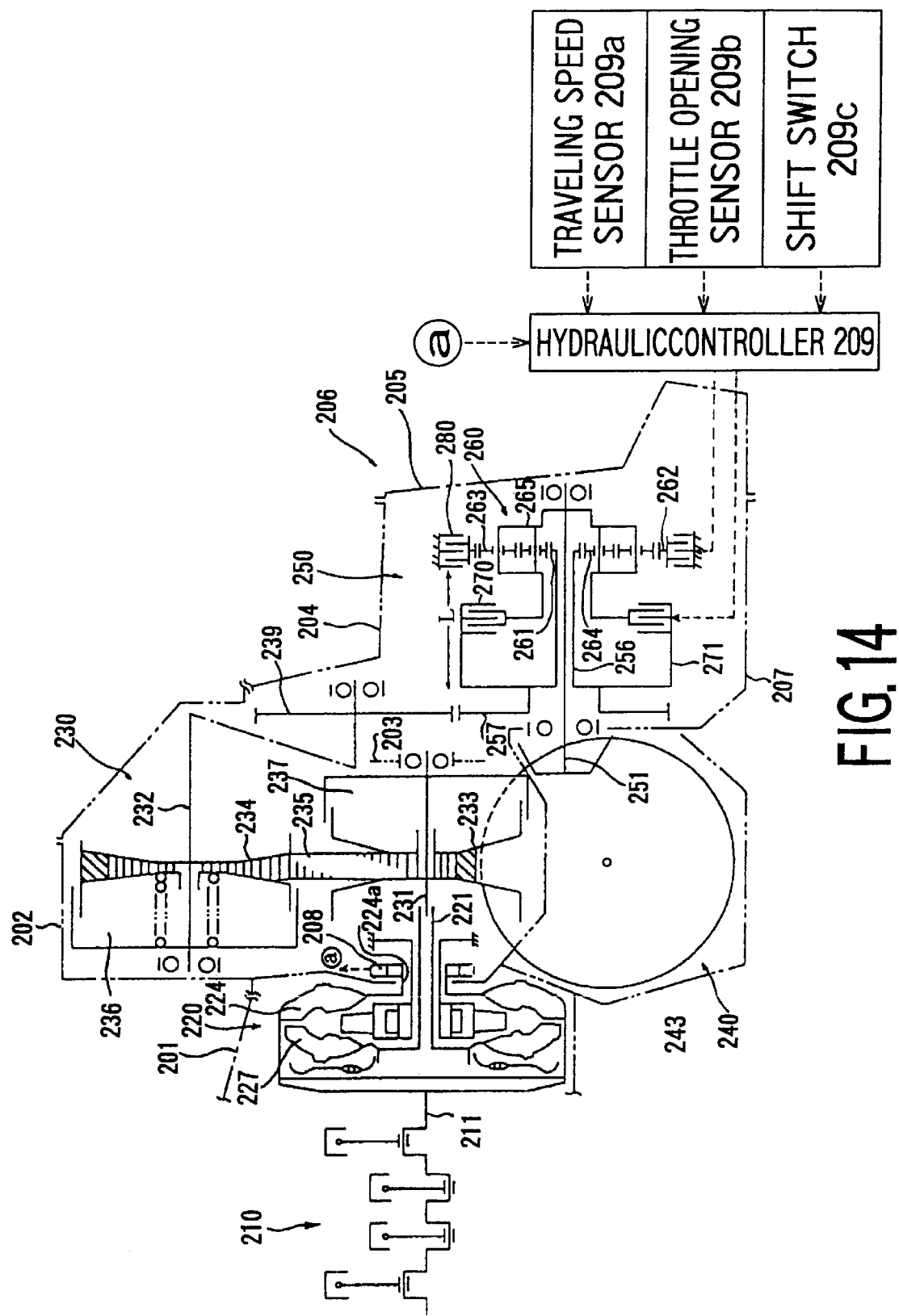
FIG. 14 is a typical view of an automobile driving system in a second embodiment according to the present invention.

Referring to FIG. 14, in the automobile driving system 200 in the second embodiment, a torque converter case 201 joined to a longitudinal engine 210 and containing a torque converter 220, a variable-speed transmission housing 202 disposed behind the torque converter case 201 and containing a belt-drive variable-speed transmission 230 and a front differential gear 240, a case 204 disposed behind the variable-speed transmission housing 202, having a bearing plate 203, which will be described later, and containing a transfer unit 250, and an end cover 205 covering the rear end of the case 204 are arranged and joined successively in that order to construct a transmission case 206. An oil pan 207 is attached to a lower portion of the transmission case 206.

The longitudinal engine 210 has a crankshaft 211 connected to a torque converter 220 contained in the torque converter case 201. An output shaft 221 included in the torque converter 220 is coupled with a primary shaft 231 included in the belt-drive variable-speed transmission 230 contained in the variable-speed transmission housing 202 to transmit power from the crankshaft 211 through the torque converter 220 to the primary shaft 231 of the variable-speed transmission 230.

The variable-speed transmission 230 changes an input speed continuously to an output speed of a secondary shaft 232. The output of the secondary shaft 232 is transmitted to the transfer unit 250 contained in the case 204. The output of the transfer unit 250 is transmitted through a differential gear, for example, the front differential gear 240 to front wheels.

An oil pump 208 which is driven continuously by an oil pump driving shaft 224a included in the torque converter 220 is contained in the torque converter case 201. The oil pump 208 discharges oil at a line pressure continuously to supply the oil to the torque converter 220 and associated parts, enables the hydraulic control of the variable-speed transmission 230, and enables the hydraulic control of the transfer unit 250 by a hydraulic controller 209 on the basis of signals provided by a traveling speed sensor 209a, a throttle opening sensor 209b and a shift switch 209c.

The torque converter 220, the belt-drive variable-speed transmission 230, the front differential gear 240 and the transfer unit 250 will be sequentially described with reference to FIGS. 14 to 16.

Figure 15:
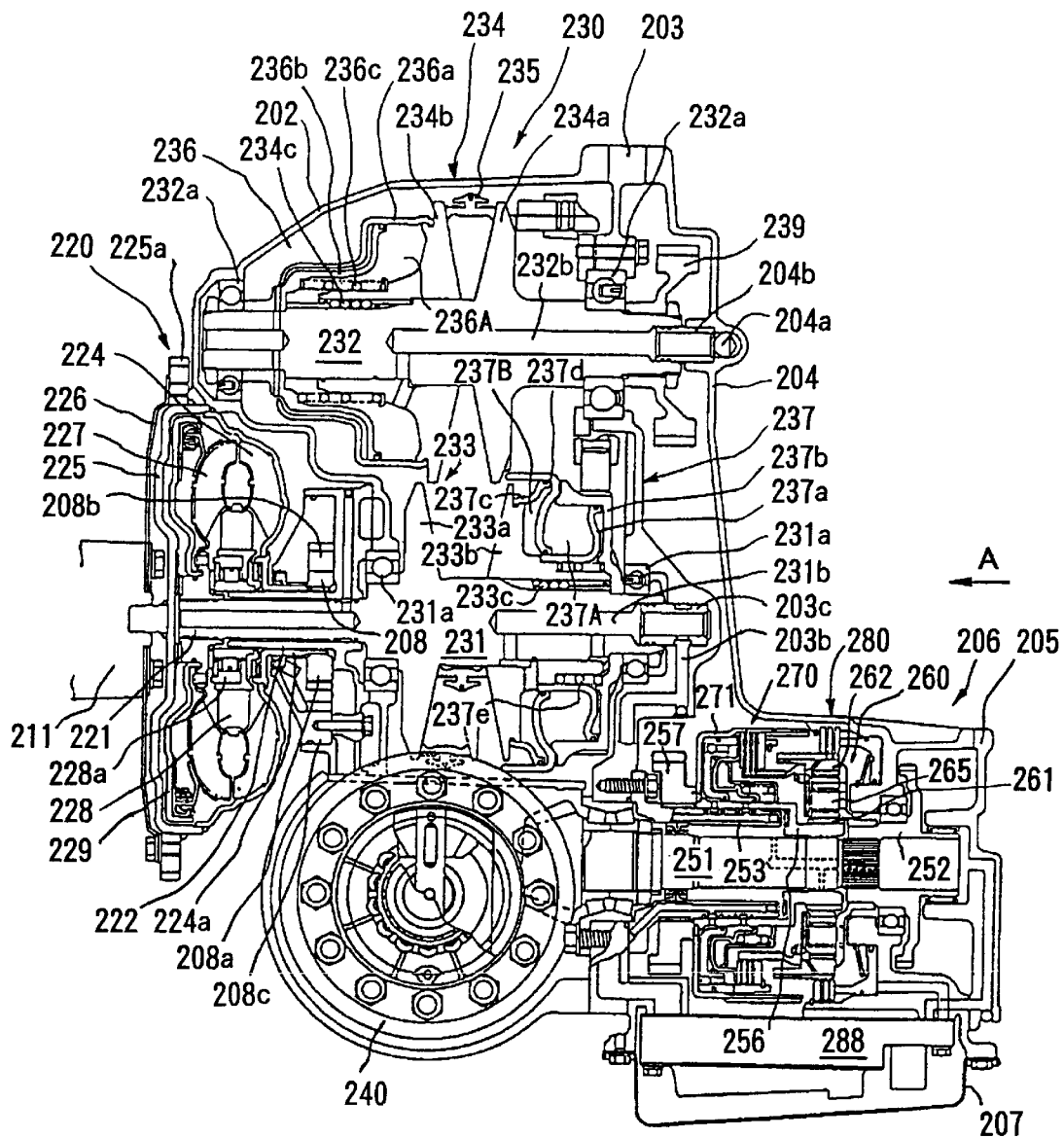
FIG. 15 is a sectional view of an essential portion of the automobile driving system of FIG. 14.

As shown in FIG. 15 in a sectional view, the output shaft 221 of the torque converter 220 is supported coaxially with the crankshaft 211 for rotation in ball bearings 231a on the variable-speed transmission housing 202 and the bearing plate 203.

The output shaft 221 has a substantially cylindrical outer circumference and is provided at its base end with a flange rotatably surrounded by a stator shaft 222 fastened to the variable-speed transmission housing 202 with bolts. The oil pump driving shaft 224a integrally connected to an impeller 224 is fitted rotatably on the stator shaft 222.

The impeller 224 is fastened with bolts to the crankshaft 211 for rotation together with the crankshaft 211 through a starter ring gear 225a having an outer circumference integrally combined with the outer circumference of a front cover 225 and formed on the outer circumference of the front cover 225, and a drive plate 226.

A turbine 227 coupled by splines with the output shaft 221 is disposed opposite to the impeller 224. A stator 228 is interposed between the impeller 224 and the turbine 227 and is mounted through a one-way clutch 228a on the stator shaft 222.

A lock-up clutch 229 is interposed between the turbine 227 and the front cover 225. The oil pump comprising an inner gear 208a driven for rotation by the oil pump driving shaft 224a, an outer gear engaged with the inner gear 208a, and an oil pump housing 208c is mounted on the base end of the stator shaft 222.

When the crankshaft 211 rotates, the impeller 224 is driven for rotation through the drive plate 226 bolted to the crankshaft 211, the starter ring gear 225a and the front cover 225.

As the impeller 224 rotates, the oil contained in the impeller 224 is discharged outside by centrifugal force, the oil flows into the turbine 227 to transmit a torque acting in the same direction as the rotating direction of the impeller 224 to the turbine 227. Consequently, the output shaft 221 coupled by splines with the turbine 227 is driven for rotation. The direction of flow of the oil flowing out from the turbine 227 is deflected by the stator 228 in a direction to assist the rotation of the impeller 224 to increase the torque of the impeller 224. If the turbine 227 rotates at a high rotating speed, the oil flows against the back surface of the stator 228 to make the stator 228 rotate on the one-way clutch 228a.

When a fixed traveling speed or rotating speed is achieved, the lock-up clutch 229 engages the impeller 224 and the turbine 227 through the front cover 225 to make the torque converter operate without slipping; consequently, the operating speed of the engine 210 is reduced accordingly, whereby fuel consumption is reduced and silence is improved.

The belt-drive variable-speed transmission 230 has a primary shaft 231, a secondary shaft 232 disposed in parallel to the primary shaft 231, a primary pulley 233 mounted on the primary shaft 231, a secondary pulley 234 mounted on the secondary shaft 232, and a drive belt 235 extended between the primary pulley 233 and the secondary pulley 234. The respective widths of the grooves of the primary pulley 233 and the secondary pulley 234 are varied to vary the ratio between the pitch diameters of the primary pulley 233 and the secondary pulley 234 for continuously variable speed change.

The primary pulley 233 mounted on the primary shaft 231 formed integrally with the output shaft 221 has a fixed cone 233a formed integrally with the primary shaft 231 and a movable cone 233b axially movable relative to the fixed cone 233a. The fixed cone 233a and the movable cone 233b must hold the drive belt 235 by a predetermined clamping force and the width of the groove defined by the fixed cone 233a and the movable cone 233b must be smoothly controllable to ensure the smooth operation of the transmission for continuously variable speed change. Therefore, a plurality of axial grooves are formed in the mating surfaces of the primary shaft 231 and the movable cone 233b, and balls 233c are placed in the mating grooves for torque transmission.

A substantially cylindrical first piston 237a is fixed to the back surface of the movable cone 233b, i.e., a surface not facing the fixed cone 233a, a pressure chamber 237A is formed by the first piston 237a and a cylinder 237b having the shape of a bottomed cylinder and having a central portion fixed to the primary shaft 231, a pressure chamber 237B is formed by fitting the opposite ends of a second piston 237d in a piston member 237c fixed to the back surface of the movable cone 233b, and the first piston 237a, and the movable cone 233b is biased toward the fixed cone 233a by a spring 237e to constitute a hydraulic actuator 237.

An oil passage 231b is formed in the primary shaft 231 so as to be connected to the pressure chambers 237A and 237B. The hydraulic controller 209 executes a control operation on the basis of signals representing the opening of the throttle and such to supply the oil into and to discharge the same from the pressure chambers 237A and 237B of the hydraulic actuator 237 through an oil passage 203b formed in the bearing plate 203 and a sleeve 203c to move the movable cone 233b along the primary shaft 231 to vary the width of the groove of the pulley.

The secondary shaft 232 extended in parallel to the primary shaft 231 is supported for rotation in ball bearings 232a on the variable-speed transmission housing 202 and the bearing plate 203. The secondary pulley 234 mounted on the secondary shaft 232 has a fixed cone 234a formed integrally with the secondary shaft 232, and a movable cone 234b axially movable relative to the fixed cone 234a. A plurality of axial grooves are formed in the mating surfaces of the movable cone 234b and the secondary shaft 232, and balls 234c are placed in the mating axial grooves for torque transmission.

A substantially cylindrical cylinder 236a is fixed to the back surface of the movable cone 234b, a pressure chamber 236A is defined by the cylinder 236a and a cylindrical piston 236b having a central portion fixed to the secondary shaft 232, and the movable cone 234b is biased toward the fixed cone 234a by a spring 236c to constitute a hydraulic actuator 236.

An oil passage 232b is formed in the secondary shaft 232 so as to be connected to the pressure chambers 236A. The hydraulic controller 209 executes a control operation on the basis of signals representing the opening of the throttle and such to supply the oil into and to discharge the same from the pressure chamber 236A of the hydraulic actuator 236 through an oil passage 204a formed in the case 204, and a sleeve 204b. A drive gear 239 is mounted on one end of the secondary shaft 232.

The pressure receiving area of the movable cone 233b of the primary pulley 233 is greater than that of the movable cone 234b of the secondary pulley 234. Therefore, when the oil is supplied into and discharged from the pressure chambers 237A, 237B and 236A, the mode of variation of the width of the groove of the primary pulley 233 and that of the width of the groove of the secondary pulley 234 are reverse to each other. Thus, the ratio between the pitch diameters of the primary pulley 233 and the secondary pulley 234 is varied continuously to vary the output rotating speed of the secondary shaft 232 continuously.

The front differential gear 240 is entirely the same in construction as the front differential gear 130 included in the automobile driving system in the first embodiment and having the essential portion shown in FIG. 4 in a sectional view and in FIG. 5 in a perspective view. Since the diameter of a crown gear 243 may be smaller than that of the crown gear of a conventional front differential gear, the front differential gear 240 can be formed in a small overall size, and the variable-speed transmission 230 and the front differential gear 240 can be disposed close to each other.

The construction of the transfer unit will be described hereinafter with reference to FIGS. 15 and 16.

As shown in FIG. 14, the transfer unit 250 has a drive shaft, for example, a front drive shaft 251, extended in parallel to the crankshaft 211 of the engine 210, the output shaft 221, the primary shaft 231 and the secondary shaft 232.

The parallel arrangement of the crankshaft 211, the output shaft 221, the primary shaft 231, the secondary shaft 232 and the front drive shaft 251 as viewed in the direction of the arrow A in FIG. 15 is the same as that of the corresponding shafts of the first embodiment shown in FIG. 8. The automobile driving system is formed in a relatively small height and in a compact construction.

Figure 16:
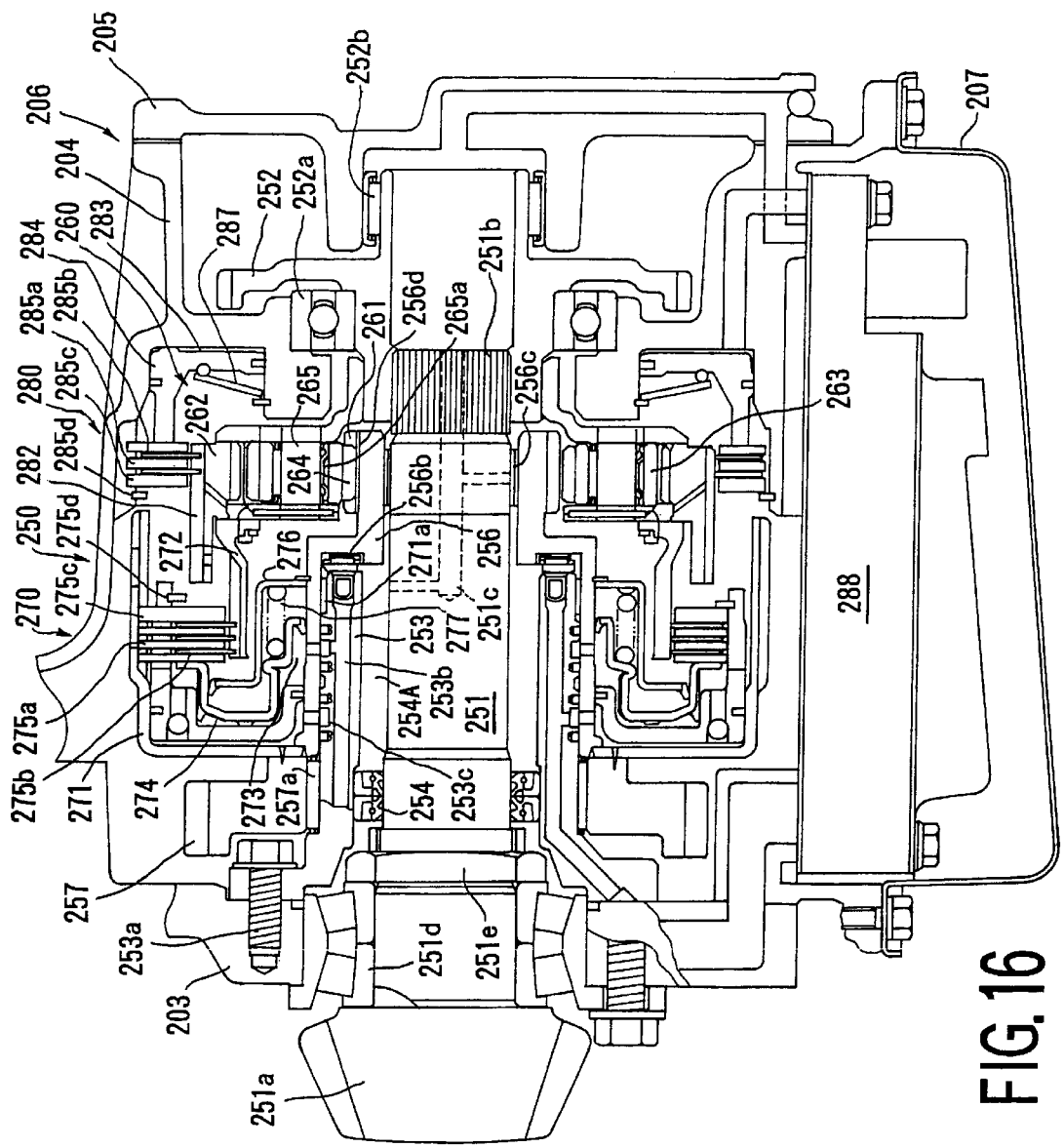
FIG. 16 is an enlarged view of a portion of the essential portion shown in FIG. 15.

As shown in FIG. 16, the front drive shaft 251 is provided with a pinion 251a to be engaged with the crown gear 243 of the front differential gear 240 in its front end portion, and splines 251b in its rear end portion. A front portion of the front drive shaft 251 is supported for rotation in a taper roller bearing 251d on the bearing plate 203. A parking gear 252 is mounted on a rear portion of the front drive shaft 251 in engagement with the splines 251b, and is supported for rotation in a ball bearing 252a and a needle bearing 252b on the case 204 and the end cover 205.

The inner ring of the taper roller bearing 251d is held between the pinion 251a and a lock nut 251e screwed on the front drive shaft 251 to restrain the front drive shaft 251 from axial movement. The front drive shaft 251 is provided with an oil passage 251c having one end opening in the rear end of the front drive shaft 251 and the other end opening into a pressure chamber 254A and a bearing metal 256c, which will be described later.

A fixed shaft 253 is held on the bearing plate 203. The fixed shaft 253 has a substantially cylindrical shape and receives a portion of the front drive shaft 251 therein. The fixed shaft 253 is provided with a flange at its base end, and the flange is fastened to the bearing plate 203 with bolts 253a. An oil seal 254 is interposed between the inner circumference of the fixed shaft 253 and the outer circumference of the front drive shaft 251 to define the pressure chamber 254A by the fixed shaft 253 and a hub 256 serving as an input member, which will be described later. The fixed shaft 253 is provided with an oil passage 253b opening into the pressure chamber 254A. The fixed shaft 253 is provided also with an oil passage 253c in its outer circumference.

The hub 256 is fitted on the fixed shaft 253 and a thrust bearing 256b is interposed between the hub 256 and the fixed shaft 253. The hub 256 is substantially cylindrical, is supported at its base end for rotation by a needle bearing 257a on the fixed shaft 253, and is operatively connected to the driven gear 257 engaged with the drive gear 239 to transmit power to the driven gear 257. The end portion of the hub 256 is supported for rotation by a bearing metal 256c on the front drive shaft 251.

Splines 256d are formed in the outer circumference of an end portion of the hub 256 to couple the hub 256 with a sun gear 261 included in a double-pinion planetary gear 260. The double-pinion planetary gear 260 has the sun gear 261 coupled with the hub 256 by the splines 256d, a ring gear 262, a first pinion 263 engaged with the ring gear 262. a second pinion 264 engaged with the sun gear 261 and the first pinion 263, and a carrier 265 rotatably supporting the first pinion 263 and the second pinion 264 thereon by needle bearings 265a. Power applied to the ring gear 262 is distributed to the sun gear 261 and the carrier 265 at a torque distribution ratio dependent on the dimensions of the sun gear 261 and the ring gear 262. When the ring gear 262 is fastened to the case 204, the carrier 265 is rotated by the power applied to the sun gear 261 in a direction opposite the rotating direction of the sun gear 261.

The driven gear 257 is separated by a distance L from the double-pinion planetary gear 260 to enable a first multiple-disk clutch 668 and a second multiple-disk clutch 678, i.e., an input selecting means 667, included in an automobile driving system in a sixth embodiment according to the present invention, which will be described later, to be disposed between the driven gear 257 and the double-pinion planetary gear 260.

A first multiple-disk clutch 270 is interposed between the driven gear 257 and the double-pinion planetary gear 260 to transmit power selectively from the driven gear 257 to the carrier 265.

The first multiple-disk clutch 270 has a clutch drum 271 supported through a bushing 271a on the fixed shaft 253 and connected to the driven gear 257, and a clutch hub 272 connected to the carrier 265 of the double-pinion planetary gear 260. The first multiple-disk clutch 270 transmits power selectively from the driven gear 257 to the carrier 265. A retaining plate 275c contiguous with a snap ring 275d fixed to the inner circumference of the clutch drum 271, driven plates 275a and drive plates 275a associated with the clutch hub 272 are compressed by a piston 274 by applying pressure to a pressure chamber 273 defined by the hub 256 and the clutch drum 271 to transmit power. A retainer 276 is disposed on one side of the piston 274 opposite the other side of the same on which the pressure chamber 273 is disposed, and the pressure of a return spring 277 is exerted on the piston 274.

A second multiple-disk clutch 280, i.e., a second friction coupling element, is interposed between the case 204 of the transmission case 206 and the ring gear 262 of the double-pinion planetary gear 260 to fasten the ring gear 262 selectively to the case 204. The second multiple-disk clutch 280 compresses a retaining plate 285c contiguous with a snap ring 285d fixed to the inner circumference of the case 204, driven plates 285b, and drive plates 285a associated with a clutch hub 282 connected to the ring gear 262 by applying a pressure to a piston 284 fitted in a pressure chamber 283 to fasten the ring gear 262 to the case 204. The piston 284 is biased by the pressure of a return spring 287.

The carrier 265 of the double-pinion planetary gear 260 and the parking gear 252 are interlocked by a power transmission means, such as splines.

A control valve 288 is disposed in the oil pan 207 joined to a lower portion of the transmission case 206. The control valve 288 is controlled by the hydraulic controller 209 on the basis of signals provided by the traveling speed sensor 209a, the throttle opening sensor 209b and the shift switch 209c to supply the oil discharged from the oil pump 208 selectively to the respective pressure chambers 273 and 283 of the first multiple-disk clutch 270 and the second multiple-disk clutch 280, and the variable-speed transmission 230.

The operation of the automobile driving system thus constructed will be described hereinafter with reference to FIGS. 17 to 20, and FIG. 21 tabulating the operating conditions of the first multiple-disk clutch 270 and the second multiple-disk clutch 280. In the table shown in FIG. 21, blank circles indicate that the corresponding multiple-disk clutches are engaged.

Referring to FIG. 14, the power of the engine 210 is transmitted from the crankshaft 211 through the torque converter 220 to the primary shaft 231 of the variable-speed transmission 230. An input speed of the primary shaft 231 is converted continuously into an output speed of the secondary shaft 232 by the action of the primary pulley 233 and the secondary pulley 234 operatively connected by the drive belt 235. The output speed of the secondary shaft 232 is reduced by the action of the drive gear 239 and the driven gear 257 and a reduced speed is transmitted through the clutch drum 271 to the first multiple-disk clutch 270 and through the hub 256 to the sun gear 261 of the double-pinion planetary gear 260.

Although the first multiple-disk clutch 270 is disengaged and the sun gear 261 is driven for rotation by the hub 256, the first pinion 263, the second pinion 264 and the ring gear 262 idle and any power is not transmitted to the carrier 265 and beyond the carrier 265 when a neutral position N or a parking position P is selected.

Figure 17:
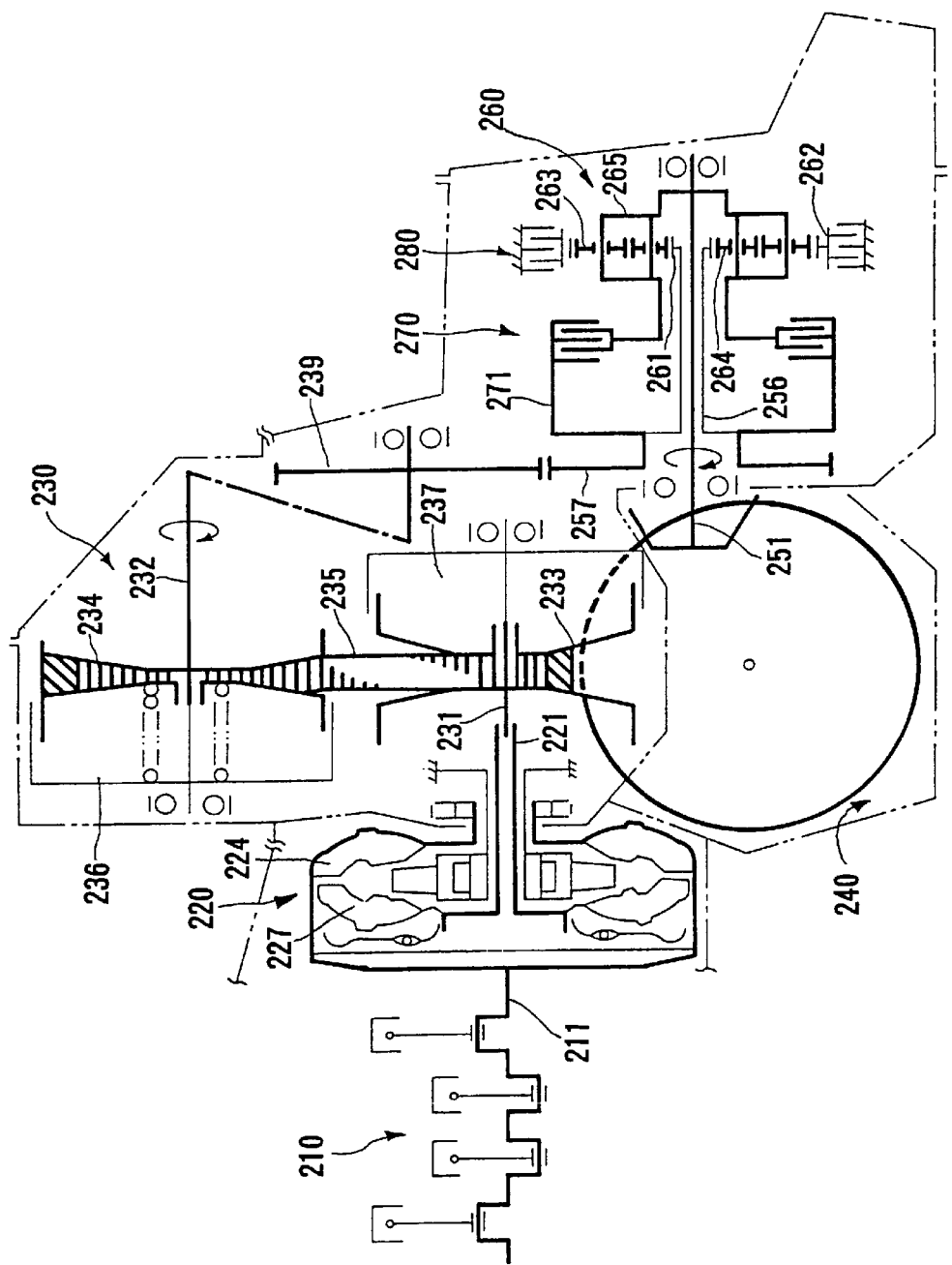
FIG. 17 is a schematic side view of assistance in explaining the operation of the automobile driving system of FIG. 14.

When a drive range D, i.e., a forward range, is selected, the first multiple-disk clutch 270 is engaged to transmit driving power through a drive line indicated by thick lines in FIG. 17. A pressure is applied through the control valve 288 to the pressure chamber 273 to compress the retaining plate 275c contiguous with the snap ring 275d fixed to the inner circumference of the clutch drum 271, the driven plates 273b and the drive plates 273a by the piston 274 so that the first multiple-disk clutch 270 is engaged. Then, the rotation of the driven gear 257 is transmitted through the carrier 265 of the double-pinion planetary gear 260 and the hub 256 to the sun gear 261, whereby the front drive shaft 251 coupled with the parking gear 257 by the splines is driven for rotation through the parking gear 252 coupled with the carrier 265 by the splines in the same direction as the direction in which the driven gear 257 is rotated to transmit power to the front differential gear 240.

Figure 18:
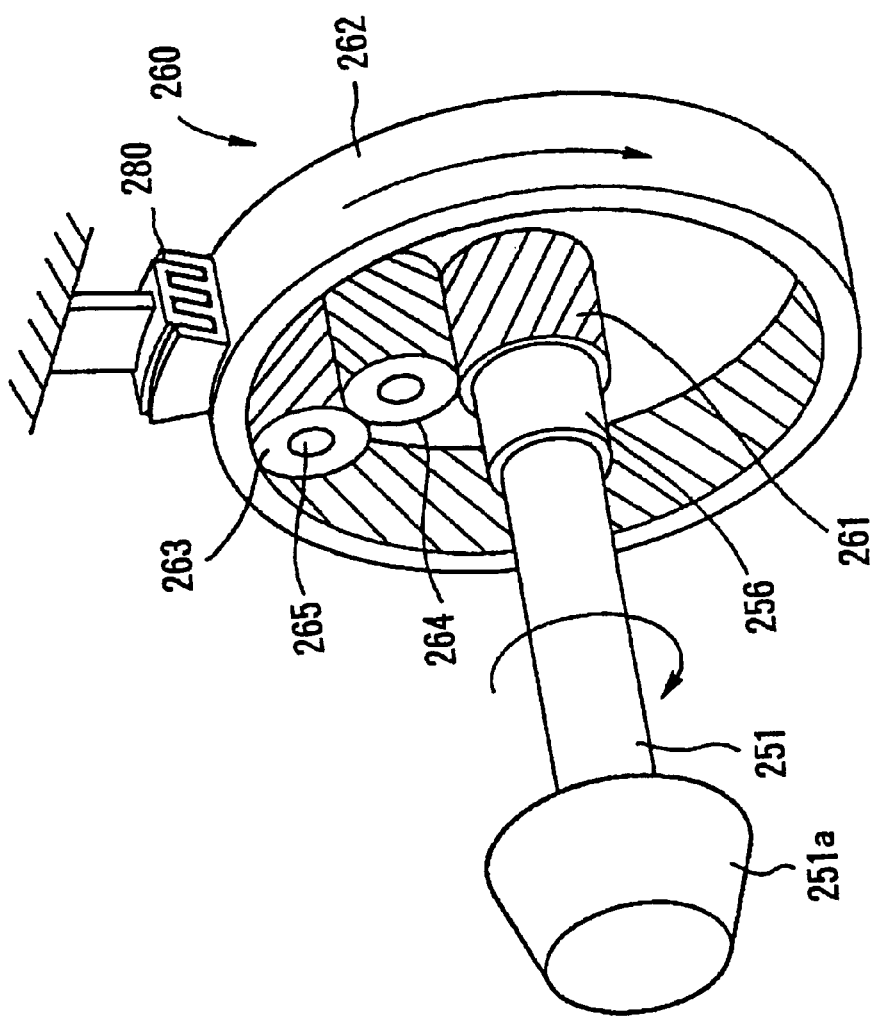
FIG. 18 is a schematic perspective view of assistance in explaining the operation of a double-pinion planetary gear.

Therefore, the second multiple-disk clutch 280 is disengaged to release the ring gear 262 of the double-pinion planetary gear 260 as shown in FIG. 18, power is transmitted from the driven gear 257 through the first multiple-disk clutch 270 and the hub 256 to the carrier 265 and the sun gear 261 and, since the carrier 265 and the front drive shaft 251 are interlocked by the parking gear 252, the double-pinion planetary gear 260 rotates together with the front drive shaft 251.

Figure 19:
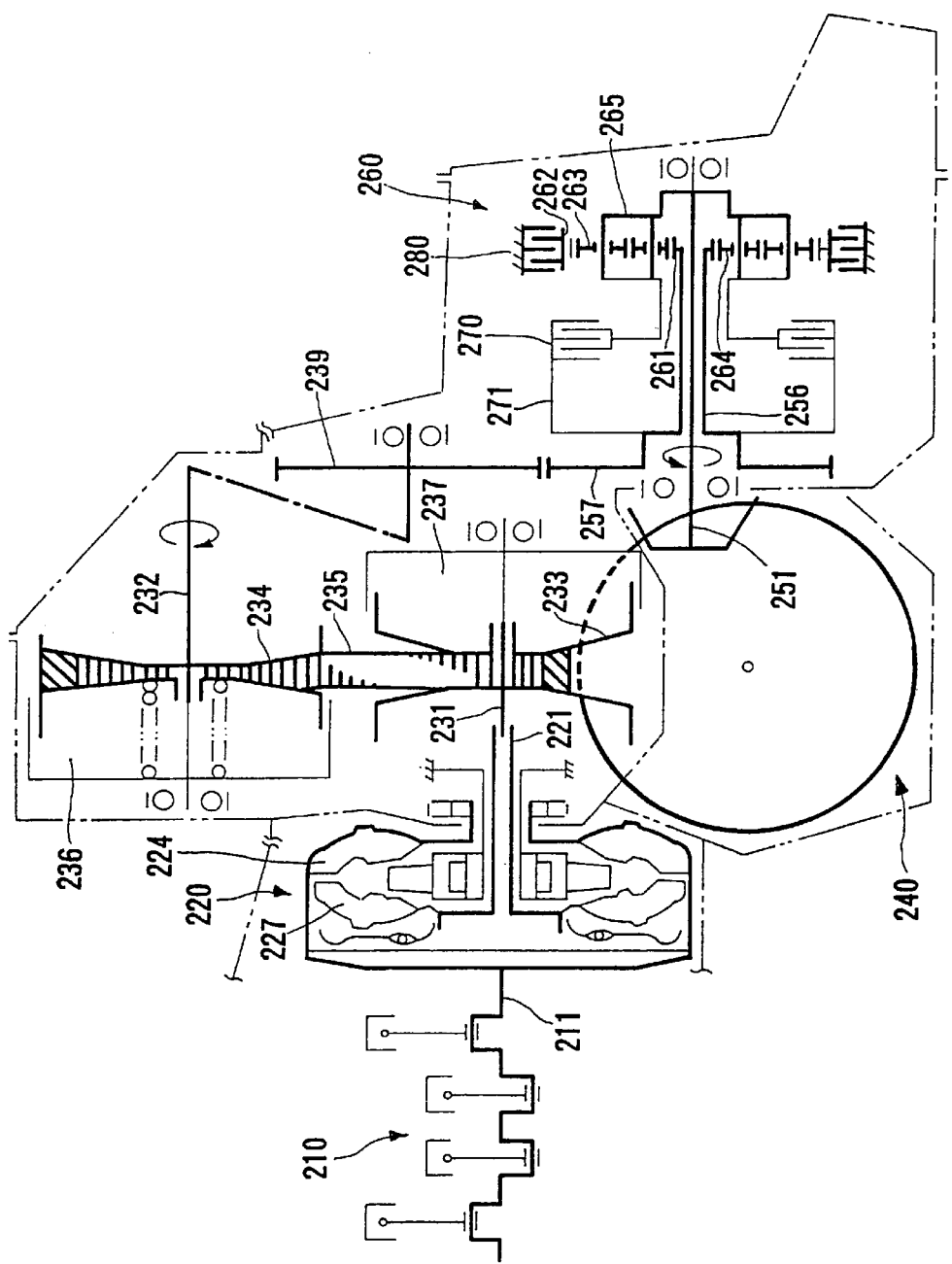
FIG. 19 is a schematic side view of assistance in explaining the operation of the automobile driving system of FIG. 14.
Figure 20:
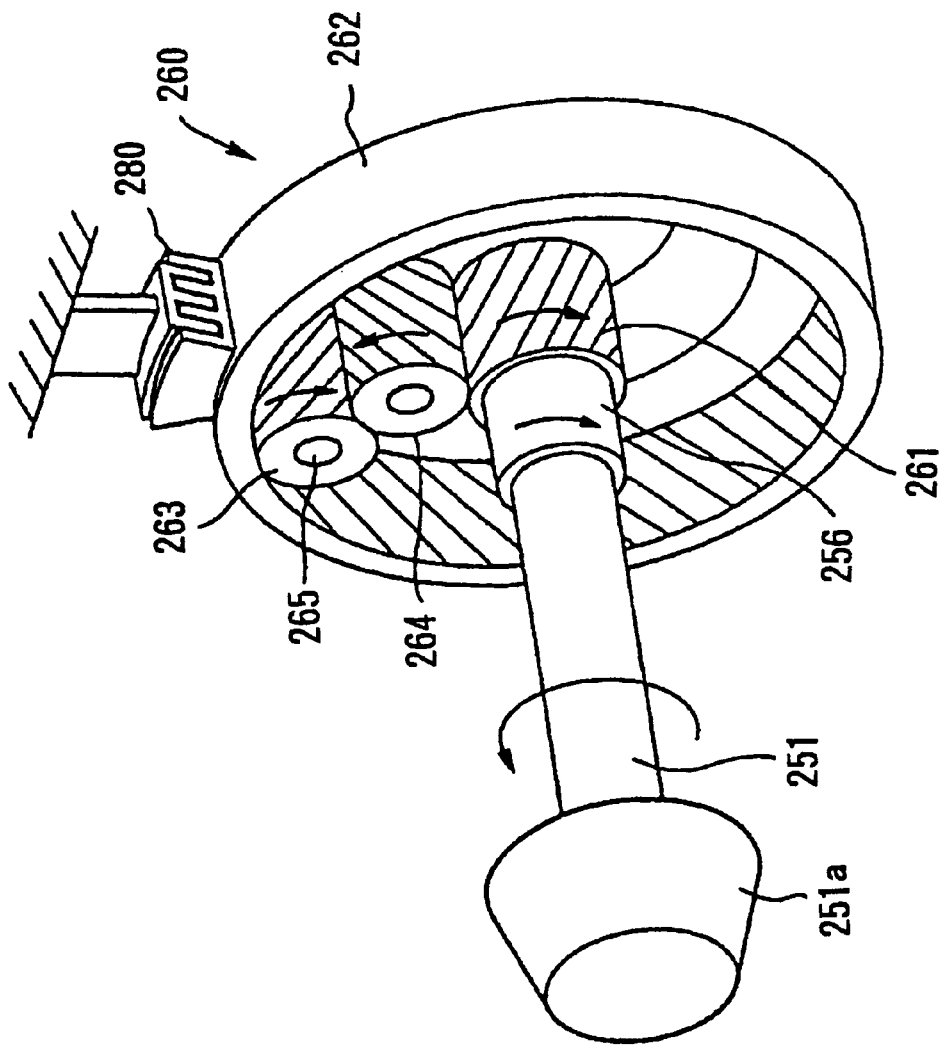
FIG. 20 is a schematic perspective view of assistance in explaining the operation of a double-pinion planetary gear.

When a reverse range R is selected, the first multiple-disk clutch 270 is disengaged and the second multiple-disk clutch 280 is engaged to transmit power through a drive line indicated by thick lines in FIG. 19. A pressure is applied through the control valve 288 to the pressure chamber 283 to compress the retaining plate 285c contiguous with the snap ring 285d, the driven plates 285b and the drive plates 285a by the piston 284 so that the second multiple-disk clutch 280 is engaged, whereby the ring gear 262 is restrained from rotation relative to the case 204.

Consequently, as shown in FIG. 19, the first pinion 263 and the second pinion 264 are driven by the sun gear 261 driven by the hub 256 so as to rotate in the opposite directions, respectively, and revolve along the ring gear 262 as the carrier 265 of the double-pinion planetary gear 260 rotates in a direction opposite the rotating direction of the sun gear 261. Consequently, the front drive shaft 251 is driven for rotation in the reverse direction to transmit power to the front differential gear 240.

The gear ratio of the double-pinion planetary gear 260 will be explained hereinafter.

The gear ratio of the double-pinion planetary gear 260, i.e., the ratio of the rotating speed of the front drive shaft 251 to that of the sun gear 261, is expressed by:

Gear ratio=[ZS+(−ZR)]/ZS where ZS is the number of teeth of the sun gear 261, and ZR is the number of teeth of the ring gear 262.

Accordingly, an optional gear ratio can be provided by properly determining ZS of the sun gear 261 and ZR of the ring gear 262.

If Zs=37 and ZR=82,

Gear ratio=[37+(−82)]/37=−1.216 which is an appropriate gear ratio for the reverse range R.

Thus, a forward/reverse selecting mechanism comprising, as principal components, the double-pinion planetary gear 260, the first multiple-disk clutch 270 and the second multiple-disk clutch 280 is constructed.

The engine 210, the torque converter 220 and the belt-drive variable-speed transmission 230 are arranged coaxially and longitudinally, and the double-pinion planetary gear 260, the first multiple-disk clutch 270 and the second multiple-disk clutch 280 constituting the forward/reverse selecting mechanism are disposed on the axis of the front drive shaft 251 disposed on a level below that of the crankshaft 211 of the engine 210 on one side of the variable-speed transmission 230 opposite the other side of the same on which the torque converter 220 is disposed. Accordingly, the upper portion of the driving system is reduced, the height of the driving system is not increased and the driving system can be made compact.

An automobile driving system for a four-wheel drive vehicle, such as an automobile driving system in a sixth embodiment, comprising the same principal components as those of the automobile driving system in the second embodiment for a two-wheel drive vehicle can be constructed by additionally interposing an input selecting means between the driven gear 257 and the double-pinion planetary gear 260, and employing a hub and a front drive shaft for a four-wheel drive vehicle instead of the hub 256 and the front drive shaft 251, and additionally employing a power transfer mechanism for transferring driving force to a rear differential gear instead of the parking gear 252, which will be described in connection with the sixth embodiment.

Third Embodiment

An automobile driving system 300 in a third embodiment according to the present invention will be described hereinafter with reference to FIGS. 22 to 30.

A torque converter case 301 containing a torque converter 320 and joined to a transverse engine 310, a variable-speed transmission housing 302 disposed beside the torque converter case 301 and containing a belt-drive variable-speed transmission 330 and a differential gear, for example, a front differential gear 340, a side cover 303, and an end cover 304 containing a transfer unit 350 in combination with the torque converter case 301 are arranged and joined successively to construct a transmission case 305. An oil pan, not shown, is attached to a lower portion of the transmission case 305.

A crankshaft 311 included in the transverse engine 310 is connected to the torque converter 320 contained in the torque converter case 301. An output shaft 321 included in the torque converter 320 is connected to a primary shaft 331 included in the belt-drive variable-speed transmission 330 contained in the variable-speed transmission housing 302 to transmit power from the crankshaft 311 through the torque converter 320 to the primary shaft 331 of the variable-speed transmission 330.

A secondary shaft 332 included in the variable-speed transmission 330 rotates at an output speed determined by varying an input speed to the variable-speed transmission 330. Power is transmitted from the secondary shaft 332 through a countershaft assembly 339 to the transfer unit 350 which in turn transmits power through the front differential gear 340 to front wheels.

An oil pump 308 is disposed in the transmission case 305 and is driven continuously by an oil pump drive shaft 324a included in the torque converter 320 to discharge an oil at a line pressure. The oil is supplied to the torque converter 320, enables the hydraulic control of the variable-speed transmission 330, and enables a hydraulic controller 309 to control the transfer unit 350 on the basis of signals provided by a traveling speed sensor 309a, a throttle opening sensor 309b and a shift switch 309c.

The constructions of the torque converter 320, the belt-drive variable-speed transmission 330, the differential gear 340 and the transfer unit 350 will be successively described with reference to FIGS. 23 and 24.

Figure 23:
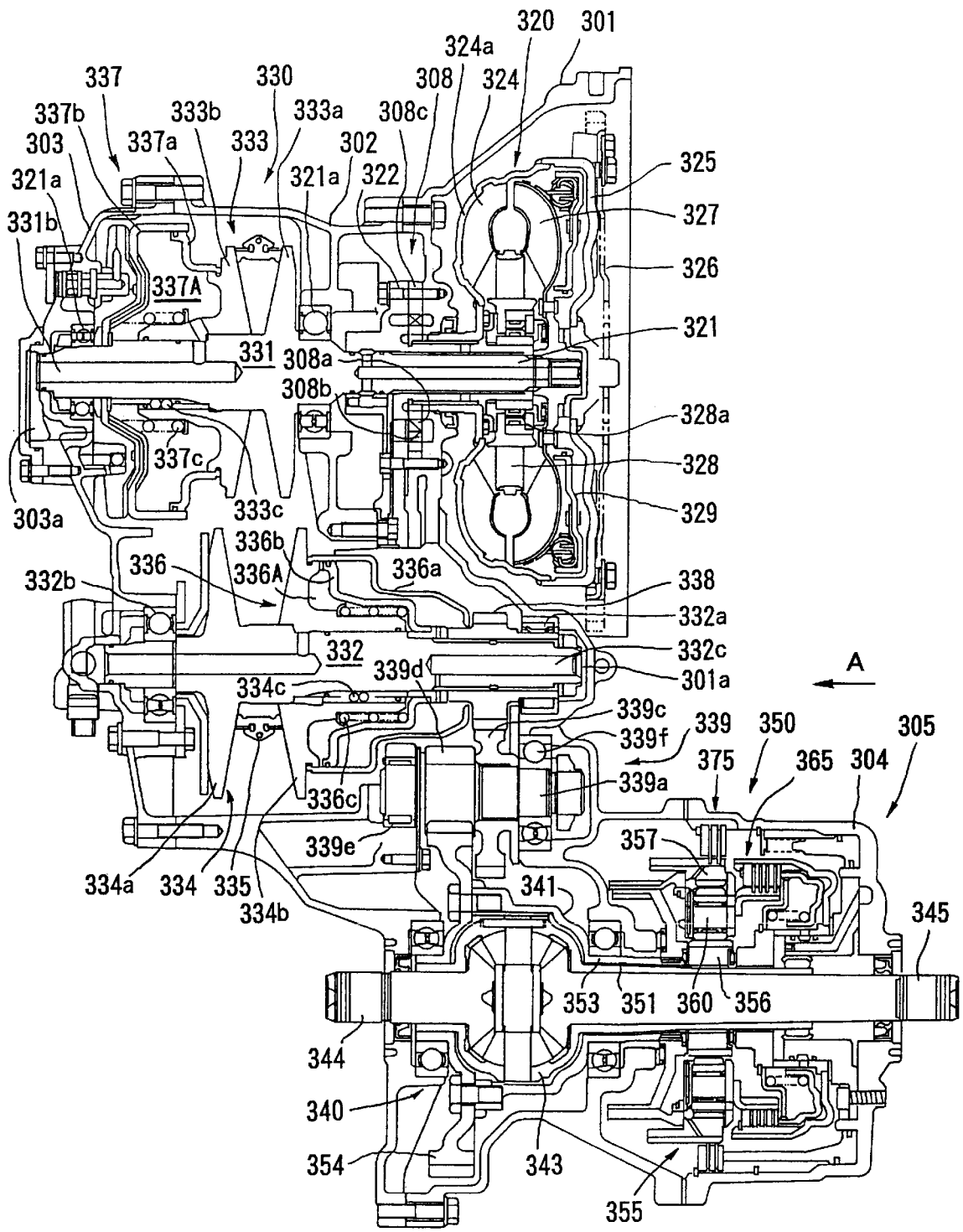
FIG. 23 is a sectional view of the automobile driving system of FIG. 22.

As shown in FIG. 23 in a sectional view, the torque converter 320 has the output shaft 321 supported for rotation in ball bearings 321a on the variable-speed transmission housing 302 and the side cover 303 coaxially with the crankshaft 311.

The output shaft 321 is surrounded so as to be rotatable by a stator shaft 322 having a substantially cylindrical outer circumference, and provided at its base end with a flange bolted together with an oil pump housing 308c to the torque converter case 301. The oil pump drive shaft 324a joined to an impeller 324 is fitted rotatably on the stator shaft 322.

The outer circumference of the impeller 324 is joined to the outer circumference of a front cover 325 and connected by a drive plate 326 to the crankshaft 311 so as to rotate together with the crankshaft 311.

A turbine 327 is disposed opposite to the impeller 324 and is coupled with the output shaft 321 by splines. A stator 328 is interposed between the impeller 324 and the turbine 327 and is supported on a one-way clutch 328a mounted on the stator shaft 322.

A lock-up clutch 329 is interposed between the turbine 327 and the front cover 325. The oil pump 308 comprising an inner gear 308a driven for rotation by the oil pump drive shaft 324a, an outer gear 308b engaged with the inner gear 308a, and an oil pump housing 308c is mounted on the base end of the stator shaft 322.

The rotation of the crankshaft 311 of the engine 310 is transmitted through the drive plate 326 joined to the crankshaft 311, and the front cover 325 to the impeller 324 to drive the same for rotation.

As the impeller 324 rotates, the oil is discharged outside from the impeller 324 by centrifugal force, the oil flows into the turbine 327 to transmit a torque acting in the same direction as the rotating direction of the impeller 324 to the turbine 327, so that the output shaft 321 coupled by the splines with the turbine 327 is driven for rotation. The direction of flow of the oil flowing out from the turbine 327 is deflected by the stator 328 in a direction to assist the rotation of the impeller 324 to increase the torque of the impeller 324. If the turbine 327 rotates at a high rotating speed, the oil flows against the back surface of the stator 328 to make the stator 328 rotate on the one-way clutch 328a.

When a fixed traveling speed or rotating speed is achieved, the lock-up clutch 329 engages the impeller 324 and the turbine 327 through the front cover 325 to make the torque converter operate without slipping; consequently, the operating speed of the engine 310 is reduced accordingly, whereby fuel consumption is reduced and silence is improved.

The belt-drive variable-speed transmission 330 has a primary shaft 331, a secondary shaft 332 disposed in parallel to the primary shaft 331, a primary pulley 333 mounted on the primary shaft 331, a secondary pulley 334 mounted on the secondary shaft 332, and a drive belt 335 extended between the primary pulley 333 and the secondary pulley 334. The respective widths of the grooves of the primary pulley 333 and the secondary pulley 334 are varied to vary the ratio between the pitch diameters of the primary pulley 333 and the secondary pulley 334 for continuously variable speed change.

The primary pulley 333 mounted on the primary shaft 331 formed integrally with the output shaft 321 has a fixed cone 333a formed integrally with the primary shaft 331 and a movable cone 333b axially movable relative to the fixed cone 333a. The fixed cone 333a and the movable cone 333b must hold the drive belt 335 by a predetermined clamping force and the width of the groove defined by the fixed cone 333a and the movable cone 333b must be smoothly controllable to ensure the smooth operation of the transmission for continuously variable speed change. Therefore, a plurality of axial grooves are formed in the mating surfaces of the primary shaft 331 and the movable cone 333b, and balls 333c are placed in the mating grooves for torque transmission.

A substantially cylindrical piston 337a is fixed to the back surface of the movable cone 333b, i.e., a surface not facing the fixed cone 333a, a pressure chamber 337A is formed by the piston 337a and a cylinder 337b having the shape of a bottomed cylinder and having a central portion fixed to the primary shaft 331, and the movable cone 333b is biased by a spring 337c toward the fixed cone 333a to constitute a hydraulic actuator 337.

An oil passage 331b is formed in the primary shaft 331 so as to be connected to the pressure chamber 337A. The hydraulic controller 309 executes a control operation on the basis of signals representing the opening of the throttle and such to supply the oil into and to discharge the same from the pressure chamber 337A of the hydraulic actuator 337 through an oil passage 303a formed in the side cover 303 to move the movable cone 333b along the primary shaft 331 to vary the width of the groove of the pulley.

The secondary shaft 332 extended in parallel to the primary shaft 331 is supported for rotation in a roller bearing 332a and a ball bearing 332b on the variable-speed transmission housing 302 and the side cover 303. The secondary pulley 334 mounted on the secondary shaft 332 has a fixed cone 334a formed integrally with the secondary shaft 332, and a movable cone 334b axially movable relative to the fixed cone 334a. A plurality of axial grooves are formed in the mating surfaces of the movable cone 334b and the secondary shaft 332, and balls 334c are placed in the mating axial grooves for torque transmission from the secondary pulley 334 to the secondary shaft 332.

A substantially cylindrical cylinder 336a is fixed to the back surface of the movable cone 334b, a pressure chamber 336A is defined by the cylinder 336a and a cylindrical piston 336b having a central portion fixed to the secondary shaft 332, and the movable cone 334b is biased toward the fixed cone 334a by a spring 336c to constitute a hydraulic actuator 336.

An oil passage 332c is formed in the secondary shaft 332 so as to be connected to the pressure chambers 336A. The hydraulic controller 309 executes a control operation on the basis of signals representing the opening of the throttle and such to supply the oil into and to discharge the same from the pressure chamber 336A of the hydraulic actuator 336 through an oil passage 301a formed in the torque converter case 301. A drive gear 338 is mounted on one end of the secondary shaft 332.

The pressure receiving area of the movable cone 333b of the primary pulley 333 is greater than that of the movable cone 334b of the secondary pulley 334. Therefore, when the oil is supplied into and discharged from the pressure chambers 337A and 336A, the mode of variation of the width of the groove of the primary pulley 333 and that of the width of the groove of the secondary pulley 334 are reverse to each other. Thus, the ratio between the pitch diameters of the primary pulley 333 and the secondary pulley 334 is varied continuously to vary the output rotating speed of the secondary shaft 332 continuously.

The rotation of the secondary shaft 332 is transmitted through the drive gear 338 to the countershaft assembly 339 at a reduced rotating speed. The rotation of the countershaft assembly 339 is transmitted through a driven gear 354 and a power transmission shaft 353 connected to the driven gear 354 to the transfer unit 350.

The countershaft assembly 339 comprises a shaft 339a supported for rotation at its opposite ends in a needle bearing 339e and a roller bearing 339f on the torque converter case 301 and the variable-speed transmission housing 302, a driven gear 339c fixedly mounted on the shaft 339a and engaged with the drive gear 338, and a drive gear 339d formed integrally with the shaft 339a and engaged with the driven gear 354.

Figure 24:
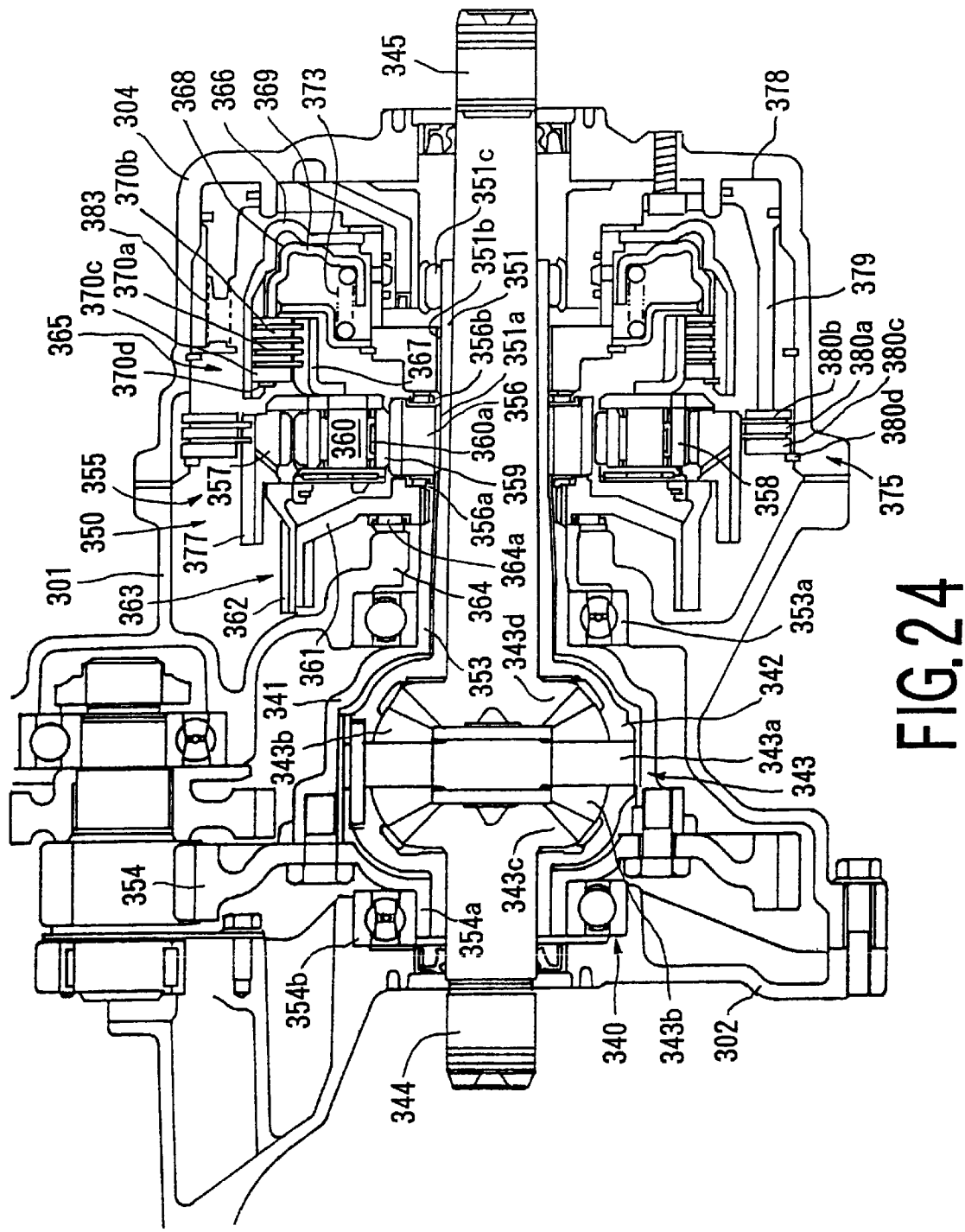
FIG. 24 is an enlarged sectional view of a portion of the automobile driving system of FIG. 23.

The respective constructions of the front differential gear 340 and the transfer unit 350 will be described hereinafter with reference to FIG. 23 and FIG. 24 showing an essential portion of a construction shown in FIG. 23 in an enlarged view.

The front differential gear 340 is contained in a differential gear housing 341 formed between a driven gear 354 having a cylindrical boss 354a supported in a ball bearing 354b on the variable-speed transmission housing 302, and a substantially cylindrical transmission shaft 353 supported for rotation in a ball bearing 353a on the torque converter case 301.

The front differential gear 340 has a hollow, differential gear case 342 rotatably fitted in an expanded part formed of the substantially cylindrical boss 354a of the driven gear 354 formed integrally with a front drive shaft 351, and the transmission shaft 353. A pair of pinions 343b are disposed in the differential gear case 342 and supported on a pinion shaft 343a supported at opposite ends thereof on the differential gear case 342. A left side gear 343c and a right side gear 343d are engaged with the pair of pinions 343b to constitute a differential gear 343.

A drive shaft 344 connected to the side gear 343c extends through the differential gear case 342 and the variable-speed transmission housing 302, and transmits power through a constant-velocity joint and an axle to one of the front wheels. A drive shaft 345 connected to the other side gear 343d extends through the differential gear case 342 and the front drive shaft 351 formed integrally with the differential gear case 342, and transmits power through a constant-velocity joint and an axle to the other front wheel.

Figure 22:
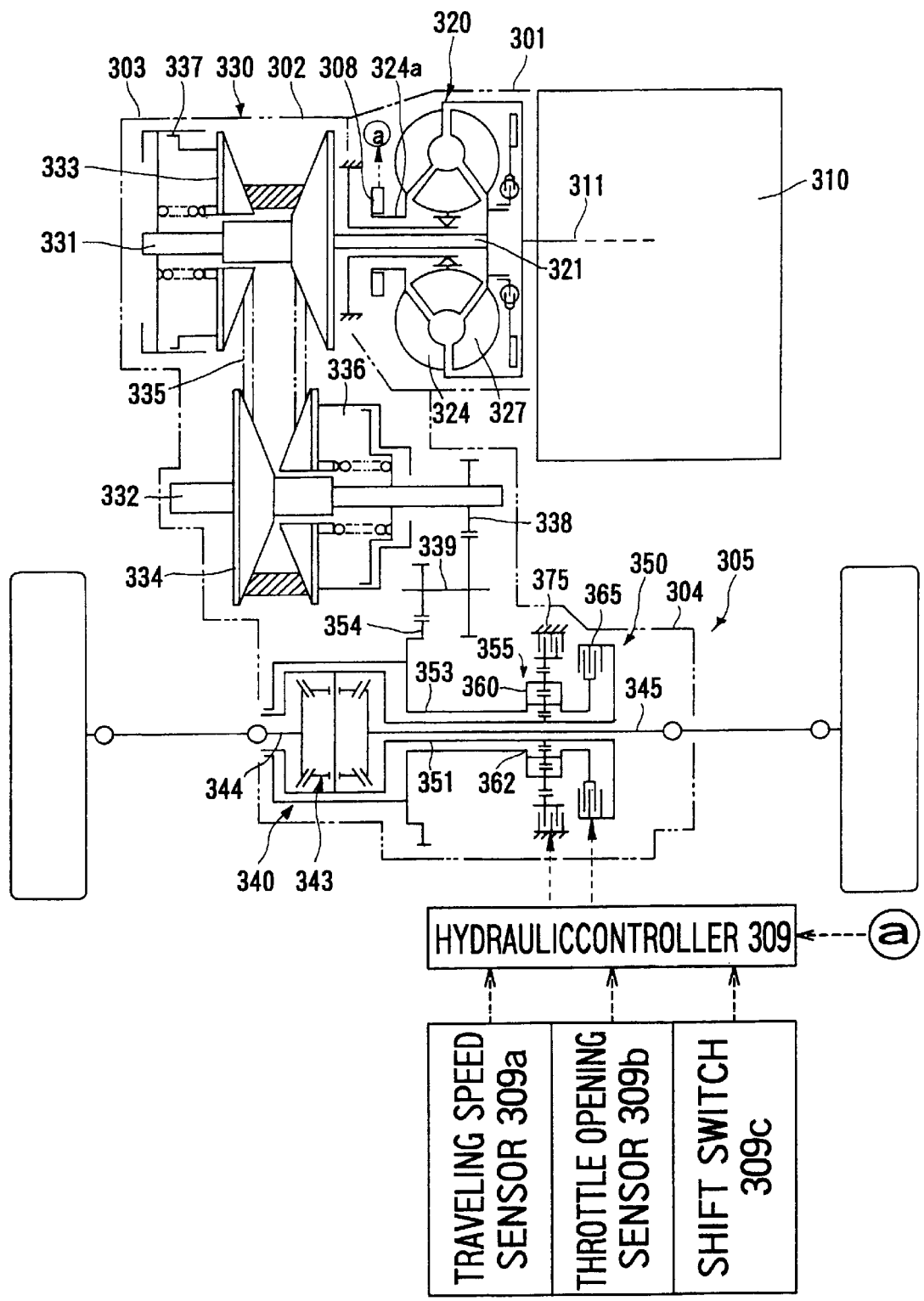
FIG. 22 is a typical view of an automobile driving system in a third embodiment according to the present invention.

As shown in FIG. 22, the transfer unit 350 has the front drive shaft 351 parallel to the crankshaft 311 of the engine 310, the output shaft 321, the primary shaft 321 and the secondary shaft 332.

Figure 25:
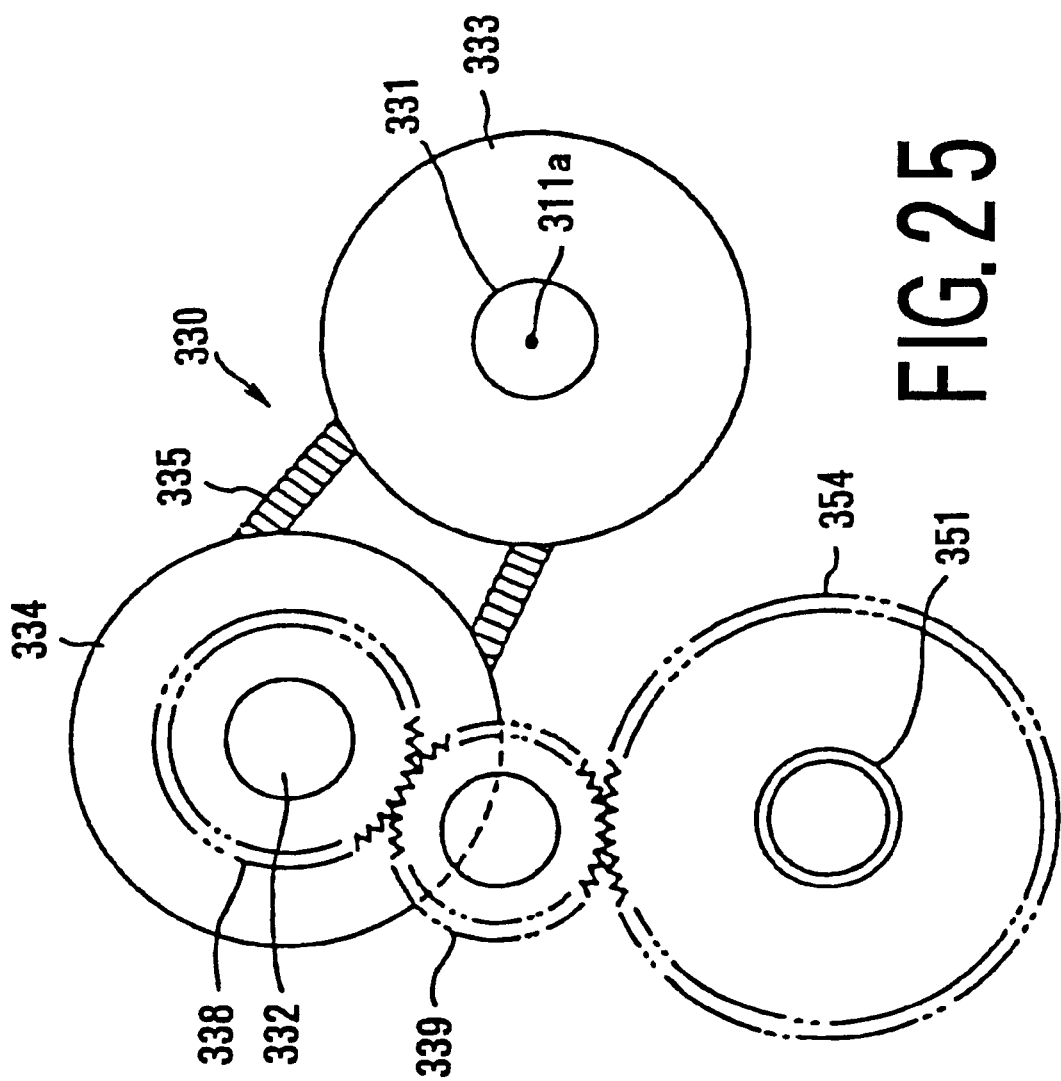
FIG. 25 is a front view taken in the direction of the arrow A in FIG. 23.

The crankshaft 311, the primary shaft 331, the secondary shaft 332 and the front drive shaft 351 extended in parallel to each other are arranged as shown in FIG. 25 in a view taken in the direction of the arrow A in FIG. 23; the crankshaft 311 having an axis 311a of rotation and the primary shaft 331 are extended coaxially along the width of the vehicle body, the secondary shaft 332 is disposed behind and in parallel to the primary shaft 331 on a level higher than that of the primary shaft 331, the secondary pulley 334 is disposed opposite to the primary pulley 333, and the front drive shaft 351 is disposed below and in parallel to the secondary shaft 332. Thus, the driving system is formed in a compact construction having relatively small transverse and longitudinal dimensions to facilitate the installation of the driving system in the engine room and to improve the compatibility of the driving system with both a vehicle body designed to be mounted with a manual transmission (MT) and a vehicle body designed to be mounted with an automatic transmission (AT).

The front drive shaft 351 formed integrally with the differential gear case 342 has one end rotatably supported through the transmission shaft 354 and the ball bearing 353a supporting the transmission shaft 353 on the torque converter case 301, and the other end rotatably supported in a needle bearing 351c on the end cover 304.

The front drive shaft 351 is provided in a middle portion thereof with splines 351a which engage with the sun gear 356 of the double-pinion planetary gear 355, and splines 351b which engage with a clutch drum 366 included in a first multiple-disk clutch 365, i.e., a first friction coupling element, in a portion thereof near the splines 351a.

The double-pinion planetary gear 355 mounted on the middle portion provided with the splines 351a of the front drive shaft 351 has a sun gear 356 engaged with the splines 351a, a ring gear 357, a first pinion 358 engaged with the ring gear 357, a second pinion 359 engaged with the first pinion 358 and the sun gear 357, and a carrier 360 supporting the first pinion 358 and the second pinion 359 for rotation thereon in needle bearings 360a. If the ring gear 357 is fastened to the transmission case 305, the sun gear 356 rotates in a direction reverse to the rotating direction of the carrier 360.

The double-pinion planetary gear 355 is restrained from axial movement by holding the sun gear 356 between a thrust bearing 356a, and a thrust bearing 356b supported through the clutch drum 366 on the end cover 304.

The transmission shaft 353 is operatively connected to the carrier 360 of the double-pinion planetary gear 355 by a connecting member 361 having one end engaged with the transmission shaft 353 by splines, and a coupling member 362, which corresponds to a clutch hub 779 included in a second multiple-disk clutch 778 employed in a seventh embodiment. The transmission shaft 353 and the connecting member 361 constitute an input member 363. The connecting member 361 is supported for rotation on a thrust bearing 364a supported on a substantially cylindrical fixed shaft 364 formed integrally with the torque converter case 301.

The first multiple-disk clutch 365 serves as a first friction coupling element for selectively connecting the front drive shaft 351 and the carrier 360 of the double-pinion planetary gear 355 for power transmission, and a second multiple-disk clutch 375 serves as a second friction coupling element for selectively fastening the ring gear of the double-pinion planetary gear 355 to the transmission case 305.

In the first multiple-disk clutch 365, the clutch drum is engaged with the front drive shaft 351 by the splines 351b, and a clutch hub 367 is connected to the carrier 360 of the double-pinion planetary gear 355 to enable the connection of the front drive shaft 351 and the carrier 360 for power transmission. A retaining plate 370c contiguous with a snap ring 370d fixed to the inner circumference of the clutch drum 366, driven plates 370b, and drive plates 370a associated with the clutch hub 367 are compressed by a piston 369 by a pressure applied to a pressure chamber 368 to transmit power. A pressure is exerted on the piston 369 by a return spring 373.

The second multiple-disk clutch 375 fastens the ring gear 357 to the transmission case 305 when a retaining plate 380c contiguous with a snap ring 380d fixed to the inner circumference of the end case 304, driven plates 380b, and drive plates 380a associated with the clutch hub 377 are compressed by a piston 379 by a pressure applied to a pressure chamber 378. A pressure is exerted on the piston 369 by a return spring 383.

A control valve is disposed in the oil pan joined to a lower portion of the transmission case 305. The control valve is controlled by the hydraulic controller 309 on the basis of signals provided by the traveling speed sensor 309a, the throttle opening sensor 309b and the shift switch 309c to supply the oil discharged from the oil pump selectively to the respective pressure chambers 368 and 378 of the first multiple-disk clutch 365 and the second multiple-disk clutch 375, and the variable-speed transmission 330.

The operation of the automobile driving system for a two-wheel drive vehicle thus constructed will be described with reference to FIGS. 28 and 29, and FIG. 30 tabulating the operating conditions of the first multiple-disk clutch 365 and the second multiple-disk clutch 375. In the table shown in FIG. 30, blank circles indicate that the corresponding multiple-disk clutches are engaged.

The power of the engine 310 is transmitted from the crankshaft 311 through the torque converter 320 to the primary shaft 331 of the variable-speed transmission 330. An input speed of the primary shaft 331 is converted continuously into an output speed of the secondary shaft 332 by the action of the primary pulley 333 and the secondary pulley 334 operatively connected by the drive belt 335. The output speed of the secondary shaft 332 is reduced by the action of the drive gear 338, the countershaft assembly 339 and the driven gear 354 and a reduced speed is transmitted through the connecting member 361 to the carrier 360 of the double-pinion planetary gear 355. Although both the first multiple-disk clutch 365 and the second multiple-disk clutch 375 are disengaged and the carrier 360 rotates, and the first pinion 358 and the second pinion 359 revolve round the sun gear 356, any power is not transmitted to and beyond the front drive shaft 351 when a neutral position N or a parking position P is selected.

Figure 26:
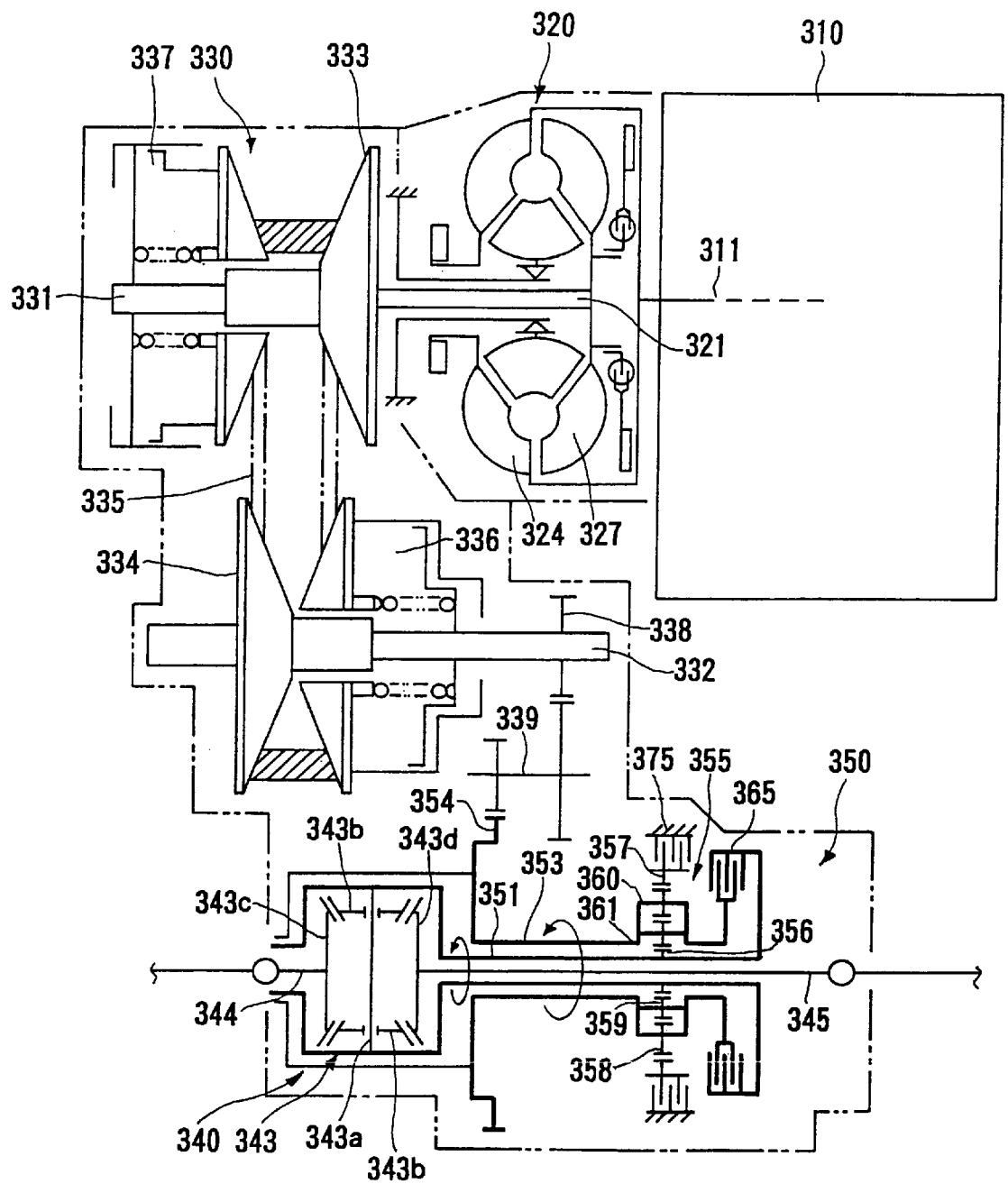
FIG. 26 is a schematic plan view of assistance in explaining the operation of the automobile driving system of FIG. 22.

When a drive range D, i.e., a forward range, is selected, the first multiple-disk clutch 365 is engaged to transmit driving power through a drive line indicated by thick lines in FIG. 26. A pressure is applied through the control valve to the pressure chamber 368 to compress the retaining plate 370c contiguous with the snap ring 370d fixed to the inner circumference of the clutch drum 366, the driven plates 370b, and the drive plates 370a associated with the clutch hub 367 by the piston 369 so that the first multiple-disk clutch 365 is engaged. Then, the rotation of the transmission shaft 353 is transmitted through the carrier 360 of the double-pinion planetary gear 355 and the first multiple-disk clutch 365 to the front drive shaft 351, whereby the front drive shaft 351c is rotated in the same direction as the rotating direction of the transmission shaft 353 to transmit power to the front differential gear 340.

Figure 27:
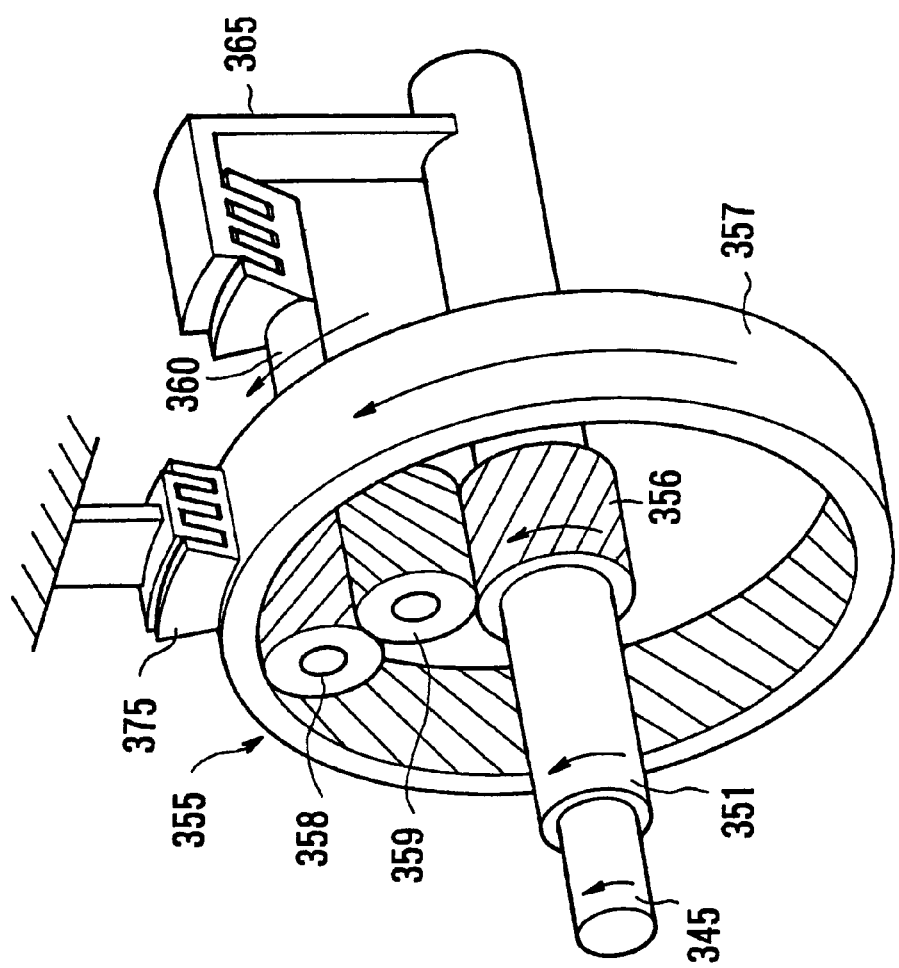
FIG. 27 is a schematic perspective view of assistance in explaining the operation of a double-pinion planetary gear.

The second multiple-disk clutch 375 is disengaged to release the ring gear 357 of the double-pinion planetary gear 355 as shown in FIG. 27, and the first multiple-disk clutch 365 is engaged to operatively connect the carrier 360 to the front drive shaft 351, so that the double-pinion planetary gear 355 rotates together with the drive shaft 351.

Figure 28:
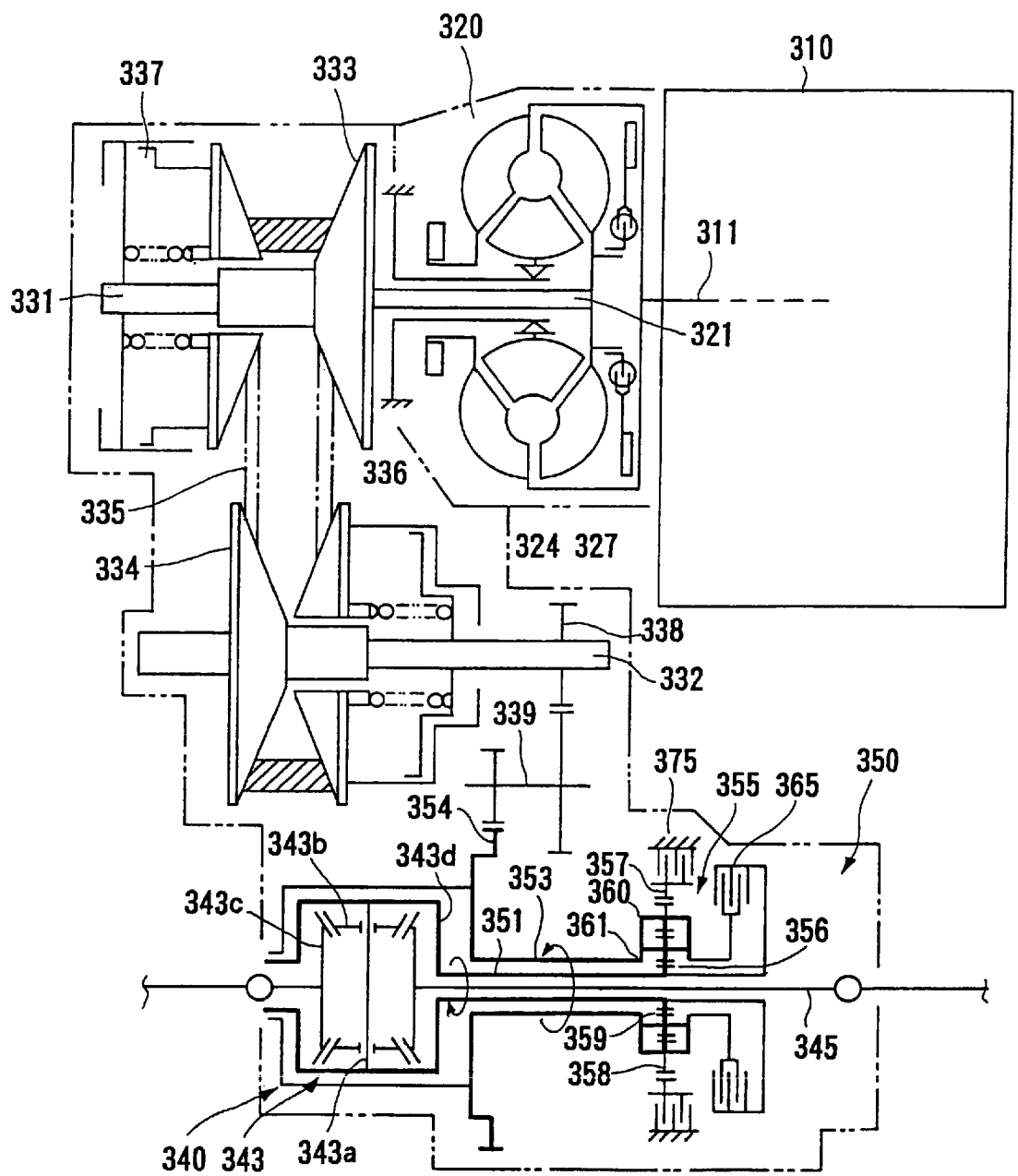
FIG. 28 is a schematic plan view of assistance in explaining the operation of the automobile driving system of FIG. 22.

When a reverse range R is selected, the first multiple-disk clutch 365 is disengaged and the second multiple-disk clutch 375 is engaged to transmit power through a drive line indicated by thick lines in FIG. 28. A pressure is applied through the control valve to the pressure chamber 378 to compress the retaining plate 380c contiguous with the snap ring 380d, the drive plates 380a and the driven plates 380b by the piston 379 so that the second multiple-disk clutch 375 is engaged, whereby the ring gear 375 is restrained from rotation relative to the transmission case 305.

Figure 29:
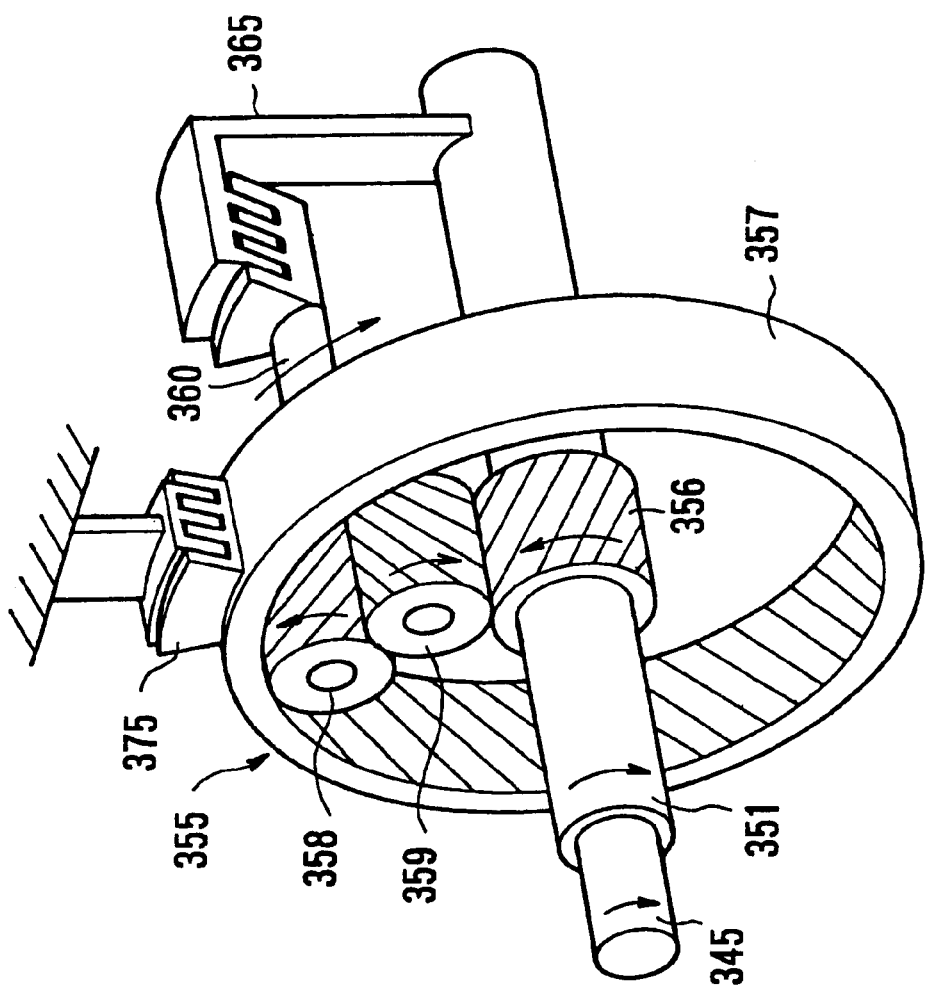
FIG. 29 is a schematic perspective view of assistance in explaining the operation of a double-pinion planetary gear.

Consequently, as shown in FIG. 29, the first pinion 358 and the second pinion 359 rotate in the opposite directions, respectively, and revolve along the ring gear 357 to rotate the sun gear 356 in a direction opposite the rotating direction of the carrier 360. Consequently, the front drive shaft 351 is driven for rotation in the reverse direction to transmit power to the front differential gear 340.

The gear ratio of the double-pinion planetary gear 355 will be explained hereinafter.

The gear ratio of the double-pinion planetary gear 355, i.e., the ratio of the rotating speed of the front drive shaft 351 to that of the carrier 360, is expressed by:

Gear ratio=[ZS+(−ZR)]/ZS where ZS is the number of teeth of the sun gear 356, and ZR is the number of teeth of the ring gear 357.

Accordingly, an optional gear ratio can be provided by properly determining ZS of the sun gear 356 and ZR of the ring gear 357.

If Zs=37 and ZR=82,

Gear ratio=[37+(−82)]/37=−1.216 which is an appropriate gear ratio for the reverse range R.

Thus, a forward/reverse selecting mechanism comprising, as principal components, the double-pinion planetary gear 355, the first multiple-disk clutch 365 and the second multiple-disk clutch 375 is constructed.

The engine 310, the torque converter 320 and the belt-drive variable-speed transmission 330 are arranged coaxially and transversely, and the double-pinion planetary gear 355, the first multiple-disk clutch 365 and the second multiple-disk clutch 375 constituting the forward/reverse selecting mechanism are disposed on the axis of the front drive shaft 351 disposed on a level below that of the crankshaft 311 of the engine 310 and on one side of the transmission 330 opposite the other side of the same on which the torque converter 320 is disposed. Accordingly, the upper portion of the driving system is reduced, the height of the driving system is not increased, the driving system can be made compact, the degree of freedom of vehicle body design is increased, and a space for securing crush stroke and work for mounting and dismounting the transmission can be easily secured.

An automobile driving system for a four-wheel drive vehicle, such as an automobile driving system in a seventh embodiment, comprising the same principal components as those of the automobile driving system in the third embodiment for a two-wheel drive vehicle can be constructed by employing an input selecting means instead of the connecting member 361 of the foregoing driving system for a two-wheel drive vehicle, and additionally employing a power transfer mechanism for transferring driving force to a rear differential gear, which will be described in connection with the seventh embodiment.

Fourth Embodiment

An automobile driving system 400 in a fourth embodiment according to the present invention will be described hereinafter with reference to FIGS. 31 to 38.

A torque converter case 401 containing a torque converter 420 and joined to a transverse engine 410, a variable-speed transmission housing 402 disposed beside the torque converter case 401 and containing a belt-drive variable-speed transmission 430 and a differential gear, for example, a front differential gear 440, a side cover 403, and an end cover 404 containing a transfer unit 450 in combination with the torque converter case 401 are arranged and joined successively to construct a transmission case 405. An oil pan, not shown, is attached to a lower portion of the transmission case 405.

A crankshaft 411 included in the transverse engine 410 is connected to the torque converter 420 contained in the torque converter case 401. An output shaft 421 included in the torque converter 420 is connected to a primary shaft 431 included in the belt-drive variable-speed transmission 430 contained in the variable-speed transmission housing 402 to transmit power from the crankshaft 411 through the torque converter 420 to the primary shaft 431 of the variable-speed transmission 430.

A secondary shaft 432 included in the variable-speed transmission 430 rotates at an output speed determined by varying an input speed to the variable-speed transmission 430. Power is transmitted from the secondary shaft 432 through a countershaft assembly 439 to the transfer unit 450 which in turn transmits power through the front differential gear 440 to front wheels.

An oil pump 408 is disposed in the transmission case 405 and is driven continuously by an oil pump drive shaft 424a included in the torque converter 420 to discharge an oil at a line pressure. The oil is supplied to the torque converter 420, enables the hydraulic control of the variable-speed transmission 430, and enables a hydraulic controller 409 to control the transfer unit 450 on the basis of signals provided by a traveling speed sensor 409a, a throttle opening sensor 409b and a shift switch 409c.

Figure 31:
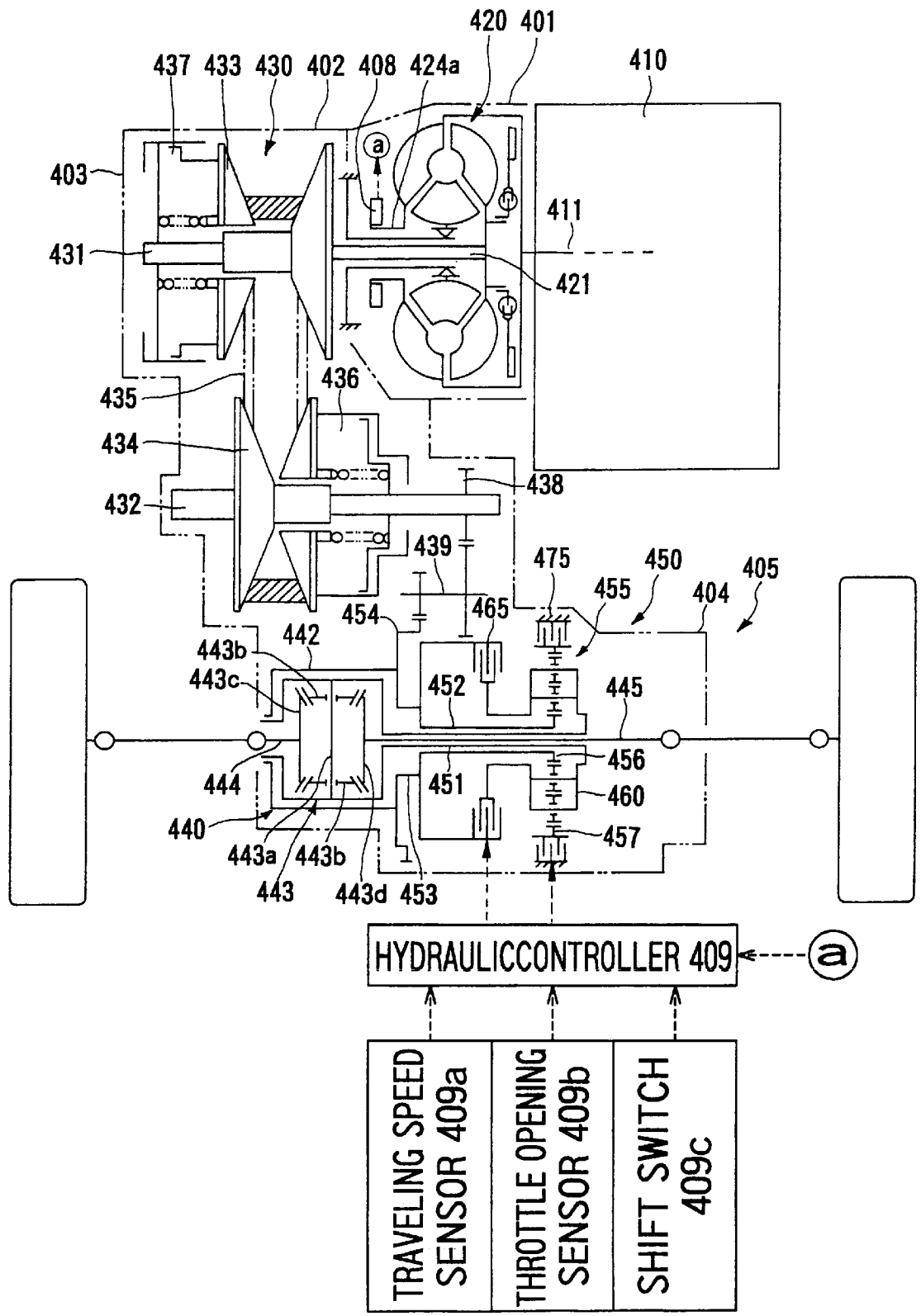
FIG. 31 is a typical view of an automobile driving system in a fourth embodiment according to the present invention.

The constructions of the torque converter 420, the belt-drive variable-speed transmission 430, the front differential gear 440 and the transfer unit 450 will be successively described with reference to FIGS. 31 to 33.

Figure 32:
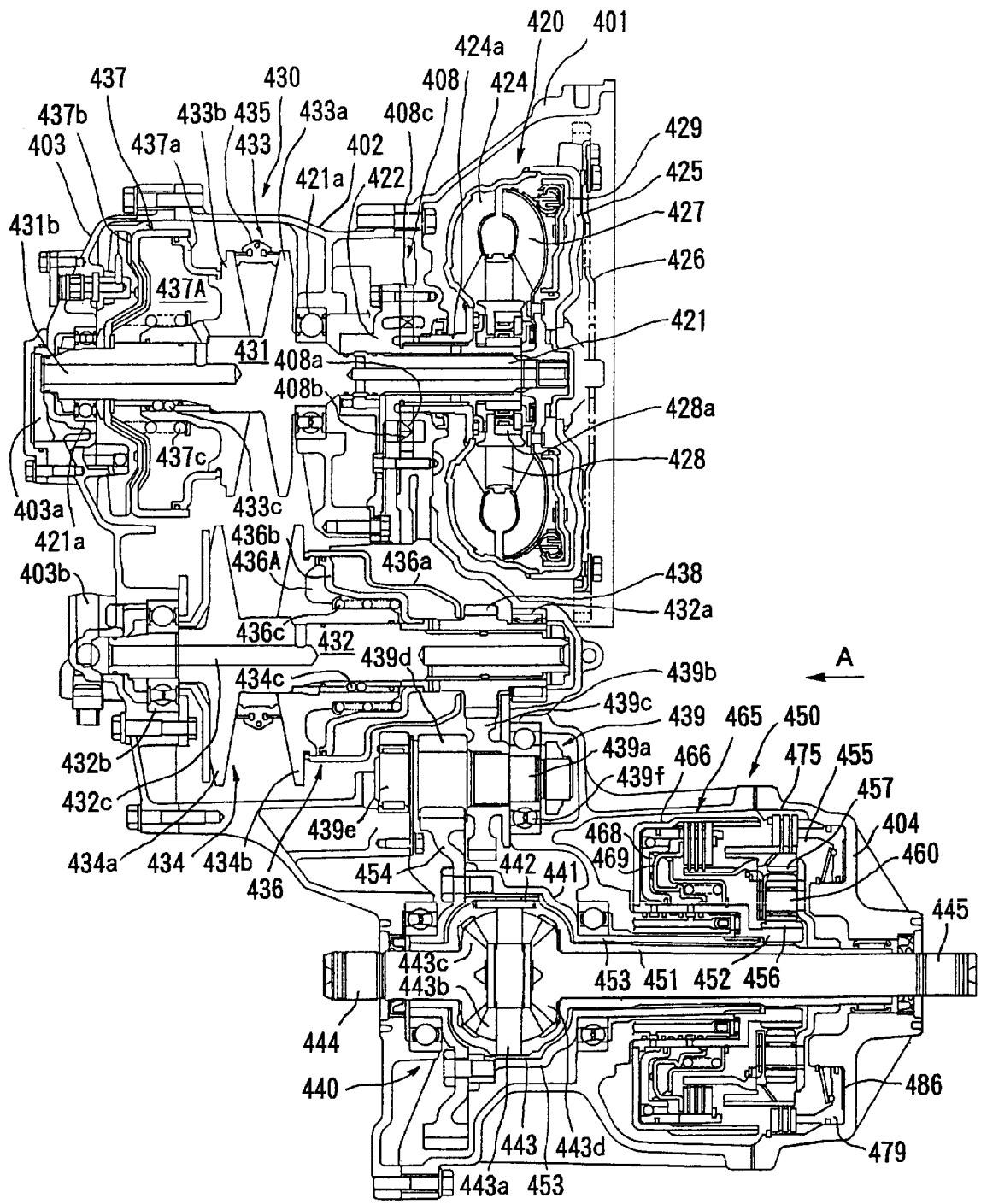
FIG. 32 is a sectional view of the automobile driving system of FIG. 31.

As shown in FIG. 32 in a sectional view, the torque converter 420 has the output shaft 421 supported for rotation in ball bearings 421a on the variable-speed transmission housing 402 and the side cover 403 coaxially with the crankshaft 411.

The output shaft 421 is surrounded so as to be rotatable by a stator shaft 422 having a substantially cylindrical outer circumference, and provided at its base end with a flange bolted together with an oil pump housing 408c to the torque converter case 401. The oil pump drive shaft 424a joined to an impeller 424 is fitted rotatably on the stator shaft 422.

The outer circumference of the impeller 424 is joined to the outer circumference of a front cover 425 and connected by a drive plate 426 to the crankshaft 411 so as to rotate together with the crankshaft 411.

A turbine 427 is disposed opposite to the impeller 424 and is coupled with the output shaft 421 by splines. A stator 428 is interposed between the impeller 424 and the turbine 427 and is supported on a one-way clutch 428a mounted on the stator shaft 422.

A lock-up clutch 429 is interposed between the turbine 427 and the front cover 425. The oil pump 408 comprising an inner gear 408a driven for rotation by the oil pump drive shaft 424a, an outer gear 408b engaged with the inner gear 408a, and an oil pump housing 408c is mounted on the base end of the stator shaft 422.

The rotation of the crankshaft 411 of the engine 410 is transmitted through the drive plate 426 joined to the crankshaft 411, and the front cover 425 to the impeller 424 to drive the same for rotation.

As the impeller 424 rotates, the oil is discharged outside from the impeller 424 by centrifugal force, the oil flows into the turbine 427 to transmit a torque acting in the same direction as the rotating direction of the impeller 424 to the turbine 427, so that the output shaft 421 coupled by the splines with the turbine 427 is driven for rotation. The direction of flow of the oil flowing out from the turbine 427 is deflected by the stator 428 in a direction to assist the rotation of the impeller 424 to increase the torque of the impeller 424. If the turbine 427 rotates at a high rotating speed, the oil flows against the back surface of the stator 428 to make the stator 428 rotate freely on the one-way clutch 428a.

When a fixed traveling speed or rotating speed is achieved, the lock-up clutch 429 engages the impeller 424 and the turbine 427 through the front cover 425 to make the torque converter operate without slipping; consequently, the operating speed of the engine 410 is reduced accordingly, whereby fuel consumption is reduced and silence is improved.

The belt-drive variable-speed transmission 430 has a primary shaft 431, a secondary shaft 432 disposed in parallel to the primary shaft 431, a primary pulley 433 mounted on the primary shaft 431, a secondary pulley 434 mounted on the secondary shaft 432, and a drive belt 435 extended between the primary pulley 433 and the secondary pulley 434. The respective widths of the grooves of the primary pulley 433 and the secondary pulley 434 are varied to vary the ratio between the pitch diameters of the primary pulley 433 and the secondary pulley 434 for continuously variable speed change.

The primary pulley 433 mounted on the primary shaft 431 formed integrally with the output shaft 421 has a fixed cone 433a formed integrally with the primary shaft 431 and a movable cone 433b axially movable relative to the fixed cone 433a. The fixed cone 433a and the movable cone 433b must hold the drive belt 435 by a predetermined clamping force and the width of the groove defined by the fixed cone 433a and the movable cone 433b must be smoothly controllable to ensure the smooth operation of the transmission for continuously variable speed change. Therefore, a plurality of axial grooves are formed in the mating surfaces of the primary shaft 431 and the movable cone 433b, and balls 433c are placed in the mating grooves for torque transmission.

A substantially cylindrical piston 437a is fixed to the back surface of the movable cone 433b, i.e., a surface not facing the fixed cone 433a, a pressure chamber 437A is formed by the piston 437a and a cylinder 437b having the shape of a bottomed cylinder and having a central portion fixed to the primary shaft 431, and the movable cone 433b is biased by a spring 437c toward the fixed cone 433a to constitute a hydraulic actuator 437.

An oil passage 431b is formed in the primary shaft 431 so as to be connected to the pressure chamber 437A. The hydraulic controller 409 executes a control operation on the basis of signals representing the opening of the throttle and such to supply the oil into and to discharge the same from the pressure chamber 437A of the hydraulic actuator 437 through an oil passage 303a formed in the side cover 403 to move the movable cone 433b along the primary shaft 431 to vary the width of the groove of the pulley.

The secondary shaft 432 extended in parallel to the primary shaft 431 is supported for rotation in a roller bearing 432a and a ball bearing 432b on the variable-speed transmission housing 402 and the side cover 403. The secondary pulley 434 mounted on the secondary shaft 432 has a fixed cone 434a formed integrally with the secondary shaft 432, and a movable cone 434b axially movable relative to the fixed cone 434a. A plurality of axial grooves are formed in the mating surfaces of the movable cone 434b and the secondary shaft 432, and balls 434c are placed in the mating axial grooves for torque transmission from the secondary pulley 434 to the secondary shaft 432.

A substantially cylindrical cylinder 436a is fixed to the back surface of the movable cone 434b, a pressure chamber 436A is defined by the cylinder 436a and a cylindrical piston 436b having a central portion fixed to the secondary shaft 432, and the movable cone 434b is biased toward the fixed cone 434a by a spring 436c to constitute a hydraulic actuator 436.

An oil passage 432c is formed in the secondary shaft 432 so as to be connected to the pressure chambers 436A. The hydraulic controller 409 executes a control operation on the basis of signals representing the opening of the throttle and such to supply the oil into and to discharge the same from the pressure chamber 436A of the hydraulic actuator 436 through an oil passage 403b formed in the side cover 403. A drive gear 438 is mounted on one end of the secondary shaft 432.

The pressure receiving area of the movable cone 433b of the primary pulley 433 is greater than that of the movable cone 434b of the secondary pulley 434. Therefore, when the oil is supplied into and discharged from the pressure chambers 437A and 436A, the mode of variation of the width of the groove of the primary pulley 433 and that of the width of the groove of the secondary pulley 434 are reverse to each other. Thus, the ratio between the pitch diameters of the primary pulley 433 and the secondary pulley 434 is varied continuously to vary the output rotating speed of the secondary shaft 432 continuously.

The rotation of the secondary shaft 432 is transmitted through the drive gear 438 to the countershaft assembly 439 at a reduced rotating speed. The rotation of the countershaft assembly 439 is transmitted through a driven gear 454 and a power transmission shaft 453 bolted to the driven gear 454 to the transfer unit 450.

The countershaft assembly 439 comprises a shaft 439a supported for rotation at its opposite ends in a needle bearing 339e and a roller bearing 339f on the torque converter case 401 and the variable-speed transmission housing 402, a driven gear 439c fixedly mounted on the shaft 439a for rotation together with the shaft 439a and engaged with the drive gear 438, and a drive gear 439d formed integrally with the drive shaft 439a and engaged with the driven gear 454.

Figure 33:
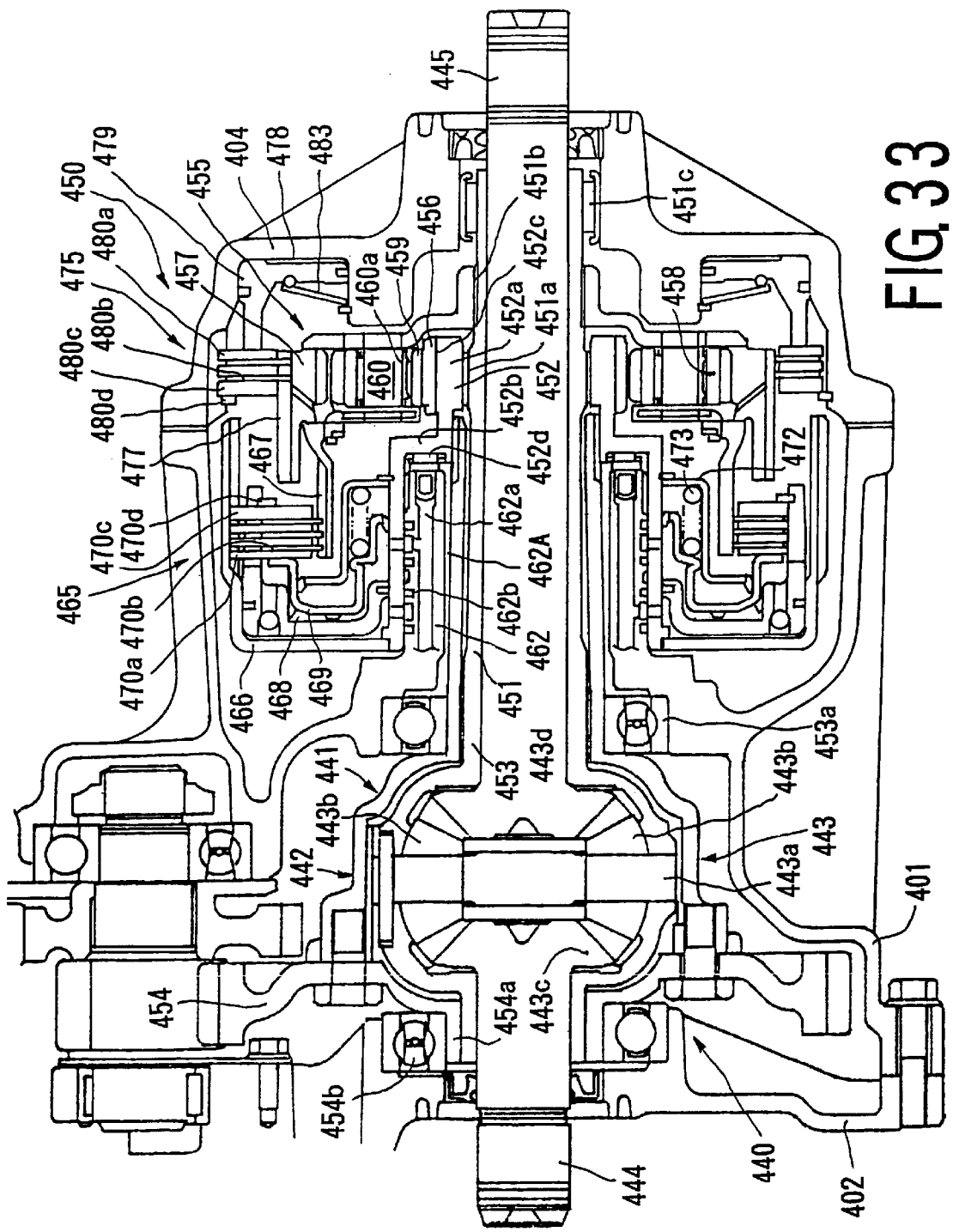
FIG. 33 is an enlarged view of a portion of the automobile driving system of FIG. 31.

The respective constructions of the front differential gear 440 and the transfer unit 450 will be described hereinafter with reference to FIG. 32 and FIG. 33 showing an essential portion of a construction shown in FIG. 32 in an enlarged view.

The front differential gear 440 is contained in a differential gear housing 441 formed between a driven gear 454 having a cylindrical boss 454a supported in a ball bearing 454b on the variable-speed transmission housing 402, and a substantially cylindrical transmission shaft 453 supported for rotation in a ball bearing 453a on the torque converter case 401.

The front differential gear 440 has a hollow, differential gear case 442 rotatably fitted in an expanded part formed of the substantially cylindrical boss 454a of the driven gear 454 formed integrally with a front drive shaft 451, and the transmission shaft 453. A pair of pinions 443b are disposed in the differential gear case 442 and supported on a pinion shaft 443a supported at opposite ends thereof on the differential gear case 442. A left side gear 443c and a right side gear 443d are engaged with the pair of pinions 343b to constitute a differential gear 443.

A drive shaft 444 connected to the side gear 443c extends through the differential gear case 442 and the variable-speed transmission housing 402, and transmits power through a constant-velocity joint and an axle to one of the front wheels. A drive shaft 445 connected to the other side gear 443d extends through the differential gear case 442 and the front drive shaft 451 formed integrally with the differential gear case 442, and transmits power through a constant-velocity joint and an axle to the other front wheel.

The transfer unit 450 has the front drive shaft 451 parallel to the crankshaft 411 of the engine 410, the output shaft 421, the primary shaft 431 and the secondary shaft 432.

The arrangement of the crankshaft 411, the primary shaft 431, the secondary shaft 432 and the front drive shaft 451 extended in parallel to each other is the same as that of the corresponding shafts of the third embodiment previously described with reference to FIG. 25. Thus, the driving system is formed in a compact construction having a relatively small longitudinal dimension to facilitate the installation of the driving system in the engine room and to improve the compatibility of the driving system with both a vehicle body designed to be mounted with a manual transmission (MT) and a vehicle body designed to be mounted with an automatic transmission (AT).

The front drive shaft 451 formed integrally with the differential gear case 442 has one end rotatably supported through the transmission shaft 453 and the ball bearing 453a supporting the transmission shaft 453 on the torque converter case 401, and the other end rotatably supported in a needle bearing 451c on the end cover 404.

The front drive shaft 451 is provided in a middle portion thereof with splines 451a which engage with a hub 452, which will be mentioned later, and splines 451b which engage with a carrier 460 included in a double-pinion planetary gear 455 in a portion thereof near the splines 451a.

The front drive shaft 451 is inserted in a substantially cylindrical fixed shaft 462 formed integrally with torque converter case 401. A space between an end surface of the fixed shaft 462 and the front drive shaft 451 is closed by the hub 452 to form a pressure chamber 462A. The fixed shaft 462 is provided with an oil passage 462a connected to the pressure chamber 462A, and an oil passage 462b formed in its outer circumference.

The hub 452, i.e., an input member, is rotatably mounted on the front drive shaft 451. The hub 452 has a cylindrical portion 452a fitted on the front drive shaft 451, a flange 452b formed at the base end of the cylindrical portion 452a, provided with splines 452c which engage with the sun gear 456 of the double-pinion planetary gear 455 in its outer circumference and splines which engage with the splines 451a of the front drive shaft 451 in its inner circumference. A clutch drum 466 included in a first multiple-disk clutch 465, i.e., a first friction coupling element, is connected to the flange 452b. The hub 452 is engaged with splines formed in an end portion of the transmission shaft 453 and is supported for rotation by a thrust bearing 452d on the fixed shaft 462.

The double-pinion planetary gear 455 has a sun gear 456 engaged with the splines 452c of the hub 452, a ring gear 457, a first pinion 458 engaged with the ring gear 457, a second pinion 459 engaged with the sun gear 456 and the first pinion 458, and a carrier 460 supporting the first pinion 458 and the second pinion 459 for rotation thereon in needle bearings 460a. If the ring gear 457 is fastened to the end cover 404, the carrier 460 is rotated in a direction opposite the rotating direction of the sun gear 456 at a reduced rotating speed by power transmitted to the sun gear 456. The carrier 460 is engaged with an output power transmitting means, for example, the splines 451b of the drive shaft 451, for power transmission.

The first multiple-disk clutch 465, i.e., a first friction coupling element for selectively transmitting power from the transmission shaft 453 to the carrier 460, is interposed between the transmission shaft 453 and the double-pinion planetary gear 455.

In the first multiple-disk clutch 465, the hub 452 is supported for rotation on the fixed shaft 462, the clutch drum 466 is fitted in and operatively connected to the hub 452, and a clutch hub 467 is connected to the carrier 460 of the double-pinion planetary gear 455. The first multiple-disk clutch 465 connects the transmission shaft 453 and the carrier 460 for power transmission. The first multiple-disk clutch 465 compresses a retaining plate 470c contiguous with a snap ring 470d fixed to the inner circumference of the clutch drum 466, driven plates 470b, and drive plates 470a associated with a clutch hub 467 by applying a pressure to a piston 469 fitted in a pressure chamber 468 to transmit power. A retainer 472 is disposed on one side of the piston 469 opposite the other side of the same on which the pressure chamber 468 is disposed, and the piston 469 is biased by the pressure of a return spring 473.

A second multiple-disk clutch 475, i.e., a second friction coupling means for selectively fastening the ring gear 457 to the end cover 404, is interposed between the end cover 404 of the transmission cover 405 and the ring gear 457.

In the second multiple-disk clutch 475, a retaining plate 480c contiguous with a snap ring 480d fixed to the inner circumference of the end cover 404, driven plates 480b, and drive plates 480a associated with a clutch hub 477 connected to the ring gear 457 are compressed by a piston 479 driven by a pressure applied to a pressure chamber 478 to fasten the ring gear 457 to the end cover 404. The piston 479 is biased by the pressure of a return spring 483.

A control valve is disposed in the oil pan joined to a lower portion of the transmission case 405. The control valve is controlled by the hydraulic controller 409 on the basis of signals provided by the traveling speed sensor 409a, the throttle opening sensor 409b and the shift switch 409c to supply the oil discharged from the oil pump selectively to the respective pressure chambers 468 and 478 of the first multiple-disk clutch 465 and the second multiple-disk clutch 475, and the variable-speed transmission 430.

The operation of the automobile driving system for a two-wheel drive vehicle thus constructed will be described with reference to FIGS. 34 to 37, and FIG. 38 tabulating the operating conditions of the first multiple-disk clutch 465 and the second multiple-disk clutch 475. In the table shown in FIG. 38, blank circles indicate that the corresponding multiple-disk clutches are engaged.

The power of the engine 410 is transmitted from the crankshaft 411 through the torque converter 420 to the primary shaft 431 of the variable-speed transmission 430. An input speed of the primary shaft 431 is converted continuously into an output speed of the secondary shaft 432 by the action of the primary pulley 433 and the secondary pulley 434 operatively connected by the drive belt 435. The output speed of the secondary shaft 432 is reduced by the action of the drive gear 438, the countershaft assembly 439 and the driven gear 454 and a reduced speed is transmitted through the transmission shaft 453 and the hub 452, i.e., an input member, to the first multiple-disk clutch 465 and the sun gear 456 of the double-pinion planetary gear 455. The first multiple-disk clutch 465 and the second multiple-disk clutch 475 are disengaged and power is not transmitted beyond the first multiple-disk clutch 465 and the second multiple-disk clutch 475 when a neutral position N or a parking position P is selected.

Figure 34:
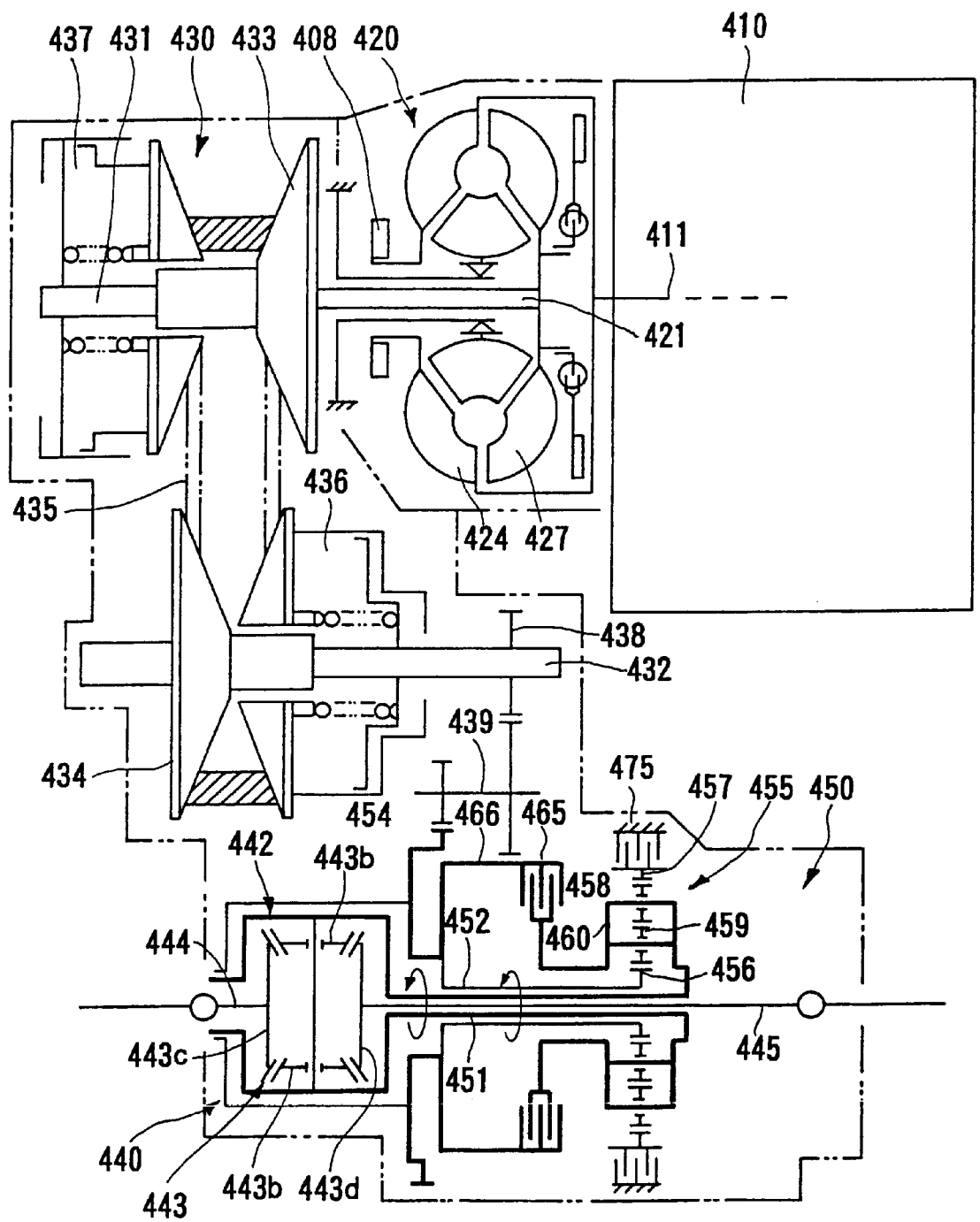
FIG. 34 is a schematic plan view of assistance in explaining the operation of the automobile driving system of FIG. 31.

When a drive range D, i.e., a forward range, is selected, the first multiple-disk clutch 465 is engaged to transmit driving power through a drive line indicated by thick lines in FIG. 34. A pressure is applied through the control valve to the pressure chamber 468 to compress the retaining plate 470c contiguous with the snap ring 470d fixed to the inner circumference of clutch drum 466, the driven plates 470b, and the drive plates 470a by the piston 469 so that the first multiple-disk clutch 465 is engaged. Then, power is transmitted from the driven gear 454 through the transmission shaft 453 and the hub 452 to the carrier 460 of the double-pinion planetary gear 455 to drive the front drive shaft 451 coupled with the carrier 460 by the splines for rotation in the same direction as the rotating direction of the driven gear 454 to transmit power to the front differential gear 440.

Figure 35:
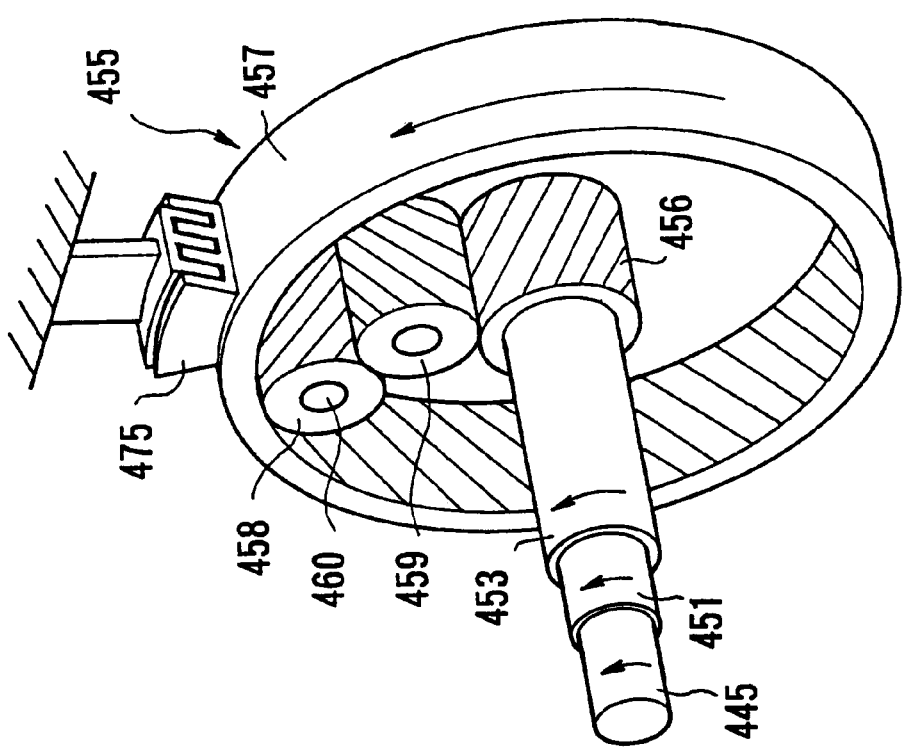
FIG. 35 is a schematic perspective view of assistance in explaining the operation of a double-pinion planetary gear.

The second multiple-disk clutch 475 is disengaged to release the ring gear 457 of the double-pinion planetary gear 455 as shown in FIG. 35. Since the carrier 460 is coupled with the front drive shaft 451 by the splines, the double-pinion planetary gear 455 rotates together with the drive shaft 451.

Figure 36:
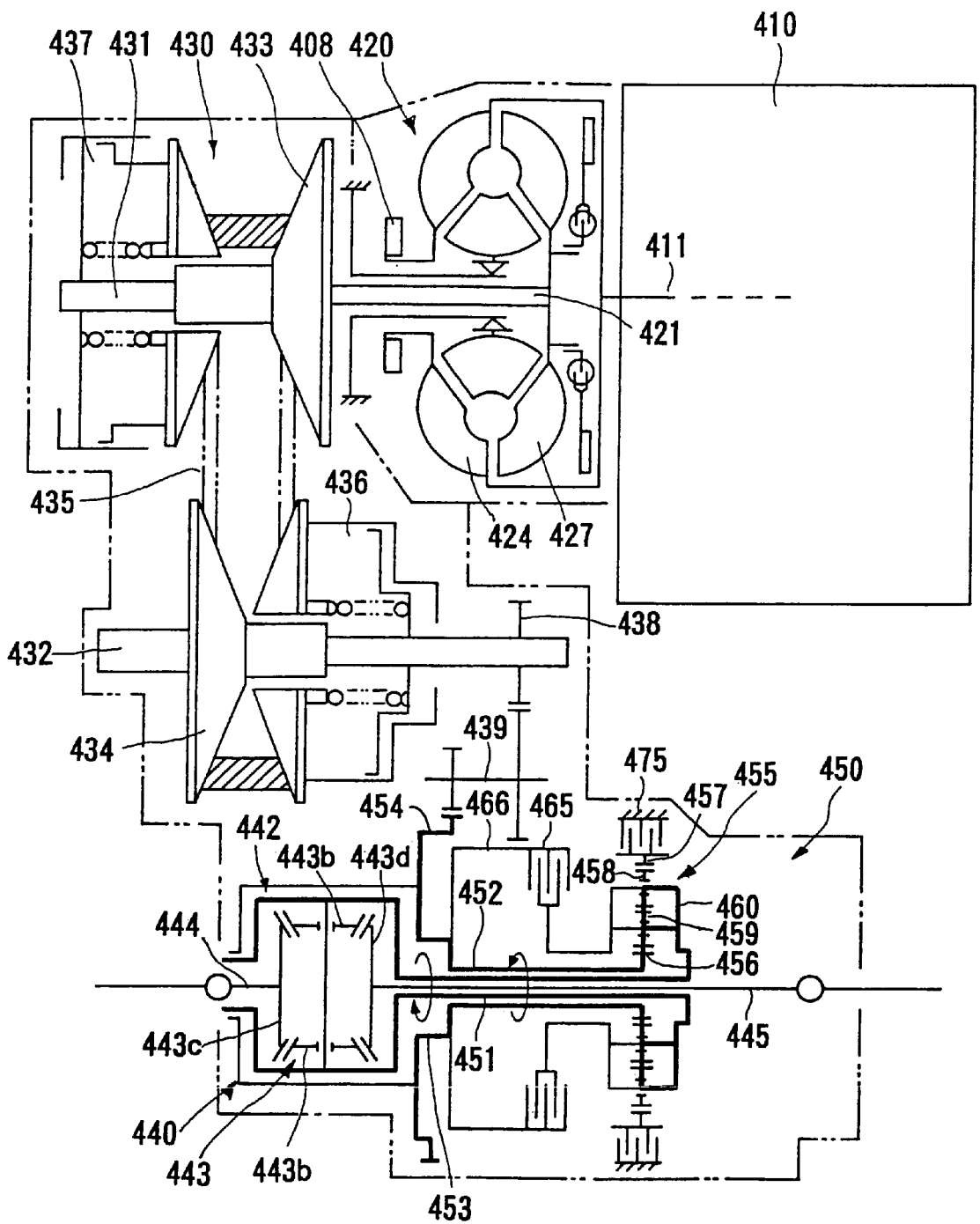
FIG. 36 is a schematic plan view of assistance in explaining the operation of the automobile driving system of FIG. 31.

When a reverse range R is selected, the first multiple-disk clutch 465 is disengaged and the second multiple-disk clutch 475 is engaged to transmit power through a drive line indicated by thick lines in FIG. 36. A pressure is applied through the control valve to the pressure chamber 478 to compress the retaining plate 480c contiguous with the snap ring 480d, the drive plates 480a and the driven plates 480b by the piston 479 to engage the second multiple-disk clutch 375, whereby the ring gear 475 is restrained from rotation relative to the transmission case 405 to transmit power from the transmission shaft 453 through the hub 452 to the sun gear 456 of the double-pinion planetary gear 455.

Figure 37:
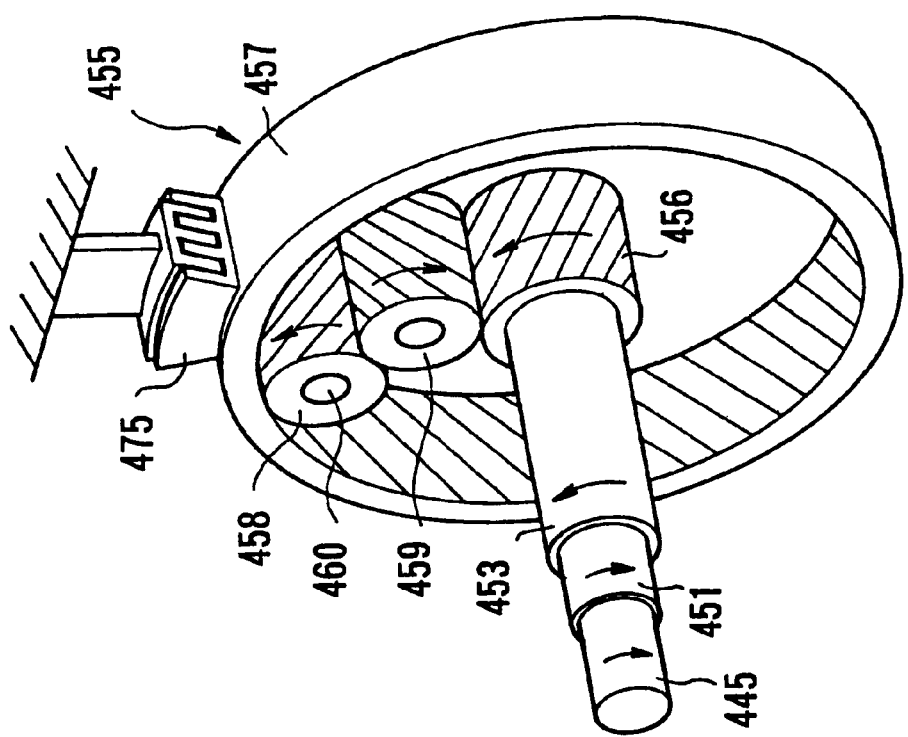
FIG. 37 is a schematic perspective view of assistance in explaining the operation of a double-pinion planetary gear.

Consequently, as shown in FIG. 37, the first pinion 458 and the second pinion 459 rotate in the opposite directions, respectively, and revolve along the ring gear 457 to rotate the carrier 460 in a direction opposite the rotating direction of the sun gear 456. Consequently, the front drive shaft 451 is driven for rotation in the reverse direction to transmit power to the front differential gear 440.

The gear ratio of the double-pinion planetary gear 455 will be explained hereinafter.

The gear ratio of the double-pinion planetary gear 455, i.e., the ratio of the rotating speed of the carrier 460 to that of the sun gear 456, i.e., the ratio of the rotating speed of the front drive shaft 451 to that of the sun gear 456, is expressed by:

Gear ratio=[ZS+(−ZR)]/ZS where ZS is the number of teeth of the sun gear 456, and ZR is the number of teeth of the ring gear 457.

Accordingly, an optional gear ratio can be provided by properly determining ZS of the sun gear 456 and ZR of the ring gear 457.

If ZS=37 and ZR=82,

Gear ratio=[37+(−82)]/37=−1.216 which is an appropriate gear ratio for the reverse range R.

Thus, a forward/reverse selecting mechanism comprising, as principal components, the double-pinion planetary gear 455, the first multiple-disk clutch 465 and the second multiple-disk clutch 475 is constructed.

The engine 410, the torque converter 420 and the belt-drive variable-speed transmission 430 are arranged coaxially and transversely, and the double-pinion planetary gear 455, the first multiple-disk clutch 465 and the second multiple-disk clutch 475 constituting the forward/reverse selecting mechanism are disposed on the axis of the front drive shaft 451 disposed on a level below that of the crankshaft 411 of the engine 410. Accordingly, the upper portion of the driving system is reduced, the height of the driving system is not increased, the driving system can be made compact, the degree of freedom of vehicle body design is increased, and a space for securing crush stroke and work for mounting and dismounting the transmission can be easily secured.

An automobile driving system for a four-wheel drive vehicle, such as an automobile driving system in an eighth embodiment, comprising the same principal components as those of the automobile driving system in the fourth embodiment for a two-wheel drive vehicle can be constructed by interposing an input selecting means between the transmission shaft 453 and the double-pinion planetary gear 455, employing a hub and a front drive shaft for a four-wheel drive vehicle instead of the hub and the front drive shaft 451, and additionally including a power transfer mechanism for transferring power to a rear differential gear, which will be described in connection with the eighth embodiment.

Fifth Embodiment

An automobile driving system 500 in a fifth embodiment according to the present invention for a four-wheel drive vehicle will be described hereinafter with reference to FIG. 39 to 48.

Figure 39:
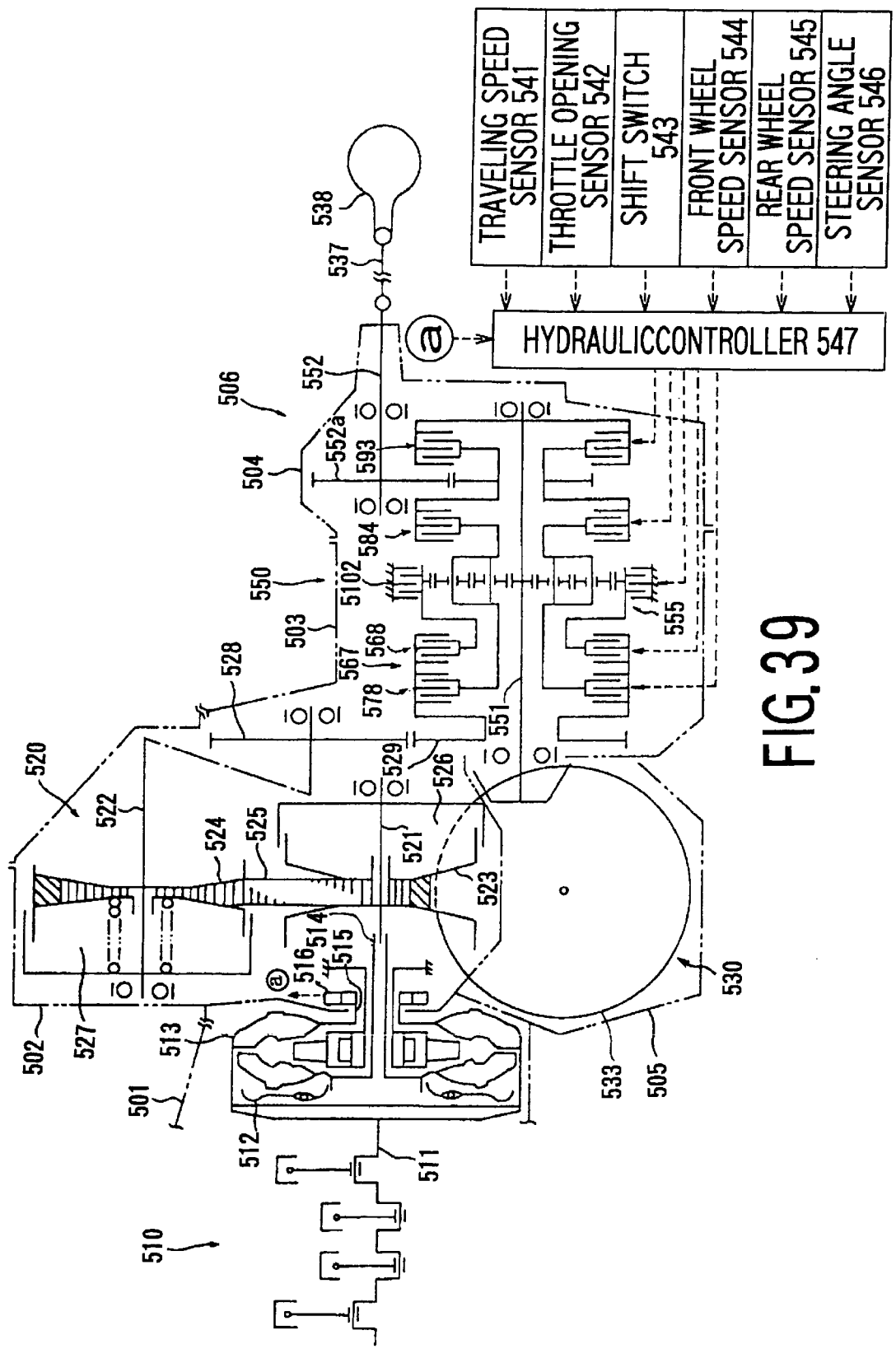
FIG. 39 is a typical view of an automobile driving system in a fifth embodiment according to the present invention.

Referring to FIG. 39, in the automobile driving system 500 in the fifth embodiment for a four-wheel drive vehicle, a first case 501 joined to a longitudinal engine, a second case 502 disposed behind the first case 501 and containing a belt-drive variable-speed transmission 520, a third case 503 disposed behind the second case 502 and containing a transfer unit 550, and a fourth case 504 disposed behind the third case 503 an d containing a power transmitting mechanism for transmitting the output of the transfer unit 550 to rear wheels are arranged and joined successively in that order. A fifth case 505 containing a front differential gear 530 is joined to a lower portion of the second case 502 to construct a transmission case 506. An oil pan is attached to a lower portion of the transmission case 506.

The longitudinal engine 510 has a crankshaft 511 connected to a torque converter 513 provided with a lock-up clutch 512 and contained in the first case 501. An output shaft 514 associated with the torque converter 513 is coupled with a primary shaft 521 included in the belt-drive variable-speed transmission 520 contained in the second case 502. The output shaft 514 included in the torque converter 513 and the primary shaft 521 are coaxial with the crankshaft 511 of the engine 510, and are supported for rotation in bearings on the transmission case 506.

The variable-speed transmission 520 has a secondary shaft 522 disposed beside and in parallel to the primary shaft 521. A primary pulley 523 and a secondary pulley 524 are mounted on the primary shaft 521 and the secondary shaft 522, respectively. The width of the groove of the primary pulley 523 is varied by a primary cylinder actuator 526, and the width of the groove of the secondary pulley 524 is varied by a secondary cylinder actuator 527. A drive belt 525 is extended between the primary pulley 523 and the secondary pulley 524. A hydraulic control system varies the width of the groove between the movable and fixed cones of the primary pulley 523 and the secondary pulley 524 to vary the ratio between the pitch diameters of the primary pulley 523 and the secondary pulley 524, whereby the rotating speed of the secondary shaft 522 is varied continuously.

A primary reduction gear 528 is mounted on the secondary shaft 524 and power is transmitted through a primary driven gear 529 engaged with the primary reduction gear 528 to the transfer unit 550 contained in the third case 503 and the fourth case 504. An output driving force of the transfer unit 550 is transmitted through a differential gear, for example, the front differential gear 530 to front wheels, and through a propeller shaft 537 and another differential gear, for example, a rear differential gear 538, to rear wheels.

The front differential gear 530 is entirely the same in construction as the front differential gear 130 employed in the first embodiment previously described with reference to FIGS. 3 and 4. Therefore, a crown gear 533 may be of a small diameter, the front differential gear 530 can be formed in a relatively small overall size, and the variable-speed transmission 520 and the front differential gear 530 can be disposed close to each other.

As shown in FIG. 39, an oil pump 516 which is driven continuously by a stator shaft 515 included in the torque converter 513 is contained in the second case 502. The oil pump 516 discharges oil at a line pressure continuously to supply the oil to the torque converter 513 and associated parts, enables the hydraulic control of the variable-speed transmission 520, and enables the hydraulic control of the transfer unit 550 by a hydraulic controller 547 on the basis of signals provided by a traveling speed sensor 541, a throttle opening sensor 542, a shift switch 543, a front wheel speed sensor 544, a rear wheel speed sensor 545 and a steering angle sensor 546.

The construction of the transfer unit 550 will be described with reference to FIGS. 40 and 41.

The transfer unit 550 has a front drive shaft 551, i.e., a first drive shaft, and a rear drive shaft 552, i.e., a second drive shaft, which are extended in parallel to the crankshaft 511 of the engine 510, the output shaft 514, the primary shaft 521 and the secondary shaft 522.

Figure 40:
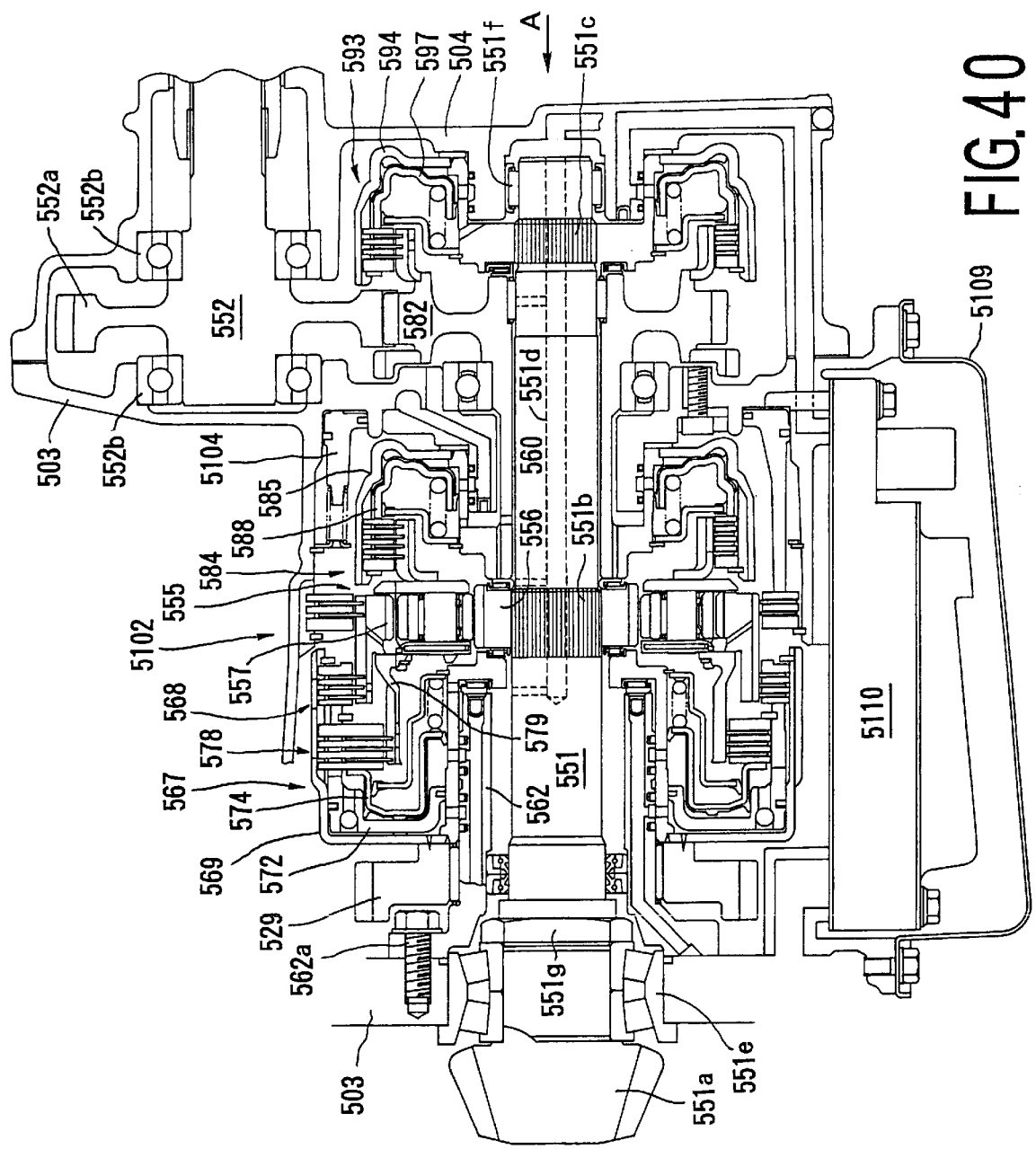
FIG. 40 is a sectional view of the automobile driving system of FIG. 39.
Figure 41:
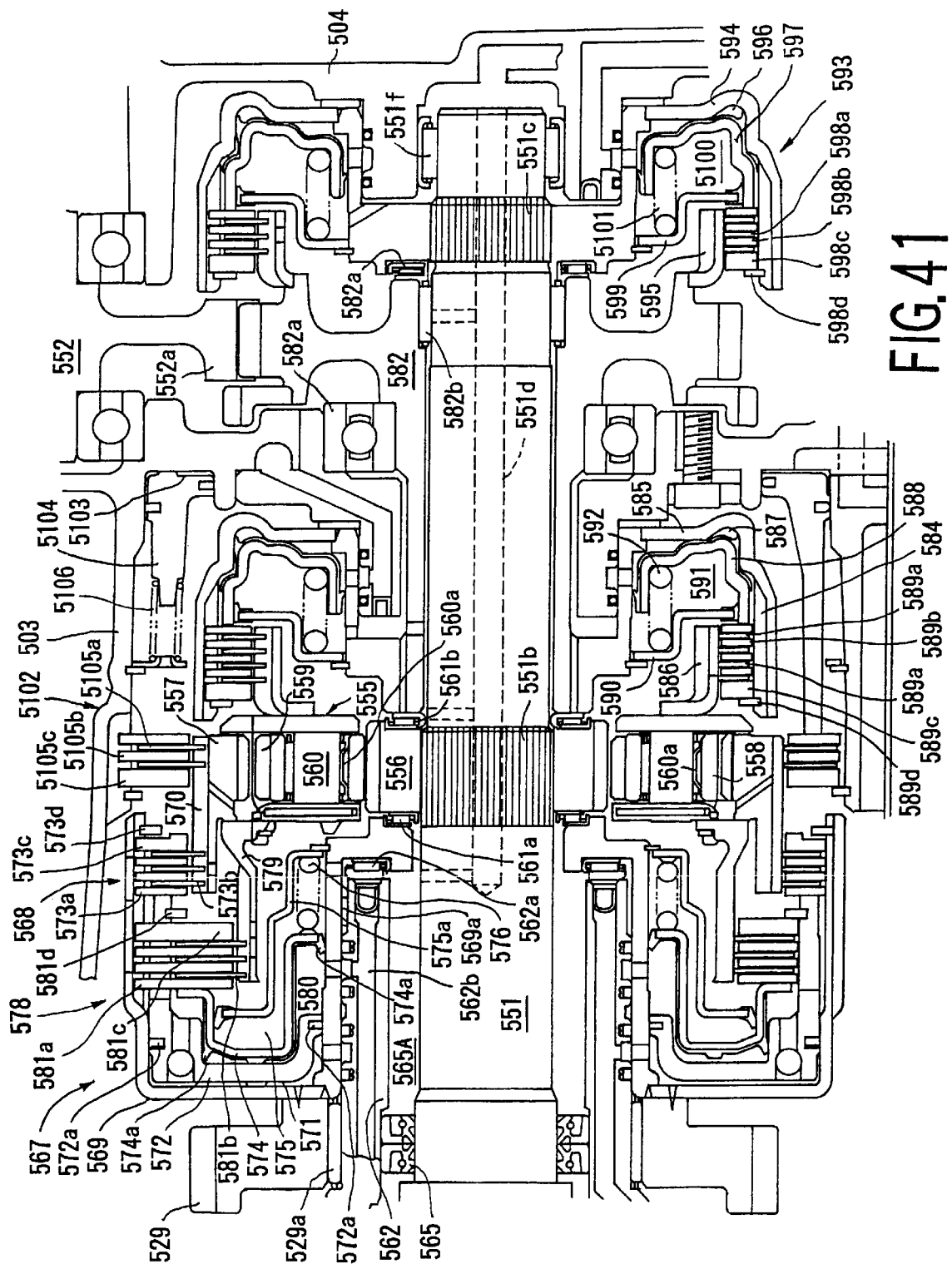
FIG. 41 is an enlarged view of a portion of the automobile driving system of FIG. 40.
Figure 42:
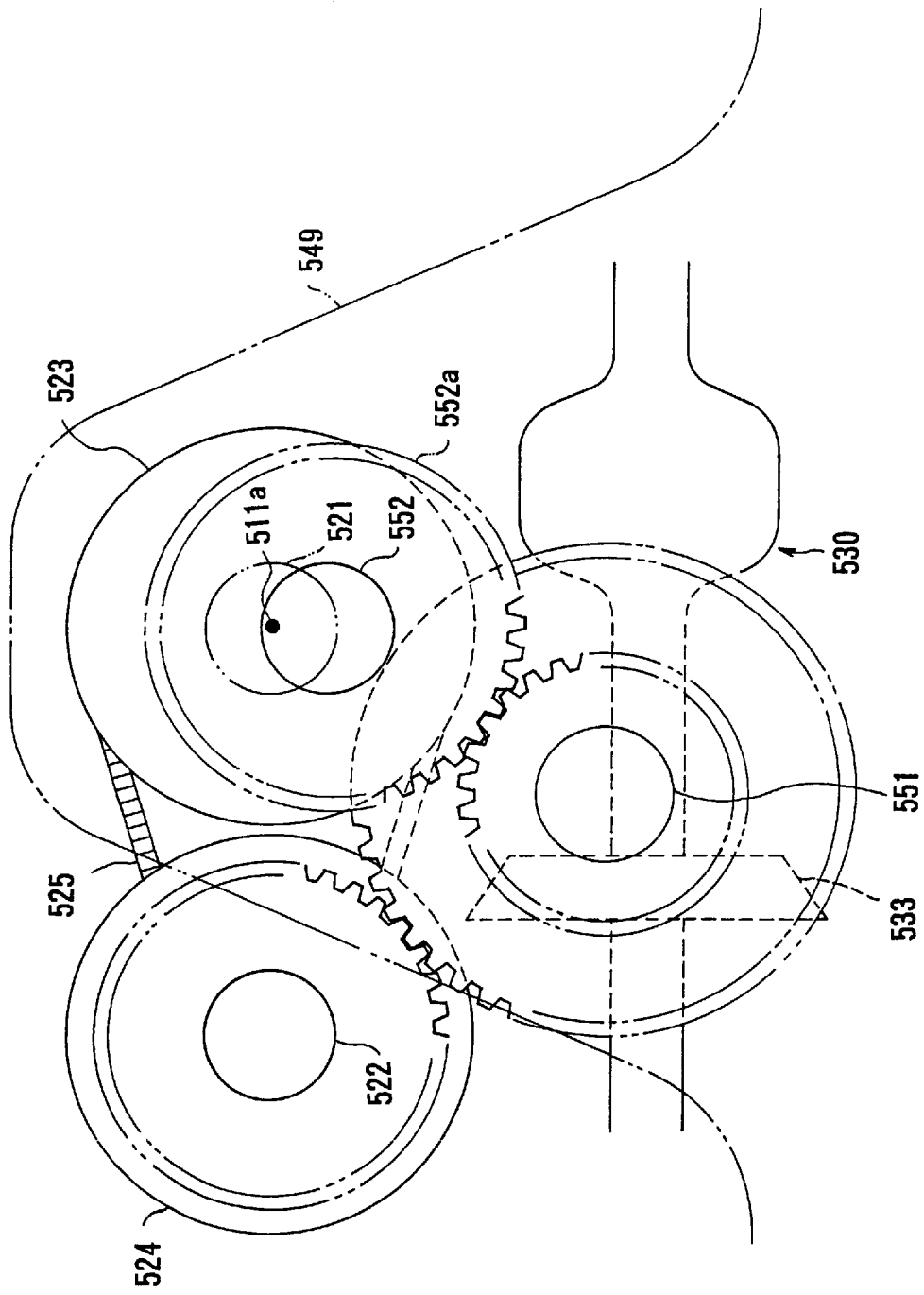
FIG. 42 is a view taken in the direction of the arrow in FIG. 40.

As shown in FIG. 42, i.e., a view taken in the direction of the arrow A in FIG. 40, the crankshaft 511, the primary shaft 521, the secondary shaft 522, the front drive shaft 551 and the rear drive shaft 552 are extended in parallel to each other. The axis 511a of rotation of the crankshaft 511 and the axis of the primary shaft 521 are extended longitudinally and are coaxial with the longitudinal center axis of the vehicle body, and the primary shaft 521 and the secondary shaft 522 are disposed in parallel to each other on substantially the same level, so that the primary pulley 523 and the secondary pulley 524 are on substantially the same level. As mentioned above, the front drive shaft 551 is operatively connected to the crown gear 533 at a position between the primary shaft 521 and the secondary shaft 522 below the variable-speed transmission 520 to interlock the transfer unit 540 and the variable-speed transmission 520 properly, and to form the automobile driving system in a compact construction and in a relatively small height.

The rear drive shaft 522 is disposed below the primary shaft 521 with their axes included in a vertical plane, to facilitate the insertion of the automobile driving system in a tunnel 549 and to improve the compatibility of the driving system with both a vehicle body designed to be mounted with a manual transmission and a vehicle body designed to be mounted with an automatic transmission.

A pinion 551a formed in an end portion of the front drive shaft 551 is in engagement with a crown gear 533 included in the front differential gear 530. A front end portion and a rear end portion of the front drive shaft 551 are supported for rotation in a taper roller bearing 551e and a needle bearing 551f on the third case 503 and the fourth case 504 of the transmission case 506, respectively.

The front drive shaft 551 is provided with splines 551b to be engaged with a sun gear 556 included in a double-pinion planetary gear 555 in the circumference of a middle portion thereof, splines 551c to be engaged with drum 594 included in a fourth multiple-disk clutch 593, i.e., a fourth friction coupling element, in the circumference of an end portion thereof, and an oil passage 551d opening at the rear end thereof and at positions on the circumference thereof respectively corresponding to an oil chamber 565A, a radial bearing 561b and a needle bearing 582b, which will be described later.

The inner ring of the taper roller bearing 551e is held between the pinion 551a and a lock nut 551g screwed on the front drive shaft 551 to restrain the front drive shaft 551 from axial movement.

The rear drive shaft 552 has one end connected through a universal joint to the propeller shaft 537, and the other end integrally provided with a transfer driven gear 552a. The rear drive shaft 552 is supported for rotation in a plurality of ball bearings 552b on the third case 503 and the fourth case 504 of the transmission case 506.

The double-pinion planetary gear 555 has the sun gear 556 coupled with the front drive shaft 551 by the splines 551*b*, a ring gear 557, a first pinion 558 engaged with the ring gear 557, a second pinion 559 engaged with the sun gear 556 and the first pinion 558, and a carrier 560 rotatably supporting the first pinion 558 and the second pinion 559 in needle bearings 560*a* thereon. Power applied to the ring gear 557 is distributed to the sun gear 556 and the carrier 560 at a torque distribution ratio dependent on the dimensions of the sun gear 556 and the ring gear 557. When the ring gear 557 is fastened to the transmission case 506, the sun gear 556 is rotated by the power applied to the carrier 560 in a direction opposite the rotating direction of the carrier 560.

The sun gear 556 of the double-pinion planetary gear 555 is held between a thrust bearing 561*a* supported through a fixed shaft 562 fixed to the transmission case 506, a thrust bearing 562*a* and a drum 569 on the third case 503 of the transmission case 506, and a thrust bearing 561*b* supported through the fourth multiple-disk clutch 593, i.e., a fourth friction coupling element, a thrust bearing 582*a* and a transfer drive gear 582 on the fourth case 504 of the transmission case 506 to restrain the double-pinion planetary gear 555 from axial movement.

The fixed shaft 562 is substantially cylindrical, extends around the front drive shaft 551, and has a base end provided with a flange fastened to the third case 503 of the transmission case 506 with bolts 562*a*. A space between the inner circumference of the fixed shaft 562 and the front drive shaft 551 is sealed with an oil seal 565 to form a pressure chamber 565A. The fixed shaft 562 is provided with an oil passage 562*b* connected to the pressure chamber 565A, and an oil passage 562*c* in its outer circumference.

The primary driven gear 529 engaged with the primary reduction gear 528 is supported for rotation on the fixed shaft 562 by a needle bearing 529*a*. An input selecting means 567 for selectively transmitting power from the primary driven gear 529 selectively to the ring gear 557 or the carrier 560 is interposed between the primary driven gear 529 and the double-pinion planetary gear 555. The input selecting means 567 comprises a first multiple-disk clutch 568, i.e., a first friction coupling element, and a second multiple-disk clutch 578, i.e., a second friction coupling element.

In the first multiple-disk clutch 568, a drum 569 supported for rotation through a bushing 568*a* on the fixed shaft 562 is connected to the primary driven gear 529, and a hub 570 is connected to the ring gear 557 of the double-pinion planetary gear 555. The first multiple-disk clutch 568 interlocks the primary driven gear 529 and the ring gear 557 for power transmission. A pressure is applied to a pressure chamber 571 to compress a retaining plate 573*c* contiguous with a snap ring 573*d*, driven plates 573*b* and drive plates 573*a* by a piston 572 to engage the first multiple-disk clutch 568 for power transmission. Indicated at 572*a* is a sealing member fitted on the piston 572 and capable of providing liquid-tight sealing between the piston 572 and the drum 569 and of sliding along the drum 569. A retainer 575*a* is disposed on one side of the piston 572 opposite the other side of the same on which the pressure chamber 571 is formed, and a pressure is exerted on the piston 572 by a return spring 576.

In the second multiple-disk clutch 578, the drum 569 serves also as the drum of the first multiple-disk clutch 568, and the hub 579 is connected to the carrier 560 of the double-pinion planetary gear 555. The second multiple-disk clutch 578 interlocks the primary driven gear 529 and the carrier 560 for power transmission. A pressure is applied to a pressure chamber 572 to compress a retaining plate 581*c* contiguous with a snap ring 581*d* fixed to the piston 572, driven plates 581*b* and drive plates 581*a* by a piston 574 to engage the second multiple-disk clutch 578 for power transmission. Indicated at 574*a* is a sealing member fitted on the piston 574 and capable of providing liquid-tight sealing between the pistons 572 and 574 and between the piston 574 and the drum 569, and of sliding along the drum 569. A centrifugal pressure generated in a pressure chamber 580 is counterbalanced with a pressure in a balancing pressure chamber 575. A pressure is exerted on the piston 574 by the return spring 576.

The transfer drive gear 582 is supported for rotation by a ball bearing 582*a* on the third case 503 of the transmission case 506 and by a needle bearing 582*b* on the front drive shaft 551 on one side of the double-pinion planetary gear 555 opposite the other side of the same on which the input selecting means 567 is disposed. A transfer driven gear 552*a* mounted on the rear drive shaft 552 is engaged with the transfer drive gear 582 for power transmission.

A third multiple-disk clutch 584, i.e., a third friction coupling element for selectively transmitting power from the carrier 560 of the double-pinion planetary gear 555 to the transfer drive gear 582, is interposed between the double-pinion planetary gear 555 and the transfer drive gear 582.

The third multiple-disk clutch 584 has a drum 585 coupled with the transfer drive gear 582 by splines, and a hub 586 connected to the carrier 560 of the double-pinion planetary gear 555. The third multiple-disk clutch 584 transmits power from the carrier 560 to the transfer drive gear 582. A pressure is applied to a pressure chamber 587 to compress a retaining plate 589*c* contiguous with a snap ring 589*d* fixed to the drum 585, driven plates 589*b* and drive plates 589*a* by a piston 588 to engage the third multiple-disk clutch 584 for power transmission. A retainer 590 is disposed on one side of the piston 588 opposite the other side of the same on which the pressure chamber 587 is formed to form a balancing pressure chamber 591 for counterbalancing a centrifugal pressure generated in the pressure chamber 587. A pressure is exerted on the piston 588 by a return spring 592.

A fourth multiple-disk clutch 593, i.e., a fourth coupling element for selectively interlocking the front drive shaft 551 and the transfer drive gear 582 for power transmission, is interposed between the rear end of the front drive shaft 551 and the transfer drive gear 582.

The fourth multiple-disk clutch 593 has a drum 594 coupled with the front drive shaft 551 by the splines 551*c* formed on the front drive shaft 551, and a hub 595 connected to the transfer drive gear 582 for power transmission. A pressure is applied to a pressure chamber 596 to compress a retaining plate 598*c* contiguous with a snap ring 598*d* fixed to the drum 594, driven plates 598*b* and drive plates 598*a* coupled with the hub 595 by a piston 597 to engage the fourth multiple-disk clutch 593 for power transmission. A retainer 599 is disposed so as to form a balancing pressure chamber 5100 for counterbalancing a centrifugal pressure generated in the pressure chamber 596. A pressure is exerted on the piston 597 by a return spring 5101.

A fifth multiple-disk clutch 5102, i.e., a fifth friction coupling element for selectively fastening the ring gear 557 to the transmission case 506, is interposed between the third case 503 of the transmission case 506 and the ring gear 557 of the double-pinion planetary gear 555.

A pressure is applied to a pressure chamber 5103 to compress a retaining plate 5105*c* contiguous with a snap ring 5105*d* fixed to the transmission caste 506, driven plates 5105*b* and drive plates 5105*a* coupled with the hub 570 connected to the ring gear 557 by a piston 5104 to engage the fifth multiple-disk clutch 5102 to fasten the ring gear 557 to the transmission case 506. A pressure is exerted on the piston 5104 by a return spring 5106.

A control valve 5110 is disposed in the oil pan 5109 joined to a lower portion of the transmission case 506. The control valve 5110 is controlled by the hydraulic controller 547 on the basis of signals provided by the traveling speed sensor 541, the throttle opening sensor 542, the shift switch 543, the front wheel speed sensor 544, the rear wheel speed sensor 545 and the steering angle sensor 546 to supply the oil discharged from the oil pump 516 selectively to the input selecting means 567, the respective pressure chambers 571, 580, 587, 596 and 5103 of the third multiple-disk clutch 584, the fourth multiple-disk clutch 593 and the fifth multiple-disk clutch 5102, and the variable-speed transmission 520.

The operation of the automobile driving system thus constructed will be described with reference to FIGS. 43 to 47, and FIG. 48 tabulating the operating conditions of the first multiple-disk clutch 568, the second multiple-disk clutch 578, third multiple-disk clutch 584, the fourth multiple-disk clutch 593 and the fifth multiple-disk clutch 5102. In the table shown in FIG. 48, blank circles indicate that the corresponding multiple-disk clutches are engaged or operative.

The power of the engine 510 is transmitted from the crankshaft 511 through the torque converter 513 to the primary shaft 521 of the variable-speed transmission 520. An input speed of the primary shaft 521 is converted continuously into an output speed of the secondary shaft 522 by the action of the primary pulley 523 and the secondary pulley 524 operatively connected by the drive belt 525. The output speed of the secondary shaft 522 is reduced by the action of the primary reduction gear 528 and the primary driven gear 529, and a reduced speed is transmitted through the drum 569 to the first multiple-disk clutch 568 and the second multiple-disk clutch 578. The first multiple-disk clutch 568 and the second multiple-disk clutch 578 are disengaged and power is not transmitted beyond the first multiple-disk clutch 568 and the second multiple-disk clutch 578 when a neutral position N or a parking position P is selected.

Figure 43:
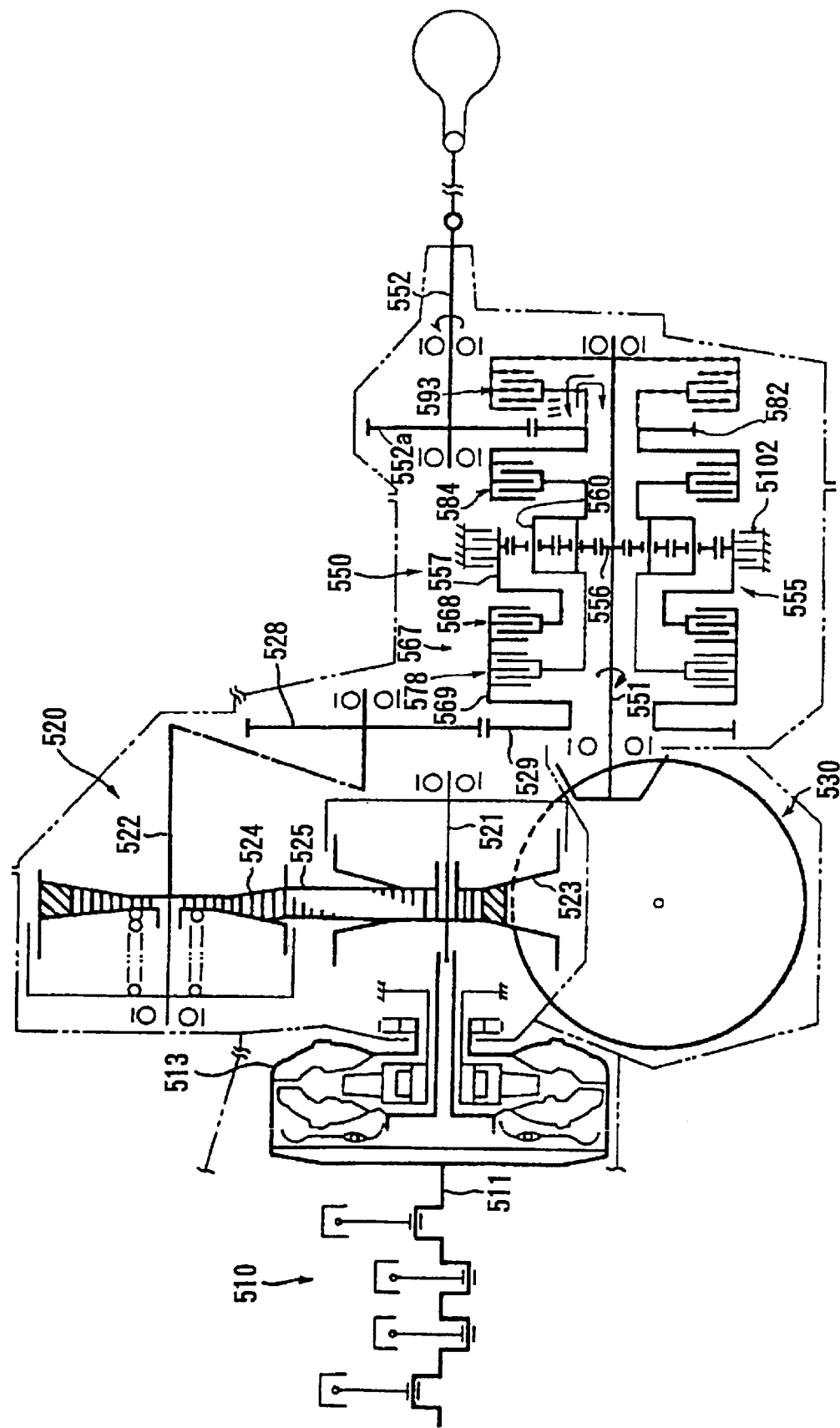
FIG. 43 is a schematic side view of assistance in explaining the operation of the automobile driving system of FIG. 39.

When a drive range D, i.e., a forward range, is selected, the first multiple-disk clutch 568 and the third multiple-disk clutch 584 are engaged to transmit driving power through a drive line indicated by thick lines in FIG. 43. A pressure is applied through the control valve 5110 to the pressure chamber 571 to compress the retaining plate 573c contiguous with the snap ring 573d fixed to the inner circumference of the drum 569, the driven plates 573b, and the drive plates 573a by the piston 572 so that the first multiple-disk clutch 568 is engaged. Consequently, power is transmitted from the primary driven gear 529 to the ring gear 557 of the double-pinion planetary gear 555. A pressure is applied also to the pressure chamber 587 to compress the retaining plate 589c, the driven plate 589b and the drive plate 589a of the third multiple-disk clutch 584 by the piston 588 to engage the third multiple-disk clutch 584. Consequently, the carrier 560 of the double-pinion planetary gear 555 and the transfer drive gear 582 are interlocked for power transmission.

Figure 44:
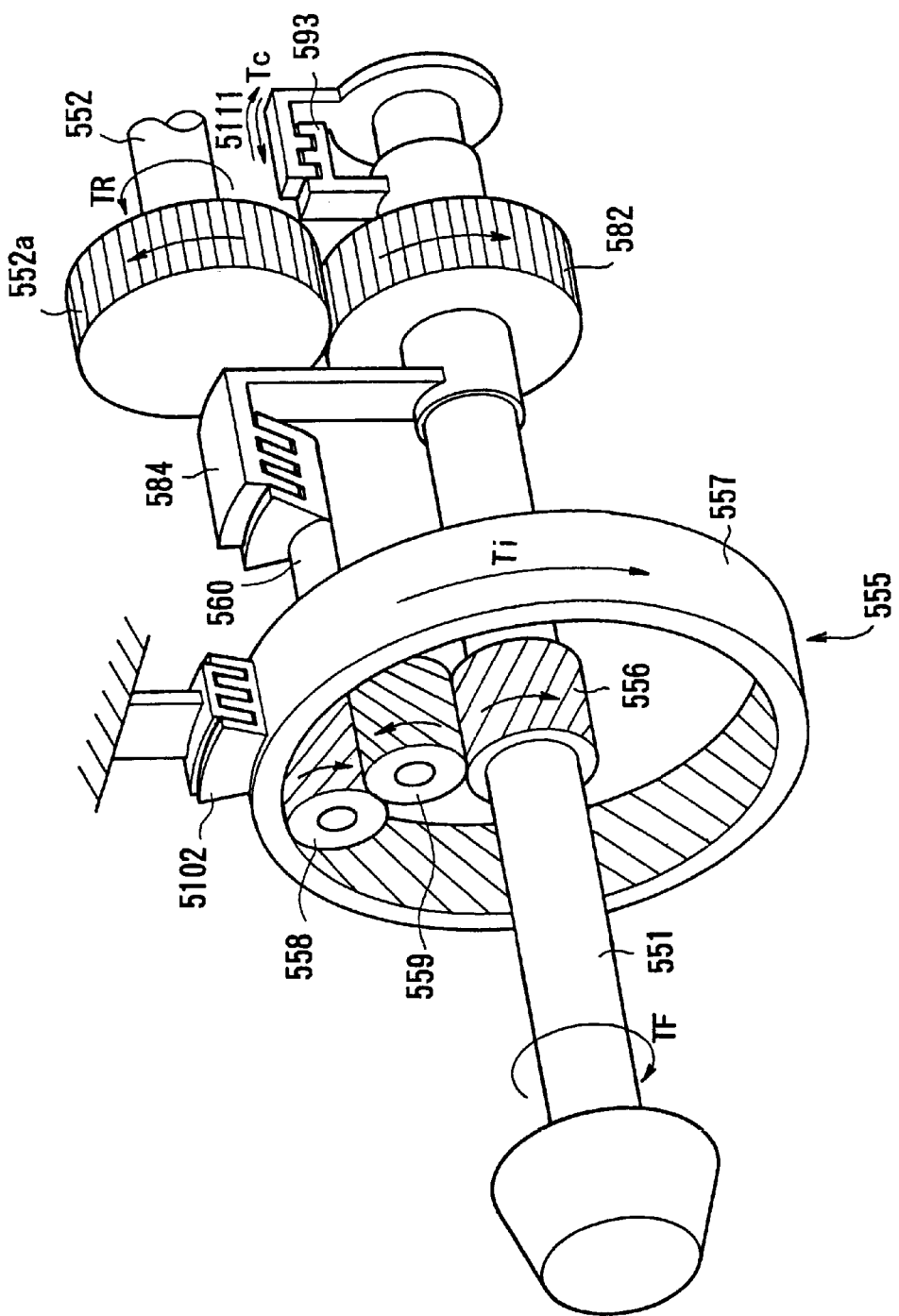
FIG. 44 is a schematic perspective view of assistance in explaining the operation of a double-pinion planetary gear.

Accordingly, in the double-pinion planetary gear 555 in which the ring gear 557, i.e., input member, and the first pinion 558 are engaged, and the second pinion 559 is engaged with the first pinion 558 and the sun gear 556 as shown in FIG. 44, the sun gear 556 and the carrier 560 are rotated for differential rotation in the same direction as the rotating direction of the ring gear 557, and torque is distributed at a predetermined distribution ratio to the sun gear 556 and the carrier 560. Thus the front drive shaft 551 coupled with the sun gear 556 by the splines, and the transfer drive gear 582 interlocked with the carrier 560 are rotated in the same direction as that of rotation of the ring gear 557, whereby the rear drive shaft 552 is driven for rotation in a direction opposite the rotating direction of the ring gear 557 through the transfer drive gear 582 and the transfer driven gear 552a engaged with the transfer drive gear 582. During torque transmission, the double-pinion planetary gear 556 serves as a center differential gear in which the first pinion 558 and the second pinion 559 rotate and revolve round the sun gear 556 to absorb the difference in rotating speed between the sun gear 556 and the carrier 560.

The second multiple-disk clutch 475 is disengaged to release the ring gear 457 of the double-pinion planetary gear 455 as shown in FIG. 35. Since the carrier 460 is coupled with the front drive shaft 451 by the splines, the double-pinion planetary gear 455 rotates together with the drive shaft 451.

Figure 45:
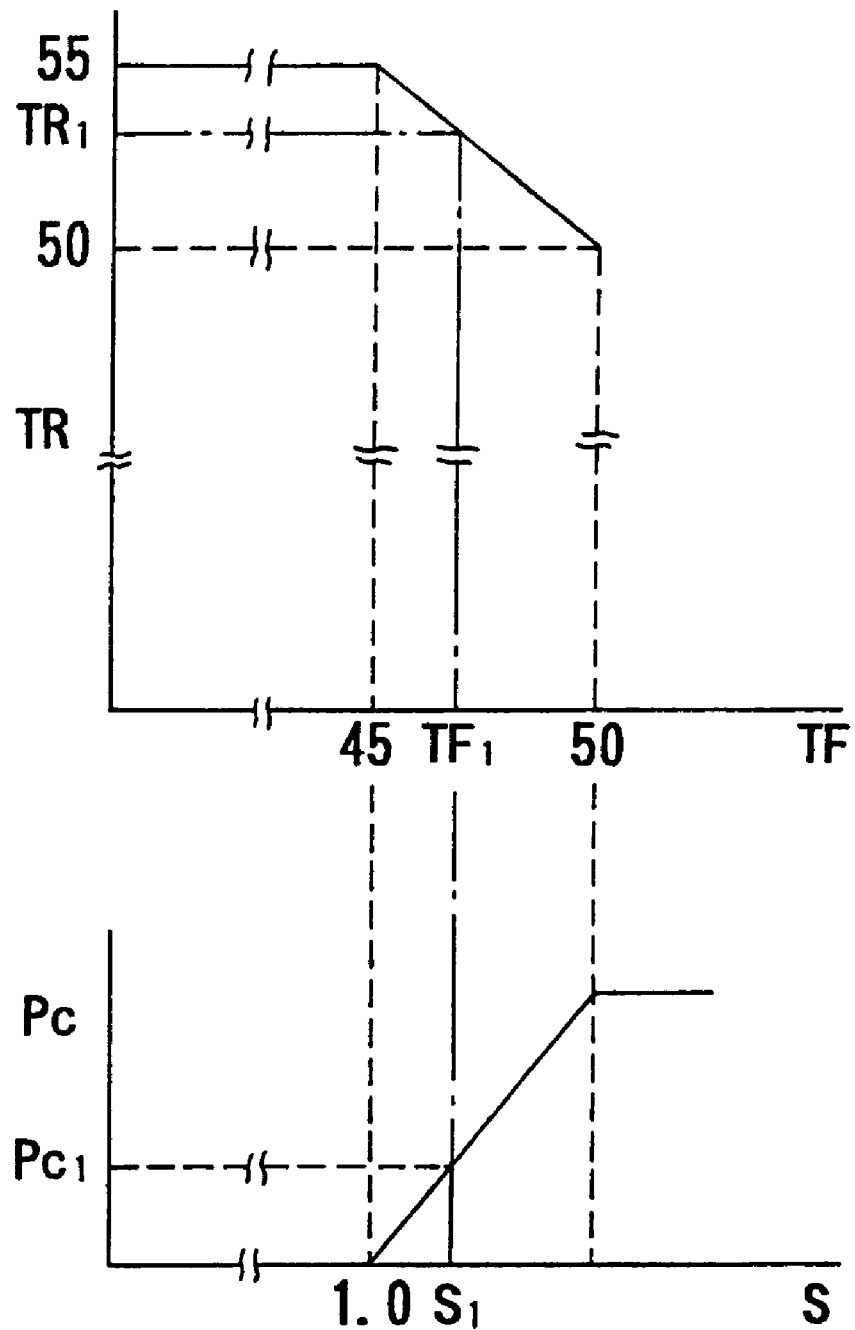
FIG. 45 is a graph of assistance in explaining torque distribution to front and rear axles.
Figure 46:
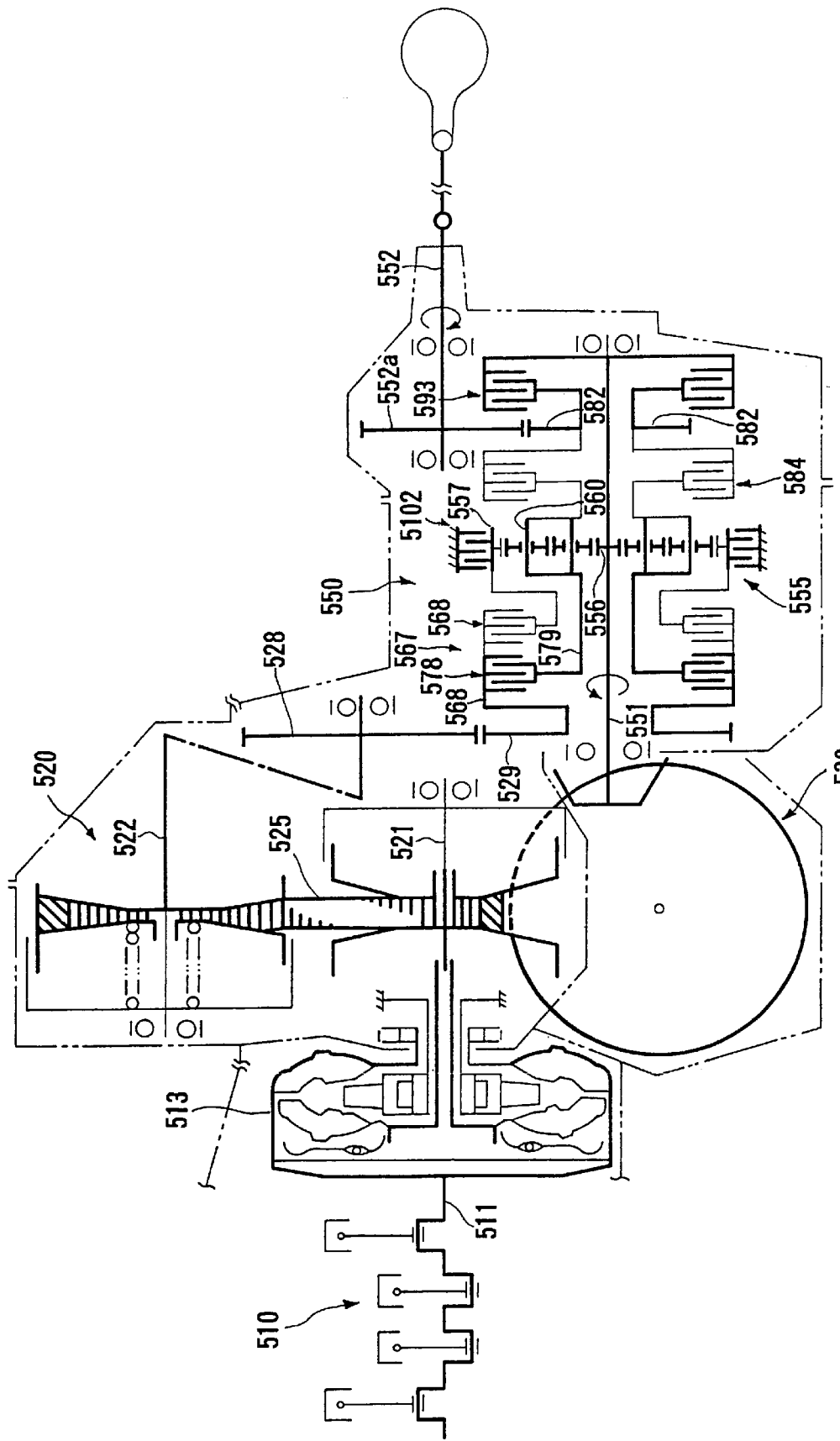
FIG. 46 is a schematic side view of assistance in explaining the operation of the automobile driving system of FIG. 39.

The torque distributing function of the double-pinion planetary gear 555 will be described with reference to a graph shown in FIG. 45.

The relation between torque distribution and the numbers of teeth of the ring gear 557 and the sun gear 556 is expressed by:

Ti=TF+TR

TF:TR=ZS:(ZR−ZS)

where Ti is input torque applied to the ring gear 557, TF is the torque of the sun gear 556 to be transmitted to the front wheels, TR is the torque of the carrier 560 to be transmitted to the rear wheels, ZS is the number of teeth of the sun gear 556 and ZR is the number of teeth of the ring gear 557. Accordingly, an optional reference torque distribution ratio TF/TR can be provided by properly determining ZS of the sun gear 556 and ZR of the ring gear 557.

If ZS=37 and ZR=82,

TF:TR=37:(82−37)

Then, TF:TR≈45:55 which signifies that about 45% and about 55% of the input torque applied to the double-pinion planetary gear 555 are distributed to the front wheels and the rear wheels, respectively. Thus, a rear-biased reference torque distribution mode, i.e., a torque distribution mode in which a major part of the input torque is distributed to the rear wheels, can be established.

A pressure is applied to the pressure chamber 596 of the fourth multiple-disk clutch 593 to compress the snap ring 598d, the retaining plate 598c, the driven plate 598b and the drive plat 598a by the piston 597 to produce clutch torque Tc. The hydraulic controller 547 controls the control valve 5110 to vary the clutch torque Tc.

Front wheel speed NF and rear wheel speed NR measured by the front wheel speed sensor 544 and the rear wheel speed sensor 545 are given to the hydraulic controller 547. The rear wheels always starts slipping first if the vehicle is traveling on a slippery road in the rear-biased reference torque distribution mode, i.e., in a mode in which TF<TR. Therefore, slip S is defined by S=NF/NR (S>0). A clutch pressure Pc corresponding to a slip S and a steering angle Ψ given to the hydraulic controller 547 from the steering angle sensor 546 is retrieved from a map of FIG. 45 stored in the hydraulic controller 547. If the rear wheels are not slipping and S≧1, the clutch pressure Pc is relatively low. If the rear wheels are slipping and S<1, the clutch pressure Pc is increased as the slip S decreases, and the clutch pressure Pc is set to Pmax when the slip S is not greater than a predetermined threshold slip S1. The line pressure is adjusted to the clutch pressure Pc for the variable control of the clutch torque Tc of the fourth multiple-disk clutch 593.

Thus, a bypass drive line 5111 is formed by engaging the fourth multiple-disk clutch 593. The bypass drive line 5111 is capable of transferring part of a driving torque transmitted to the transfer drive gear 582 to the front drive shaft 551 and of transferring part of a driving torque transmitted to the front drive shaft 551 to the transfer drive gear 582. The bypass drive line 5111 exercises a differential function to meet (rear wheel speed NR)>(rotating speed of the ring gear 557)>(front wheel speed NF) in the transfer unit 550 if the rear wheels slip, and the torque transmitted through the fourth multiple-disk clutch 593 to the front drive shaft 551 is increased by the clutch torque Tc, and the torque transmitted through the transfer driven gear 552a engaged with the transfer drive gear 582 to the rear drive shaft 552 is reduced by the clutch torque Tc distributed to the front wheels. Consequently, TF=0.45Ti+Tc TR=0.55Ti−Tc Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the rear wheels are slipping and the clutch torque Tc is generated, more part of the input torque Ti is distributed to the front wheels through the bypass drive line 5111 shown in FIG. 44 if the clutch torque Tc is greater, and the torque distribution ratio TF:TR changes to TF1:TR1 as shown in FIG. 45 so that the torque distributed to the front wheels is increased and the torque distributed to the rear wheels is decreased. Consequently, the slip of the rear wheels is decreased and the traction of the vehicle is improved. When the slip S is decreased below the predetermined threshold slip, the pressure of the oil supplied to the fourth multiple-disk clutch 593 increases, differential limiting torque increases to a maximum, and the sun gear 556 and the carrier 560 are connected directly. Consequently, the differential motion of the transfer unit 550 is locked and a direct four-wheel-drive mode in which the torque is distributed at a torque distribution ratio corresponding to front-rear axle weight distribution ratio is established, whereby the traction of the vehicle is enhanced to a maximum.

If the front wheels slip, the differential function of the transfer unit 550 meets a condition: (rear wheel speed NR)<(rotating speed of the ring gear 557)<(front wheel speed NF), a torque is transmitted from the front drive shaft 551 to the transfer drive gear 582 according to the clutch torque Tc, and the torque transmitted from the front drive shaft 551 to the front wheels is reduced by the clutch torque Tc distributed to the rear wheels. Consequently, TF=0.45Ti−Tc TR=0.55Ti+Tc Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the front wheels are slipping and the clutch torque Tc is generated, the input torque Ti is distributed to the rear wheels according to the clutch torque Tc to increase the torque distributed to the rear wheels positively and to reduce the torque distributed to the front wheels, so that the traction of the vehicle is improved. If the slip S is decreased below the predetermined threshold slip, the pressure of the oil supplied to the fourth multiple-disk clutch 593 increases, differential limiting torque increases to a maximum, and the sun gear 556 and the carrier 560 are connected directly. Consequently, the differential motion of the transfer unit 550 is locked and a direct four-wheel-drive mode in which the torque is distributed at a torque distribution ratio corresponding to front-rear axle weight distribution ratio is established, whereby the traction of the vehicle is fully enhanced. Thus, the torques distributed to the front and the rear wheels are controlled in a wide range according to the mode of slip to avoid the reduction of traction.

If the vehicle turns during the torque distribution control for suppressing slip, the differential limiting torque of the third multiple-disk clutch 584 is reduced for correction according to the steering angle $\Psi$. Consequently, the differential limiting effect of the transfer unit 550 is reduced and the difference in rotating speed can be satisfactorily absorbed, so that tight corner braking is avoided and satisfactory controllability can be secured.

When a reverse range R is selected, the first multiple-disk clutch 568 and the third multiple-disk clutch 584 are disengaged and the second multiple-disk clutch 578, the fourth multiple-disk clutch 593 and the fifth multiple-disk clutch 5102 are engaged to transmit power through a drive line indicated by thick lines in FIG. 43. A pressure is applied through the control valve 5110 to the pressure chamber 580 to compress the snap ring 581d, the retaining plate 581c, the drive plates 581a and the driven plates 581b by the piston 574 to engage the second multiple-disk clutch 578 to transmit power from the primary driven gear 529 to the carrier 560 of the double-pinion planetary gear 555. A pressure is applied to the pressure chamber 5103 to compress the snap ring 5105d, the retaining plate 5105c, the drive plates 5105a and the driven plates 5105b by the piston 5104 to engage the fifth multiple-disk clutch 5102, whereby the ring gear 557 is fastened to the transmission case 506. The snap ring 593d, the retaining plate 598c, the drive plates 598a and the driven plates 598b are compressed by the piston 597 to engage the fourth multiple-disk clutch 593, so that power is transmitted from the front drive shaft 551 to the transfer drive shaft 582.

Figure 47:
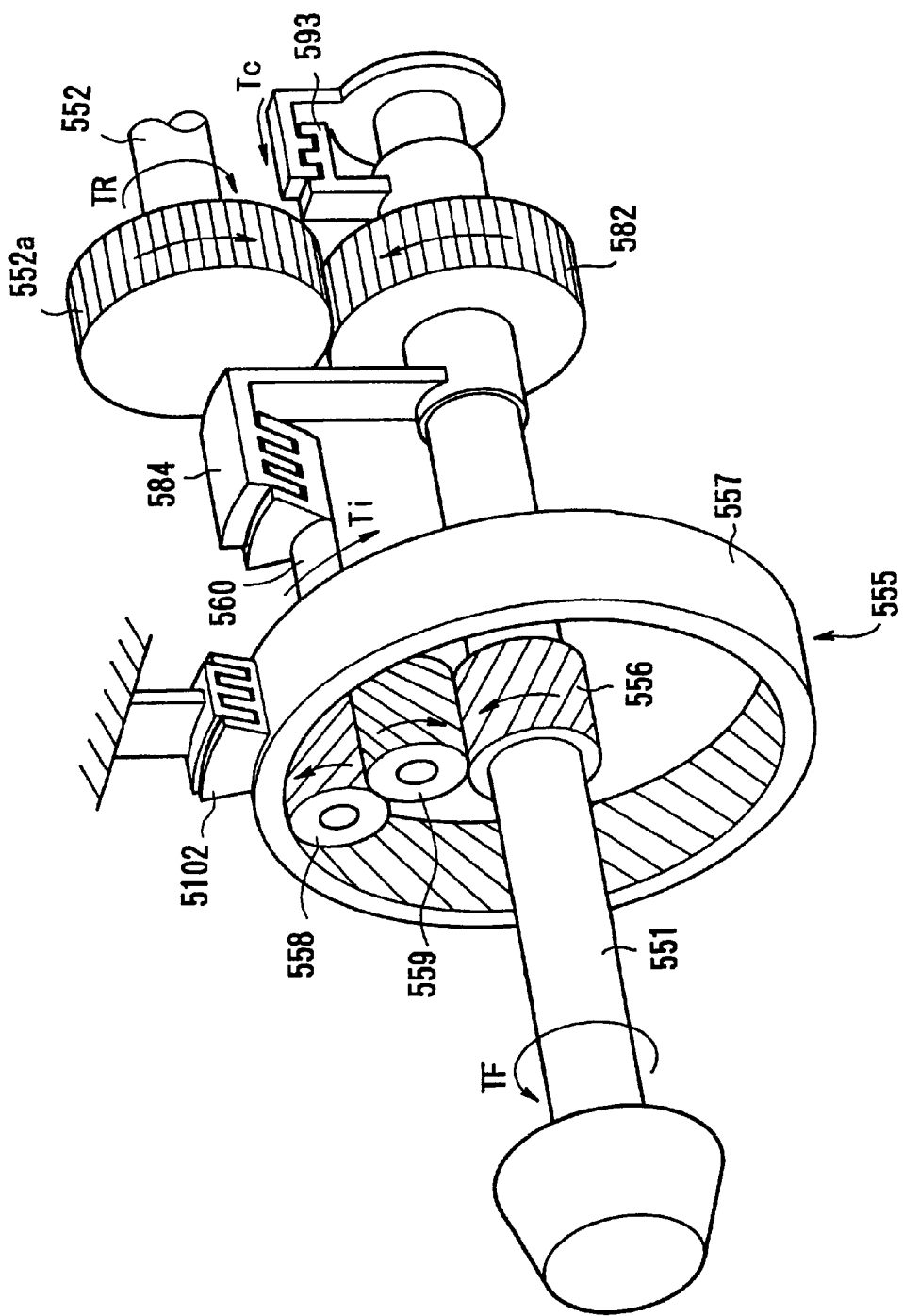
FIG. 47 is a schematic perspective view of assistance in explaining the operation of a double-pinion planetary gear.

Consequently, as shown in FIG. 47, the first pinion 558 and the second pinion 559 rotate in the opposite directions, respectively, and revolve along the ring gear 557 to rotate the sun gear 556 in a direction opposite the rotating direction of the carrier 560. Consequently, the front drive shaft 551 is driven for rotation in the reverse direction, power is transmitted from the front drive shaft 551 through the fourth multiple-disk clutch 593 to the transfer drive gear 582 to drive the rear drive shaft 552 for rotation in a direction opposite the rotating direction of the front drive shaft 551.

Therefore, the power transmitted to the primary driven gear 529 is transmitted in a direction opposite a direction in which power is transmitted when the drive range D is selected to the front drive shaft 551 and the rear drive shaft 552. Thus, the double-pinion planetary gear 555 is capable of a forward/reverse selecting function.

In this case, power is transmitted from the carrier 560 to the front drive shaft 551 and the rear drive shaft 552 at a gear ratio expressed by:

Gear ratio=[ZS+(−ZR)]/ZS

If ZS=37 and ZR=82,

Gear ratio=[37+(−82)]/37=−1.216 which is an appropriate gear ratio for the reverse range R.

The clutch torque Tc among the input torque Ti applied to the carrier 560 is transmitted to the transfer drive gear 582 and the rest of the input torque Ti is transmitted to the front wheels.

Ti=TF+TR
TF=Ti−Tc
TR=Tc

Therefore, the traction of the vehicle is improved by reducing the clutch torque Tc so that part of the input torque Ti distributed to the front wheels is increased to increase the torque of the front wheels positively and to reduce the torque of the rear wheels when the rear wheels slip in order that the slip is suppressed. If the slip S is decreased blow the predetermined threshold slip, the pressure of the oil supplied to the fourth multiple-disk clutch 593 is increased to a maximum and the differential limiting torque Tc is increased to a maximum to connect the front drive shaft 551 and the transfer drive gear 582 directly to establish a direct four-wheel-drive mode in which the torque is distributed at a torque distribution ratio corresponding to front-rear axle weight distribution ratio, whereby the traction of the vehicle is fully enhanced. Thus, the torques distributed to the front and the rear wheels are controlled in a wide range according to the mode of slip to avoid the reduction of traction. If the vehicle turns during the torque distribution control for suppressing slip, the differential limiting torque of the fourth multiple-disk clutch 593 is reduced for correction according to the steering angle Ψ. Consequently, the difference in rotating speed can be satisfactorily absorbed, so that tight corner braking is avoided and satisfactory controllability can be secured.

In the fifth embodiment, the front drive shaft 551 and the rear drive shaft 552 for transmitting power to the front differential gear 530 connected to the output side of the belt-drive variable-speed transmission 520 and the rear differential gear 538, respectively, are disposed in parallel to the crankshaft 511 of the transverse engine 510, the double-pinion planetary gear 555 is mounted on the front drive shaft 551 with its sun gear 556 coupled with the front drive shaft 551, the first multiple-disk clutch 568 is capable of transmitting the output of the variable-speed transmission 520 to the ring gear 557, the second multiple-disk clutch 578 is capable of transmitting the output of the variable-speed transmission 520 to the carrier 560, the third multiple-disk clutch 584 is capable of interlocking the carrier 560 and the transfer drive gear 582 for power transmission, the fourth multiple-disk clutch 593 is capable of interlocking the front drive shaft 551 and the rear drive shaft 552 for power transmission, the fifth multiple-disk clutch 5102 is capable of restraining the ring gear 557 from rotation, and the multiple-disk clutches 568, 568, 584, 593 and 5102 are controlled selectively so that the automobile driving system exercises the functions of a center differential gear to distribute torques properly to the front drive shaft 551 and the rear drive shaft 552 and to achieve a differential limiting operation so that the vehicle is able to travel satisfactorily when the drive range D, i.e., the forward range, or the reverse range R is selected and exercises the functions of a forward/reverse selecting mechanism when the drive range D or the reverse range R is selected.

Whereas the conventional automobile driving system needs special double-pinion planetary gears respectively for a center differential gear and a forward/reverse selecting mechanism, the automobile driving system in the fifth embodiment according to the present invention needs a single double-pinion planetary gear for both the functions of the center differential gear and those of the forward/reverse selecting mechanism. Therefore, the automobile driving system in the fifth embodiment according to the present invention exercises high performance, has a simple, compact, lightweight construction having a small overall length, simplifies control operations, and can be manufactured at a low manufacturing cost. Accordingly, the automobile driving system can be installed on a vehicle body with only a small portion or no portion thereof projected into a tunnel formed under a passenger room to reduce greatly the sectional area of the portion of the tunnel protruding into the passenger room, a sufficiently large space can be secured between the toe board and the automobile driving system, and a sufficiently large space can be secured to form a passenger room which provides improved comfortability.

Since an increased space is secured between the toe board and the automobile driving system, a sufficient crush stroke necessary for protecting the passenger in the case of collision can be secured, and a sufficiently large space is available for work for installing the transmission in and removing the same from the engine room. Furthermore, the degree of freedom of vehicle body design is increased and the automobile driving system can be mounted on a slant nose body having a low engine hood.

An electromagnetic clutch or a wet clutch may be employed instead of the torque converter 513. If an electromagnetic clutch or a wet clutch is employed instead of the torque converter, the transmission of power to the primary shaft 531 of the belt-drive variable-speed transmission 520 and beyond the belt-drive variable-speed transmission 520 can be intercepted when the neutral position N or the parking position P is selected.

It is known from the comparative examination of the automobile driving system 500 in the fifth embodiment for a four-wheel drive vehicle and the automobile driving system 100 in the first embodiment for a two-wheel drive vehicle that the torque converter, the belt-drive variable-speed transmission, the front differential gear, the first, the second and the fifth case forming the transmission case containing the belt-drive variable-speed transmission, and the principal components of the transfer unit including the front drive shaft, the double-pinion planetary gear, the fixed shaft, and the first and the second multiple-disk clutch are common to the automobile driving system 500 in the fifth embodiment for a four-wheel drive vehicle and the automobile driving system 100 in the first embodiment for a two-wheel drive vehicle.

Therefore, the principal portions of the automobile driving system for a four-wheel drive vehicle can be constructed relatively easily by additionally incorporating the power transmitting mechanism for transmitting power to the rear differential gear including the third, the fourth and the fifth clutch, the transfer drive gear and the rear drive shaft into the automobile driving system 100 in the first embodiment for a two-wheel drive vehicle.

Sixth Embodiment

A driving system 600 in a sixth embodiment according to the present invention for a four-wheel drive vehicle will be described hereinafter with reference to FIGS. 49 to 56.

Figure 49:
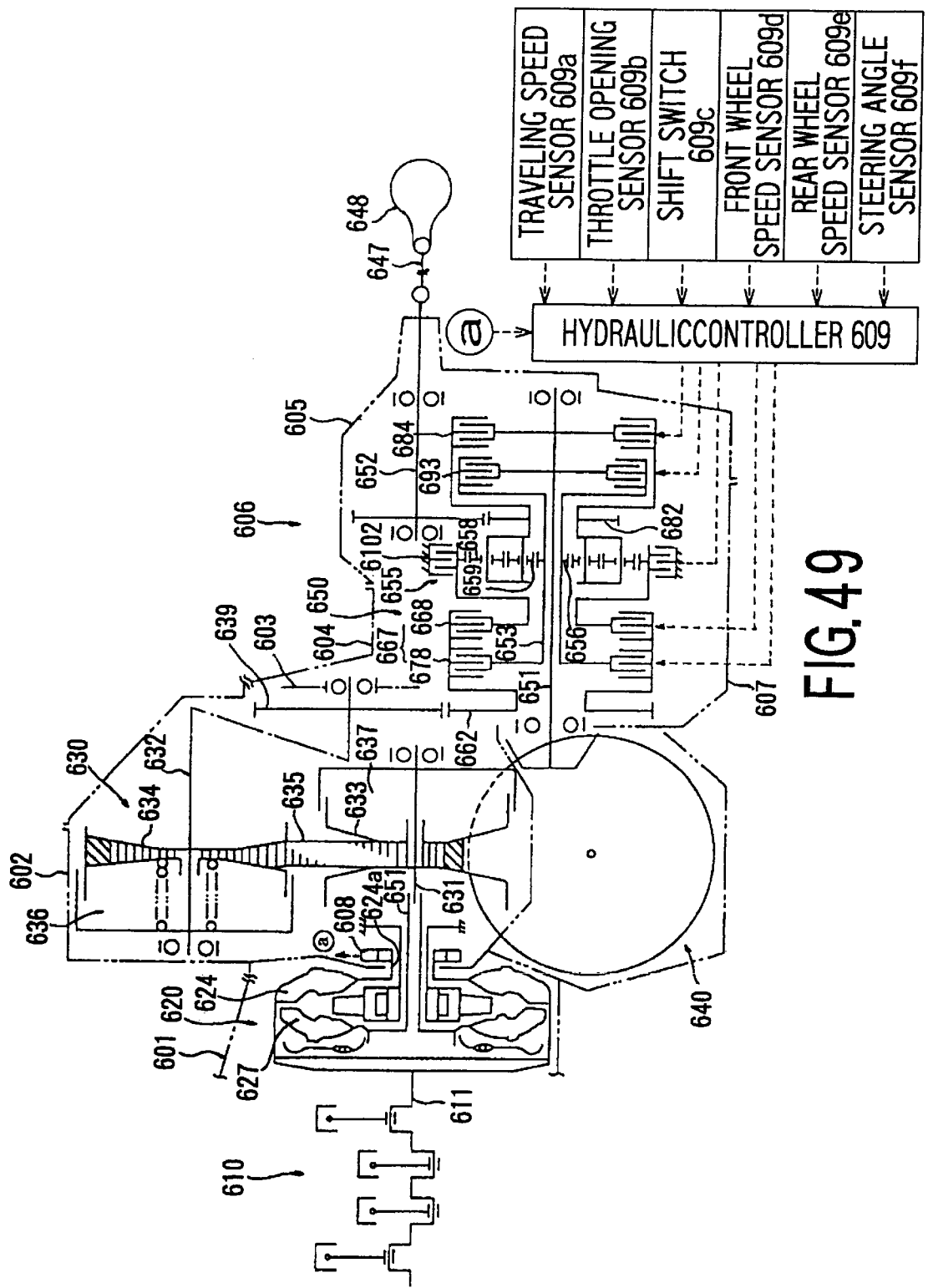
FIG. 49 is a typical view of an automobile driving system in a sixth embodiment according to the present invention.

Referring to FIG. 49, in the automobile driving system 600 in the sixth embodiment for a four-wheel drive vehicle, a torque converter case 601 joined to a longitudinal engine 610 to contain a torque converter 620, a variable-speed transmission housing 602 disposed behind the torque converter case 601 and containing a belt-drive variable-speed transmission 630 and a front differential gear 640, a case 604 disposed behind the variable-speed transmission housing 602 and containing a transfer unit 650 on a bearing plate 603, and an extension case 605 disposed behind the case 604 and containing a power transmitting mechanism for transmitting the output of the transfer unit 650 to rear wheels are arranged and joined successively in that order to construct a transmission case 606. An oil pan is attached to a lower portion of the transmission case 606.

The longitudinal engine 610 has a crankshaft 611 connected to the torque converter 620 contained in the torque converter case 601. An output shaft 621 associated with the torque converter 620 is coupled with a primary shaft 631 included in the belt-drive variable-speed transmission 630 contained in the variable-speed transmission case 602 to transmit power from the crankshaft 611 through the torque converter 620 to the primary shaft 631 of the variable-speed transmission 630.

The variable-speed transmission 630 converts an input rotating speed to an output rotating speed of a secondary shaft 632. Power is transmitted from the secondary shaft 632 to the transfer unit 650 contained in the case 604 and the extension case 605. The transfer unit 650 transfers power through the front differential gear 640 to front wheels and through a propeller shaft 647 and a rear differential gear 648 to rear wheels.

An oil pump 608 which is driven continuously by an oil pump drive shaft 624a included in the torque converter 620 is contained in the torque converter case 601. The oil pump 608 discharges oil at a line pressure continuously to supply the oil to the torque converter 620 and associated parts, enables the hydraulic control of the variable-speed transmission 630, and enables the hydraulic control of the transfer unit 650 by a hydraulic controller 609 on the basis of signals provided by a traveling speed sensor 609a, a throttle opening sensor 609b, a shift switch 609c, a front wheel speed sensor 609d, a rear wheel speed sensor 609e and a steering angle sensor 609f.

The torque converter 620, the belt-type variable-speed transmission 630, the front differential gear 640 and the transfer unit 650 will be successively described with reference to FIGS. 50 and 51.

Figure 50:
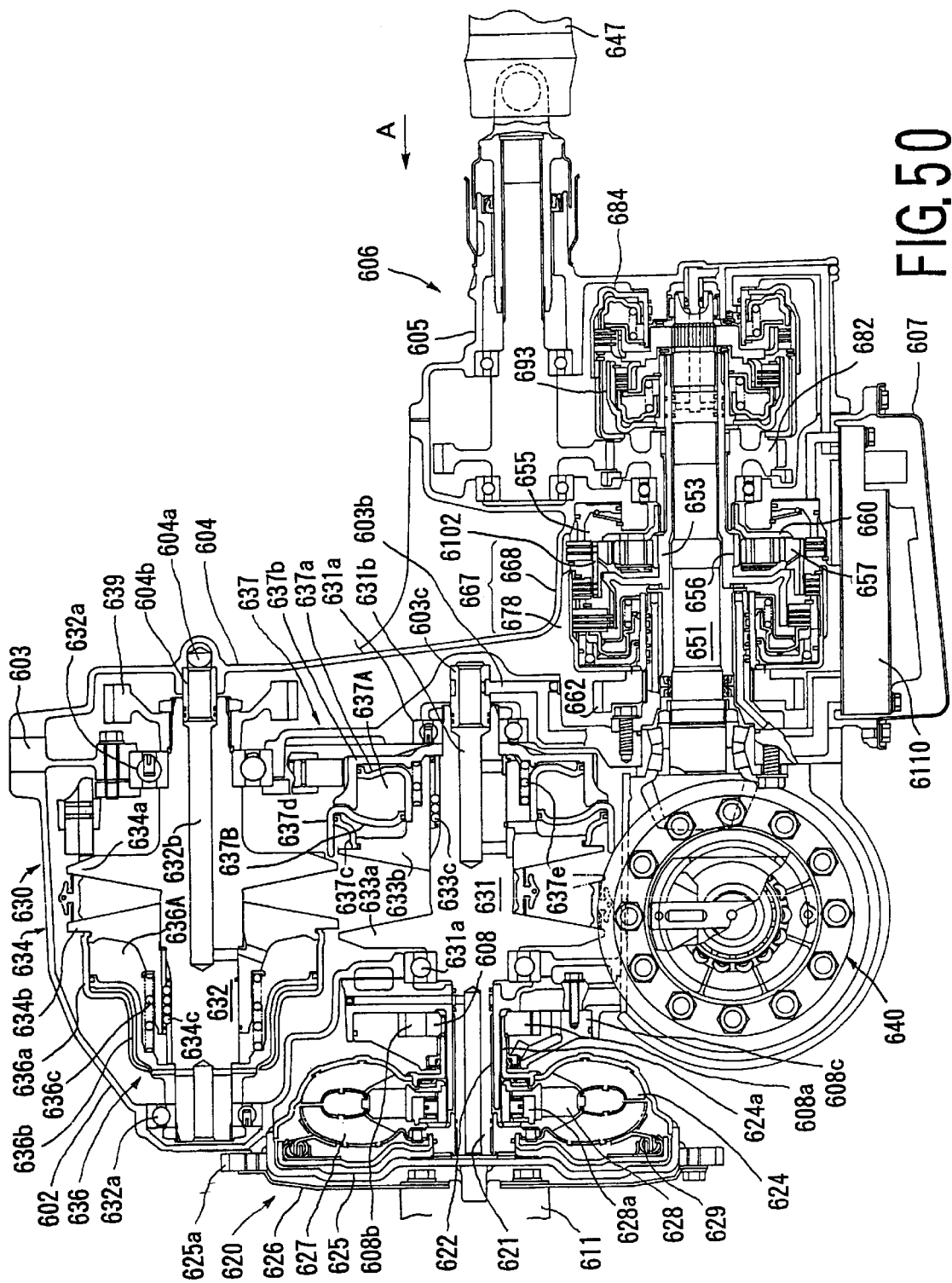
FIG. 50 is a sectional view of the automobile driving system of FIG. 49.

As shown in FIG. 50 in a sectional view, the torque converter 620 has the output shaft 621 supported for rotation in ball bearings 631a on the variable-speed transmission housing 602 and the bearing plate 603 coaxially with the crankshaft 611.

The output shaft 621 is surrounded so as to be rotatable by a stator shaft 622 having a substantially cylindrical outer circumference, and provided at its base end with a flange bolted to the variable-speed transmission case 602. The oil pump drive shaft 624a joined to an impeller 624 is fitted rotatably on the stator shaft 622.

The outer circumference of the impeller 624 is joined to the outer circumference of a front cover 625 and connected by a starter ring gear 625a attached to the outer circumference of the front cover 625, and a drive plate 626 bolted to the crankshaft 611 so as to rotate together with the crankshaft 611.

A turbine 627 is disposed opposite to the impeller 624 and is coupled with the output shaft 621 by splines. A stator 628 is interposed between the impeller 624 and the turbine 627 and is supported on a one-way clutch 628a mounted on the stator shaft 622.

A lock-up clutch 629 is interposed between the turbine 627 and the front cover 625. The oil pump 608 comprising an inner gear 608a driven for rotation by the oil pump drive shaft 624a, an outer gear 608b engaged with the inner gear 608a, and an oil pump housing 608c is mounted on the base end of the stator shaft 622.

The rotation of the crankshaft 611 of the engine 610 is transmitted through the drive plate 626 bolted to the crankshaft 611, the starter ring gear 625a and the front cover 625 to the impeller 624 to drive the same for rotation.

As the impeller 624 rotates, the oil is discharged outside from the impeller 624 by centrifugal force, the oil flows into the turbine 627 to transmit a torque acting in the same direction as the rotating direction of the impeller 624 to the turbine 627, so that the output shaft 621 coupled by the splines with the turbine 627 is driven for rotation. The direction of flow of the oil flowing out from the turbine 627 is deflected by the stator 628 in a direction to assist the rotation of the impeller 624 to increase the torque of the impeller 624. If the turbine 627 rotates at a high rotating speed, the oil flows against the back surface of the stator 628 to make the stator 628 rotate freely on the one-way clutch 628a.

When a fixed traveling speed or rotating speed is achieved, the lock-up clutch 629 engages the impeller 624 and the turbine 627 through the front cover 625 to make the torque converter operate without slipping; consequently, the operating speed of the engine 610 is reduced accordingly, whereby fuel consumption is reduced and silence is improved.

The belt-drive variable-speed transmission 630 has a primary shaft 631, a secondary shaft 632 disposed in parallel to the primary shaft 631, a primary pulley 633 mounted on the primary shaft 631, a secondary pulley 634 mounted on the secondary shaft 632, and a drive belt 635 extended between the primary pulley 633 and the secondary pulley 634. The respective widths of the grooves of the primary pulley 633 and the secondary pulley 634 are varied to vary the ratio between the pitch diameters of the primary pulley 633 and the secondary pulley 634 for continuously variable speed change.

The primary pulley 633 mounted on the primary shaft 631 formed integrally with the output shaft 621 has a fixed cone 633a formed integrally with the primary shaft 631 and a movable cone 633b axially movable relative to the fixed cone 633a. The fixed cone 633a and the movable cone 633b must hold the drive belt 635 by a predetermined clamping force and the width of the groove defined by the fixed cone 633a and the movable cone 633b must be smoothly controllable to ensure the smooth operation of the transmission for continuously variable speed change. Therefore, a plurality of axial grooves are formed in the mating surfaces of the primary shaft 631 and the movable cone 633b, and balls 633c are placed in the mating grooves for torque transmission.

A substantially cylindrical first piston 637a is fixed to the back surface of the movable cone 633b, i.e., a surface not facing the fixed cone 633a, a pressure chamber 637A is formed by the first piston 637a and a cylinder 637b having the shape of a bottomed cylinder and having a central portion fixed to the primary shaft 631. The opposite ends of a second piston 637d are fitted in a piston 637c fixed to the back surface of the movable cone 633b, and the first piston 637a, respectively, to form a pressure chamber 637B. The movable cone 633b is biased by a hydraulic actuator 637 including a spring 637e toward the fixed cone 633a.

An oil passage 631b is formed in the primary shaft 631 so as to be connected to the pressure chambers 637A and 637B. The hydraulic controller 609 executes a control operation on the basis of signals representing the opening of the throttle and such to supply the oil into and to discharge the same from the pressure chambers 637A and 637B of the hydraulic actuator 637 through an oil passage 603b formed in the bearing plate 603 and a sleeve 603c to move the movable cone 633b along the primary shaft 631 to vary the width of the groove of the pulley.

The secondary shaft 632 extended in parallel to the primary shaft 631 is supported for rotation in ball bearings 632a on the variable-speed transmission housing 602 and the bearing plate 603. The secondary pulley 634 mounted on the secondary shaft 632 has a fixed cone 634a formed integrally with the secondary shaft 632, and a movable cone 634b axially movable relative to the fixed cone 634a. A plurality of axial grooves are formed in the mating surfaces of the movable cone 634b and the secondary shaft 632, and balls 634c are placed in the mating axial grooves for torque transmission from the secondary pulley 634 to the secondary shaft 632.

A substantially cylindrical cylinder 636a is fixed to the back surface of the movable cone 634b, a pressure chamber 636A is defined by the cylinder 636a and a cylindrical piston 636b having a central portion fixed to the secondary shaft 632, and the movable cone 634b is biased toward the fixed cone 634a by a spring 636c to constitute a hydraulic actuator 636.

An oil passage 632b is formed in the secondary shaft 632 so as to be connected to the pressure chamber 636A. The hydraulic controller 609 executes a control operation on the basis of signals representing the opening of the throttle and such to supply the oil into and to discharge the same from the pressure chamber 636A of the hydraulic actuator 636 through an oil passage 604a formed in the case 604. A drive gear 639 is mounted on one end of the secondary shaft 632.

The pressure receiving area of the movable cone 633b of the primary pulley 633 is greater than that of the movable cone 634b of the secondary pulley 634. Therefore, when the oil is supplied into and discharged from the pressure chambers 637A, 637B and 636A, the mode of variation of the width of the groove of the primary pulley 633 and that of the width of the groove of the secondary pulley 634 are reverse to each other. Thus, the ratio between the pitch diameters of the primary pulley 633 and the secondary pulley 634 is varied continuously to vary the output rotating speed of the secondary shaft 632 continuously.

The front differential gear 640 is entirely the same in construction as the front differential gear 130 employed in the first embodiment. Therefore, a crown gear 643 included in the front differential gear 640 may be of a small diameter, the front differential gear 640 can be formed in a relatively small overall size, and the variable-speed transmission 630 and the front differential gear 640 can be disposed close to each other.

The construction of the transfer unit 650 will be described hereinafter with reference to FIGS. 50 and 51.

The transfer unit 650 has a front drive shaft 651, i.e., a first drive shaft, and a rear drive shaft 652, i.e., a second drive shaft, parallel to the crankshaft 611 of the engine 610, the output shaft 621, the primary shaft 631 and the secondary shaft 632.

The arrangement, as viewed in the direction of the arrow A in FIG. 50, of the crankshaft 611, the primary shaft 631, the secondary shaft 632 and the front drive shaft 651 and the rear drive shaft 652 extended in parallel to each other is entirely the same as that of the corresponding shafts of the fifth embodiment previously described with reference to FIG. 42. Thus, the driving system is formed in a compact construction having a relatively small height to facilitate the combination of the same with the variable-speed transmission 630. Since the rear drive shaft 652 and the primary shaft 631 are included in the same vertical plane one above the other, the automobile driving system can be easily inserted in a tunnel 649 and the compatibility of the automobile driving system with both a vehicle body designed to be mounted with a manual transmission (MT) and a vehicle body designed to be mounted with an automatic transmission (AT).

A pinion 651a to be engaged with the crown gear 643 of the front differential gear 640 is formed at one end of the front drive shaft 651. The front drive shaft 651 has one end rotatably supported in a taper roller bearing 651d on the bearing plate 603 of the transmission case 606, and the other end rotatably supported in a needle bearing 651e on the extension case 605.

The front drive shaft 651 is provided in its rear end portion with splines 651b which engages with a disk 683 supporting a clutch drum 685 included in a third multiple-disk clutch 684, i.e., a third friction coupling element, and an oil passage 651c having one end opening in the rear end of the front drive shaft 651 and the other end opening into a pressure chamber 696 included in a fourth multiple-disk clutch, i.e., a fourth friction coupling element. The inner ring of the taper roller bearing 651d is held between the pinion 651a and a lock nut 651f screwed on the front drive shaft 651 to restrain the front drive shaft 651 from axial movement.

The rear drive shaft 652 has one end connected through a universal joint to a propeller shaft 647, and the other end provided with a transfer driven gear 652a. The rear drive shaft 652 is supported for rotation in a plurality of ball bearings 652b on the case 604 and the extension case 605 of the transmission case 606.

A hub 653 is rotatably mounted on the front drive shaft 651. The hub 653 has a cylindrical portion 653a fitted on the front drive shaft 651, and a flange 653b formed at the base end of the cylindrical portion 653a. The cylindrical portion 653a is provided with splines 653c which engage with the sun gear 656 of a double-pinion planetary gear 655 in a portion of its outer circumference near the flange 653b and splines 653d which engage with the clutch hub 695 of the fourth multiple-disk clutch 693, i.e., the fourth friction coupling element, in its rear end portion. A clutch hub 679 of the second multiple-disk clutch 678, i.e., a second friction coupling element, is formed integrally with the flange 653b. The hub 653 is held between a thrust bearing 653g supported on the bearing plate 603 by the fixed shaft 661 fixed to the bearing plate 603, and a thrust bearing 653h supported through a disk 683 supporting the clutch hubs 686 and 695 of the third multiple-disk clutch 684 and the fourth multiple-disk clutch 693 on the extension case 605 to restrain the hub 653 from axial movement.

The double-pinion planetary gear 655 has the sun gear 656 coupled with the hub 653 by the splines 653c formed in the outer circumference of the hub 653, a ring gear 657, a first pinion 658 engaged with the ring gear 657, a second pinion 659 engaged with the sun gear 656 and the first pinion 658, and a carrier 660 rotatably supporting the first pinion 658 and the second pinion 659 in needle bearings 660a thereon. Power applied to the ring gear 657 is distributed to the sun gear 656 and the carrier 660 at a torque distribution ratio dependent on the dimensions of the sun gear 656 and the ring gear 657. When the ring gear 657 is fastened to the case 604, the carrier 660 is rotated in a direction opposite the rotating direction of the sun gear 656.

The fixed shaft 661 is substantially cylindrical, extends around the front drive shaft 651, and has a base end provided with a flange fastened to the bearing plate 603 of the transmission case 606 with bolts 661a. A space between the inner circumference of the fixed shaft 661 and the front drive shaft 651 is sealed with an oil seal 665 to form a pressure chamber 665A. The fixed shaft 661 is provided with an oil passage 661b connected to the pressure chamber 665A, and an oil passage 661c in its outer circumference.

The driven gear 662 engaged with the drive gear 639 is supported for rotation on the fixed shaft 661 by a needle bearing 662a. An input selecting means 667 for selectively transmitting power from the driven gear 662 selectively to the ring gear 657 or through the hub 653 to the sun gear 656 is interposed between the driven gear 662 and the double-pinion planetary gear 655. The input selecting means 667 comprises the first multiple-disk clutch 668, i.e., a first friction coupling element, and the second multiple-disk clutch 678, i.e., a second friction coupling element.

In the first multiple-disk clutch 668, a clutch drum 669 supported for rotation through a bushing 669a on the fixed shaft 661 is connected to the driven gear 662, a clutch hub 670 is connected to the ring gear 657 of the double-pinion planetary gear 655. The first multiple-disk clutch 668 interlocks the driven gear 662 and the ring gear 657 for power transmission. A pressure is applied to a pressure chamber 671 to compress a retaining plate 673c contiguous with a snap ring 673d, driven plates 673b and drive plates 673a by a piston 672 to engage the first multiple-disk clutch 668 for power transmission. Indicated at 672a is a sealing member fitted on the piston 672 and capable of providing liquid-tight sealing between the piston 672 and the clutch drum 669 and of sliding along the clutch drum 669. A retainer 675a is disposed on one side of the piston 672 opposite the other side of the same on which the pressure chamber 671 is formed, and a pressure is exerted on the piston 672 through the piston 674 by a return spring 676.

In the second multiple-disk clutch 678, the clutch drum 669 serves also as the clutch drum of the first multiple-disk clutch 668, and the clutch hub 679 is formed integrally with the hub 653. The second multiple-disk clutch 678 is able to transmit power from the driven gear 662 through the hub 653 to the sun gear 656. A pressure is applied to a pressure chamber 680 to compress a retaining plate 681c contiguous with a snap ring 681d fixed to the piston 672, driven plates 681b and drive plates 681a by a piston 674 to engage the second multiple-disk clutch 678 for power transmission. A centrifugal pressure generated in the pressure chamber 680 is counterbalanced with a pressure in a balancing pressure chamber 675. A pressure is exerted on the piston 674 by the return spring 676.

A transfer drive gear 682 is supported for rotation by a ball bearing 682a on the case 604 of the transmission case 606 and supported for rotation by a needle bearing 682b on the hub 653 on one side of the double-pinion planetary gear 655 opposite the other side of the same on which the input selecting means 667 is disposed. A transfer driven gear 652a mounted on the rear drive shaft 652 is engaged with the transfer drive gear 682 for power transmission. The carrier 660 of the double-pinion planetary gear 655 is coupled with the transfer drive gear 682 by splines, and a parking gear 682c is combined with the transfer drive gear 682.

In the third multiple-disk clutch 684, the clutch drum 685 is connected to the transfer drive gear 682 by a drum member 685a and is supported for rotation coaxially with the front drive shaft 651 on the extension case 605, and the clutch hub 686 is connected to a disk 683 coupled with the front drive shaft 651 by the splines 651b. Thus, the third multiple-disk clutch 684 is interposed for power transmission between the transfer drive gear 682 and the front drive shaft 651. A pressure is applied to a pressure chamber 687 to compress a retaining plate 689c contiguous with a snap ring 689d fixed to the clutch drum 685, driven plates 689b and drive plates 689a by a piston 688 to engage the third multiple-disk clutch 684 for power transmission. A retainer 690 is disposed on one side of the piston 688 opposite the other side of the same on which the pressure chamber 687 is formed to form a balancing pressure chamber 691 for counterbalancing a centrifugal pressure generated in the pressure chamber 687. A pressure is exerted on the piston 688 by a return spring 692.

The fourth multiple-disk clutch 693, i.e., a fourth coupling element, for selectively interlocking the front drive shaft and the hub 653 for power transmission is interposed between the front drive shaft 651 and the rear end of the hub 653.

In the fourth multiple-disk clutch 693, a clutch drum 694 is coupled with the hub 653 by the splines 653d, the clutch hub 695 is connected to a disk 683, and the disk 683 is coupled with the front drive shaft 651 by splines for power transmission. A pressure is applied to a pressure chamber 696 to compress a retaining plate 698c contiguous with a snap ring 698d fixed to the clutch drum 694, driven plates 698b and drive plates 698a coupled with the clutch hub 695 by a piston 697 to engage the fourth multiple-disk clutch 693 for power transmission. A retainer 699 is disposed so as to form a balancing pressure chamber 6100 for counterbalancing a centrifugal pressure generated in the pressure chamber 696. A pressure is exerted on the piston 697 by a return spring 6101.

A fifth multiple-disk clutch 6102, i.e., a fifth friction coupling element for selectively fastening the ring gear 657 to the case 604, is interposed between the case 604 of the transmission case 606 and the ring gear 657 of the double-pinion planetary gear 655.

A pressure is applied to a pressure chamber 6103 formed in the fifth multiple-disk clutch 6102 to compress a retaining plate 6105c contiguous with a snap ring 6105d fixed to the case 604, driven plates 6105b and drive plates 6105a coupled with the clutch hub 670 connected to the ring gear 657 by a piston 6104 to engage the fifth multiple-disk clutch 6102 to fasten the ring gear 657 to the case 604. A pressure is exerted on the piston 6104 by a return spring 6106.

A control valve 6110 is disposed in an oil pan 607 joined to a lower portion of the transmission case 606. The control valve 6110 is controlled by the hydraulic controller 609 on the basis of signals provided by the traveling speed sensor 609a, the throttle opening sensor 609b, the shift switch 609c, the front wheel speed sensor 609d, the rear wheel speed sensor 609e and the steering angle sensor 609f to supply the oil discharged from the oil pump 608 selectively to the input selecting means 667, the respective pressure chambers 671, 680, 687, 696 and 6103 of the third multiple-disk clutch 684, the fourth multiple-disk clutch 693 and the fifth multiple-disk clutch 6102, and the variable-speed transmission 630.

The operation of the automobile driving system for a four-wheel drive vehicle thus constructed will be described with reference to FIGS. 52 to 55, and FIG. 56 tabulating the operating conditions of the first multiple-disk clutch 668, the second multiple-disk clutch 678. third multiple-disk clutch 684, the fourth multiple-disk clutch 693 and the fifth multiple-disk clutch 6102. In the table shown in FIG. 48, blank circles indicate that the corresponding multiple-disk clutches are engaged or operative, and parenthesized blank circles indicate that multiple-disk clutches are engaged or operative if necessary.

The power of the engine 610 is transmitted from the crankshaft 611 through the torque converter 620 to the primary shaft 631 of the variable-speed transmission 630. An input speed of the primary shaft 631 is converted continuously into an output speed of the secondary shaft 632 by the action of the primary pulley 633 and the secondary pulley 634 operatively connected by the drive belt 635. The output speed of the secondary shaft 632 is reduced by the action of the drive gear 639 and the driven gear 662. and a reduced speed is transmitted through the clutch drum 669 to the first multiple-disk clutch 668 and the second multiple-disk clutch 678. The first multiple-disk clutch 668 and the second multiple-disk clutch 678 are disengaged and power is not transmitted beyond the first multiple-disk clutch 668 and the second multiple-disk clutch 678 when a neutral position N or a parking position P is selected.

Figure 52:
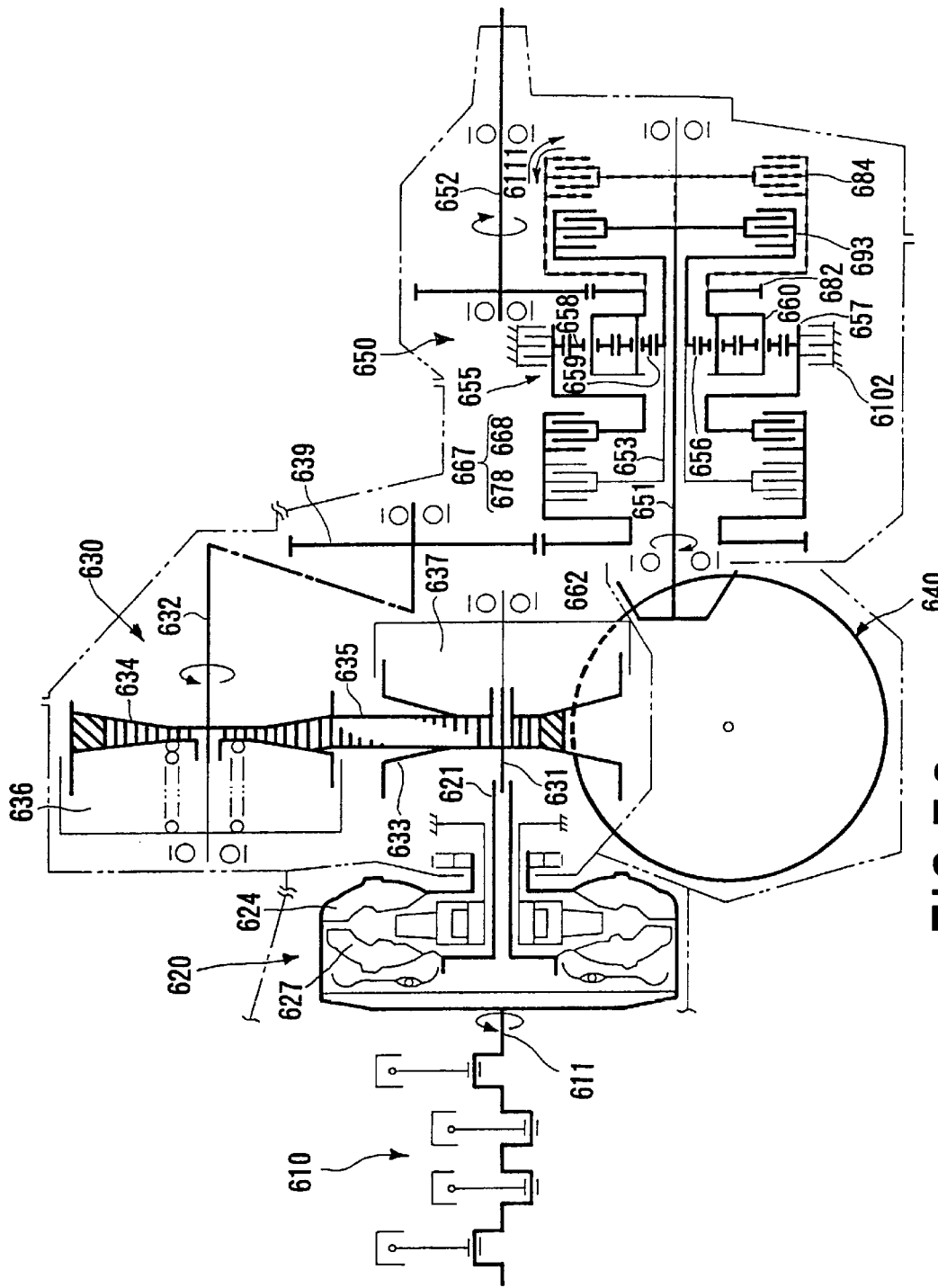
FIG. 52 is a schematic side view of assistance in explaining the operation of the automobile driving system of FIG. 49.

When a drive range D, i.e., a forward range, is selected, the first multiple-disk clutch 668 and the fourth multiple-disk clutch 693 are engaged to transmit driving power through a drive line indicated by thick lines in FIG. 52. A pressure is applied through the control valve 6110 to the pressure chamber 671 to compress the retaining plate 673c contiguous with the snap ring 673d fixed to the inner circumference of the clutch drum 669, the driven plates 673b, and the drive plates 673a by the piston 672 so that the first multiple-disk clutch 668 is engaged. Consequently, power is transmitted from the driven gear 662 to the ring gear 657 of the double-pinion planetary gear 655. A pressure is applied also to the pressure chamber 696 to compress the retaining plate 698c, the driven plate 698b and the drive plate 698a of the fourth multiple-disk clutch 693 by the piston 697 to engage the fourth multiple-disk clutch 693. Consequently, the sun gear 656 of the double-pinion planetary gear 655 and the front drive shaft 651 are interlocked for power transmission through the hub 653 and the third multiple-disk clutch 684.

Figure 53:
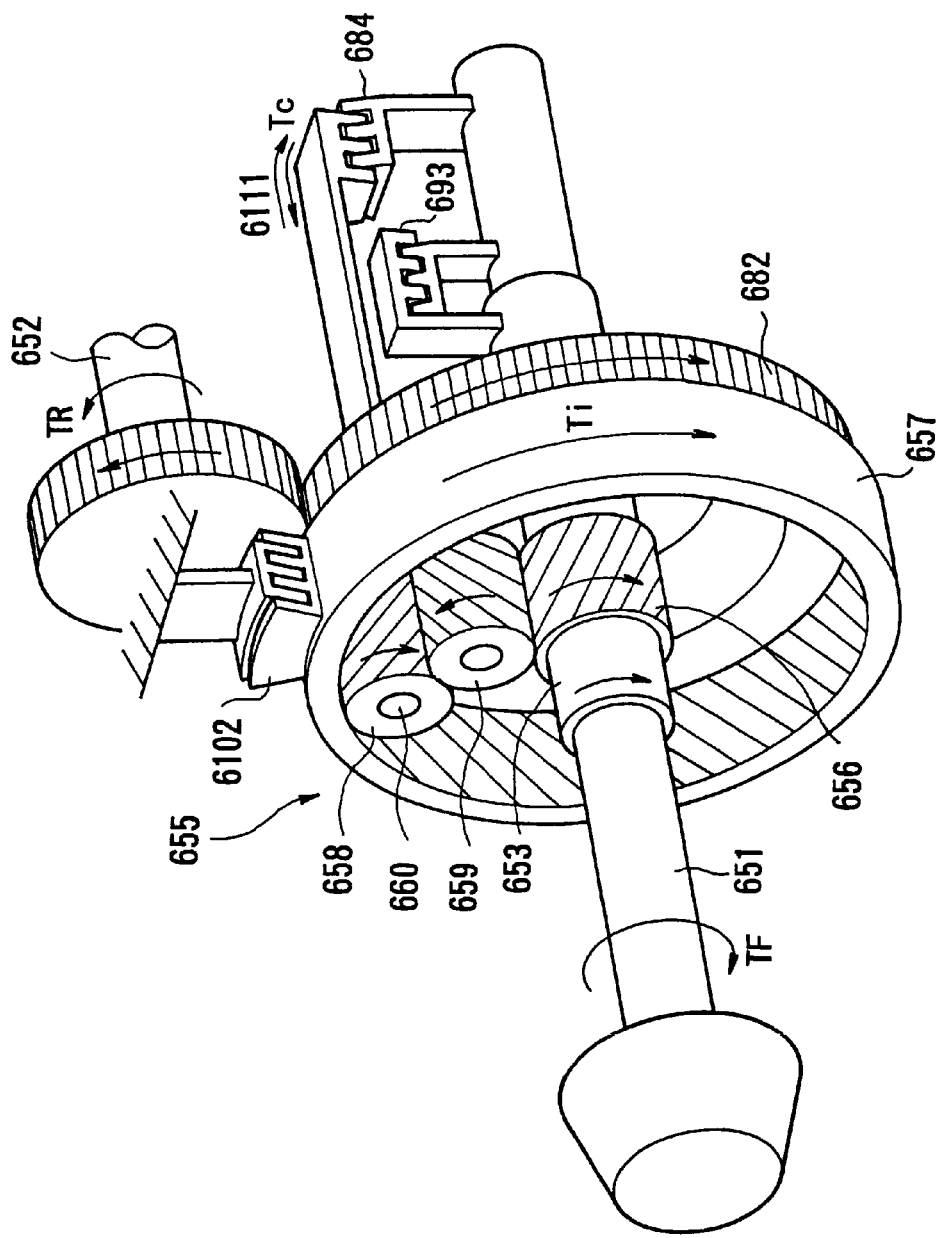
FIG. 53 is a schematic perspective view of assistance in explaining the operation of a double-pinion planetary gear.

Accordingly, in the double-pinion planetary gear 655 in which the ring gear 657, i.e., input member, and the first pinion 658 are engaged, and the second pinion 659 is engaged with the first pinion 658 and the sun gear 656 as shown in FIG. 53, the sun gear 656 and the carrier 660 are rotated for differential rotation in the same direction as the rotating direction of the ring gear 657, and torque is distributed at a predetermined distribution ratio to the sun gear 656 and the carrier 660. Thus the front drive shaft 651 coupled with the disk 683 by splines is rotated through the hub 653 coupled with the sun gear 656 by splines, the fourth multiple-disk clutch 693 and the disk 683 in the rotating direction of the ring gear 657, the transfer drive gear 682 coupled with the carrier 660 by splines is rotated in the rotating direction of the ring gear 657, and the rear drive shaft 652 is driven in a direction opposite the rotating direction of the ring gear 657 by the transfer driven gear 652a engaged with the transfer drive gear 682. During torque transmission, the double-pinion planetary gear 655 serves as a center differential gear in which the first pinion 658 and the second pinion 659 rotate and revolve round the sun gear 656 to absorb the difference in rotating speed between the sun gear 656 and the carrier 660.

The torque distributing function of the double-pinion planetary gear 655 will be described with reference to a graph shown in FIG. 53.

The relation between torque distribution and the numbers of teeth of the ring gear 657 and the sun gear 656 is expressed by:

$$Ti = TF + TR$$

$$TF:TR = ZS:(ZR-ZS)$$

where Ti is input torque applied to the ring gear 657, TF is the torque of the sun gear 656 to be transmitted to the front wheels, TR is the torque of the carrier 660 to be transmitted to the rear wheels, ZS is the number of teeth of the sun gear 656 and ZR is the number of teeth of the ring gear 657.

Accordingly, an optional reference torque distribution ratio TF/TR can be provided by properly determining ZS of the sun gear 656 and ZR of the ring gear 657.

If ZS=37 and ZR=82, $$TF:TR = 37:(82-37)$$

Then TF:TR≈45:55 which signifies that about 45% and about 55% of the input torque applied to the ring gear 657 of the double-pinion planetary gear 655 are distributed to the front wheels and the rear wheels, respectively. Thus, a rear-biased reference torque distribution mode, i.e., a torque distribution mode in which a major part of the input torque is distributed to the rear wheels, can be established.

A pressure is applied to the pressure chamber 687 of the third multiple-disk clutch 684 to compress the snap ring 689d, the retaining plate 689c, the driven plate 689b and the drive plat 689a by the piston 688 to produce clutch torque Tc. The hydraulic controller 609 controls the control valve 6110 to vary the clutch torque Tc.

Front wheel speed NF and rear wheel speed NR measured by the front wheel speed sensor 609d and the rear wheel speed sensor 609e are given to the hydraulic controller 609. The rear wheels always starts slipping first if the vehicle is traveling on a slippery road in the rear-biased reference torque distribution mode, i.e., in a mode in which TF<TR. Therefore, slip S is defined by S=NF/NR (S>0). A clutch pressure Pc corresponding to a slip S and a steering angle Ψ given to the hydraulic controller 609 from the steering angle sensor 609f is retrieved from a map of FIG. 45 stored in the hydraulic controller 609. If the rear wheels are not slipping and S≧1, the clutch pressure Pc is relatively low. If the rear wheels are slipping and S<1, the clutch pressure Pc is increased as the slip S decreases, and the clutch pressure Pc is set to Pmax when the slip S is not greater than a predetermined threshold slip S1. The line pressure is adjusted to the clutch pressure Pc for the variable control of the clutch torque Tc of the third multiple-disk clutch 684.

Thus, a bypass drive line 6111 is formed by engaging the third multiple-disk clutch 684. The bypass drive line 6111 extends from the front drive shaft 651, through the third multiple-disk clutch 684, the transfer drive gear 682, the carrier 660, the sun gear 656, the hub 653 and the fourth multiple-disk clutch 693 to the front drive shaft 651. The bypass drive line 6111 exercises a differential function to meet (rear wheel speed NR)>(rotating speed of the ring gear 657)>(front wheel speed NF) in the transfer unit 650 if the rear wheels slip, and the torque transmitted through the third multiple-disk clutch 684 to the front drive shaft 651 is increased by the clutch torque Tc, and the torque transmitted through the transfer driven gear 652a engaged with the transfer drive gear 682 to the rear drive shaft 652 is reduced by the clutch torque Tc distributed to the front wheels. Consequently, $$TF = 0.45 Ti + Tc$$

$$TR = 0.55 Ti - Tc$$

Accordingly, the torque is distributed to the front wheels and the rear wheels at a rear-biased torque distribution ratio TF:TR (45:55 when neither the front wheels nor the rear wheels are slipping because the clutch torque Tc=0 if neither the front wheels nor the rear wheels are slipping. When the rear wheels are slipping and the clutch torque Tc is generated, more part of the input torque Ti is distributed to the front wheels through the bypass drive line 6111 if the clutch torque Tc is greater, and the torque distribution ratio TF:TR changes to TF1:TR1 as shown in FIG. 45 so that the torque distributed to the front wheels is increased and the torque distributed to the rear wheels is decreased. Consequently, the slip of the rear wheels is decreased and the traction of the vehicle is improved. When the slip S is decreased below the predetermined threshold slip, the pressure of the oil supplied to the third multiple-disk clutch 684 increases, differential limiting torque increases to a maximum, and the sun gear 656 and the carrier 660 are connected directly. Consequently, the differential motion of the transfer unit 650 is locked and a direct four-wheel-drive mode in which the torque is distributed at a torque distribution ratio corresponding to front-rear axle weight distribution ratio is established, whereby the traction of the vehicle is enhanced to a maximum.

If the front wheels slip, the differential function of the transfer unit 650 meets a condition: (rear wheel speed NR)<(rotating speed of the ring gear 657)<(front wheel speed NF), a torque is transmitted from the front drive shaft 651 to the transfer drive gear 682 according to the clutch torque Tc, and the torque transmitted from the front drive shaft 651 to the front wheels is reduced by the clutch torque Tc distributed to the rear wheels. Consequently, $$TF=0.45Ti-Tc$$

$$TR=0.55Ti+Tc$$

Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the front wheels are slipping and the clutch torque Tc is generated, the input torque Ti is distributed to the rear wheels according to the clutch torque Tc to increase the torque distributed to the rear wheels positively and to reduce the torque distributed to the front wheels, so that the traction of the vehicle is improved. If the slip S is decreased below the predetermined threshold slip, the pressure of the oil supplied to the third multiple-disk clutch 684 increases, differential limiting torque increases to a maximum, and the sun gear 656 and the carrier 660 are connected directly. Consequently, the differential motion of the transfer unit 650 is locked and a direct four-wheel-drive mode in which the torque is distributed at a torque distribution ratio corresponding to front-rear axle weight distribution ratio is established, whereby the traction of the vehicle is fully enhanced. Thus, the torques distributed to the front and the rear wheels are controlled in a wide range according to the mode of slip to avoid the reduction of traction.

If the vehicle turns during the torque distribution control for suppressing slip, the differential limiting torque of the third multiple-disk clutch 684 is reduced for correction according to the steering angle Ψ. Consequently, the differential limiting effect of the transfer unit 650 is reduced and the difference in rotating speed can be satisfactorily absorbed, so that tight corner braking is avoided and satisfactory controllability can be secured.

Figure 54:
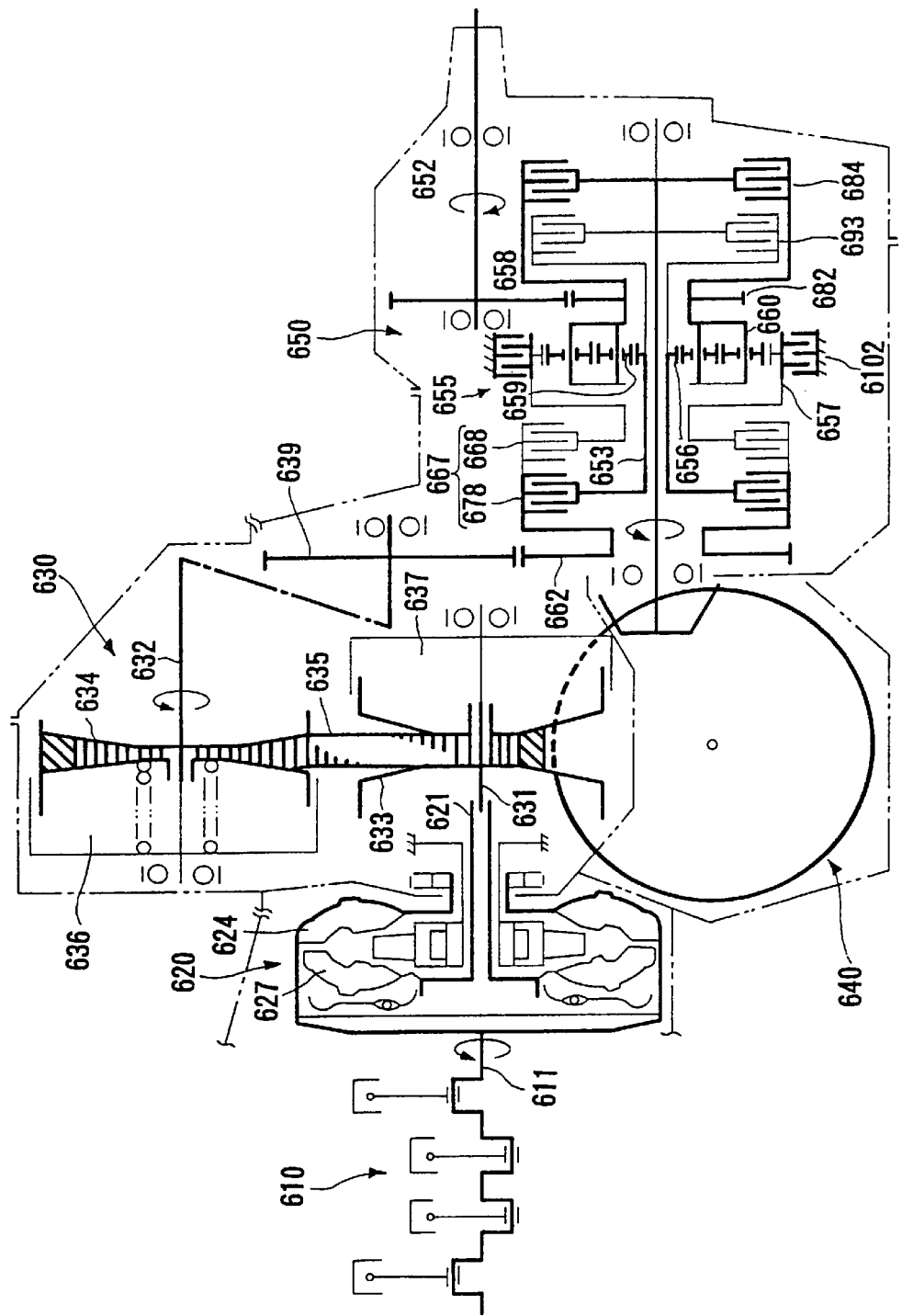
FIG. 54 is a schematic side view of assistance in explaining the operation of the automobile driving system of FIG. 49.

When a reverse range R is selected, the first multiple-disk clutch 668 and the fourth multiple-disk clutch 693 are disengaged and the second multiple-disk clutch 678, the third multiple-disk clutch 684 and the fifth multiple-disk clutch 6102 are engaged to transmit power through a drive line indicated by thick lines in FIG. 54. A pressure is applied through the control valve 6110 to the pressure chamber 680 to compress the snap ring 681*d*, the retaining plate 681*c*, the drive plates 681*a* and the driven plates 681*b* by the piston 674 to engage the second multiple-disk clutch 678 to transmit power from the driven gear 662 through the hub 653 to the sun gear 656 of the double-pinion planetary gear 655. A pressure is applied to the pressure chamber 6103 to compress the snap ring 6105*d*, the retaining plate 6105*c*, the drive plates 6105*a* and the driven plates 6105*b* by the piston 6104 to engage the fifth multiple-disk clutch 6102, whereby the ring gear 657 is fastened to the case 604. The snap ring 689*d*, the retaining plate 689*c*, the drive plates 689*a* and the driven plates 689*b* are compressed by the piston 688 to engage the third multiple-disk clutch 684, so that power is transmitted from the transfer drive gear 682 to the front drive shaft 651.

Figure 55:
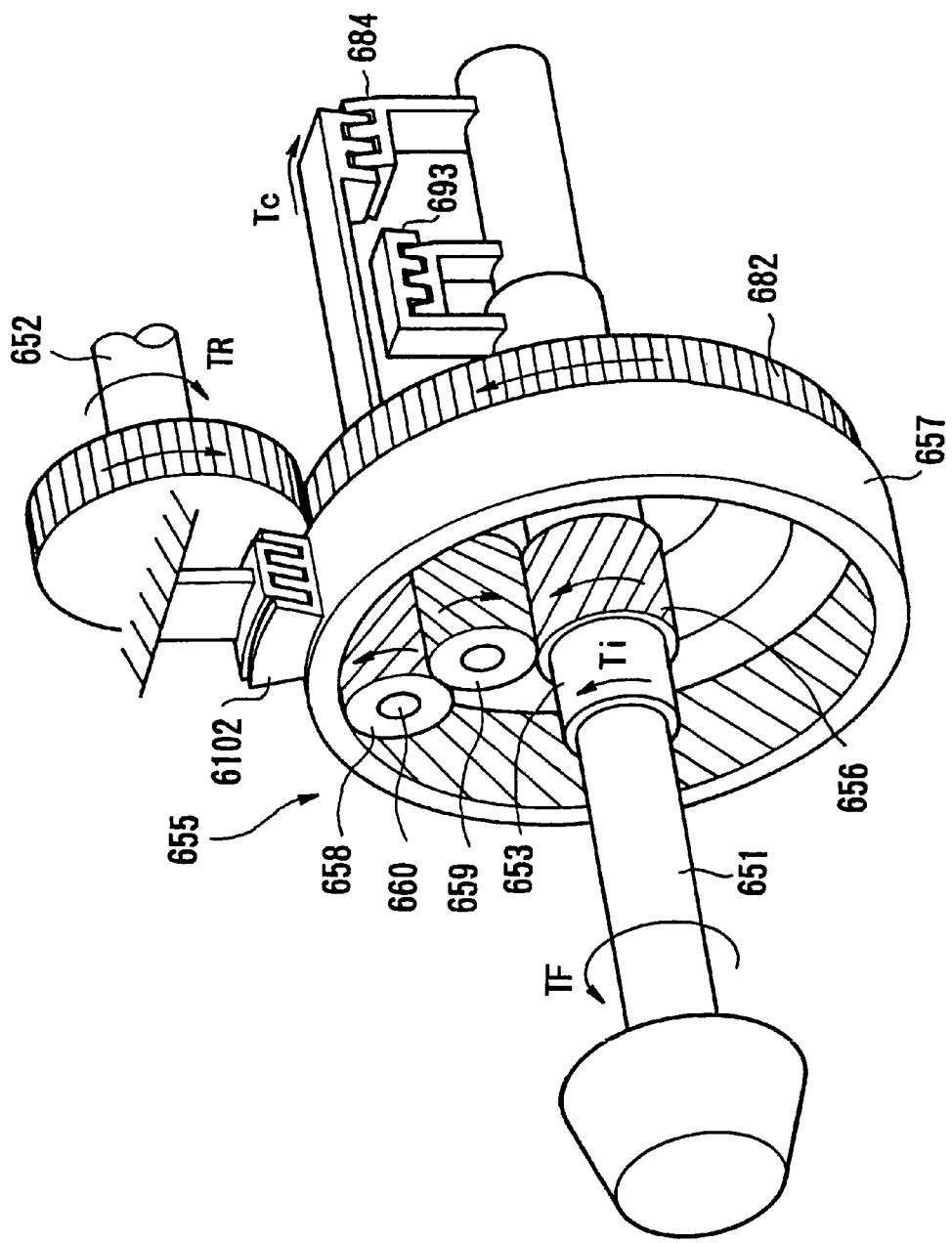
FIG. 55 is a schematic perspective view of assistance in explaining the operation of a double-pinion planetary gear.

Consequently, as shown in FIG. 55, the first pinion 558 and the second pinion 559 are rotated in the opposite directions, respectively, by the sun gear and revolve along the ring gear 657 to rotate the carrier 660 in a direction opposite the rotating direction of the sun gear 656. Consequently, the transfer drive gear 682 is driven for rotation in the reverse direction, power is transmitted from the transfer drive gear 683 through the third multiple-disk clutch 684 to the front drive shaft 651 to drive the rear drive shaft 652 for rotation in a direction opposite the rotating direction of the front drive shaft 651.

Therefore, the power transmitted to the driven gear 662 is transmitted in a direction opposite a direction in which power is transmitted when the drive range D is selected to the front drive shaft 651 and the rear drive shaft 652 when the ring gear 657 of the double-pinion planetary gear 655 is fastened to the case 604 by the fifth multiple-disk clutch 6102. Thus, the double-pinion planetary gear 655 is capable of a forward/reverse selecting function.

In this case, power is transmitted from the sun gear 656 to the front drive shaft 651 and the rear drive shaft 652 at a gear ratio expressed by:

$$\text{Gear ratio}=[ZS+(-ZR)]/ZS$$

If ZS=37 and ZR=82, $$\text{Gear ratio}=[37+(-82)]/37=-1.216$$

which is an appropriate gear ratio for the reverse range R.

The clutch torque Tc among the input torque Ti applied to the sun gear 656 is transmitted to the front drive shaft 651 and the rest of the input torque Ti is transmitted to the rear wheels.

$$Ti=TF+TR$$

$$TR=Ti-Tc$$

$$TF=Tc$$

Therefore, the traction of the vehicle is improved by increasing the clutch torque Tc so that part of the input torque Ti distributed to the front wheels is increased to increase the torque of the front wheels positively and to reduce the torque of the rear wheels when the rear wheels slip in order that the slip is suppressed. When the front wheels slip, the clutch torque Tc is reduced to distribute more part of the torque Ti to the rear wheels to increase the torque of the rear wheels positively and the torque of the front wheels is reduced to suppress slip and to improve traction. If the slip S is decreased blow the predetermined threshold slip, the pressure of the oil supplied to the third multiple-disk clutch 684 is increased to a maximum and the differential limiting torque Tc is increased to a maximum to connect the front drive shaft 651 and the transfer drive gear 682 directly to establish a direct four-wheel-drive mode in which the torque is distributed at a torque distribution ratio corresponding to front-rear axle weight distribution ratio, whereby the traction of the vehicle is fully enhanced. If the vehicle turns during the torque distribution control for suppressing slip, the differential limiting torque of the third multiple-disk clutch 684 is reduced according to the steering angle Ψ. Consequently, the difference in rotating speed can be satisfactorily absorbed, so that tight corner braking is avoided and satisfactory controllability can be secured.

In the sixth embodiment, the front drive shaft 651 and the rear drive shaft 652 for transmitting power to the front differential gear 640 connected to the output side of the belt-drive variable-speed transmission 630 and the rear differential gear 648, respectively, are disposed in parallel to the crankshaft 611 of the transverse engine 610, the double-pinion planetary gear 655 is mounted on the front drive shaft 551 with its sun gear 656 coupled with the front drive shaft 651 through the hub 653 and the fourth multiple-disk clutch 693, the first multiple-disk clutch 668 is capable of transmitting the output of the variable-speed transmission 630 to the ring gear 657, the second multiple-disk clutch 678 is capable of transmitting the output of the variable-speed transmission 630 to the hub 653, the third multiple-disk clutch 684 is capable of interlocking the front drive shaft 651 and the transfer drive gear 682 for power transmission, the fifth multiple-disk clutch 6102 is capable of restraining the ring gear 657 from rotation, and the multiple-disk clutches 668, 678, 684, 693 and 6102 are controlled selectively so that the automobile driving system exercises the functions of a center differential gear to distribute torques properly to the front drive shaft 651 and the rear drive shaft 652 and to achieve a differential limiting operation so that the vehicle is able to travel satisfactorily when the drive range D, i.e., the forward range, or the reverse range R is selected and exercises the functions of a forward/reverse selecting mechanism when the drive range D or the reverse range R is selected.

Whereas the conventional automobile driving system needs special double-pinion planetary gears respectively for a center differential gear and a forward/reverse selecting mechanism, the automobile driving system in the sixth embodiment according to the present invention needs a single double-pinion planetary gear for both the functions of the center differential gear and those of the forward/reverse selecting mechanism. Therefore, the automobile driving system in the sixth embodiment according to the present invention exercises high performance, has a simple, compact, lightweight construction having a small overall length, simplifies control operations, and can be manufactured at a low manufacturing cost. Accordingly, the automobile driving system can be installed on a vehicle body with only a small portion or no portion thereof projected into a tunnel formed under a passenger room to reduce greatly the sectional area of the portion of the tunnel protruding into the passenger room, a sufficiently large space can be secured between the toe board and the automobile driving system, and a sufficiently large space can be secured to form a passenger room which provides improved comfortability.

Since an increased space is secured between the toe board and the automobile driving system, a sufficient crush stroke necessary for protecting the passenger in the case of collision can be secured, and a sufficiently large space is available for work for installing the transmission in and removing the same from the engine room. Furthermore, the degree of freedom of vehicle body design is increased and the automobile driving system can be mounted on a slant nose body having a low engine hood.

An electromagnetic clutch or a wet clutch may be employed instead of the torque converter 620. If an electromagnetic clutch or a wet clutch is employed instead of the torque converter, the transmission of power to the primary shaft 631 of the belt-drive variable-speed transmission 630 and beyond the belt-drive variable-speed transmission 630 can be intercepted when the neutral position N or the parking position P is selected.

It is known from the comparative examination of the automobile driving system 600 in the sixth embodiment for a four-wheel drive vehicle and the automobile driving system 200 in the second embodiment for a two-wheel drive vehicle that the torque converter, the belt-drive variable-speed transmission, the front differential gear, the first, the second and the fifth case forming the transmission case containing the belt-drive variable-speed transmission, and the principal components of the transfer unit including the front drive shaft, the double-pinion planetary gear, the fixed shaft, and the first and the second multiple-disk clutch are common to the automobile driving system 600 in the sixth embodiment for a four-wheel drive vehicle and the automobile driving system 200 in the second embodiment for a two-wheel drive vehicle.

Therefore, the principal portions of the automobile driving system for a four-wheel drive vehicle can be constructed relatively easily at a reduced manufacturing cost by additionally incorporating the power transmitting mechanism for transmitting power to the rear differential gear including the third, the fourth and the fifth clutch, the transfer drive gear and the rear drive shaft into the automobile driving system 200 in the second embodiment for a two-wheel drive vehicle.

Seventh Embodiment

A driving system 700 in a seventh embodiment according to the present invention for a four-wheel drive vehicle will be described hereinafter with reference to FIGS. 57 to 65.

Figure 57:
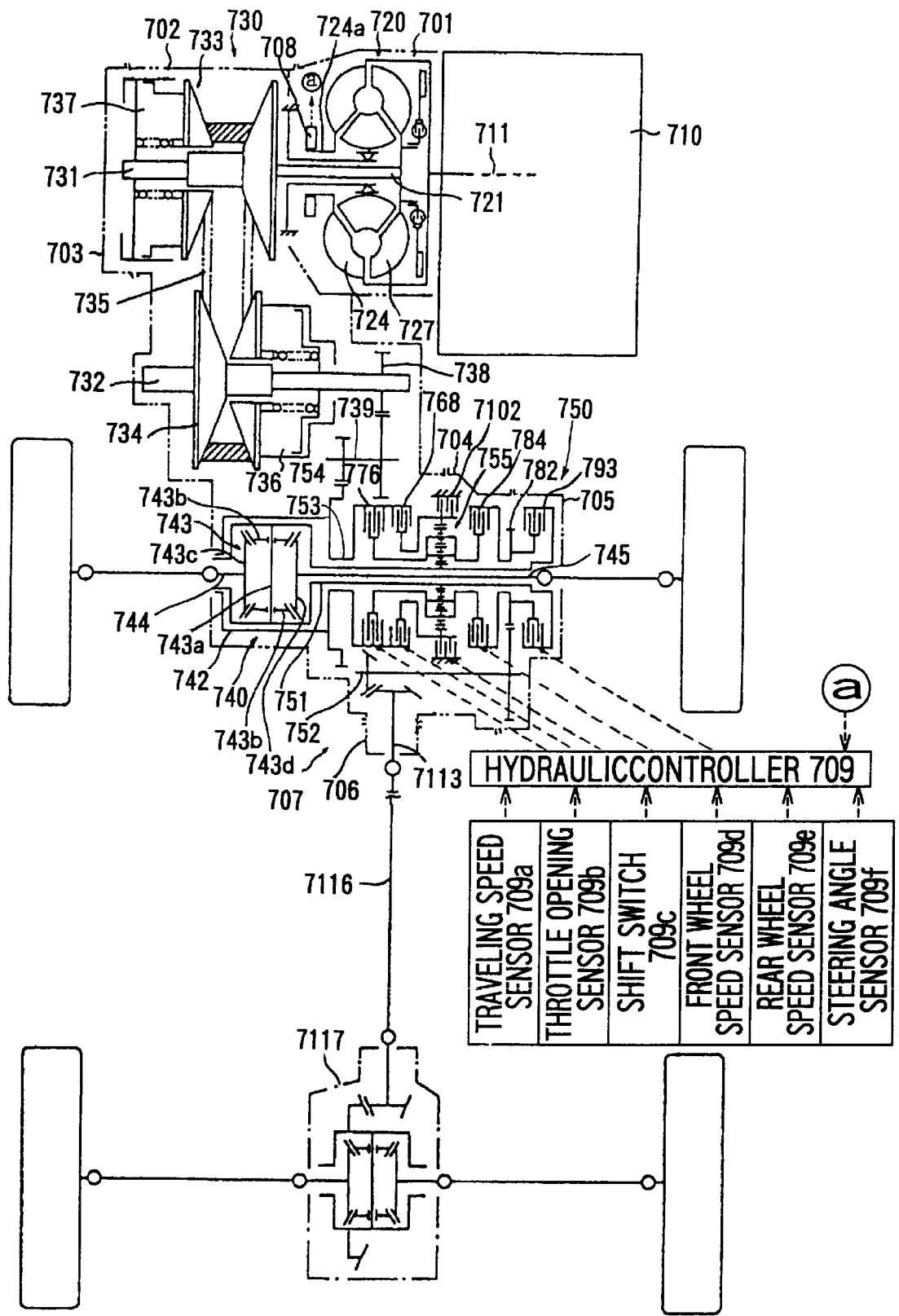
FIG. 57 is a typical view of an automobile driving system in a seventh embodiment according to the present invention.

Referring to FIG. 57, in the automobile driving system 700 in the seventh embodiment for a four-wheel drive vehicle, a torque converter case 701 joined to a transverse engine 710 to contain a torque converter 720, a variable-speed transmission housing 702 disposed beside the torque converter case 701 and containing a belt-drive variable-speed transmission 730 and a front differential gear 740, a side cover 703, a case 704 and an end cover 705 combined with the torque converter case 701 to contain a transfer unit 750, an extension case 706 disposed behind the torque converter case 701 to contain a power transmitting mechanism for transmitting the output of the transfer unit 750 to rear wheels are arranged and joined successively in that order to construct a transmission case 707. An oil pan, not shown, is attached to a lower portion of the transmission case 707.

The transverse engine 710 has a crankshaft 711 connected to the torque converter 720 contained in the torque converter case 701. An output shaft 721 associated with the torque converter 720 is coupled with a primary shaft 731 included in the belt-drive variable-speed transmission 730 contained in the variable-speed transmission case 702 to transmit power from the crankshaft 711 through the torque converter 720 to the primary shaft 731 of the variable-speed transmission 730.

The variable-speed transmission 730 converts an input rotating speed to an output rotating speed of a secondary shaft 732. Power is transmitted from the secondary shaft 732 through a countershaft assembly 739 to the transfer unit 750. The transfer unit 750 transfers power through the front differential gear 740 to front wheels and through a propeller shaft 7116 and a rear differential gear 7117 to rear wheels.

An oil pump 708 which is driven continuously by an oil pump drive shaft 724*a* included in the torque converter 720 is contained in the transmission case 707. The oil pump 708 discharges oil at a line pressure continuously to supply the oil to the torque converter 720 and associated parts, enables the hydraulic control of the variable-speed transmission 730, and enables the hydraulic control of the transfer unit 750 by a hydraulic controller 709 on the basis of signals provided by a traveling speed sensor 709*a*, a throttle opening sensor 709*b*, a shift switch 709*c*, a front wheel speed sensor 709*d*, a rear wheel speed sensor 709*e* and a steering angle sensor 709*f*.

The torque converter 720, the belt-type variable-speed transmission 730, the front differential gear 740 and the transfer unit 750 will be successively described with reference to FIGS. 58 to 60.

Figure 58:
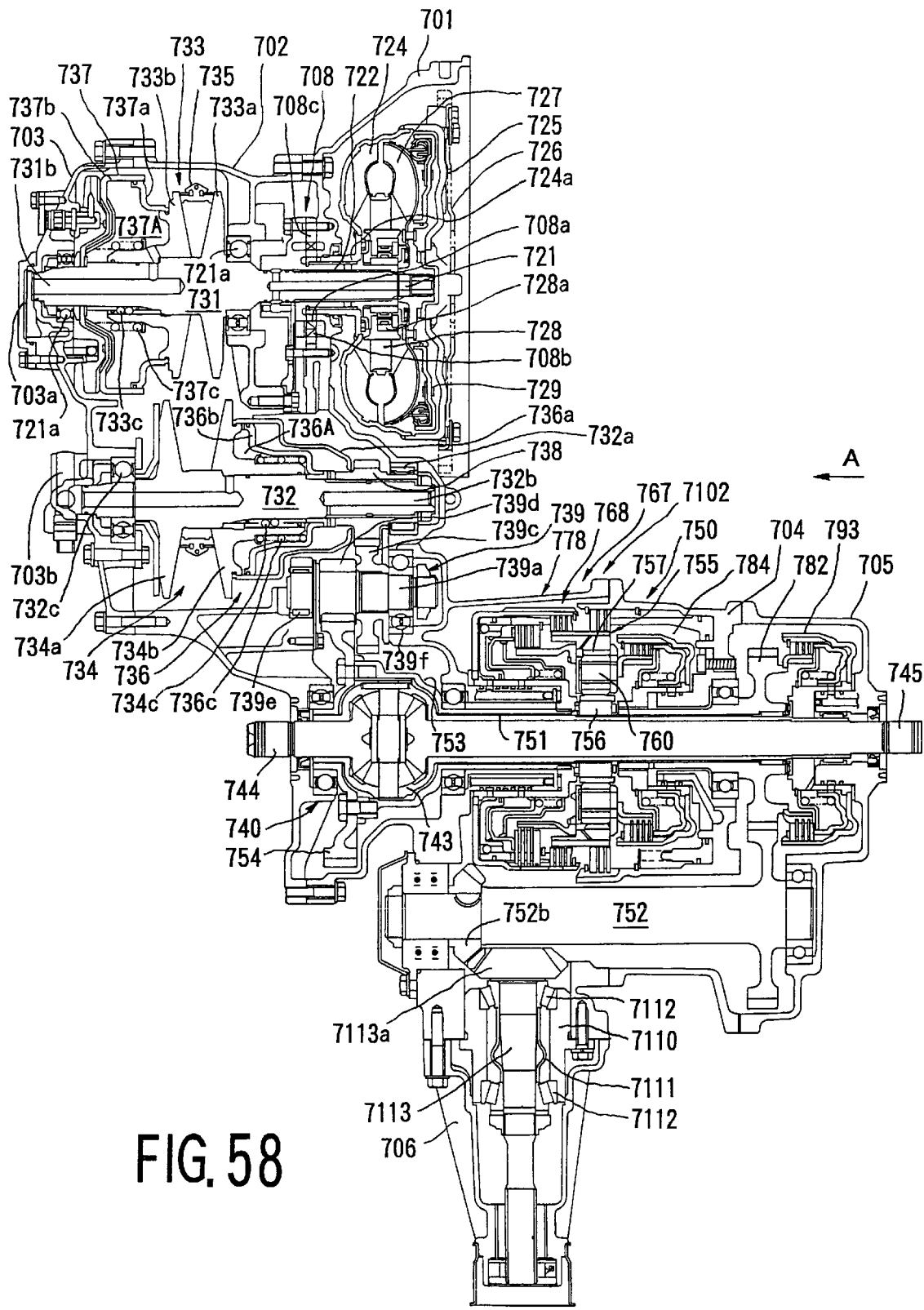
FIG. 58 is a sectional view of the automobile driving system of FIG. 57.

As shown in FIG. 58 in a sectional view, the torque converter 720 has the output shaft 721 supported for rotation in ball bearings 721*a* on the variable-speed transmission housing 702 and the side cover 703 coaxially with the crankshaft 711.

The output shaft 721 is surrounded so as to be rotatable by a stator shaft 722 having a substantially cylindrical outer circumference, and provided at its base end with a flange bolted to the variable-speed transmission case 701 through an oil pump housing 708*c*. The oil pump drive shaft 724*a* joined to an impeller 724 is fitted rotatably on the stator shaft 722.

The outer circumference of the impeller 724 is joined to the outer circumference of a front cover 725 and connected by a drive plate 726 to the crankshaft 711 so as to rotate together with the crankshaft 711.

A turbine 727 is disposed opposite to the impeller 724 and is coupled with the output shaft 721 by splines. A stator 728 is interposed between the impeller 724 and the turbine 727 and is supported on a one-way clutch 728*a* mounted on the stator shaft 722.

A lock-up clutch 729 is interposed between the turbine 727 and the front cover 725. The oil pump 708 comprising an inner gear 708*a* driven for rotation by the oil pump drive shaft 724*a*, an outer gear 708*b* engaged with the inner gear 708*a*, and an oil pump housing 708*c* is mounted on the base end of the stator shaft 722.

The rotation of the crankshaft 711 of the engine 710 is transmitted through the drive plate 726 bolted to the crankshaft 711, and the front cover 725 to the impeller 724 to drive the same for rotation.

As the impeller 724 rotates, the oil is discharged outside from the impeller 724 by centrifugal force, the oil flows into the turbine 727 to transmit a torque acting in the same direction as the rotating direction of the impeller 724 to the turbine 727, so that the output shaft 721 coupled by the splines with the turbine 727 is driven for rotation. The direction of flow of the oil flowing out from the turbine 727 is deflected by the stator 728 in a direction to assist the rotation of the impeller 724 to increase the torque of the impeller 724. If the turbine 727 rotates at a high rotating speed, the oil flows against the back surface of the stator 728 to make the stator 728 rotate freely on the one-way clutch 728*a*.

When a fixed traveling speed or rotating speed is achieved, the lock-up clutch 729 engages the impeller 724 and the turbine 727 through the front cover 725 to make the torque converter operate without slipping; consequently, the operating speed of the engine 710 is reduced accordingly, whereby fuel consumption is reduced and silence is improved.

The belt-drive variable-speed transmission 730 has a primary shaft 731, a secondary shaft 732 disposed in parallel to the primary shaft 731, a primary pulley 733 mounted on the primary shaft 731, a secondary pulley 734 mounted on the secondary shaft 732, and a drive belt 735 extended between the primary pulley 733 and the secondary pulley 734. The respective widths of the grooves of the primary pulley 733 and the secondary pulley 734 are varied to vary the ratio between the pitch diameters of the primary pulley 733 and the secondary pulley 734 for continuously variable speed change.

The primary pulley 733 mounted on the primary shaft 731 formed integrally with the output shaft 721 has a fixed cone 733*a* formed integrally with the primary shaft 731 and a movable cone 733*b* axially movable relative to the fixed cone 733*a*. The fixed cone 733*a* and the movable cone 733*b* must hold the drive belt 735 by a predetermined clamping force and the width of the groove defined by the fixed cone 733*a* and the movable cone 733*b* must be smoothly controllable to ensure the smooth operation of the transmission for continuously variable speed change. Therefore, a plurality of axial grooves are formed in the mating surfaces of the primary shaft 731 and the movable cone 733*b*, and balls 733*c* are placed in the mating grooves for torque transmission.

A substantially cylindrical first piston 737*a* is fixed to the back surface of the movable cone 733*b*, i.e., a surface not facing the fixed cone 733*a*, a pressure chamber 737A is formed by the first piston 737*a* and a cylinder 737*b* having the shape of a bottomed cylinder and having a central portion fixed to the primary shaft 731. The movable cone 733*b* is biased by a hydraulic actuator 737 including a spring 737*c* toward the fixed cone 733*a*.

An oil passage 731*b* is formed in the primary shaft 731 so as to be connected to the pressure chamber 737A. The hydraulic controller 709 executes a control operation on the basis of signals representing the opening of the throttle and such to supply the oil into and to discharge the same from the pressure chamber 637A of the hydraulic actuator 737 through an oil passage 703*a* formed in the side cover 703 to move the movable cone 733*b* along the primary shaft 731 to vary the width of the groove of the pulley.

The secondary shaft 732 extended in parallel to the primary shaft 731 is supported for rotation in a roller bearing 732*a* and a ball bearing 732*b* on the variable-speed transmission housing 702 and the side cover 703. The secondary pulley 734 mounted on the secondary shaft 732 has a fixed cone 734*a* formed integrally with the secondary shaft 732, and a movable cone 734*b* axially movable relative to the fixed cone 734*a*. A plurality of axial grooves are formed in the mating surfaces of the movable cone 734*b* and the secondary shaft 732, and balls 734*c* are placed in the mating axial grooves for torque transmission from the secondary pulley 734 to the secondary shaft 732.

A substantially cylindrical cylinder 736*a* is fixed to the back surface of the movable cone 734*b*, a pressure chamber 736A is defined by the cylinder 736*a* and a cylindrical piston 736*b* having a central portion fixed to the secondary shaft 732, and the movable cone 734*b* is biased toward the fixed cone 734*a* by a spring 736*c* included in a hydraulic actuator 736.

An oil passage 732b is formed in the secondary shaft 732 so as to be connected to the pressure chamber 736A. The hydraulic controller 709 executes a control operation on the basis of signals representing the opening of the throttle and such to supply the oil into and to discharge the same from the pressure chamber 736A of the hydraulic actuator 736 through an oil passage 703b formed in the side cover 703. A drive gear 738 is mounted on one end of the secondary shaft 732.

The pressure receiving area of the movable cone 733b of the primary pulley 733 is greater than that of the movable cone 734b of the secondary pulley 734. Therefore, when the oil is supplied into and discharged from the pressure chambers 737A and 736A, the mode of variation of the width of the groove of the primary pulley 733 and that of the width of the groove of the secondary pulley 734 are reverse to each other. Thus, the ratio between the pitch diameters of the primary pulley 733 and the secondary pulley 734 is varied continuously to vary the output rotating speed of the secondary shaft 732 continuously.

The rotation of the secondary shaft 732 is transmitted through the drive gear 738 to the countershaft assembly 739 at a reduced rotating speed. The rotation of the countershaft assembly 739 is transmitted through a driven gear 754 and a power transmission shaft 753 connected to the driven gear 754 to the transfer unit 750.

The countershaft assembly 739 comprises a shaft 739a supported at its opposite ends in a needle bearing 739e and a roller bearing 739f on the torque converter case 701 and the variable-speed transmission housing 702, a driven gear 739c of a relatively large diameter fixedly mounted on the shaft 739a for rotation together with the shaft 739a and engaged with the drive gear 738, and a drive gear 739d formed integrally with the shaft 739a and engaged with the driven gear 754.

Figure 59:
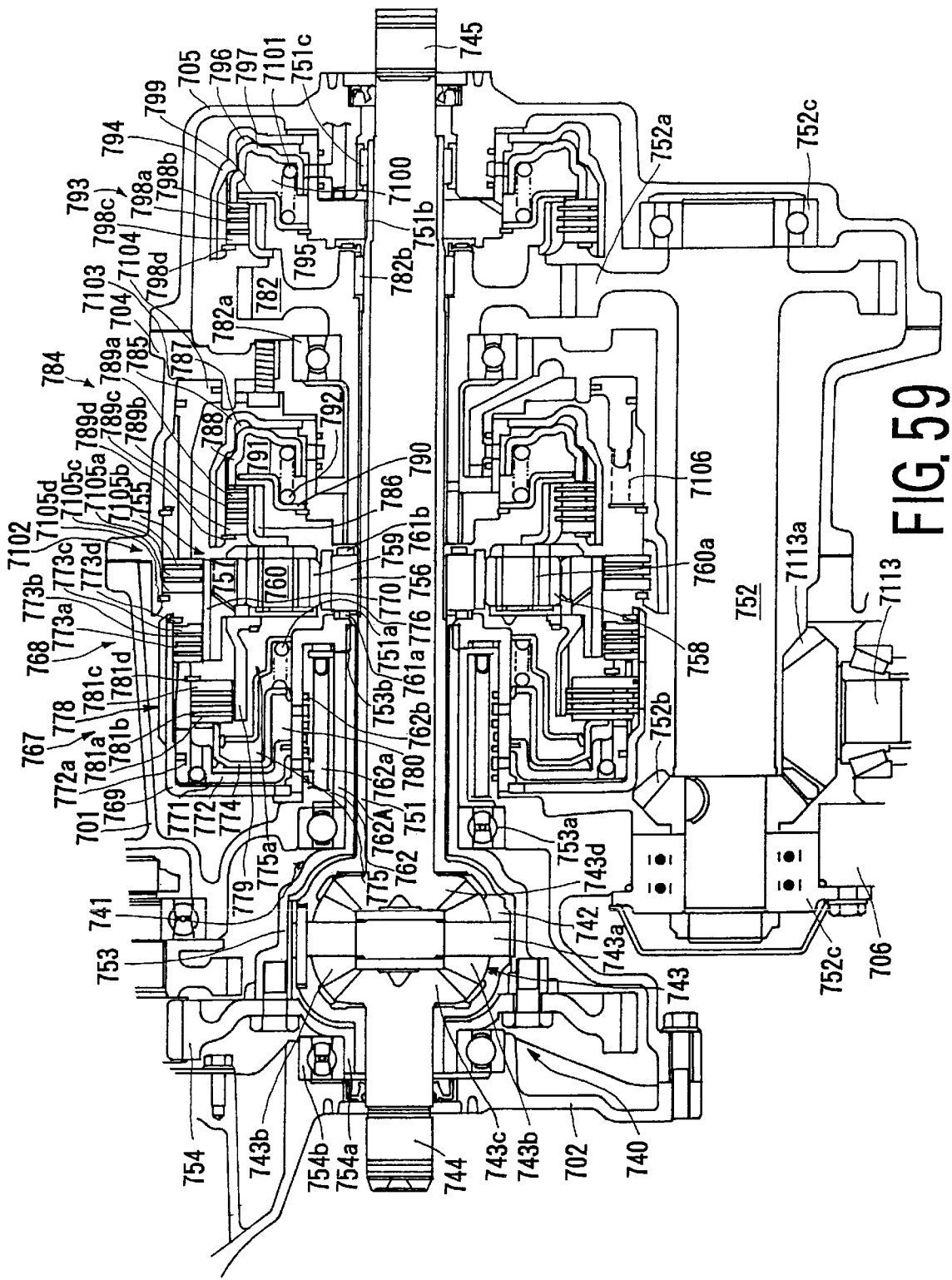
FIG. 59 is an enlarged view of a portion of the automobile driving system of FIG. 58.

The respective constructions of the front differential gear 740 and the transfer unit 750 will be described hereinafter with reference to FIG. 58 and FIG. 59 showing an essential portion of a construction shown in FIG. 58 in an enlarged view.

The front differential gear 740 is contained in a differential gear housing 741 formed between a driven gear 754 having a cylindrical boss 754a supported in a ball bearing 754b on the variable-speed transmission housing 702, and a substantially cylindrical transmission shaft 753 supported for rotation in a ball bearing 753a on the torque converter case 701.

The front differential gear 740 has a hollow, differential gear case 742 rotatably fitted in an expanded part formed of the substantially cylindrical boss 754a of the driven gear 754 formed integrally with a front drive shaft 751, and the transmission shaft 753. A pair of pinions 743b are disposed in the differential gear case 742 and supported on a pinion shaft 743a supported at opposite ends thereof on the differential gear case 742. A left side gear 743c and a right side gear 743d are engaged with the pair of pinions 743b to constitute a differential gear 743.

A drive shaft 744 connected to the side gear 743c extends through the differential gear case 742 and the variable-speed transmission housing 702, and transmits power through a constant-velocity joint and an axle to one of the front wheels. A drive shaft 745 connected to the other side gear 743d extends through the differential gear case 742 and the front drive shaft 751 formed integrally with the differential gear case 742, projects from the end cover 705 and transmits power through a constant-velocity joint and an axle to the other front wheel.

The transfer unit 750 has the front drive shaft 751, i.e., a first drive shaft, parallel to the crankshaft 711 of the engine 710, the output shaft 721, the primary shaft 731 and the secondary shaft 732, and a rear drive shaft 752, i.e., a second drive shaft.

Figure 60:
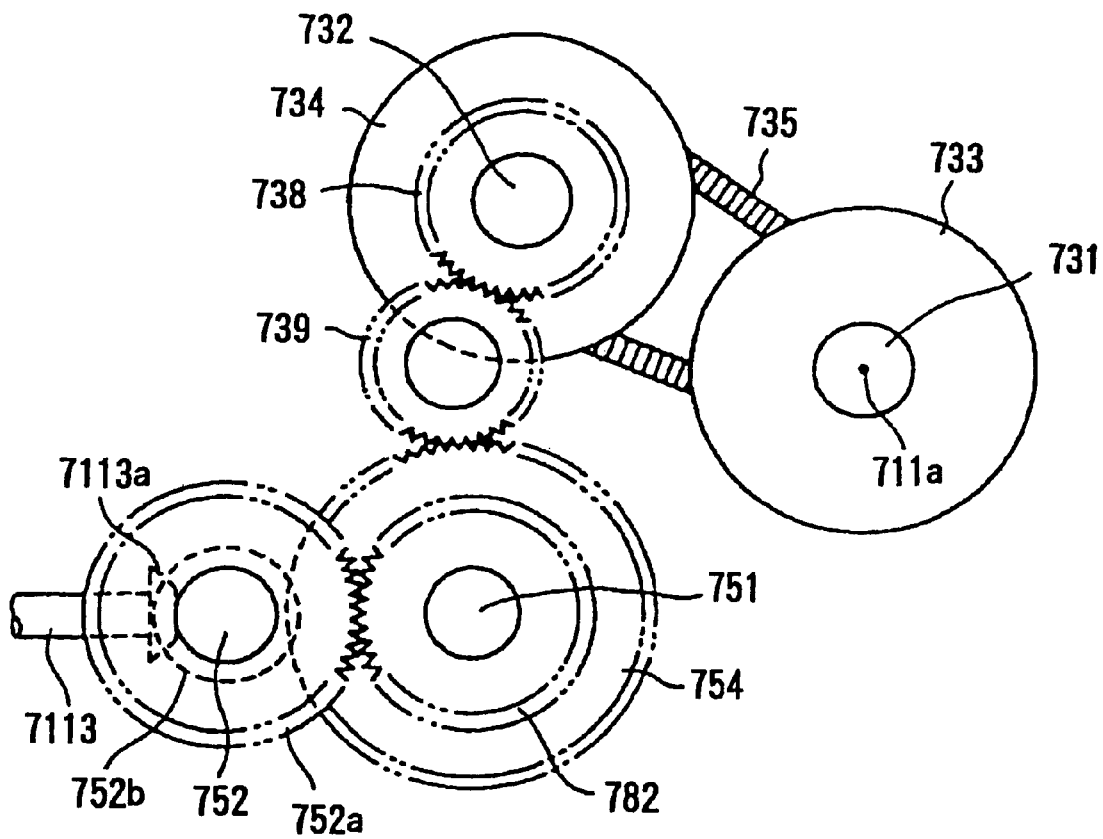
FIG. 60 is a front view taken in the direction of the arrow in FIG. 58.

The crankshaft 711, the primary shaft 731, the secondary shaft 732, the front drive shaft 751 and the rear drive shaft 752 extended in parallel to each other are arranged as shown in FIG. 60 in a view taken in the direction of the arrow A in FIG. 58; the crankshaft 711 having an axis 711a of rotation and the primary shaft 731 are extended coaxially along the width of the vehicle body, the secondary shaft 732 is disposed behind and in parallel to the primary shaft 731 on a level higher than that of the primary shaft 731, the front drive shaft 751 is disposed below the secondary shaft 732, and the rear drive shaft 752 is disposed behind the front drive shaft 751. Thus, the driving system is formed in a compact construction having relatively small transverse and longitudinal dimensions to facilitate the installation of the driving system in the engine room and to improve the compatibility of the driving system with both a vehicle body designed to be mounted with a manual transmission (MT) and a vehicle body designed to be mounted with an automatic transmission (AT).

The front drive shaft 751 formed integrally with the differential gear case 742 has one end rotatably supported through the transmission shaft 753 and the ball bearing 753a supporting the transmission shaft 753 on the torque converter case 701, and the other end rotatably supported in a needle bearing 751c on the end cover 705.

The front drive shaft 751 is provided in a middle portion thereof with splines 751a which engage with a sun gear 756 included in a double-pinion planetary gear 755, and splines 751b which engage with a clutch drum 794 included in a fourth multiple-disk clutch 793, i.e., a fourth friction coupling element.

A transfer driven gear 752a is mounted on one end of the rear drive shaft 752 disposed in parallel to the front drive shaft 751, and a bevel gear 752b, which engages with a bevel gear 7113a mounted on one end of an output shaft 7113, is mounted on the other end of the rear drive shaft 752. The rear drive shaft 752 is supported for rotation in a plurality of ball bearings 752c on the torque converter case 701 and the end cover 705 of the transmission case 707.

The double-pinion planetary gear 755 has the sun gear 756 engaged with the splines 751a formed in the middle portion of the front drive shaft 751, a ring gear 757, a first pinion 758 engaged with the sun gear 756, a second pinion 759 engaged with the ring gear 757 and the first pinion 758, and a carrier 760 supporting the first pinion 758 and the second pinion 759 for rotation thereon in needle bearings 760a. Power applied to the ring gear 757 is distributed to the sun gear 756 and the carrier 760 at a torque distribution ratio dependent on the dimensions of the sun gear 756 and the ring gear 757. When the ring gear 757 is fastened to the transmission case 707, the sun gear 756 is rotated in a direction opposite the rotating direction of the carrier 760.

The sun gear 756 is held between a thrust bearing 761a supported on the transmission shaft 753, and a thrust bearing 761b supported through a ball bearing 782a and a transfer drive gear 782 on the case 704 to restrain the axial movement of the double-pinion planetary gear 755.

The front drive shaft 751 is inserted in a substantially cylindrical fixed shaft 762 formed integrally with the torque converter case 701. A space between the inner circumference of the fixed shaft 762 and the front drive shaft 751 is closed by a clutch drum 769 included in a first multiple-disk clutch 768, i.e., a first friction coupling element, to form a pressure chamber 762A. The fixed shaft 762 is provided with an oil passage 762a connected to the pressure chamber 762A, and an oil passage 762b formed in its outer circumference.

An input selecting means 767 for selectively transmitting power from the transmission shaft 753 to the ring gear 757 or the carrier 760 is interposed between the transmission shaft 753 and the double-pinion planetary gear 755. The input selecting means 567 comprises the first multiple-disk clutch 768 and the second multiple-disk clutch 778, i.e., a second friction coupling element.

In the first multiple-disk clutch 768, a clutch drum 769 supported for rotation on the fixed shaft 762 is engaged with splines 753b formed in one end portion of the transmission shaft 753, and a clutch hub 770 is connected to the ring gear 757 of the double-pinion planetary gear 755. The first multiple-disk clutch 768 interlocks the transmission shaft 753 and the ring gear 757 for power transmission. A pressure is applied to a pressure chamber 771 to compress a retaining plate 773c contiguous with a snap ring 773d, driven plates 773b and drive plates 773a by a piston 772 to engage the first multiple-disk clutch 768 for power transmission. Indicated at 772a is a sealing member fitted on the piston 772 and capable of providing liquid-tight sealing between the piston 772 and the clutch drum 769 and of sliding along the clutch drum 769. A retainer 775a is disposed on one side of the piston 772 opposite the other side of the same on which the pressure chamber 771 is formed, and a pressure is exerted through a piston 774 on the piston 772 by a return spring 776.

In the second multiple-disk clutch 778, the clutch drum 769 of the first multiple-disk clutch 768 serves also as the clutch drum of the second multiple-disk clutch 778, and the clutch hub 779 is connected to the carrier 760 of the double-pinion planetary gear 755. The second multiple-disk clutch 778 interlocks the transmission shaft 753 and the carrier 760 for power transmission. A pressure is applied to a pressure chamber 780 to compress a retaining plate 781c contiguous with a snap ring 781d fixed to the piston 772, driven plates 781b and drive plates 781a coupled with the clutch hub 779 by the piston 772 to engage the second multiple-disk clutch 778 for power transmission. A centrifugal pressure generated in the pressure chamber 780 is counterbalanced with a pressure in a balancing pressure chamber 775. A pressure is exerted on the piston 774 by the return spring 776.

The transfer drive gear 782 is supported for rotation by a ball bearing 782a on the case 704 of the transmission case 707 and by a needle bearing 782b on the front drive shaft 751 on one side of the double-pinion planetary gear 755 opposite the other side of the same on which the input selecting means 767 is disposed. The transfer driven gear 752a mounted on the rear drive shaft 752 is engaged with the transfer drive gear 782 for power transmission.

A third multiple-disk clutch 784, i.e., a third friction coupling element for selectively transmitting power from the carrier 760 of the double-pinion planetary gear 755 to the transfer drive gear 782, is interposed between the double-pinion planetary gear 755 and the transfer drive gear 782.

The third multiple-disk clutch 784 has a drum 785 coupled with the transfer drive gear 782 by splines, and a clutch hub 786 connected to the carrier 760 of the double-pinion planetary gear 755. The third multiple-disk clutch 784 transmits power from the carrier 760 to the transfer drive gear 782. A pressure is applied to a pressure chamber 787 to compress a retaining plate 789c contiguous with a snap ring 789d fixed to the clutch drum 785, driven plates 789b and drive plates 789a coupled with the clutch hub 786 by a piston 788 to engage the third multiple-disk clutch 784 for power transmission. A retainer 790 is disposed on one side of the piston 788 opposite the other side of the same on which the pressure chamber 787 is formed to form a balancing pressure chamber 791 for counterbalancing a centrifugal pressure generated in the pressure chamber 787. A pressure is exerted on the piston 788 by a return spring 792.

The fourth multiple-disk clutch 793, i.e., a fourth coupling element for selectively interlocking the front drive shaft 751 and the transfer drive gear 782 for power transmission, is interposed between the rear end of the front drive shaft 751 and the transfer drive gear 782.

The fourth multiple-disk clutch 793 has a clutch drum 794 coupled with the front drive shaft 751 by the splines 751b formed on the front drive shaft 751, and a clutch hub 795 connected to the transfer derive gear 782 for power transmission. A pressure is applied to a pressure chamber 796 to compress a retaining plate 798c contiguous with a snap ring 798d fixed to the clutch drum 794, driven plates 798b and drive plates 798a coupled with the clutch hub 795 by a piston 797 to engage the fourth multiple-disk clutch 793 for power transmission. A retainer 799 is disposed so as to form a balancing pressure chamber 7100 for counterbalancing a centrifugal pressure generated in the pressure chamber 796. A pressure is exerted on the piston 797 by a return spring 7101.

A fifth multiple-disk clutch 7102, i.e., a fifth friction coupling element for selectively fastening the ring gear 757 to the case 704 of the transmission case 707, is interposed between the case 704 of the transmission case 707 and the ring gear 757 of the double-pinion planetary gear 755.

A pressure is applied to a pressure chamber 7103 to compress a retaining plate 7105c contiguous with a snap ring 7105d fixed to the case 704, driven plates 7105b and drive plates 7105a coupled with the clutch hub 770 connected to the ring gear 757 by a piston 7104 to engage the fifth multiple-disk clutch 7102 to fasten the ring gear 757 to the transmission case 707. A pressure is exerted on the piston 7104 by a return spring 7106.

An output shaft 7113 is supported in a pair of bearings 7112 spaced a predetermined distance apart by a spacer 7111 and supported on the extension case 706 by a retainer 7110 in the extension case 706 connected to the rear end of the torque converter case 701.

The bevel gear 7113a is mounted on the front end of the output shaft 7113 and is engaged with the bevel gear 752a mounted on the rear drive shaft 752. The rear end of the output shaft 7113 is connected through a universal coupling and a propeller shaft 7116 to the rear differential gear 7117 to transmit power to the rear differential gear 7117.

A control valve is disposed in the oil pan joined to a lower portion of the transmission case 707. The control valve is controlled by the hydraulic controller 709 on the basis of signals provided by the traveling speed sensor 709a, the throttle opening sensor 709b, the shift switch 709c, the front wheel speed sensor 709d, the rear wheel speed sensor 709e and the steering angle sensor 709f to supply the oil discharged from the oil pump selectively to the input selecting means 767, the respective pressure chambers 771, 780, 787, 796 and 7103 of the first multiple-disk clutch 768, the second multiple-disk clutch 778, the third multiple-disk clutch 784, the fourth multiple-disk clutch 793 and the fifth multiple-disk clutch 7102, and the variable-speed transmission 730.

The operation of the automobile driving system for a four-wheel drive vehicle thus constructed will be described with reference to FIGS. 61 to 64, and FIG. 56 tabulating the operating conditions of the first multiple-disk clutch 768, the second multiple-disk clutch 778, third multiple-disk clutch 784, the fourth multiple-disk clutch 793 and the fifth multiple-disk clutch 7102. In the table shown in FIG. 65, blank circles indicate that the corresponding multiple-disk clutches are engaged or operative, and parenthesized blank circles indicate that multiple-disk clutches are engaged or operative if necessary.

The power of the engine 710 is transmitted from the crankshaft 711 through the torque converter 720 to the primary shaft 731 of the variable-speed transmission 730. An input speed of the primary shaft 731 is converted continuously into an output speed of the secondary shaft 732 by the action of the primary pulley 733 and the secondary pulley 734 operatively connected by the drive belt 735. The output speed of the secondary shaft 732 is reduced by the action of the drive gear 738, the countershaft assembly 739 and the driven gear 754. and a reduced speed is transmitted through the clutch drum 769 to the first multiple-disk clutch 768 and the second multiple-disk clutch 778. The first multiple-disk clutch 768 and the second multiple-disk clutch 778 are disengaged and power is not transmitted beyond the first multiple-disk clutch 768 and the second multiple-disk clutch 778 when a neutral position N or a parking position P is selected.

Figure 61:
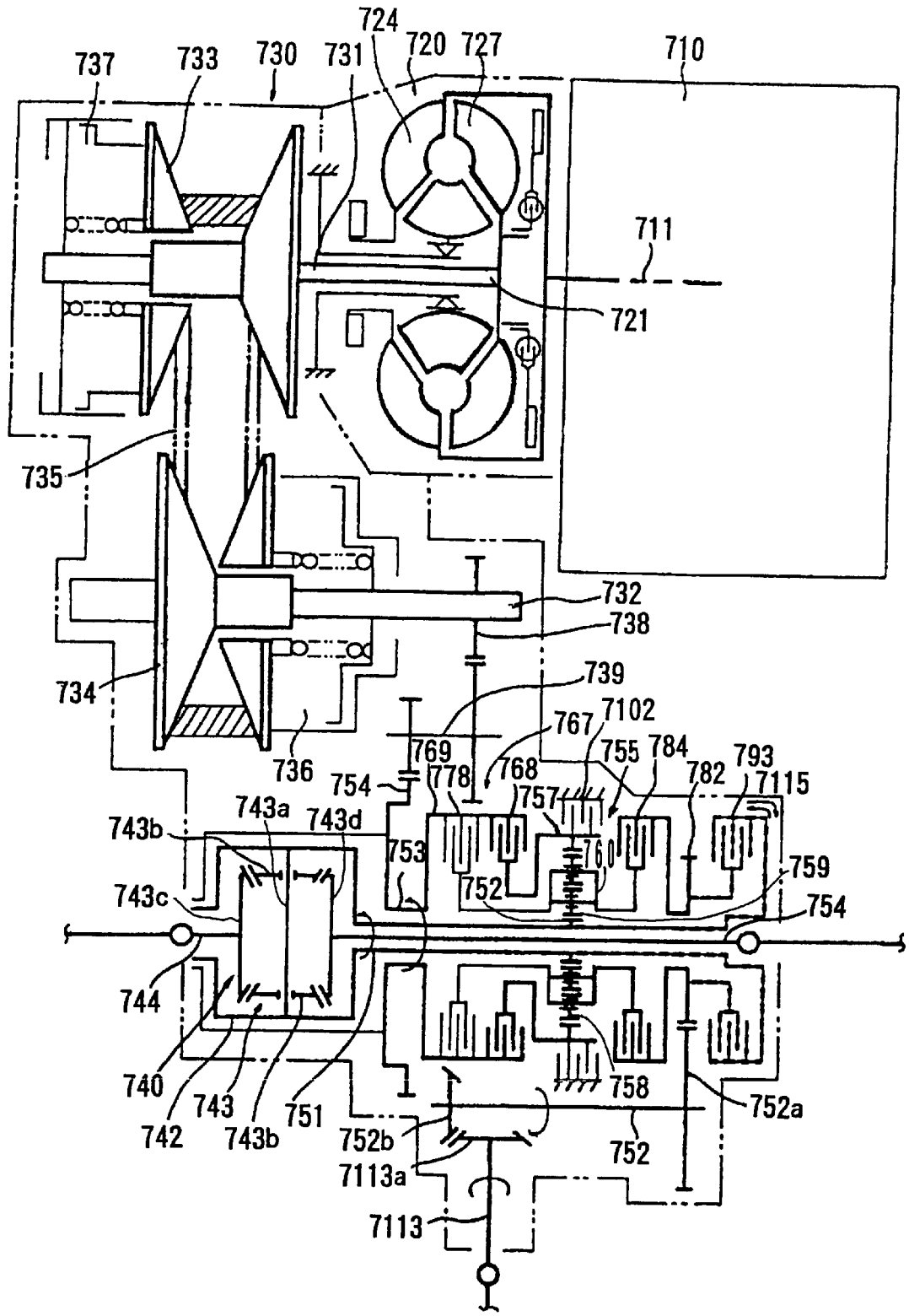
FIG. 61 is a schematic plan view of assistance in explaining the operation of the automobile driving system of FIG. 57.

When a drive range D, i.e., a forward range, is selected, the first multiple-disk clutch 768 and the third multiple-disk clutch 784 are engaged to transmit driving power through a drive line indicated by thick lines in FIG. 61. A pressure is applied through the control valve to the pressure chamber 771 to compress the retaining plate 773c contiguous with the snap ring 773d fixed to the inner circumference of the clutch drum 769, the driven plates 773b, and the drive plates 773a by the piston 772 so that the first multiple-disk clutch 768 is engaged. Consequently, power is transmitted from the transmission shaft 753 to the ring gear 757 of the double-pinion planetary gear 755. A pressure is applied also to the pressure chamber 787 to compress the retaining plate 789c, the snap ring 789d, the driven plate 789b and the drive plate 789a of the third multiple-disk clutch 784 by the piston 788 to engage the third multiple-disk clutch 784. Consequently, the carrier 760 of the double-pinion planetary gear 755 and the transfer drive gear 782 are interlocked for power transmission through the third multiple-disk clutch 784.

Figure 62:
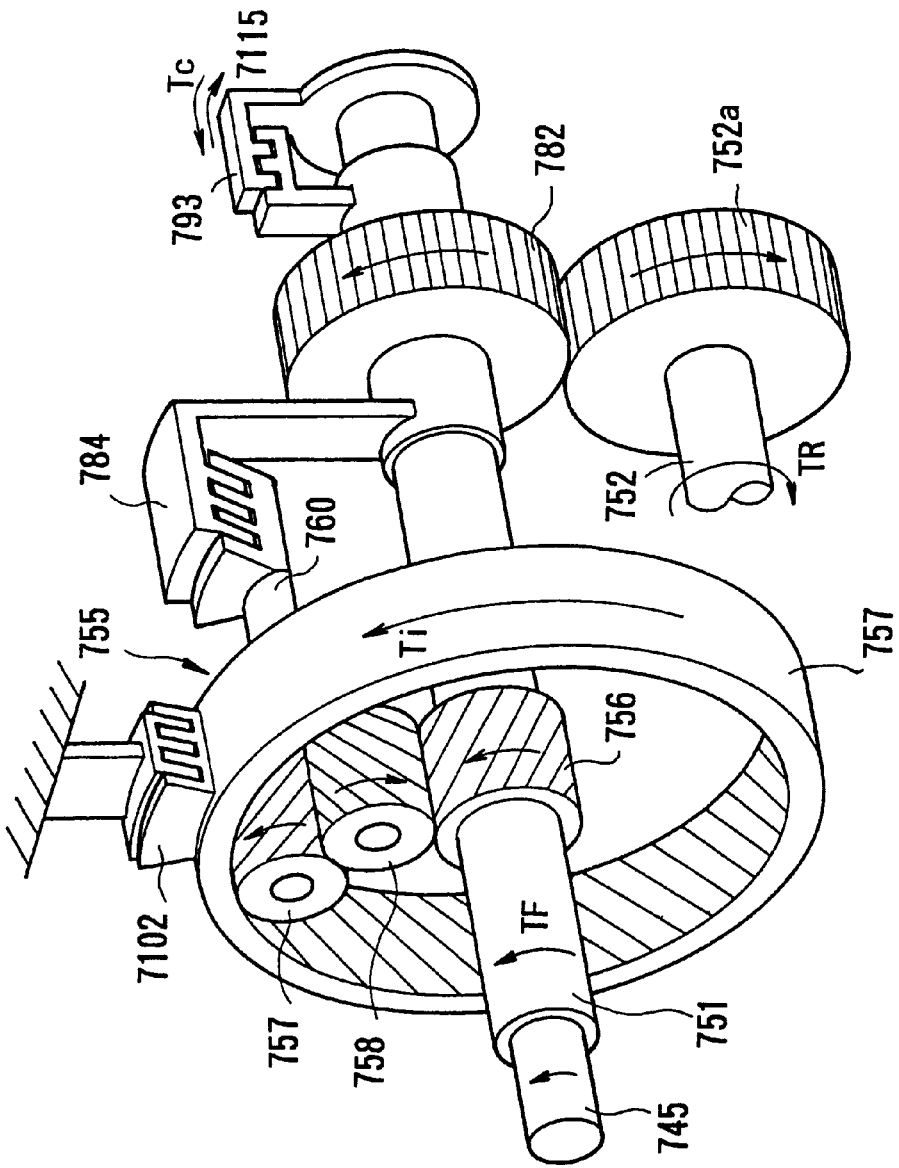
FIG. 62 is a schematic perspective view of assistance in explaining the operation of a double-pinion planetary gear.

Accordingly, in the double-pinion planetary gear 755 in which the ring gear 757, i.e., input member, and the first pinion 758 are engaged, and the second pinion 759 is engaged with the first pinion 758 and the sun gear 756 as shown in FIG. 62, the sun gear 756 and the carrier 760 are rotated for differential rotation in the same direction as the rotating direction of the ring gear 757, and torque is distributed at a predetermined distribution ratio to the sun gear 756 and the carrier 760. Thus the front drive shaft 751 coupled with the sun gear 756 by splines and the transfer drive gear 782 operatively connected to the carrier 760 are rotated in the rotating direction of the ring gear 757, and the transfer drive gear 752a engaged with the transfer drive gear 782 is rotated to drive the rear drive shaft 752 for rotation in a direction opposite the rotating direction of the ring gear 757. During torque transmission, the double-pinion planetary gear 755 serves as a center differential gear in which the first pinion 758 and the second pinion 759 rotate and revolve round the sun gear 756 to absorb the difference in rotating speed between the sun gear 756 and the carrier 760.

The torque distributing function of the double-pinion planetary gear 755 will be described with reference FIG. 62.

The relation between torque distribution and the numbers of teeth of the ring gear 757 and the sun gear 756 is expressed by:

$Ti = TF + TR$ $TF:TR = ZS:$

Then $TF:TR \approx 45:55$ where Ti is input torque applied to the ring gear 757, TF is the torque of the sun gear 756 to be transmitted to the front wheels, TR is the torque of the carrier 760 to be transmitted to the rear wheels, ZS is the number of teeth of the sun gear 756 and ZR is the number of teeth of the ring gear 757. Accordingly, an optional reference torque distribution ratio TF/TR can be provided by properly determining ZS of the sun gear 756 and ZR of the ring gear 757.

If $ZS = 37$ and $ZR = 82$, $TF:TR = 37:(82-37)$ $(45:55$ which signifies that about 45% and about 55% of the input torque applied to the ring gear 757 of the double-pinion planetary gear 755 are distributed to the front wheels and the rear wheels, respectively. Thus, a rear-biased reference torque distribution mode, i.e., a torque distribution mode in which a major part of the input torque is distributed to the rear wheels, can be established.

A pressure is applied to the pressure chamber 796 of the fourth multiple-disk clutch 793 to compress the snap ring 798d, the retaining plate 798c, the driven plate 798b and the drive plat 798a by the piston 797 to produce clutch torque Tc. The hydraulic controller 709 controls the control valve to vary the clutch torque Tc.

Front wheel speed NF and rear wheel speed NR measured by the front wheel speed sensor 709d and the rear wheel speed sensor 709e are given to the hydraulic controller 709. The rear wheels always starts slipping first if the vehicle is traveling on a slippery road in the rear-biased reference torque distribution mode, i.e., in a mode in which TF<TR. Therefore, slip S is defined by S=NF/NR (S>0). A clutch pressure Pc corresponding to a slip S and a steering angle Ψ given to the hydraulic controller 709 from the steering angle sensor 709f is retrieved from a map stored in the hydraulic controller 709. If the rear wheels are not slipping and S≧1, the clutch pressure Pc is relatively low. If the rear wheels are slipping and S<1, the clutch pressure Pc is increased as the slip S decreases, and the clutch pressure Pc is set to Pmax when the slip S is not greater than a predetermined threshold slip S1. The line pressure is adjusted to the clutch pressure Pc for the variable control of the clutch torque Tc of the fourth multiple-disk clutch 793.

Thus, a bypass drive line 7115 is formed by engaging the fourth multiple-disk clutch 793. The bypass drive line 7115 extends from the front drive shaft 751 through the transfer drive gear 782 to the sun gear 756. The bypass drive line 7115 exercises a differential function to meet (rear wheel speed NR)>(rotating speed of the ring gear 757)>(front wheel speed NF) in the transfer unit 750 if the rear wheels slip, and the torque transmitted through the fourth multiple-disk clutch 793 to the front drive shaft 751 is increased by the clutch torque Tc, and the torque transmitted through the transfer driven gear 752a engaged with the transfer drive gear 782 to the rear drive shaft 752 is reduced by the clutch torque Tc distributed to the front wheels. Consequently, $$TF=0.45Ti+Tc$$

$$TR=0.55Ti-Tc$$

Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the rear wheels are slipping and the clutch torque Tc is generated, more part of the input torque Ti is distributed to the front wheels through the bypass drive line 7115 shown in FIG. 62 if the clutch torque Tc is greater, and the torque distribution ratio TF:TR changes to TF1:TR1 as shown in FIG. 45 so that the torque distributed to the front wheels is increased positively and the torque distributed to the rear wheels is decreased. Consequently, the slip of the rear wheels is decreased and the traction of the vehicle is improved. When the slip S is decreased below the predetermined threshold slip, the pressure of the oil supplied to the fourth multiple-disk clutch 793 increases, differential limiting torque increases to a maximum, and the sun gear 756 and the carrier 760 are connected directly. Consequently, the differential motion of the transfer unit 750 is locked and a direct four-wheel-drive mode in which the torque is distributed at a torque distribution ratio corresponding to front-rear axle weight distribution ratio is established, whereby the traction of the vehicle is enhanced to a maximum.

If the front wheels slip, the differential function of the transfer unit 750 meets a condition: (rear wheel speed NR)<(rotating speed of the ring gear 757)<(front wheel speed NF), a torque is transmitted from the front drive shaft 751 to the transfer drive gear 782 according to the clutch torque Tc, and the torque transmitted from the front drive shaft 751 to the front wheels is reduced by the clutch torque Tc distributed to the rear wheels. Consequently, $$TF=0.45Ti-Tc$$

$$TR=0.55Ti+Tc$$

Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the front wheels are slipping and the clutch torque Tc is generated, the input torque Ti is distributed to the rear wheels according to the clutch torque Tc to increase the torque distributed to the rear wheels positively and to reduce the torque distributed to the front wheels, so that the traction of the vehicle is improved. If the slip S is decreased below the predetermined threshold slip, the pressure of the oil supplied to the fourth multiple-disk clutch 793 increases, differential limiting torque increases to a maximum, and the sun gear 756 and the carrier 760 are connected directly. Consequently, a direct four-wheel-drive mode in which the torque is distributed at a torque distribution ratio corresponding to front-rear axle weight distribution ratio is established, whereby the traction of the vehicle is fully enhanced. Thus, the torques distributed to the front and the rear wheels are controlled in a wide range according to the mode of slip to avoid the reduction of traction.

If the vehicle turns during the torque distribution control for suppressing slip, the differential limiting torque of the fourth multiple-disk clutch 793 is reduced for correction according to the steering angle Ψ. Consequently, the differential limiting effect of the transfer unit 750 is reduced and the difference in rotating speed can be satisfactorily absorbed, so that tight corner braking is avoided and satisfactory controllability can be secured.

Figure 63:
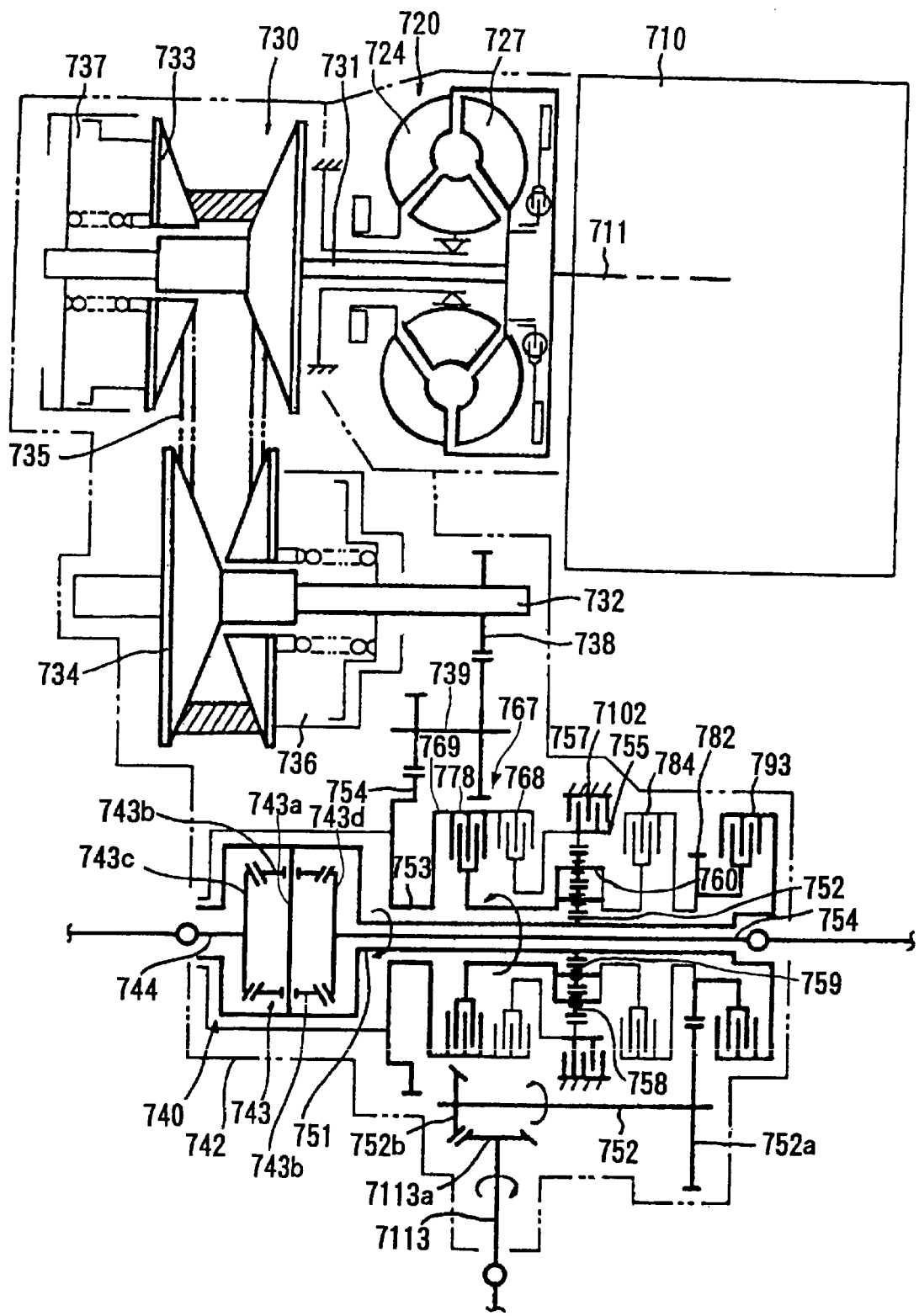
FIG. 63 is a schematic plan view of assistance in explaining the operation of the automobile driving system of FIG. 57.

When a reverse range R is selected, the first multiple-disk clutch 768 and the third multiple-disk clutch 784 are disengaged and the second multiple-disk clutch 778, the fourth multiple-disk clutch 793 and the fifth multiple-disk clutch 7102 are engaged to transmit power through a drive line indicated by thick lines in FIG. 63. A pressure is applied through the control valve to the pressure chamber 780 to compress the snap ring 781*d*, the retaining plate 781*c*, the drive plates 781*a* and the driven plates 781*b* by the piston 774 to engage the second multiple-disk clutch 778 to interlock the transmission shaft 753 and the carrier 760 of the double-pinion planetary gear 755 for power transmission. A pressure is applied to the pressure chamber 7103 to compress the snap ring 7105*d*, the retaining plate 7105*c*, the drive plates 7105*a* and the driven plates 7105*b* by the piston 7104 to engage the fifth multiple-disk clutch 7102, whereby the ring gear 757 is fastened to the transmission case 707. The snap ring 798*d*, the retaining plate 798*c*, the drive plates 798*a* and the driven plates 798*b* are compressed by the piston 797 to engage the fourth multiple-disk clutch 793, so that power is transmitted from the front drive shaft 751 to the transfer drive gear 782.

Figure 64:
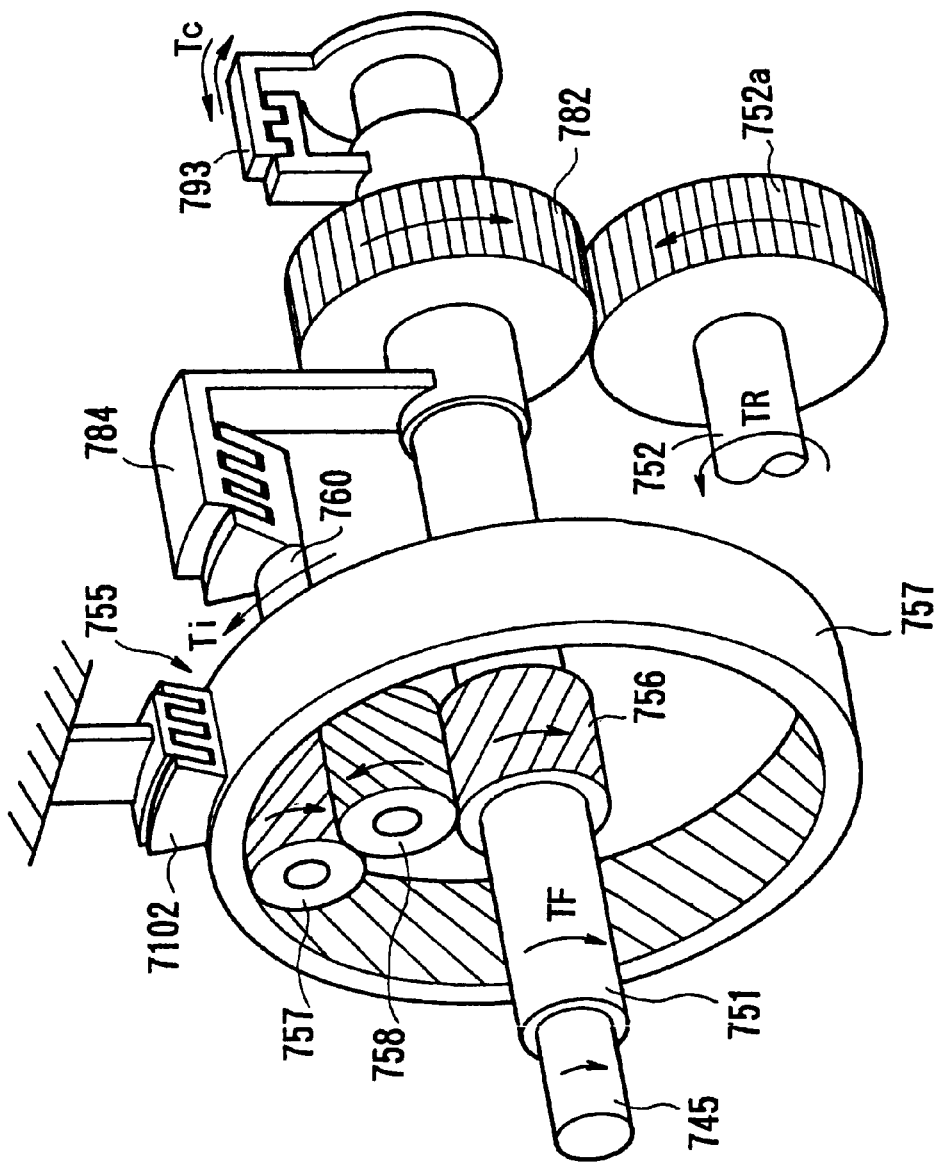
FIG. 64 is a schematic perspective view of assistance in explaining the operation of a double-pinion planetary gear.

Consequently, as shown in FIG. 64, the first pinion 758 and the second pinion 759 are rotated in the opposite directions, respectively, by the carrier 760 and revolve along the ring gear 757 to rotate the sun gear 756 in a direction opposite the rotating direction of the carrier 760. Consequently, the front drive shaft 751 is driven for rotation in the reverse direction, power is transmitted from the front drive shaft 751 through the fourth multiple-disk clutch 793 to the transfer drive gear 782 to drive the rear drive shaft 752 for rotation in a direction opposite the rotating direction of the front drive shaft 751.

Therefore, the power transmitted to the transmission shaft 753 is transmitted in a direction opposite a direction in which power is transmitted when the drive range D is selected to the front drive shaft 751 and the rear drive shaft 752 when the ring gear 757 of the double-pinion planetary gear 755 is fastened to the transmission case 707 by the fifth multiple-disk clutch 7102. Thus, the double-pinion planetary gear 755 is capable of a forward/reverse selecting function.

In this case, power is transmitted from the carrier 760 to the front drive shaft 751 and the rear drive shaft 752 at a gear ratio expressed by:

$$\text{Gear ratio}=[ZS+(-ZR)]/ZS$$

If ZS=37 and ZR=82, $$\text{Gear ratio}=[37+(-82)]/37=-1.216$$

which is an appropriate gear ratio for the reverse range R.

The input torque Ti applied to the carrier 760 is transmitted to the transfer drive gear 782 according to the clutch torque Tc, and the rest of the input torque Ti is transmitted to the front wheels.

$$Ti=TF+TR$$

$TF=Ti-Tc$ $TR=Tc$

Therefore, the traction of the vehicle is improved by reducing the clutch torque Tc so that part of the input torque Ti distributed to the front wheels is increased positively and the torque distributed to the rear wheels is decreased when the rear wheels slip in order that the slip is suppressed and satisfactory traction can be secured. When the front wheels slip, the clutch torque Tc is increased to distribute more part of the input torque Ti to the rear wheels to increase the torque of the rear wheels positively and the torque distributed to the front wheels is reduced to suppress slip and to improve traction. If the slip S is decreased blow the predetermined threshold slip, the pressure of the oil supplied to the fourth multiple-disk clutch 793 is increased to a maximum and the differential limiting torque Tc is increased to a maximum to connect the front drive shaft 751 and the transfer drive gear 782 directly to establish a direct four-wheel-drive mode in which the torque is distributed at a torque distribution ratio corresponding to front-rear axle weight distribution ratio, whereby the traction of the vehicle is fully enhanced. If the vehicle turns during the torque distribution control for suppressing slip, the differential limiting torque of the fourth multiple-disk clutch 793 is reduced according to the steering angle $\Psi$. Consequently, the difference in rotating speed can be satisfactorily absorbed, so that tight corner braking is avoided and satisfactory controllability can be secured.

In the seventh embodiment, the front drive shaft 751 and the rear drive shaft 752 for transmitting power to the front differential gear 740 connected to the output side of the belt-drive variable-speed transmission 730 and the rear differential gear 7117, respectively, are disposed in parallel to the crankshaft 711 of the transverse engine 710, the double-pinion planetary gear 755 is mounted on the front drive shaft 751 with its sun gear 756 coupled with the front drive shaft 751, the first multiple-disk clutch 768 is capable of transmitting the output of the variable-speed transmission 730 to the ring gear 757, the second multiple-disk clutch 778 is capable of transmitting the output of the variable-speed transmission 730 to the carrier 760, the third multiple-disk clutch 784 is capable of interlocking the carrier 760 and the transfer drive gear 782 for power transmission, the fourth multiple-disk clutch 793 is capable of connecting the front drive shaft 751 and the rear drive shaft 752 for power transmission, the fifth multiple-disk clutch 7102 is capable of restraining the ring gear 757 from rotation, and the multiple-disk clutches 768, 778, 784, 793 and 7102 are controlled selectively so that the automobile driving system exercises the functions of a center differential gear to distribute torques properly to the front drive shaft 751 and the rear drive shaft 752 and to achieve a differential limiting operation so that the vehicle is able to travel satisfactorily when the drive range D, i.e., the forward range, or the reverse range R is selected and exercises the functions of a forward/reverse selecting mechanism when the drive range D or the reverse range R is selected.

Whereas the conventional automobile driving system needs special double-pinion planetary gears respectively for a center differential gear and a forward/reverse selecting mechanism, the automobile driving system in the seventh embodiment according to the present invention needs a single double-pinion planetary gear for both the functions of the center differential gear and those of the forward/reverse selecting mechanism. Therefore, the automobile driving system in the seventh embodiment according to the present invention exercises high performance, has a simple, compact, lightweight construction having a small overall length along the width of the vehicle body, simplifies control operations, and can be manufactured at a low manufacturing cost. Accordingly, the automobile driving system can be installed on a vehicle body with a sufficiently large space secured between the side walls of the engine room and the opposite ends thereof, so that a sufficient crush stroke necessary for protecting the passenger in the case of lateral collision can be secured, and a sufficiently large space is available for work for installing the transmission in and removing the same from the engine room. Furthermore, the degree of freedom of vehicle body design is increased.

An electromagnetic clutch or a wet clutch may be employed instead of the torque converter 720. If an electromagnetic clutch or a wet clutch is employed instead of the torque converter 720, the transmission of power to the primary shaft 731 of the belt-drive variable-speed transmission 730 and beyond the belt-drive variable-speed transmission 730 can be intercepted when the neutral position N or the parking position P is selected.

It is known from the comparative examination of the automobile driving system 700 in the seventh embodiment for a four-wheel drive vehicle and the automobile driving system 300 in the third embodiment for a two-wheel drive vehicle that the torque converter, the belt-drive variable-speed transmission, the front differential gear, the first, the second and the fifth case forming the transmission case containing the torque converter and the belt-drive variable-speed transmission, and the principal components of the transfer unit including the front drive shaft, the double-pinion planetary gear, the fixed shaft, and the first and the second multiple-disk clutch are common to the automobile driving system 700 in the seventh embodiment for a four-wheel drive vehicle and the automobile driving system 300 in the third embodiment for a two-wheel drive vehicle.

Therefore, the principal portions of the automobile driving system for a four-wheel drive vehicle can be constructed relatively easily at a reduced manufacturing cost by additionally incorporating the power transmitting mechanism for transmitting power to the rear differential gear including the third, the fourth and the fifth clutch, the transfer drive gear and the rear drive shaft into the automobile driving system 300 in the third embodiment for a two-wheel drive vehicle.

Eighth Embodiment

A driving system 800 in an eighth embodiment according to the present invention for a four-wheel drive vehicle will be described hereinafter with reference to FIGS. 66 to 73.

Figure 66:
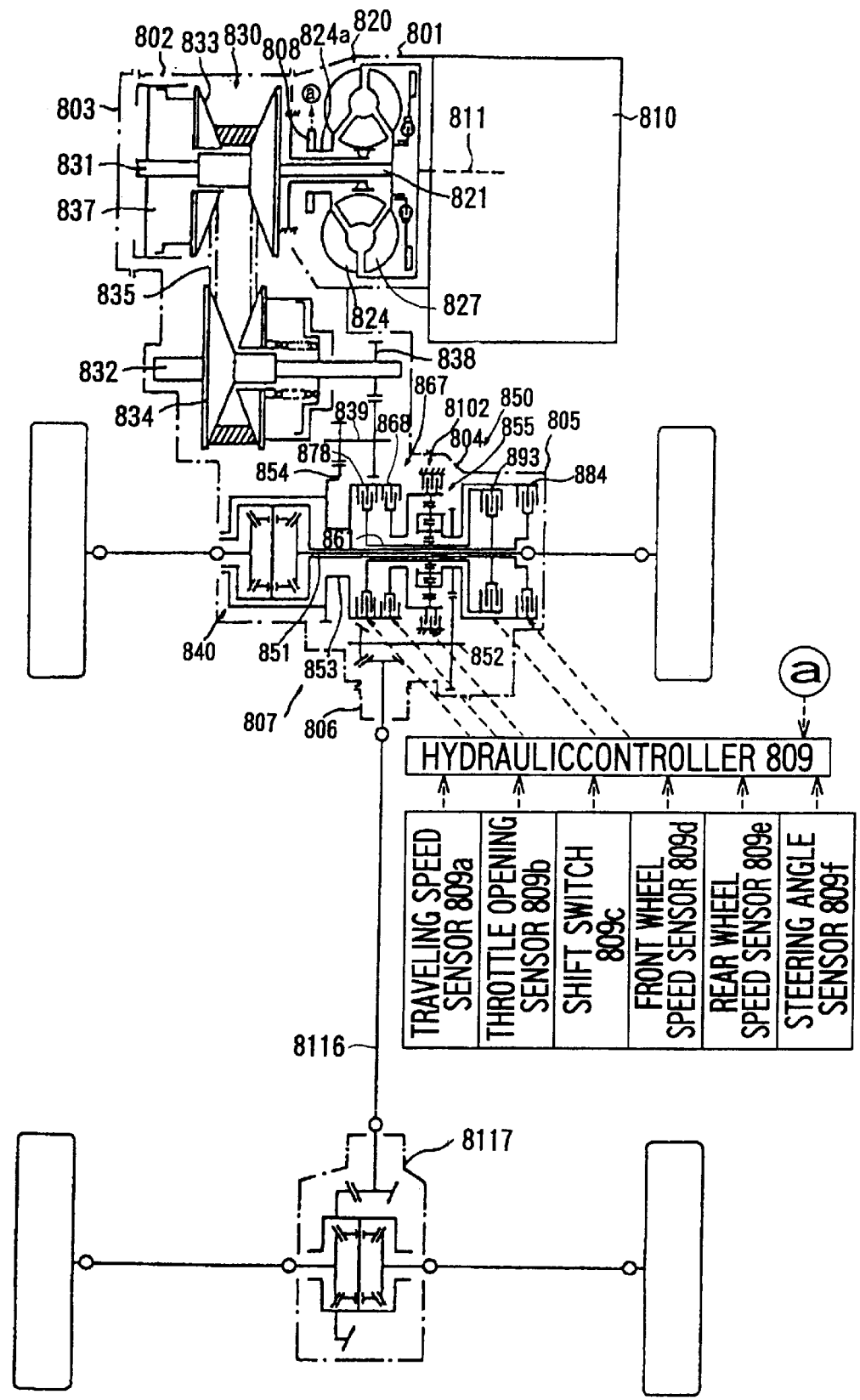
FIG. 66 is a typical view of an automobile driving system in an eighth embodiment according to the present invention.

Referring to FIG. 66, in the automobile driving system 700 in the eighth embodiment for a four-wheel drive vehicle, a torque converter case 801 joined to a transverse engine 810 to contain a torque converter 820, a variable-speed transmission housing 802 and a case 803 disposed beside the torque converter case 801 and containing a belt-drive variable-speed transmission 830 and a front differential gear 840, a case 804 and an end cover 805 combined with the torque converter case 801 to contain a transfer unit 850, an extension case 806 disposed behind the torque converter case 801 to contain a power transmitting mechanism for transmitting the output of the transfer unit 850 to rear wheels are arranged and joined successively in that order to construct a transmission case 807. An oil pan, not shown, is attached to a lower portion of the transmission case 807.

The transverse engine 810 has a crankshaft 811 connected to the torque converter 820 contained in the torque converter case 801. An output shaft 821 associated with the torque converter 820 is coupled with a primary shaft 831 included in the belt-drive variable-speed transmission 830 contained in the variable-speed transmission case 802 to transmit power from the crankshaft 811 through the torque converter 820 to the primary shaft 831 of the variable-speed transmission 830.

The variable-speed transmission 830 converts an input rotating speed to an output rotating speed of a secondary shaft 832. Power is transmitted from the secondary shaft 832 through a countershaft assembly 839 to the transfer unit 850. The transfer unit 850 transfers power through the front differential gear 840 to front wheels and through a propeller shaft 8116 and a rear differential gear 8117 to rear wheels.

An oil pump 808 which is driven continuously by an oil pump drive shaft 824a included in the torque converter 820 is contained in the transmission case 807. The oil pump 788 discharges oil at a line pressure continuously to supply the oil to the torque converter 820 and associated parts, enables the hydraulic control of the variable-speed transmission 830, and enables the hydraulic control of the transfer unit 850 by a hydraulic controller 809 on the basis of signals provided by a traveling speed sensor 809a, a throttle opening sensor 809b, a shift switch 809c, a front wheel speed sensor 809d, a rear wheel speed sensor 809e and a steering angle sensor 809f.

The torque converter 820, the belt-type variable-speed transmission 830, the front differential gear 840 and the transfer unit 850 will be successively described with reference to FIGS. 67 and 68.

Figure 67:
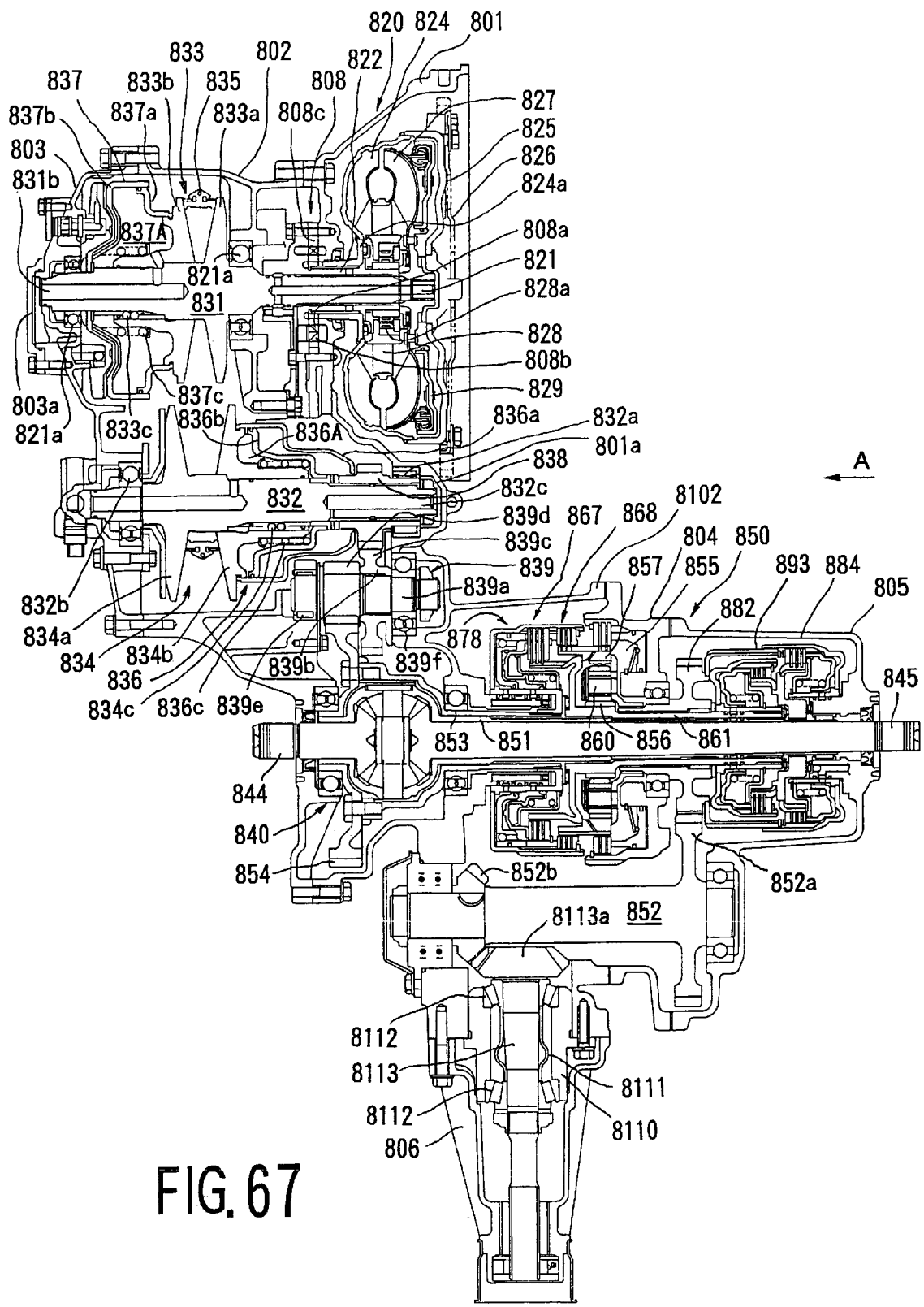
FIG. 67 is a sectional view of the automobile driving system of FIG. 66.

As shown in FIG. 67, the torque converter 820 has the output shaft 821 supported for rotation in ball bearings 821a on the variable-speed transmission housing 802 and the side cover 803 coaxially with the crankshaft 811.

The output shaft 821 is surrounded so as to be rotatable by a stator shaft 822 having a substantially cylindrical outer circumference, and provided at its base end with a flange bolted to the variable-speed transmission case 801 through an oil pump housing 808c. The oil pump drive shaft 824a joined to an impeller 824 is fitted rotatably on the stator shaft 822.

The outer circumference of the impeller 824 is joined to the outer circumference of a front cover 825 and connected by a drive plate 826 to the crankshaft 811 so as to rotate together with the crankshaft 811.

A turbine 827 is disposed opposite to the impeller 824 and is coupled with the output shaft 821 by splines. A stator 828 is interposed between the impeller 824 and the turbine 827 and is supported on a one-way clutch 828a mounted on the stator shaft 822.

A lock-up clutch 829 is interposed between the turbine 827 and the front cover 825. The oil pump 808 comprising an inner gear 808a driven for rotation by the oil pump drive shaft 824a, an outer gear 808b engaged with the inner gear 808a, and an oil pump housing 808c is mounted on the base end of the stator shaft 822.

The rotation of the crankshaft 811 of the engine 810 is transmitted through the drive plate 826 connected to the crankshaft 811, and the front cover 825 to the impeller 824 to drive the same for rotation.

As the impeller 824 rotates, the oil is discharged outside from the impeller 824 by centrifugal force, the oil flows into the turbine 827 to transmit a torque acting in the same direction as the rotating direction of the impeller 824 to the turbine 827, so that the output shaft 821 coupled by the splines with the turbine 827 is driven for rotation. The direction of flow of the oil flowing out from the turbine 827 is deflected by the stator 828 in a direction to assist the rotation of the impeller 824 to increase the torque of the impeller 824. If the turbine 827 rotates at a high rotating speed, the oil flows against the back surface of the stator 828 to make the stator 828 rotate freely on the one-way clutch 828a.

When a fixed traveling speed or rotating speed is achieved, the lock-up clutch 829 engages the impeller 824 and the turbine 827 through the front cover 825 to make the torque converter operate without slipping; consequently, the operating speed of the engine 810 is reduced accordingly, whereby fuel consumption is reduced and silence is improved.

The belt-drive variable-speed transmission 830 has a primary shaft 831, a secondary shaft 832 disposed in parallel to the primary shaft 831, a primary pulley 833 mounted on the primary shaft 831, a secondary pulley 834 mounted on the secondary shaft 832, and a drive belt 835 extended between the primary pulley 833 and the secondary pulley 834. The respective widths of the grooves of the primary pulley 833 and the secondary pulley 834 are varied to vary the ratio between the pitch diameters of the primary pulley 833 and the secondary pulley 834 for continuously variable speed change.

The primary pulley 833 mounted on the primary shaft 831 formed integrally with the output shaft 821 has a fixed cone 833a formed integrally with the primary shaft 831 and a movable cone 833b axially movable relative to the fixed cone 833a. The fixed cone 833a and the movable cone 833b must hold the drive belt 835 by a predetermined clamping force and the width of the groove defined by the fixed cone 833a and the movable cone 833b must be smoothly controllable to ensure the smooth operation of the transmission for continuously variable speed change. Therefore, a plurality of axial grooves are formed in the mating surfaces of the primary shaft 831 and the movable cone 833b, and balls 833c are placed in the mating grooves for torque transmission.

A substantially cylindrical piston 837a is fixed to the back surface of the movable cone 833b, i.e., a surface not facing the fixed cone 833a, a pressure chamber 837A is formed by the first piston 837a and a cylinder 837b having the shape of a bottomed cylinder and having a central portion fixed to the primary shaft 831. The movable cone 833b is biased by a spring 837c included in a hydraulic actuator 837 toward the fixed cone 833a.

An oil passage 831b is formed in the primary shaft 831 so as to be connected to the pressure chamber 837A. The hydraulic controller 809 executes a control operation on the basis of signals representing the opening of the throttle and such to supply the oil into and to discharge the same from the pressure chamber 837A of the hydraulic actuator 837 through an oil passage 803a formed in the side cover 803 to move the movable cone 833b along the primary shaft 831 to vary the width of the groove of the pulley.

The secondary shaft 832 extended in parallel to the primary shaft 831 is supported for rotation in a roller bearing 832a and a ball bearing 832b on the variable-speed transmission housing 802 and the side cover 803. The secondary pulley 834 mounted on the secondary shaft 832 has a fixed cone 834a formed integrally with the secondary shaft 832, and a movable cone 834b axially movable relative to the fixed cone 834a. A plurality of axial grooves are formed in the mating surfaces of the movable cone 834b and the secondary shaft 832, and balls 834c are placed in the mating axial grooves for torque transmission from the secondary pulley 834 to the secondary shaft 832.

A substantially cylindrical cylinder 836a is fixed to the back surface of the movable cone 834b, a pressure chamber 836A is defined by the cylinder 836a and a cylindrical piston 836b having a central portion fixed to the secondary shaft 832, and the movable cone 834b is biased toward the fixed cone 834a by a spring 836c included in a hydraulic actuator 836.

An oil passage 832b is formed in the secondary shaft 832 so as to be connected to the pressure chamber 836A. The hydraulic controller 809 executes a control operation on the basis of signals representing the opening of the throttle and such to supply the oil into and to discharge the same from the pressure chamber 836A of the hydraulic actuator 836 through an oil passage 801a formed in the torque converter case 801. A drive gear 838 is mounted on one end of the secondary shaft 832.

The pressure receiving area of the movable cone 833b of the primary pulley 833 is greater than that of the movable cone 834b of the secondary pulley 834. Therefore, when the oil is supplied into and discharged from the pressure chambers 837A and 836A, the mode of variation of the width of the groove of the primary pulley 833 and that of the width of the groove of the secondary pulley 834 are reverse to each other. Thus, the ratio between the pitch diameters of the primary pulley 833 and the secondary pulley 834 is varied continuously to vary the output rotating speed of the secondary shaft 832 continuously.

The rotation of the secondary shaft 832 is transmitted through the drive gear 838 to the countershaft assembly 839 at a reduced rotating speed. The rotation of the countershaft assembly 839 is transmitted through a driven gear 854 and a power transmission shaft 853 to which the driven gear 854 is bolted to the transfer unit 850.

The countershaft assembly 839 comprises a shaft 839a supported at its opposite ends in a needle bearing 839e and a roller bearing 839f on the variable-speed transmission housing 802 and the torque converter case 801, respectively, a driven gear 839c of a relatively large diameter fixedly mounted on the shaft 839a for rotation together with the shaft 839a and engaged with the drive gear 838, and a drive gear 839d formed integrally with the driven gear 839c and engaged with the driven gear 854.

Figure 68:
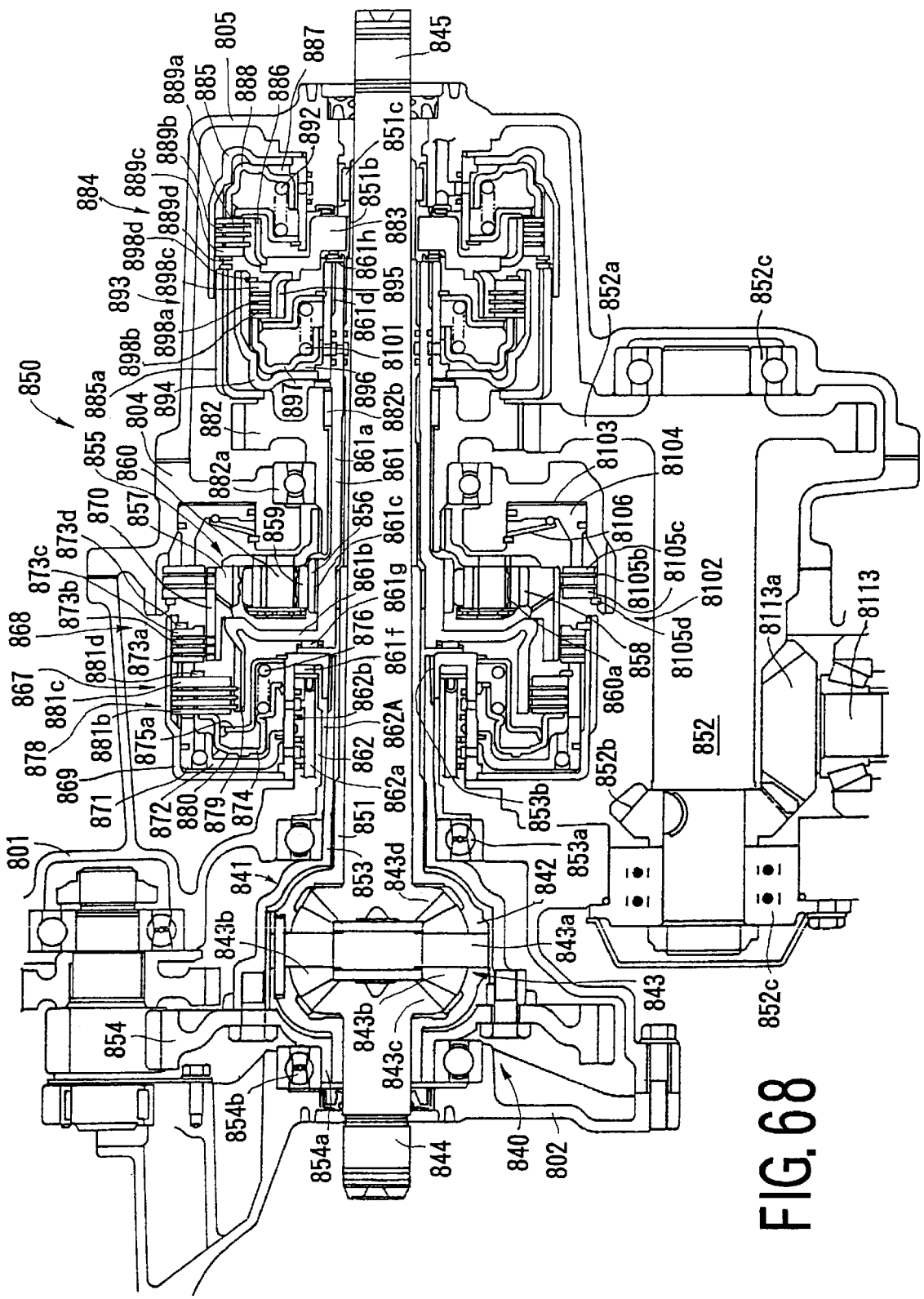
FIG. 68 is an enlarged view of a portion of the automobile driving system of FIG. 67.

The respective constructions of the front differential gear 840 and the transfer unit 850 will be described hereinafter with reference to FIG. 67 and FIG. 68 showing an essential portion of a construction shown in FIG. 67 in an enlarged view.

The front differential gear 840 is contained in a differential gear housing 841 formed between a driven gear 854 having a cylindrical boss 854a supported in a ball bearing 854b on the variable-speed transmission housing 802, and a substantially cylindrical transmission shaft 853 supported for rotation in a ball bearing 853a on the torque converter case 801.

The front differential gear 840 has a hollow, differential gear case 842 rotatably fitted in an expanded part formed of the substantially cylindrical boss 854a of the driven gear 854 formed integrally with a front drive shaft 851, and the transmission shaft 853. A pair of pinions 843b are disposed in the differential gear case 842 and supported on a pinion shaft 843a supported at opposite ends thereof on the differential gear case 842. A left side gear 843c and a right side gear 843d are engaged with the pair of pinions 843b to constitute a differential gear 843.

A drive shaft 844 connected to the side gear 843c extends through the differential gear case 842 and the variable-speed transmission housing 802, and transmits power through a constant-velocity joint and an axle to one of the front wheels. A drive shaft 845 connected to the other side gear 843d extends through the differential gear case 842 and the front drive shaft 851 formed integrally with the differential gear case 842, projects from the end cover 805 and transmits power through a constant-velocity joint and an axle to the other front wheel.

The transfer unit 850 has the front drive shaft 851, i.e., a first drive shaft, parallel to the crankshaft 811 of the engine 810, the output shaft 821, the primary shaft 831 and the secondary shaft 832, and a rear drive shaft 852, i.e., a second drive shaft.

The arrangement of the crankshaft 811, the primary shaft 831, the secondary shaft 832, the front drive shaft 851 and the rear drive shaft 852 extended in parallel to each other is entirely the same as that of the corresponding shafts of the automobile driving system in the seventh embodiment. Thus, the driving system is formed in a compact construction having a relatively small longitudinal dimension to facilitate the installation of the driving system in the engine room and to improve the compatibility of the driving system with both a vehicle body designed to be mounted with a manual transmission (MT) and a vehicle body designed to be mounted with an automatic transmission (AT).

The front drive shaft 851 formed integrally with the differential gear case 842 has one end rotatably supported through the transmission shaft 853 and the ball bearing 853a supporting the transmission shaft 853 on the torque converter case 801, and the other end rotatably supported in a needle bearing 851c on the end cover 805.

The front drive shaft 851 is provided in the outer circumference of a rear end portion thereof with splines 851b which engage with disk 883 supporting a clutch hub 886 included in a third multiple-disk clutch 884, i.e., a third friction coupling element, and a clutch hub 895 included in a fourth multiple-disk clutch 893, i.e., a fourth friction coupling element.

The front drive shaft 851 is inserted in a substantially cylindrical fixed shaft 862 formed integrally with the torque converter case 801. A space between the inner circumference of the fixed shaft 862 and the front drive shaft 851 is closed by a clutch drum 869 included in a first multiple-disk clutch 868, i.e., a first friction coupling element, to form a pressure chamber 862A. The fixed shaft 862 is provided with an oil passage 862a connected to the pressure chamber 862A, and an oil passage 862b formed in its outer circumference.

A hub 861 is rotatably mounted on the front drive shaft 851. The hub 851 has a tubular portion 861a fitted on the front drive shaft 851, and a flange 861b formed at the base end of the tubular portion 861a. Splines 861c with which a sun gear 856 included in a double-pinion planetary gear 855 is engaged is formed in a section of the tubular portion 861a near the flange 861b, and splines 861d with which a clutch drum 894 included in a fourth multiple-disk clutch 893, i.e., a fourth friction coupling element, is engaged is formed in an end section of the tubular portion 861a. A clutch hub 879 included in a second multiple-disk clutch 878, i.e., a second friction coupling element, is formed integrally with the flange 861b.

The hub 861 is restrained from axial movement by a thrust bearing 861 supported on the fixed shaft 862, a thrust bearing 861g supported on the clutch drum 869, and a thrust bearing 861h supported on the extension case 5 through the disk 883 supporting the clutch hub 886 of the third multiple-disk clutch 884 and the clutch hub 895 of the fourth multiple-disk clutch 893.

The double-pinion planetary gear 855 has the sun gear 856 engaged with the splines 861c of the hub 861, a ring gear 857, a first pinion 858 engaged with the sun gear 856, a second pinion 859 engaged with the ring gear 857 and the first pinion 858, and a carrier 860 supporting the first pinion 858 and the second pinion 859 for rotation thereon in needle bearings 860a. Power applied to the ring gear 857 is distributed to the sun gear 856 and the carrier 860 at a torque distribution ratio dependent on the dimensions of the sun gear 856 and the ring gear 857. When the ring gear 857 is fastened to the case 804, the sun gear 856 rotates the carrier 860 in a direction opposite the rotating direction of the sun gear 856.

A transfer driven gear 852a is mounted on one end of the rear drive shaft 852 disposed in parallel to the front drive shaft 851, and a bevel gear 852b, which engages with a bevel gear 8113a mounted on one end of an output shaft 8113, is mounted on the other end of the rear drive shaft 852. The rear drive shaft 852 is supported for rotation in a plurality of ball bearings 852c on the torque converter case 801 and the end cover 805 of the transmission case 807.

An input selecting means 867 for selectively transmitting power from the transmission shaft 853 to the ring gear 857 or the sun gear 856 is interposed between the transmission shaft 853 and the double-pinion planetary gear 855. The input selecting means 867 comprises the first multiple-disk clutch 868 and the second multiple-disk clutch 878, i.e., a second friction coupling element.

In the first multiple-disk clutch 868, a clutch drum 869 supported for rotation on the fixed shaft 862 is engaged with splines 853b formed in one end portion of the transmission shaft 853, and a clutch hub 870 is connected to the ring gear 857 of the double-pinion planetary gear 855. The first multiple-disk clutch 868 interlocks the transmission shaft 853 and the ring gear 857 for power transmission. A pressure is applied to a pressure chamber 871 to compress a retaining plate 873c contiguous with a snap ring 873d, driven plates 873b and drive plates 873a by a piston 872 to engage the first multiple-disk clutch 868 for power transmission. A retainer 875a is disposed on one side of the piston 872 opposite the other side of the same on which the pressure chamber 871 is formed, and a pressure is exerted through a piston 874 on the piston 872 by a return spring 876.

In the second multiple-disk clutch 878, the clutch drum 869 of the first multiple-disk clutch 868 serves also as the clutch drum of the second multiple-disk clutch 878, and the clutch hub 879 is formed integrally with the hub 861. The second multiple-disk clutch 878 interlocks the transmission shaft 853 and the sun gear 856 for power transmission. A pressure is applied to a pressure chamber 800 to compress a retaining plate 881c contiguous with a snap ring 881d fixed to the piston 872, driven plates 881b and drive plates 881a coupled with the clutch hub 879 by the piston 772 to engage the second multiple-disk clutch 878 for power transmission. A pressure is exerted on the piston 874 by the return spring 876.

The transfer drive gear 882 is supported for rotation by a ball bearing 882a on the case 804 of the transmission case 807 and by a needle bearing 882b on the hub 861 on one side of the double-pinion planetary gear 855 opposite the other side of the same on which the input selecting means 867 is disposed. The transfer driven gear 852a mounted on the rear drive shaft 852 is engaged with the transfer drive gear 882 for power transmission. The carrier 860 of the double-pinion planetary gear 855 and the transfer drive gear 882 are coupled by splines.

The third multiple-disk clutch 884 has a clutch drum 885 coupled with the transfer drive gear 882 by a drum connecting member 885a and supported for rotation coaxially with the front drive shaft 851 on the end cover 805, and a clutch hub 886 connected to the disk 883 coupled with the front drive shaft 851 by the splines 851b. The third multiple-disk clutch 884 interlocks the transfer drive gear 882 and the front drive shaft 851 for power transmission. A pressure is applied to a pressure chamber 887 to compress a retaining plate 889c contiguous with a snap ring 889d fixed to the clutch drum 885, driven plates 889b and drive plates 889a coupled with the clutch hub 886 by a piston 888 to engage the third multiple-disk clutch 884 for power transmission. A pressure is exerted on the piston 888 by a return spring 892.

The fourth multiple-disk clutch 893, i.e., a fourth coupling element for selectively interlocking the front drive shaft 851 and the hub 861 for power transmission, is interposed between the front drive shaft 851 and the hub 861.

The fourth multiple-disk clutch 893 has the clutch drum 894 coupled with the hub 861 by the splines 851b formed on the hub 861, and the clutch hub 895 connected to the disk 883 coupled with the front drive shaft 851 by the splines for power transmission. A pressure is applied to a pressure chamber 896 to compress a retaining plate 898c contiguous with a snap ring 898d fixed to the clutch drum 894, driven plates 898b and drive plates 898a coupled with the clutch hub 895 by a piston 897 to engage the fourth multiple-disk clutch 893 for power transmission. Pressure is exerted on the piston 897 by a return spring 8101.

A fifth multiple-disk clutch 8102, i.e., a fifth friction coupling element for selectively fastening the ring gear 857 to the case 804 of the transmission case 807, is interposed between the case 804 of the transmission case 807 and the ring gear 857 of the double-pinion planetary gear 855.

A pressure is applied to a pressure chamber 8103 to compress a retaining plate 8105c contiguous with a snap ring 8105d fixed to the case 804, driven plates 8105b and drive plates 8105a coupled with the clutch hub 870 connected to the ring gear 857 by a piston 8104 to engage the fifth multiple-disk clutch 8102 to fasten the ring gear 857 to the case 804. A pressure is exerted on the piston 8104 by a return spring 8106.

A control valve is disposed in the oil pan joined to a lower portion of the transmission case 707. The control valve is controlled by the hydraulic controller 809 on the basis of signals provided by the traveling speed sensor 809a, the throttle opening sensor 809b, the shift switch 809c, the front wheel speed sensor 809d, the rear wheel speed sensor 809e and the steering angle sensor 809f to supply the oil discharged from the oil pump selectively to the respective pressure chambers 871, 800, 887, 896 and 8103 of the first multiple-disk clutch 868, the second multiple-disk clutch 878, the third multiple-disk clutch 884, the fourth multiple-disk clutch 893 and the fifth multiple-disk clutch 8102, and the variable-speed transmission 830.

An output shaft 8113 is supported in a pair of roller bearings 8112 spaced a predetermined distance apart by a spacer 8111 and supported on the extension case 806 by a retainer 8110 in the extension case 806 joined to the rear end of the torque converter case 801.

The bevel gear 8113a is mounted on the front end of the output shaft 8113 and is engaged with the bevel gear 852a mounted on the rear drive shaft 852. The rear end of the output shaft 8113 is connected through a universal coupling and a propeller shaft 8116 to the rear differential gear 8117 to transmit power to the rear differential gear 8117.

The operation of the automobile driving system for a four-wheel drive vehicle thus constructed will be described with reference to FIGS. 69 to 72, and FIG. 73 tabulating the operating conditions of the first multiple-disk clutch 868, the second multiple-disk clutch 878. third multiple-disk clutch 884, the fourth multiple-disk clutch 893 and the fifth multiple-disk clutch 8102. In the table shown in FIG. 73, blank circles indicate that the corresponding multiple-disk clutches are engaged or operative, and parenthesized blank circles indicate that multiple-disk clutches are engaged or operative if necessary.

The power of the engine 810 is transmitted from the crankshaft 811 through the torque converter 820 to the primary shaft 831 of the variable-speed transmission 830. An input speed of the primary shaft 831 is converted continuously into an output speed of the secondary shaft 832 by the action of the primary pulley 833 and the secondary pulley 834 operatively connected by the drive belt 835. The output speed of the secondary shaft 832 is reduced by the action of the drive gear 838, the countershaft assembly 839 and the driven gear 854. and a reduced speed is transmitted through the clutch drum 869 to the first multiple-disk clutch 868 and the second multiple-disk clutch 878. The first multiple-disk clutch 868 and the second multiple-disk clutch 878 are disengaged and power is not transmitted beyond the first multiple-disk clutch 868 and the second multiple-disk clutch 878 when a neutral position N or a parking position P is selected.

Figure 69:
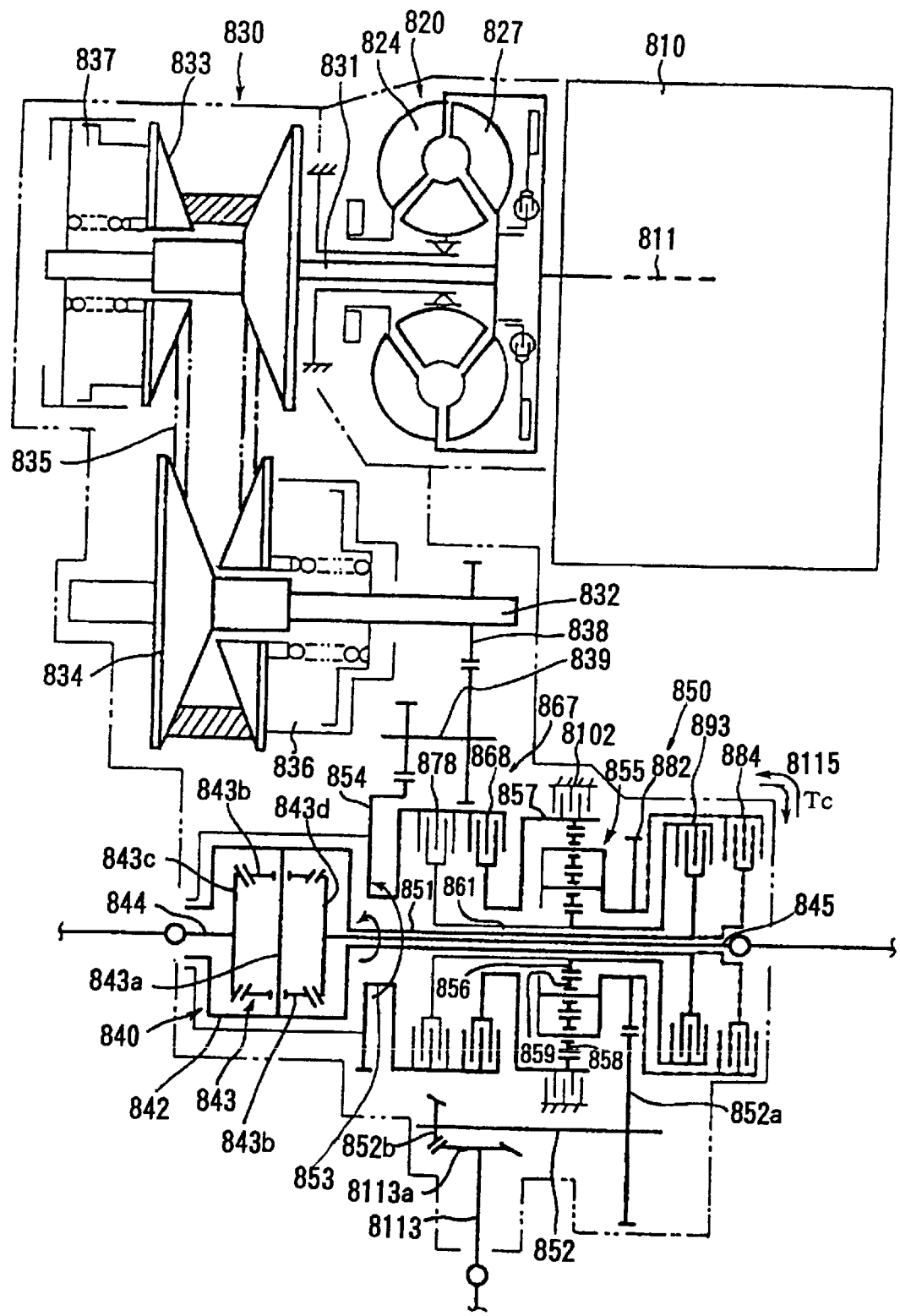
FIG. 69 is a schematic side view of assistance in explaining the operation of the automobile driving system of FIG. 66.

When a drive range D, i.e., a forward range, is selected, the first multiple-disk clutch 868 and the fourth multiple-disk clutch 893 are engaged to transmit driving power through a drive line indicated by thick lines in FIG. 69. A pressure is applied through the control valve to the pressure chamber 871 to compress the retaining plate 873c contiguous with the snap ring 873d fixed to the inner circumference of the clutch drum 869, the driven plates 873b, and the drive plates 873a by the piston 872 so that the first multiple-disk clutch 868 is engaged. Consequently, power is transmitted from the driven gear 854 through the transmission shaft 853 to the ring gear 857 of the double-pinion planetary gear 855. A pressure is applied also to the pressure chamber 896 to compress the retaining plate 898c, the driven plate 898b and the drive plate 898a of the fourth multiple-disk clutch 893 by the piston 788 to engage the fourth multiple-disk clutch 893. Consequently, the sun gear 856 of the double-pinion planetary gear 855 and the front drive shaft 851 are interlocked for power transmission through the fourth multiple-disk clutch 893.

Figure 70:
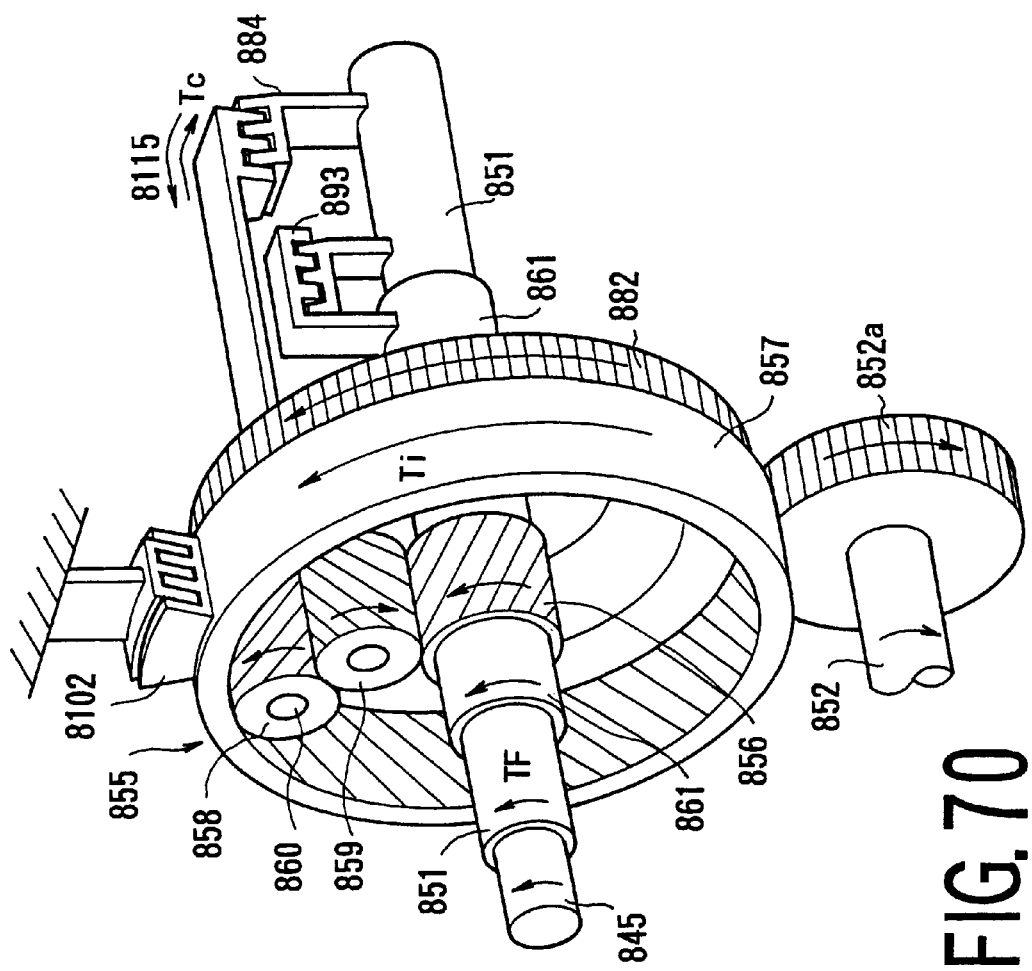
FIG. 70 is a schematic perspective view of assistance in explaining the operation of a double-pinion planetary gear.
Figure 71:
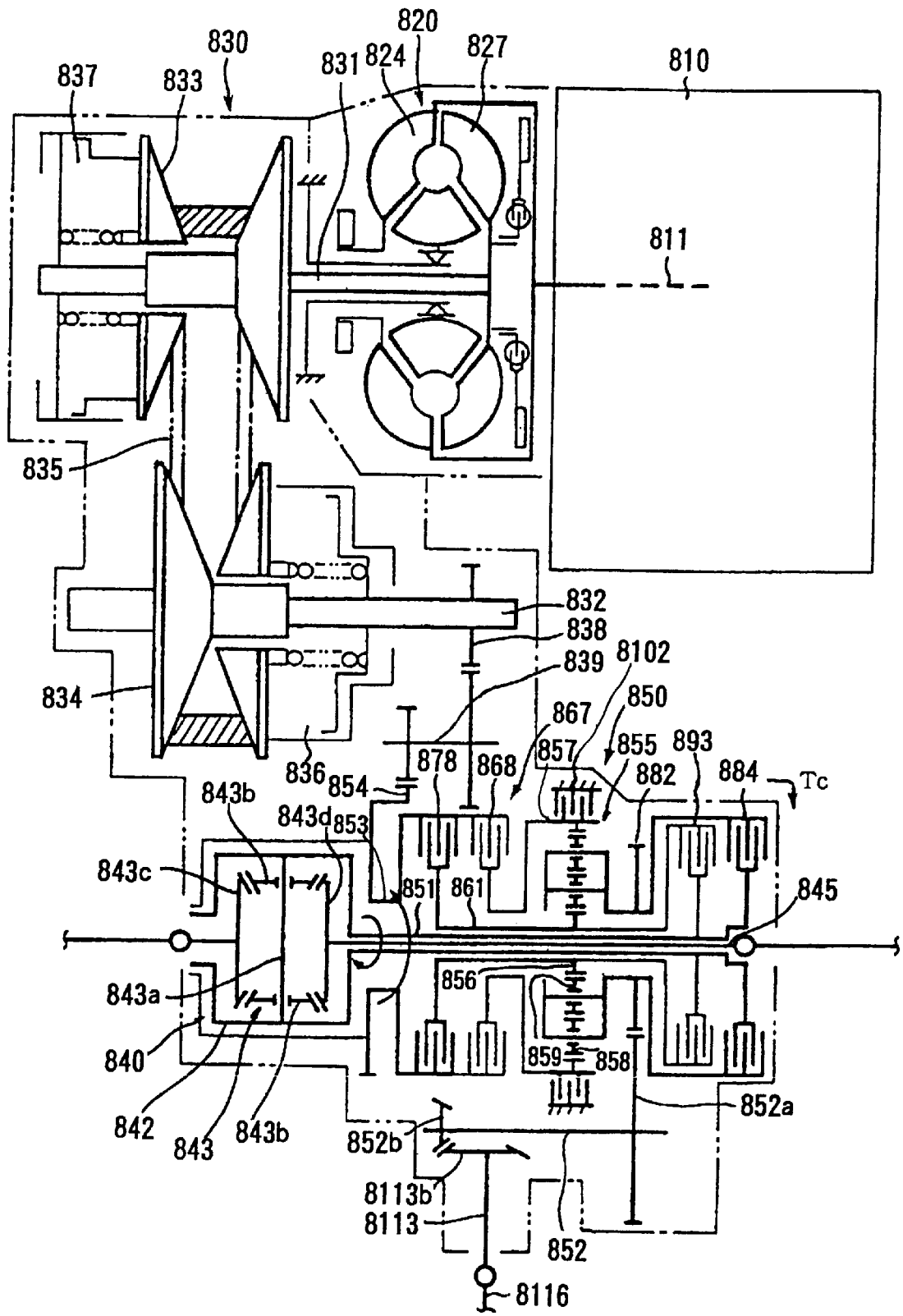
FIG. 71 is a schematic side view of assistance in explaining the operation of the automobile driving system of FIG. 66.

Accordingly, in the double-pinion planetary gear 855 in which the ring gear 857, i.e., input member, and the first pinion 858 are engaged, and the second pinion 859 is engaged with the first pinion 858 and the sun gear 856 as shown in FIG. 70, the sun gear 856 and the carrier 860 are rotated for differential rotation in the same direction as the rotating direction of the ring gear 857, and torque is distributed at a predetermined distribution ratio to the sun gear 856 and the carrier 860. Thus the front drive shaft 851 coupled with the disk 883 by splines and the transfer drive gear 882 operatively coupled with the carrier 860 by splines are rotated in the rotating direction of the ring gear 857 through the hub 861 coupled with the sun gear 856 by splines, the fourth multiple-disk clutch 893 and the disk 883 coupled with the front drive shaft 851 by splines, and the transfer drive gear 852a engaged with the transfer drive gear 882 is rotated to drive the rear drive shaft 852 for rotation in a direction opposite the rotating direction of the ring gear 857. During torque transmission, the double-pinion planetary gear 855 serves as a center differential gear in which the first pinion 858 and the second pinion 859 rotate and revolve round the sun gear 856 to absorb the difference in rotating speed between the sun gear 856 and the carrier 860.

The torque distributing function of the double-pinion planetary gear 855 will be described with reference FIG. 70.

The relation between torque distribution and the numbers of teeth of the ring gear 857 and the sun gear 856 is expressed by:

$$Ti = TF + TR$$

$$TF:TR = ZS:(ZR - ZS)$$

where Ti is input torque applied to the ring gear 857, TF is the torque of the sun gear 856 to be transmitted through the hub 861 to the front drive shaft 851, TR is the torque of the carrier 860 to be transmitted to the rear drive shaft 852, ZS is the number of teeth of the sun gear 856 and ZR is the number of teeth of the ring gear 857. Accordingly, an optional reference torque distribution ratio TF/TR can be provided by properly determining ZS of the sun gear 856 and ZR of the ring gear 857.

If ZS=37 and ZR=82, $$TF:TR = 37:(82-37)$$

Then, TF:TR≈45:55 which signifies that about 45% and about 55% of the input torque are distributed to the front wheels and the rear wheels, respectively. Thus, a rear-biased reference torque distribution mode, i.e., a torque distribution mode in which a major part of the input torque is distributed to the rear wheels, can be established.

A pressure is applied to the pressure chamber 887 of the third multiple-disk clutch 884 to compress the snap ring 889d, the retaining plate 889c, the driven plate 889b and the drive plat 889a by the piston 888 to produce clutch torque Tc. The hydraulic controller 809 controls the control valve to vary the clutch torque Tc.

Front wheel speed NF and rear wheel speed NR measured by the front wheel speed sensor 809d and the rear wheel speed sensor 809e are given to the hydraulic controller 809. The rear wheels always starts slipping first if the vehicle is traveling on a slippery road in the rear-biased reference torque distribution mode, i.e., in a mode in which TF<TR. Therefore, slip S is defined by S=NF/NR (S>0). A clutch pressure Pc corresponding to a slip S and a steering angle Ψ given to the hydraulic controller 809 from the steering angle sensor 809f is retrieved from a map of FIG. 45 stored in the hydraulic controller 809. If the rear wheels are not slipping and S≧1, the clutch pressure Pc is relatively low. If the rear wheels are slipping and S<1, the clutch pressure Pc is increased as the slip S decreases, and the clutch pressure Pc is set to Pmax when the slip S is not greater than a predetermined threshold slip S1. The line pressure is adjusted to the clutch pressure Pc for the variable control of the clutch torque Tc of the third multiple-disk clutch 884.

Thus, a bypass drive line 8115 is formed by engaging the third multiple-disk clutch 884. The bypass drive line 8115 extends from the front drive shaft 851 through the third multiple-disk clutch 884 and the transfer drive gear 882 to the carrier 860, and through the sun gear 856, the hub 861 and the fourth multiple-disk clutch 893 to the front drive shaft 851. The bypass drive line 8115 exercises a differential function to meet (rear wheel speed NR)>(rotating speed of the ring gear 857)>(front wheel speed NF) in the transfer unit 850 if the rear wheels slip, and the torque transmitted from the transfer drive gear 882 through the third multiple-disk clutch 884 to the front drive shaft 851 is increased by the clutch torque Tc, and the torque transmitted through the transfer driven gear 852a engaged with the transfer drive gear 882 to the rear drive shaft 852 is reduced by the clutch torque Tc distributed to the front wheels. Consequently, $$TF=0.45Ti+Tc$$

$$TR=0.55Ti-Tc$$

Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the rear wheels are slipping and the clutch torque Tc is generated, more part of the input torque Ti is distributed to the front wheels through the bypass drive line 8115 if the clutch torque Tc is greater, and the torque distribution ratio TF:TR changes to TF1:TR1 as shown in FIG. 45 so that the torque distributed to the front wheels is increased positively and the torque distributed to the rear wheels is decreased. Consequently, the slip of the rear wheels is decreased and the traction of the vehicle is improved. When the slip S is decreased below the predetermined threshold slip, the pressure of the oil supplied to the third multiple-disk clutch 884 increases, differential limiting torque increases to a maximum, and the sun gear 856 and the carrier 860 are connected directly. Consequently, the differential motion of the transfer unit 850 is locked and a direct four-wheel-drive mode in which the torque is distributed at a torque distribution ratio corresponding to front-rear axle weight distribution ratio is established, whereby the traction of the vehicle is enhanced to a maximum.

If the front wheels slip, the differential function of the transfer unit 850 meets a condition: (rear wheel speed NR)<(rotating speed of the ring gear 857)<(front wheel speed NF), a torque is transmitted from the front drive shaft 851 to the transfer drive gear 882 according to the clutch torque Tc, and the torque transmitted from the front drive shaft 851 to the front wheels is reduced by the clutch torque Tc distributed to the rear wheels. Consequently, $$TF=0.45Ti-Tc$$

$$TR=0.55Ti+Tc$$

Accordingly, the torque is distributed to the front wheels and the rear wheels at a rear-biased torque distribution ratio TF:TR≈45:55 when neither the front wheels nor the rear wheels are slipping because the clutch torque Tc=0 if neither the front wheels nor the rear wheels are slipping. When the front wheels are slipping and the clutch torque Tc is generated, the input torque Ti is distributed to the rear wheels according to the clutch torque Tc to increase the torque distributed to the rear wheels positively and to reduce the torque distributed to the front wheels, so that the traction of the vehicle is improved. If the slip S is decreased below the predetermined threshold slip, the pressure of the oil supplied to the third multiple-disk clutch 884 increases, differential limiting torque increases to a maximum, and the sun gear 856 and the carrier 860 are connected directly. Consequently, a direct four-wheel-drive mode in which the torque is distributed at a torque distribution ratio corresponding to front-rear axle weight distribution ratio is established, whereby the traction of the vehicle is fully enhanced. Thus, the torques distributed to the front and the rear wheels are controlled in a wide range according to the mode of slip to avoid the reduction of traction.

If the vehicle turns during the torque distribution control for suppressing slip, the differential limiting torque of the third multiple-disk clutch 884 is reduced for correction according to the steering angle Ψ. Consequently, the differential limiting effect of the transfer unit 850 is reduced and the difference in rotating speed can be satisfactorily absorbed, so that tight corner braking is avoided and satisfactory controllability can be secured.

Figure 72:
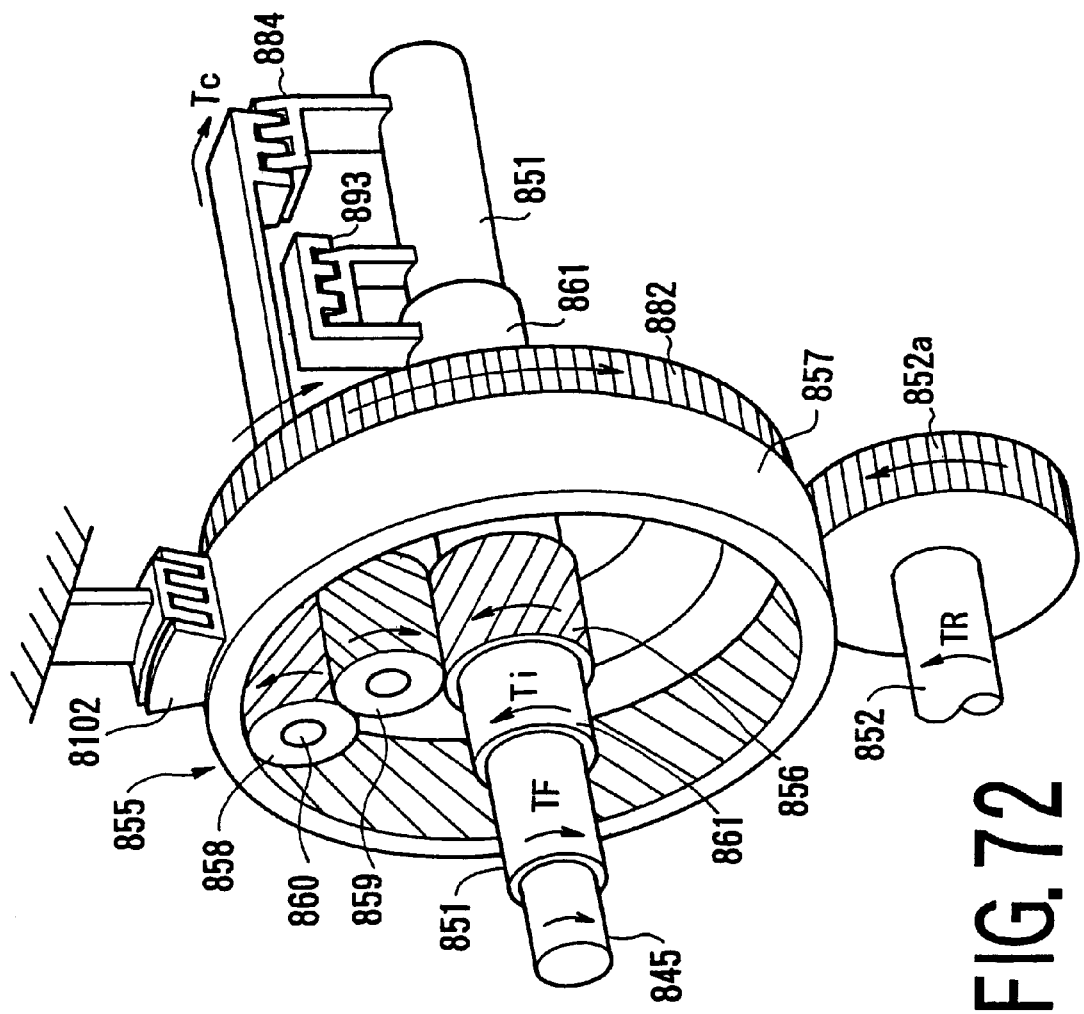
FIG. 72 is a schematic perspective view of assistance in explaining the operation of a double-pinion planetary gear.

When a reverse range R is selected, the first multiple-disk clutch 868 and the fourth multiple-disk clutch 893 are disengaged and the second multiple-disk clutch 878, the third multiple-disk clutch 884 and the fifth multiple-disk clutch 8102 are engaged to transmit power through a drive line indicated by thick lines in FIG. 72. A pressure is applied through the control valve to the pressure chamber 881 to compress the snap ring 881d, the retaining plate 881c, the drive plates 881a and the driven plates 881b by the piston 874 to engage the second multiple-disk clutch 878 to transmit power from the transmission shaft 853 through the hub 861 to the sun gear 856 of the double-pinion planetary gear 855. A pressure is applied to the pressure chamber 8103 to compress the snap ring 8105d, the retaining plate 8105c, the drive plates 8105a and the driven plates 8105b by the piston 8104 to engage the fifth multiple-disk clutch 8102, whereby the ring gear 857 is fastened to the case 804. The snap ring 889d, the retaining plate 889c, the drive plates 889a and the driven plates 889b are compressed by the piston 888 to engage the third multiple-disk clutch 884 by applying a pressure to the pressure chamber 887, so that power is transmitted from the transfer drive gear 882 through the third multiple-disk clutch 884 to the front drive shaft 851.

Consequently, as shown in FIG. 72, the first pinion 858 and the second pinion 859 are rotated in the opposite directions, respectively, by the sun gear 856 carrier 856 and revolve along the ring gear 857 to rotate the carrier 860 in a direction opposite the rotating direction of the sun gear 856. Consequently, power is transmitted through the transfer drive gear 882 and the third multiple-disk clutch 884 to the front drive shaft 851 to drive the rear drive shaft 852 for rotation in a direction opposite the rotating direction of the front drive shaft 851.

Therefore, the power transmitted to the driven gear 862 is transmitted in a direction opposite a direction in which power is transmitted when the drive range D is selected to the front drive shaft 851 and the rear drive shaft 852 when the ring gear 857 of the double-pinion planetary gear 855 is fastened to the case 804 by the fifth multiple-disk clutch 8102. Thus, the double-pinion planetary gear 855 is capable of a forward/reverse selecting function.

In this case, power is transmitted from the sun gear 856 to the front drive shaft 851 and the rear drive shaft 852 at a gear ratio expressed by:

$$\text{Gear ratio}=[ZS+(-ZR)]/ZS$$

If ZS=37 and ZR=82, $$\text{Gear ratio}=[37+(-82)]/37=-1.216$$

which is an appropriate gear ratio for the reverse range R.

The input torque Ti applied to the sun gear 856 is transmitted to the front drive shaft 851 according to the clutch torque Tc, and the rest of the input torque Ti is transmitted to the front wheels.

$Ti=TF+TR$ $TF=Ti-Tc$ $TR=Tc$

Therefore, the traction of the vehicle is improved by reducing the clutch torque Tc so that part of the input torque Ti distributed to the front wheels is increased positively and the torque distributed to the rear wheels is decreased when the rear wheels slip in order that the slip is suppressed and satisfactory traction can be secured. When the front wheels slip, the clutch torque Tc is increased to distribute more part of the input torque Ti to the rear wheels to increase the torque of the rear wheels positively and the torque distributed to the front wheels is reduced to suppress slip and to improve traction. If the slip S is decreased blow the predetermined threshold slip, the pressure of the oil supplied to the third multiple-disk clutch 884 is increased to a maximum and the differential limiting torque Tc is increased to a maximum to connect the front drive shaft 851 and the transfer drive gear 882 directly to establish a direct four-wheel-drive mode in which the torque is distributed at a torque distribution ratio corresponding to front-rear axle weight distribution ratio, whereby the traction of the vehicle is fully enhanced. If the vehicle turns during the torque distribution control for suppressing slip, the differential limiting torque of the third multiple-disk clutch 884 is reduced according to the steering angle $\Psi$. Consequently, the difference in rotating speed can be satisfactorily absorbed, so that tight corner braking is avoided and satisfactory controllability can be secured.

In the eighth embodiment, the front drive shaft 851 and the rear drive shaft 852 for transmitting power to the front differential gear 840 connected to the output side of the belt-drive variable-speed transmission 830 and the rear differential gear 8117, respectively, are disposed in parallel to the crankshaft 811 of the transverse engine 710, the double-pinion planetary gear 855 is mounted on the front drive shaft 851 with its sun gear 856 coupled with the front drive shaft 851 through the hub 861 and the fourth multiple-disk clutch 893, the first multiple-disk clutch 868 is capable of transmitting the output of the variable-speed transmission 830 to the ring gear 857, the second multiple-disk clutch 878 is capable of transmitting the output of the variable-speed transmission 830 to the hub 861, the third multiple-disk clutch 884 is capable of interlocking the front drive shaft 851 and the transfer drive gear 882 for power transmission, the fifth multiple-disk clutch 8102 is capable of restraining the ring gear 857 from rotation, and the multiple-disk clutches 868, 878, 884, 893 and 8102 are controlled selectively so that the automobile driving system exercises the functions of a center differential gear to distribute torques properly to the front drive shaft 851 and the rear drive shaft 852 and to achieve a differential limiting operation so that the vehicle is able to travel satisfactorily when the drive range D, i.e., the forward range, or the reverse range R is selected and exercises the functions of a forward/reverse selecting mechanism when the drive range D or the reverse range R is selected.

Whereas the conventional automobile driving system needs special double-pinion planetary gears respectively for a center differential gear and a forward/reverse selecting mechanism, the automobile driving system in the eighth embodiment according to the present invention needs a single double-pinion planetary gear for both the functions of the center differential gear and those of the forward/reverse selecting mechanism. Therefore, the automobile driving system in the eighth embodiment according to the present invention exercises high performance, has a simple, compact, lightweight construction having a small overall length along the width of the vehicle body, simplifies control operations, and can be manufactured at a low manufacturing cost. Accordingly, the automobile driving system can be installed on a vehicle body with a sufficiently large space secured between the side walls of the engine room and the opposite ends thereof, so that a sufficient crush stroke necessary for protecting the passenger in the case of lateral collision can be secured, and a sufficiently large space is available for work for installing the transmission in and removing the same from the engine room. Furthermore, the degree of freedom of vehicle body design is increased.

An electromagnetic clutch or a wet clutch may be employed instead of the torque converter 820. If an electromagnetic clutch or a wet clutch is employed instead of the torque converter 820, the transmission of power to the primary shaft 831 of the belt-drive variable-speed transmission 830 and beyond the belt-drive variable-speed transmission 830 can be intercepted when the neutral position N or the parking position P is selected.

It is known from the comparative examination of the automobile driving system 800 in the eighth embodiment for a four-wheel drive vehicle and the automobile driving system 400 in the fourth embodiment for a two-wheel drive vehicle that the torque converter, the belt-drive variable-speed transmission, the front differential gear, the first, the second and the fifth case forming the transmission case containing the torque converter and the belt-drive variable-speed transmission, and the principal components of the transfer unit including the front drive shaft, the double-pinion planetary gear, the fixed shaft, and the first and the second multiple-disk clutch are common to the automobile driving system 800 in the eighth embodiment for a four-wheel drive vehicle and the automobile driving system 400 in the fourth embodiment for a two-wheel drive vehicle.

Therefore, the principal portions of the automobile driving system for a four-wheel drive vehicle can be constructed relatively easily at a reduced manufacturing cost by additionally incorporating the power transmitting mechanism for transmitting power to the rear differential gear including the third, the fourth and the fifth clutch, the transfer drive gear and the rear drive shaft into the automobile driving system 400 in the fourth embodiment for a two-wheel drive vehicle, which contributes greatly to the reduction of the manufacturing cost.

What is claimed is:

1. An automobile driving system comprising:
   an engine;
   a transmission driven by the engine;
   a first differential gear;
   a first drive shaft disposed in parallel to a crankshaft included in the engine to transmit power to the first differential gear;
   a second differential gear;
   a second drive shaft disposed in parallel to the crankshaft of the engine to transmit power to the second differential gear; and
   a planetary gear for distributing the output of the transmission, selectively setting up a forward drive mode or a reverse mode, and transmitting power to the first and second drive shafts.

2. The automobile driving system according to claim 1 further comprising:

a plurality of friction coupling elements; and a control means for controlling the operations of the plurality of friction coupling elements;

wherein the control means controls the operations of the plurality of friction coupling elements to make the planetary gear distribute the output of the transmission of a predetermined power distribution ratio, set up a forward drive mode or a reverse mode selectively and transmit power to the first and the second drive shafts.

3. An automobile driving system comprising;

an engine;

a transmission driven by the engine said transmission having a primary pulley set operatively coupled with a crankshaft of the engine and a secondary pulley set arranged in parallel to the primary pulley set on substantially the same level:

a differential gear disposed under the primary and secondary pulley sets;

a drive shaft connected to the differential gear and disposed in parallel to the crankshaft of the engine;

a planetary gear disposed on the drive shaft and having a sun gear operatively coupled with an output shaft of the secondary pulley set and a carrier coupled with the drive shaft for power transmission;

a first friction coupling element for interlocking the sun gear and the drive shaft to set up a forward drive mode; and a second friction coupling element for restraining a ring gear of the planetary gear from rotation to set up a reverse mode.

4. The automobile driving system according to claim 11, wherein the output of the engine is transmitted to a ring gear or a carrier of the planetary gear.

5. The automobile driving system according to claim 1, wherein the output of the engine is transmitted to ring gear or a sun gear of the planetary gear.

6. The automobile driving system according to claim 1, wherein the planetary gear is coaxial with the first drive shaft.

7. An automobile driving system comprising:

an engine; a transmission driven by the engine;

a first differential gear;

a first drive shaft disposed in parallel to a crankshaft included in the engine to transmit power to the first differential gear;

a second differential gear;

a second drive shaft disposed in parallel to the crankshaft of the engine to transmit power to the second differential gear;

a planetary gear having a sun gear connected to the first drive shaft;

an input selecting means for selectively transmitting power from the transmission to a ring gear or a carrier included in the planetary gear;

a third friction coupling element for selectively transmitting power from the carrier of the planetary gear to the second drive shaft;

a fourth friction coupling element for selectively interlocking the first and the second drive shafts; and a fifth friction coupling element for selectively restraining the ring gear of the planetary gear from rotation;

wherein the input selecting means and the friction coupling elements are operated selectively to distribute the output of the transmission at a predetermined power distribution ratio, to set up a forward drive mode or a reverse mode selectively and to transmit power to the first and the second drive shaft by the planetary gear.

8. The automobile driving system according to claim 7, wherein when a forward drive range is selected, the input selecting means transmits the output of the transmission to the ring gear, the fifth friction coupling element is disengaged to allow the ring gear to rotate, the planetary gear functions as a center differential gear for distributing power to the carrier and the sun gear at a predetermined power distribution ratio, the third fiction coupling element is engaged for power transmission and the fourth friction coupling element is engaged to limit differential rotation between the carrier and the sun gear.

9. The automobile driving system according to claim 8, wherein the torque transmission capacity of the fourth friction coupling element is controlled on the basis of data representing the traveling condition of the vehicle when the forward drive range is selected.

10. The automobile driving system according to claim 7, wherein when a reverse range is selected the input selecting means transmits the output of the transmission to the carrier, the fifth friction coupling element is engaged to restrain the ring gear from rotation, the third friction coupling element is disengaged, and the fourth friction coupling element is engaged.

11. The automobile driving system according to claim 10, wherein the torque transmission capacity of the fourth friction coupling element is controlled on the basis of data representing the traveling condition of the vehicle when the reverse range is selected.

12. An automobile driving system comprising:

an engine;

a transmission driven by the engine;

a first differential gear;

a first drive shaft disposed in parallel to a crankshaft included in the engine to transmit power to the first differential gear;

a second differential gear;

a second drive shaft disposed in parallel to the crankshaft of the engine to transmit power to the second differential gear;

a planetary gear having a carrier connected to the second drive shaft;

an input selecting means for selectively transmitting power from the transmission to a ring gear or a sun gear included in the planetary gear a third friction coupling element for selectively interlocking the first and the second drive shafts;

a fourth friction coupling elements for selectively transmitting power from the sun gear to the first drive shaft; and a fifth friction coupling element for selectively restraining the ring gear of the planetary gear from rotation;

wherein the input selecting means and the friction coupling elements are operated selectively to distribute the output of the transmission at a predetermined power distribution ratio, to set up a forward drive mode or a reverse mode electively and to transmit power to the first and the second drive shaft by the planetary gear.

13. The automobile driving system according to claim 12, wherein when a forward drive range is selected the input selecting means transmits the output of the transmission to the ring gear, the fifth friction coupling element is disengaged to allow the ring gear to rotate, the planetary gear functions as a center differential gear for distributing power to the carrier and the sun gear at a predetermined power distribution ratio, the fourth friction coupling element is engaged for power transmission and the third friction coupling element is engaged to limit differential rotation between the carrier and the sun gear.

14. The automobile driving system according to claim 13, wherein the torque transmission capacity of the third friction coupling element is controlled on the basis of data representing the traveling condition of the vehicle when the forward drive range is selected.

15. The automobile driving system according to claim 12 wherein when a reverse range is selected the input selecting means transmits the output of the transmission to the sun gear, the fifth friction coupling element is engaged to restrain the ring gear from rotation, the third friction coupling element is disengaged and the fourth friction coupling element is disengaged.

16. The automobile driving system according to claim 15, wherein the torque transmission capacity of the third friction coupling element is controlled on the basis of data representing the traveling condition of the vehicle when the reverse range is selected.

17. The automobile driving system according to claim 12, wherein the input selecting means further comprises a first friction coupling element which is engaged to transmit the output of the transmission to the ring gear when the forward drive range is selected, and a second friction coupling element which is engaged to transmit the output of the transmission to the sun gear when the reverse mode is selected.

18. An automobile driving system comprising:

an engine;

a transmission driven by the engine, said transmission having a primary pulley set operatively coupled with a crankshaft of the engine and a secondary pulley set arranged in parallel to the primary pulley set on substantially the same level;

a differential gear disposed under the primary and secondary pulley sets;

a drive shaft connected to the differential gear and disposed in parallel to the crankshaft of the engine;

a planetary gear disposed on the drive shaft and having a carrier operatively coupled with an output shaft of the secondary pulley set and a sun gear coupled with the drive shaft for power transmission;

a first friction coupling element for interlocking the carrier and the drive shaft to set up a forward drive mode; and a second friction coupling element for restraining a ring gear of the planetary gear from rotation to set up a reverse mode.

19. The automobile driving system according to claim 18, wherein the engine is mounted on a vehicle body in a longitudinal disposition and the planetary gear is disposed on the side of the transmission opposite to the side facing the engine.

20. The automobile driving system according to claim 7 wherein the input selecting means comprises a first friction coupling element which is engaged to transmit the output of the transmission to the ring gear when the forward drive range is selected, and a second friction coupling element which is engaged to transmit the output of the transmission to the carrier when the reverse mode is selected.

21. The automobile driving system according to claim 20, wherein the engine is mounted on a vehicle body in a longitudinal disposition and the planetary gear is disposed on the side of the transmission opposite to the side facing the engine.

* * * * *